United States Patent [19]

Crow et al.

[11] Patent Number: 5,832,266
[45] Date of Patent: Nov. 3, 1998

[54] ENCAPSULATION OF APPLICATIONS FOR INCLUSION WITHIN AN OBJECT MANAGEMENT FACILITY ENVIRONMENT

[75] Inventors: William M. Crow, San Jose; Yitzchak Ehrlich, Sunnyvale, both of Calif.

[73] Assignee: Hewlett-Packard Company, Palo Alto, Calif.

[21] Appl. No.: 336,718

[22] Filed: Nov. 9, 1994

Related U.S. Application Data

[63] Continuation of Ser. No. 292,610, Dec. 30, 1988, abandoned.

[51] Int. Cl.[6] ............................................. G06F 9/06
[52] U.S. Cl. ................................. 395/700; 364/DIG. 1; 364/286.2
[58] Field of Search ...................................... 395/650, 700

[56] References Cited

U.S. PATENT DOCUMENTS

| | | | |
|---|---|---|---|
| 4,205,371 | 5/1980 | Feather | 364/200 |
| 4,468,732 | 8/1984 | Raver | 364/200 |
| 4,631,664 | 12/1986 | Bachman | 364/200 |
| 4,791,561 | 12/1988 | Huber | 364/200 |
| 4,809,219 | 2/1989 | Ashford et al. | 364/900 |
| 4,833,597 | 5/1989 | Wakayama et al. | 364/200 |
| 4,853,842 | 8/1989 | Thatte et al. | 364/200 |
| 4,864,497 | 9/1989 | Lowry et al. | 364/300 |
| 4,866,634 | 9/1989 | Reboh et al. | 364/900 |
| 4,866,635 | 9/1989 | Kahn et al. | 364/200 |

FOREIGN PATENT DOCUMENTS 0 236 744  9/1987  European Pat. Off. .

OTHER PUBLICATIONS

William M. Crow: "Encapsulation of Applications in the NewWave Environment", Hewlett–Packard Journal, vol. 40, No. 4, Aug, 1989, pp. 57–64.

*Primary Examiner*—Thomas M. Heckler

[57] ABSTRACT

A computing system having an object management facility is presented. The object management facility manages a plurality of objects. Each object references an application designed to run in conjunction with the object management facility. The computing system also includes an encapsulation system which facilitates the inclusion in the computing system of a first application not designed to run in conjunction with the object management facility. The encapsulation facility includes an encapsulation shell and a shell filter. The encapsulation shell is referenced by objects as if the encapsulation shell was an application designed to run in conjunction with the object management facility. The encapsulation shell also acts as an interface between the object management facility and the first application. The shell filter interacts with the encapsulation shell and upon instruction from the encapsulation shell is able to intercept commands from a user to the first application. The shell filter also forwards to the first application commands generated by the encapsulated shell.

10 Claims, 149 Drawing Sheets

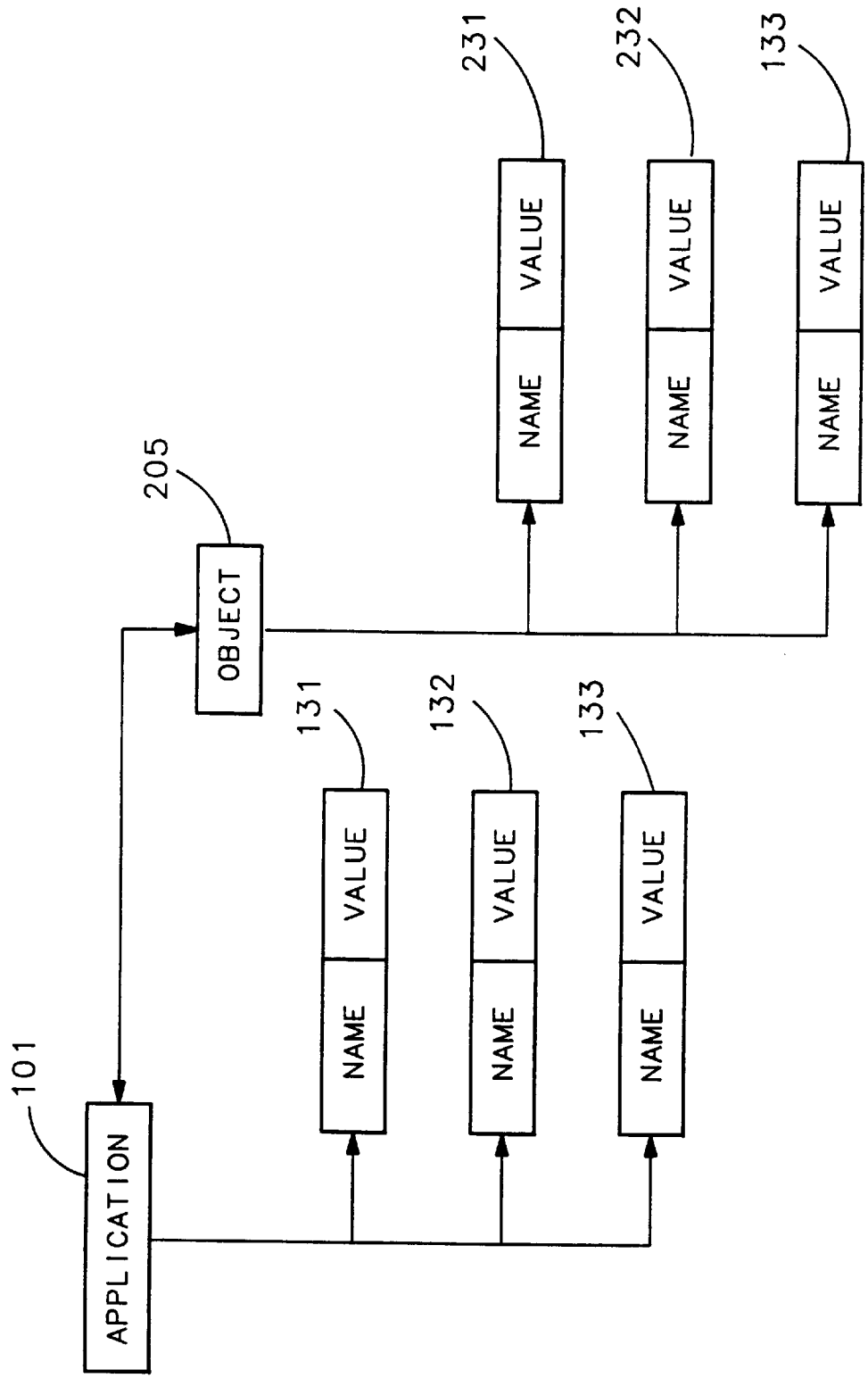

Col 10Ln 1Pg 1Doc DEMODOC1.AW

READY!

FIG 134

```
READY!                Col 10Ln 1Pg 1Doc DEMODOC1.AW

This is a sample document created with
HP AdvanceWrite PLUS running under the
HP NewWave system using the Generic
Encapsulation Shell.
```

FIG 135

ENCAPSULATION OF APPLICATIONS FOR INCLUSION WITHIN AN OBJECT MANAGEMENT FACILITY ENVIRONMENT

This application is a continuation of application Ser. No. 07/292,610, filed Dec. 30, 1988, now abandoned.

BACKGROUND

The present invention relates to the encapsulation of applications to be run on an object management facility.

One problem that has made computer use difficult is inefficient file management systems. For instance, in a directory, there cannot exist two files with the same name.

Further, there is data incompatibility between data files which are originated by different computer applications. Typically, each computer application operates independently from other computer applications. It is extremely rare that data from one computer application may be effectively incorporated into data from another application. If data is incorporated, it is difficult if not impossible to modify. Furthermore, once data has been transferred from a first application to a second application, it is usually impossible to return the data back to the first application to be modified.

Once an environment has been presented which allows the effective transfer of data between applications, there remains the problem of upward compatibility for applications which were not originally designed to function in the environment.

SUMMARY OF THE INVENTION

In accordance with the preferred embodiment of the present invention a computing system having an object management facility is presented. The object management facility manages a plurality of objects. Each object references an application designed to run in conjunction with the object management facility. The computing system also includes an encapsulation system which facilitates the inclusion in the computing system of a first application not designed to run in conjunction with the object management facility. The encapsulation facility includes an encapsulation shell and a shell filter. The encapsulation shell is referenced by objects as if the encapsulation shell was an application designed to run in conjunction with the object management facility. The encapsulation shell also acts as an interface between the object management facility and the first application. The shell filter interacts with the encapsulation shell and upon instruction from the encapsulation shell is able to intercept commands from a user to the first application. The shell filter also forwards to the first application commands generated by the encapsulated shell.

The encapsulated shell may be used for a variety of applications. In order that the encapsulated shell may know particular information about a particular application, each application to be encapsulated by the encapsulated shell has associated with it configuration properties. Likewise, a menu/macro definitions file may be associated with an encapsulated application and accessed by the encapsulated shell in order to define macros and menus made available to the user by the encapsulation shell and the shell filter.

BRIEF DESCRIPTION OF THE DRAWINGS

FIG. 2A is a block diagram shows class properties associated with an Application and object properties associated with objects in accordance with the preferred embodiment of the present invention.

FIG. 134 shows a display for the application "Advance-Write."

FIG. 135 shows text having been added to the screen shown in FIG. 134.

DESCRIPTION OF THE PREFERRED EMBODIMENT

Figure 1:
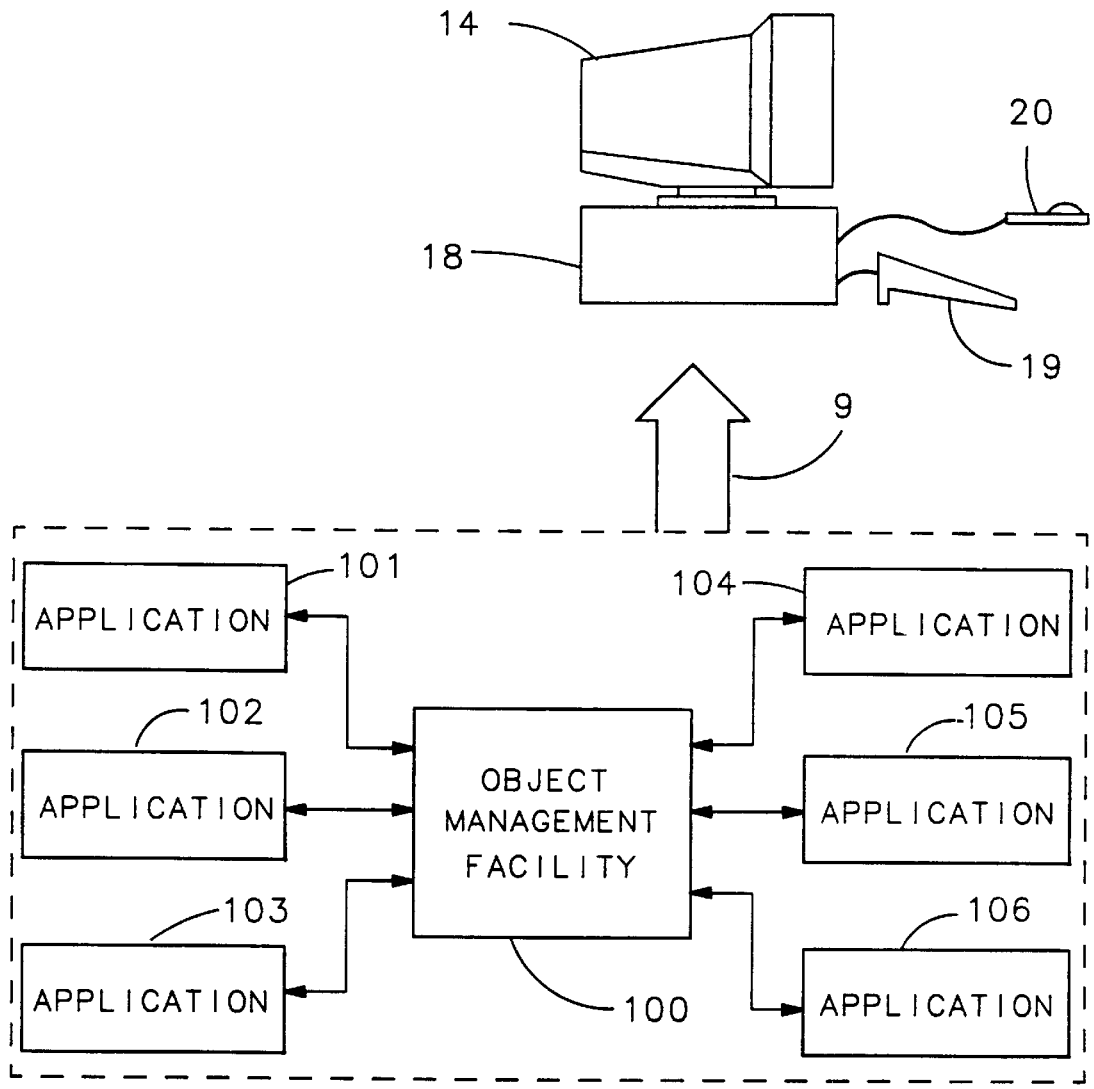
FIG. 1 is a block diagram of a computer in accordance with the preferred embodiment of the present invention.

FIG. 1 shows a computer 18 having a monitor 14, a keyboard 19 and a mouse 20. A portion of computer main memory 17 is shown by an arrow 9 to be within computer 18. Within computer main memory 17 is shown an object management facility (OMF) 100, an application 101, an application 102, an application 103, an application 104, an application 105 and an application 106.

Figure 2:
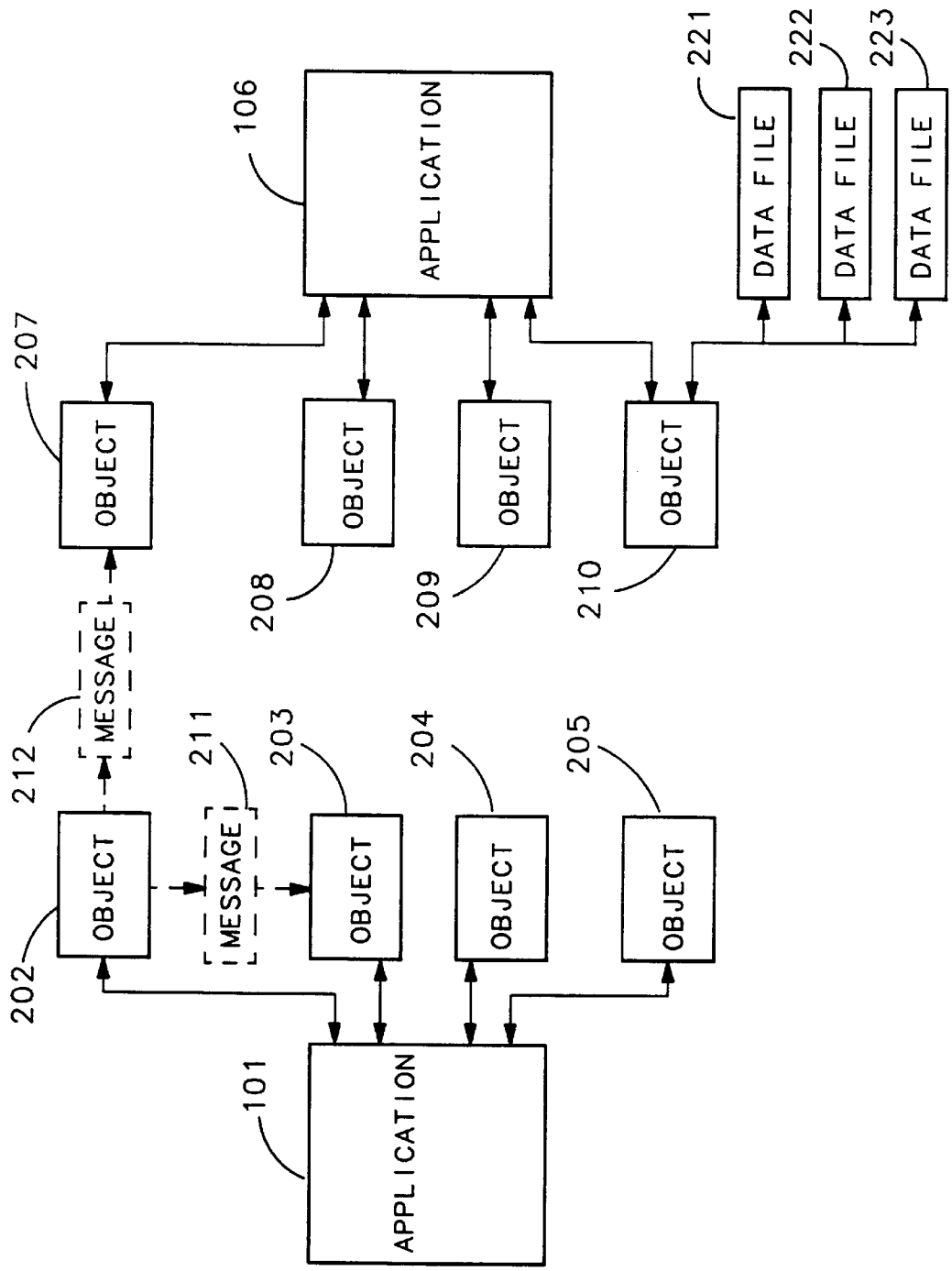
FIG. 2 shows a block diagrams which illustrates the relationship between objects, applications and data files in accordance with the preferred embodiment of the present invention.

Each of applications 101 to 106 store data using objects. For instance, in FIG. 2, application 101 is shown to have stored data using an object 202, an object 203, an object 204 and an object 205. Similarly, application 106 is shown to have stored data in an object 207, an object 208, an object 209 and an object 210. OMF 100 stores information indicating which objects go with which application. Objects which are associated with a single application are considered to be objects of the same type, or the same class. For instance, object 202, 203, 204 and 205 are of the same class because each is associated with application 101. Similarly objects 207, 208, 209 and 210 are of the same class because each is associated with application 106. All objects of the same class use the same application. When an application is being run by computer 18, OMF 100 informs the application which object the application should access for data. That object is then considered to be active. An object is inactive when the application the object is associated with is not being run by computer 18, or when the application the object is associated with is being run, but is not being run with the data of that object.

Active objects can communicate with each other using messages. For example if two instances of application 101 are being run by computer 18, one with the data of object 202 and the other with the data of object 203, object 202 and object 203 are both active. Therefore object 202 may send a message 211 to object 203. Similarly, if computer 18 is running application 101 with the data of object 202, and is running application 106 with the data of object 207, object 202 and object 207 are both active. Therefore, object 202 may send a message 212 to object 207.

Messages, such as message 211 and 212 may be formatted to be sent and received by all types of objects. This allows for free communication between all active objects. This also allows new object types to be defined and added to the system without requiring that the existing object types be updated to use the new type.

Each object has associated with a set of data files. For instance, object 210 is shown to have associated with it a data file 221, a data file 222 and a data file 223. Data in data files 221, 222 and 223 are in a format which can be interpreted by application 106.

Each object has associated with it a list of properties. Each property has a name and a value which may be accessed by specifying the name. In addition, each class of objects has associated with it a list of properties that are common to all objects of that class. For instance, in FIG. 2A, object 205 and application 101 are shown. Object 205 has associated with it a property 231, a property 232, and a property 233. Application 101 has associated with it a property 131, a property 132 and a property 133.

Property 131 includes a name 1131 and a value 2131. Property 132 includes a name 1132 and a value 2132. Property 133 includes a name 1133 and a value 2133. Property 231 includes a name 1231 and a value 2231. Property 232 includes a name 1232 and a value 2232. Property 233 includes a name 1233 and a value 2233.

Property lists can contain any number of properties. Each property value can be from zero to 3,2762 bytes in length. Properties are used to store descriptive information about objects and classes, such as names, comments and so on.

Objects may have references to other objects. These references are called links. Links are directional: one object is called the parent, the other the child. Each link has a reference name which is a number that is assigned by the parent object to identify each of its children. All of an object's children, its children's children, and so on are collectively called that object's descendants. Similarly, an object's parents, its parents' parents, and so on, are collectively called that object's ancestors. In the preferred embodiment of the present invention, an object which may be manipulated by a user, can have zero or more children and one or more parents. An object is not allowed to become its own descendant.

Figure 3:
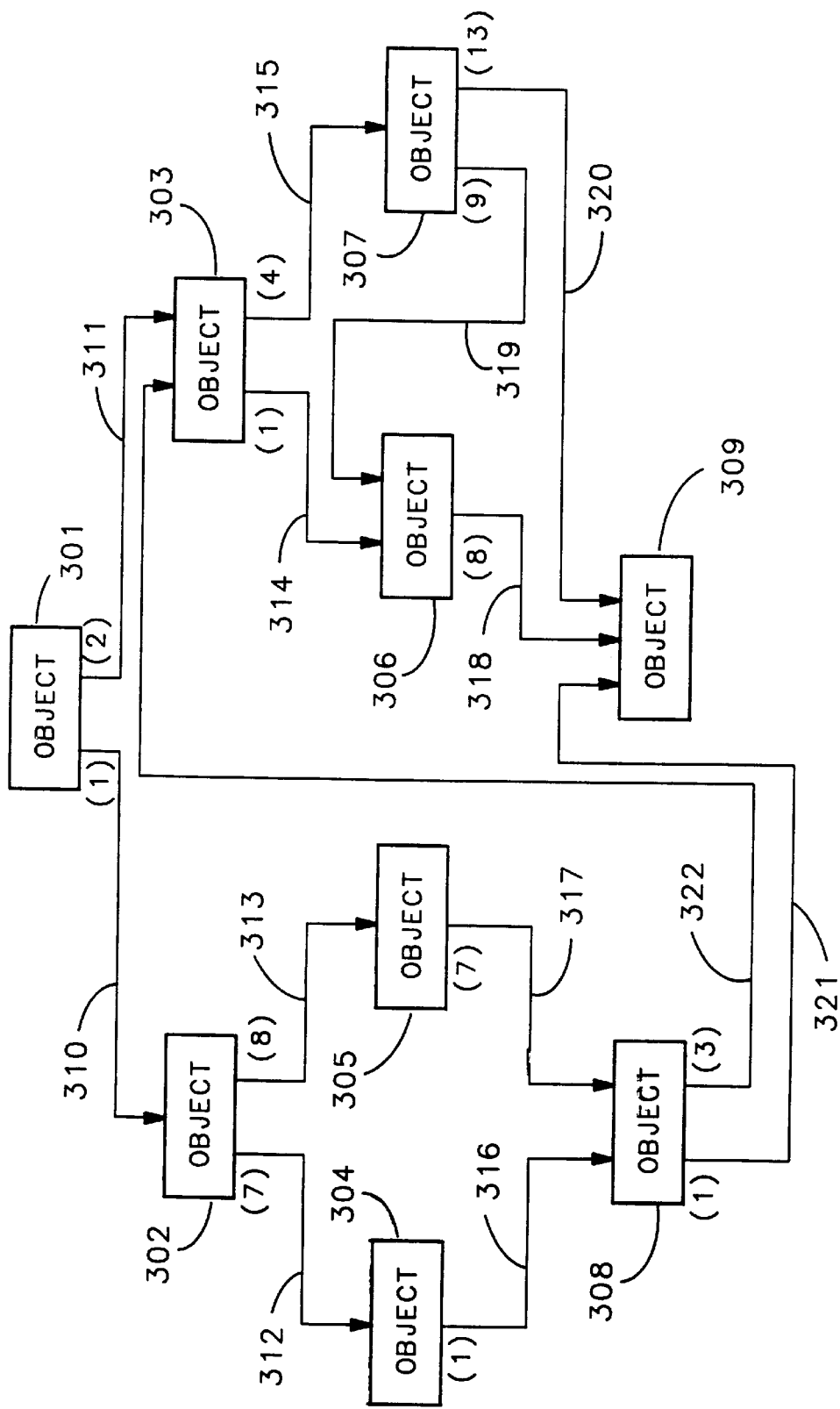
FIG. 3 shows a plurality of objects linked in accordance with a preferred embodiment of the present invention.

In FIG. 3 is shown an object 301, an object 302, an object 303, an object 304, an object 305, an object 306, an object 307, an object 308 and an object 309. Objects 301–309 have links with reference names which are numbers shown in parenthesis by each link. Object 301 has a link 310, with reference name "1", to object 302. Object 301 has a link 311, with reference name "2", to object 303. Object 302 has a link 312, with reference name "7", to object 304. Object 302 has a link 313, with reference name "8", to object 305. Object 303 has a link 314, with reference name "1", to object 306. Object 303 has a link 315, with reference name "4", to object 307. Object 304 has a link 316, with reference name "1", to object 308. Object 305 has a link 317, with reference name "7", to object 308. Object 306 has a link 318, with reference name "8", to object 309. Object 307 has a link 319, with reference name "9", to object 306. Object 307 has a link 320, with reference name "13", to object 309. Object 308 has a link 321, with reference name "1", to object 309. Object 308 has a link 322, with reference name "3", to object 303.

Object 301 is a parent of 302 and 303. Object 303 is a child of object 301 and of object 308. Each of objects 302–309 are descendants of object 301. Descendants of object 303 are objects 306, 307 and 309. Object 309 has for ancestors all of objects 301–308. Object 303 has for ancestors objects 301, 302, 304, 305 and 308. And so on.

Active objects can dynamically make and delete links to other objects. When a link to an object is deleted, OMF 100 checks if the object has any other parents. If not, OMF 100 destroys the object by deleting the data files of the object and reclaiming other storage space associated with the object.

Figure 4:
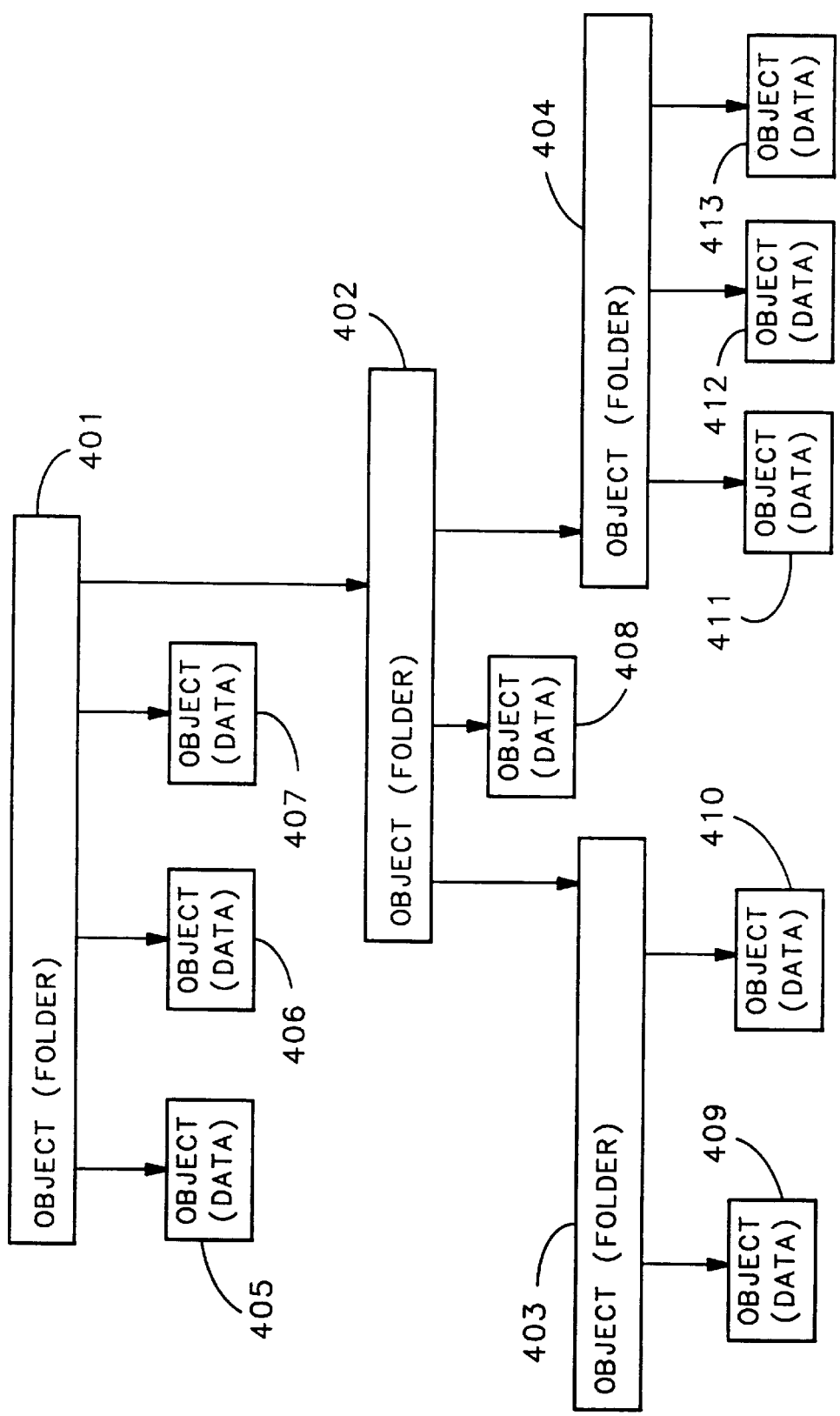
FIG. 4 shows a series of objects serving as folders, as parents of objects containing data, in accordance with a preferred embodiment of the present invention.

Object links may be used for various purposes. For example, folders may be in the form of objects. The children of objects used as folders may be objects containing data for use with various applications, or the objects may be other folders. FIG. 4 shows an example of the use of objects as folders. An object 401 (also called folder 401), an object 402 (also called folder 402), an object 403 (also called folder 403) and an object 404 (also called folder 404) are used as folders. Folder 401 contains an object 405, used to contain data, an object 406, used to contain data, an object 407, used to contain data, and folder 402. Folder 402 contains an object 408, used to contain data, folder 403 and folder 404. Folder 403 contains an object 409, used to contain data, and an object 410, used to contain data. Folder 404 contains an object 411, used to contain data, an object 412, used to contain data and an object 413, used to contain data.

Figure 5:
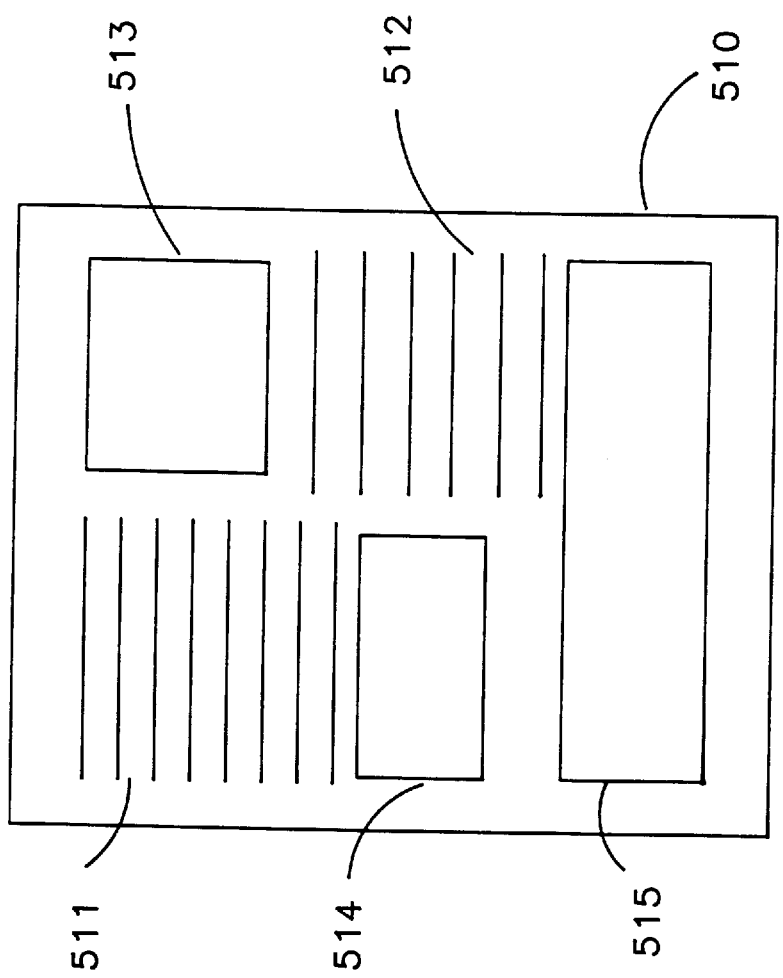
FIG. 5 illustrates the screen display which results from linking of various objects in accordance with a preferred embodiment of the present invention.
Figure 6:
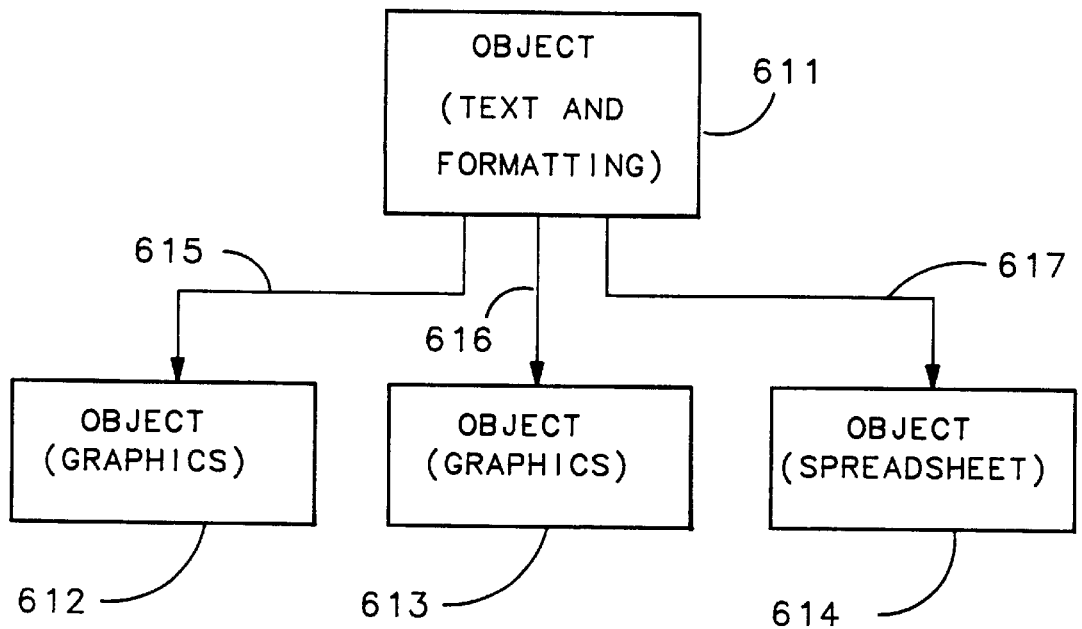
FIG. 6 shows the linking of objects in order to create the screen display shown in FIG. 5.

A more sophisticated use of links is to construct compound objects. For instance in FIG. 5, a document 510 contains lines of text 511, lines of text 512, a graphics FIG. 513, a graphics FIG. 514 and spreadsheet data 515. As shown in FIG. 6, text and formatting data is stored in an object 611, graphics data for graphics FIG. 513 is stored in an object 612, graphics data for graphics FIG. 514 is stored in an object 613 and spreadsheet data 515 is stored in object 614. Links that are used to build compound objects always have some kind of data transfer associated with the link and hence are called data links. In FIG. 6 is shown a data link 615, a data link 616 and a data link 617. In document 510, data from object 612, object 613 and object 614 are merely displayed, therefore data link 614, data link 615 and data link 616 are visual data links. In a visual data link, the parent will send requests to its child to display data within the parent's window.

Figure 7:
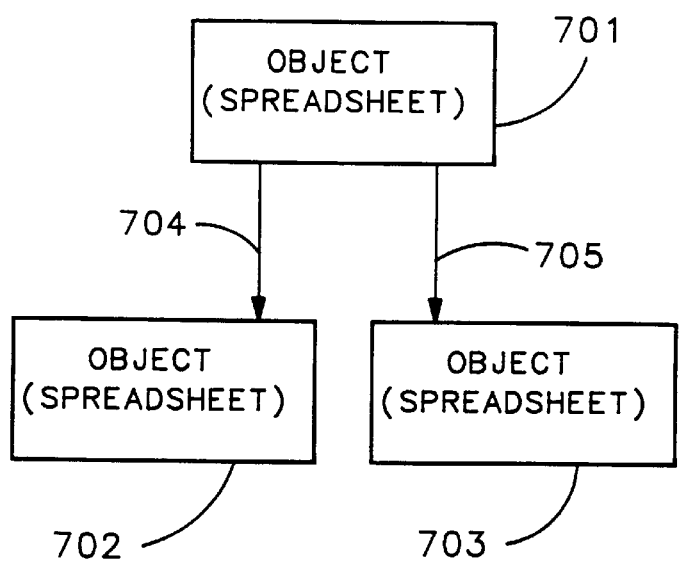
FIG. 7 shows how three objects may be linked together in accordance with a preferred embodiment of the present invention.

In FIG. 7, an object 701, which contains data for a first spreadsheet, is linked through data link 704 to an object 702, which contains data for a second spreadsheet, and is linked through data link 705 to an object 703, which contains data for a third spreadsheet. The first spreadsheet uses data from the second spreadsheet and from the third spreadsheet. Since the first spreadsheet does more than merely display data from the second and the third spreadsheets, data link 704 and data link 705 are called data-passing data links.

OMF 100 does the "bookkeeping" when objects are copied or mailed. When an object is copied, OMF 100 makes copies of data files associated with the object. If the object being copied has children, OMF 100 also makes copies of the object's descendants, and builds links between the new objects to give the new compound object the same structure as the original.

Figure 8:
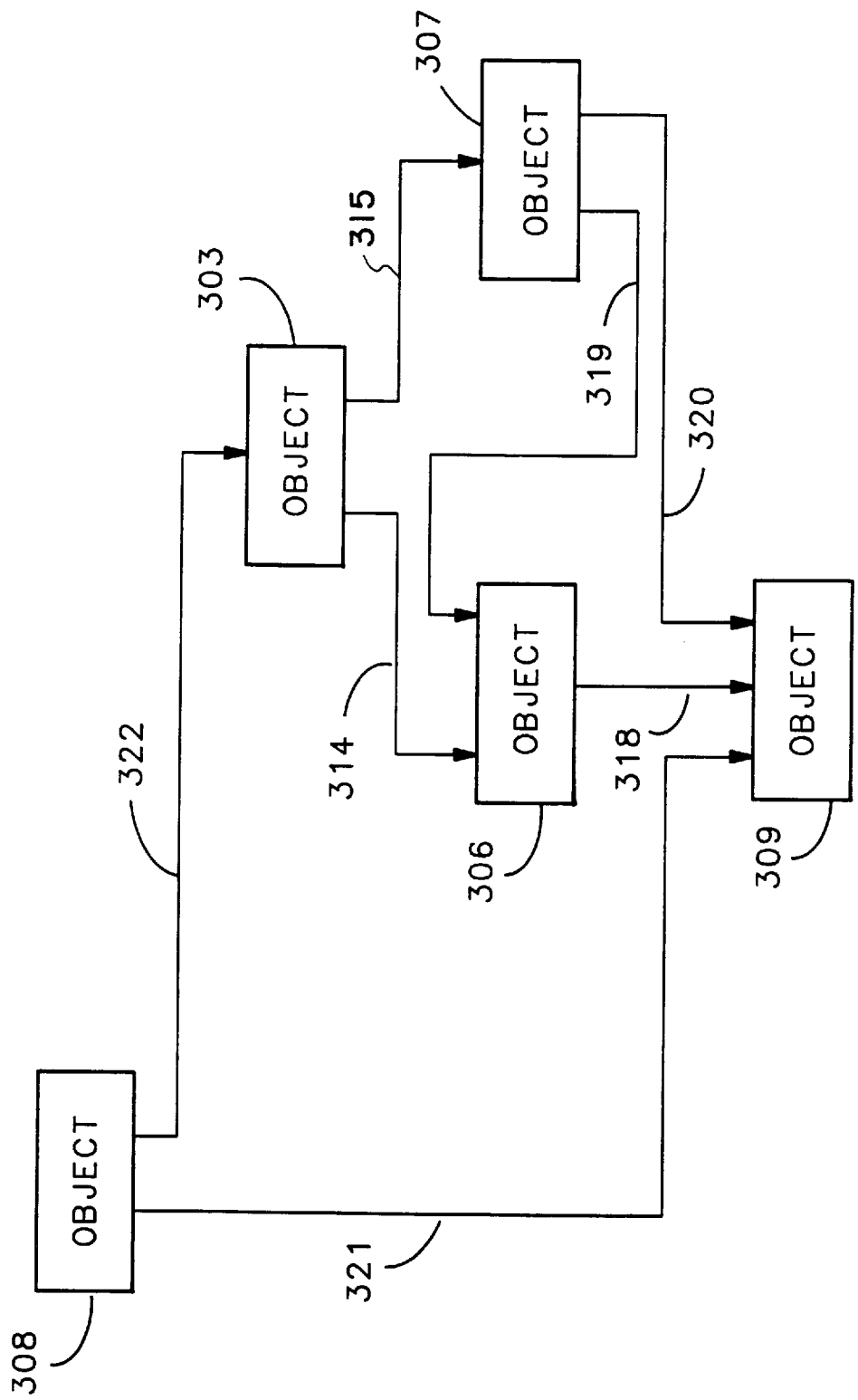
FIG. 8 and FIG. 9 illustrate how an object may be copied in accordance with a preferred embodiment of the present invention.
Figure 9:
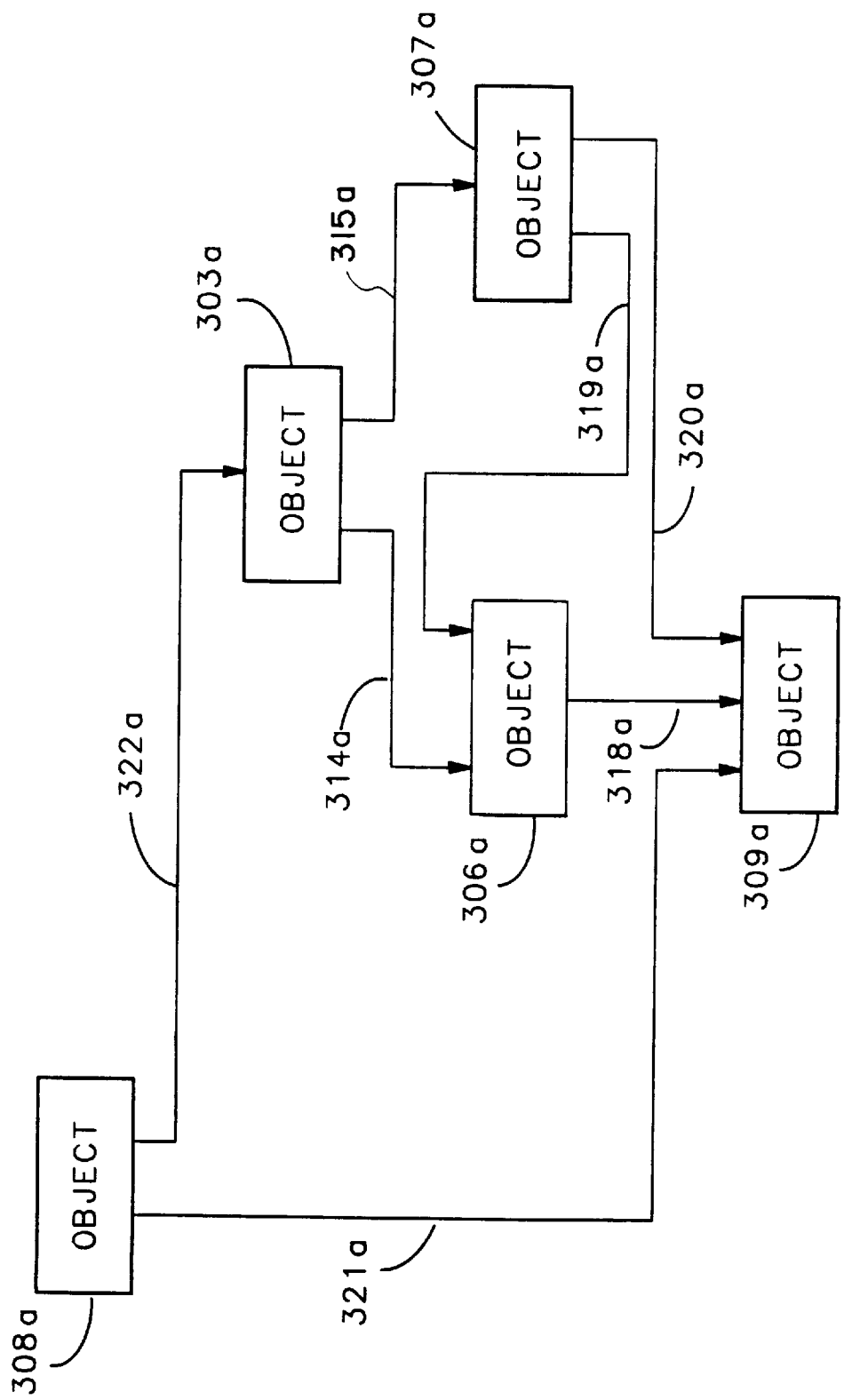

For instance, FIG. 8 shows object 308, from FIG. 3, and the descendants of object 308. When OMF makes a copy of object 308, OMF copies each of object 308's descendants and the links shown in FIG. 8. FIG. 9 shows a copy of object 308. Object 308a is a copy of object 308. Object 303a is a copy of object 303. Object 306a is a copy of object 306. Object 307a is a copy of object 307. Object 309a is a copy of object 309. Link 321a is a copy of link 321. Link 322a is a copy of link 322. Link 314a is a copy of link 314. Link 315a is a copy of link 315. Link 318a is a copy of link 318. Link 319a is a copy of link 319. Link 320a is a copy of link 320.

Figures 10, 11:
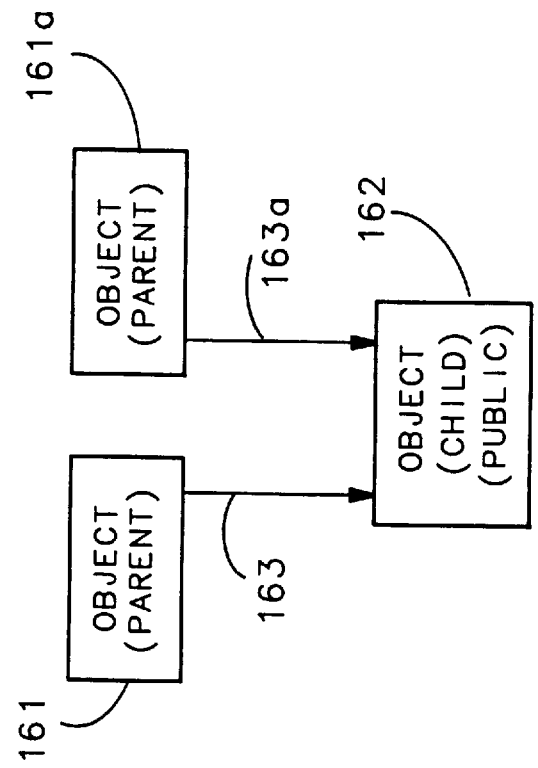
FIG. 10 and FIG. 11 illustrate the copying of a public object in accordance to a preferred embodiment of the present invention.

In the preferred embodiment, the default behavior results in the copy of a parent's children when the parent is copied. However, when a child is designated as "public" it is not copied. Rather, a copy of the parent includes a link to the child. For instance, in FIG. 10, a parent object 161 is to be copied. Parent object 161 is linked to a child object 162 through a link 163. Child object 162 is a public object. As shown in FIG. 11, copying of parent object 161 results in new object 161a being linked to object 162 through a new link 163a. Object 161a is a copy of object 161. Link 163a is a copy of link 163.

Figure 12:
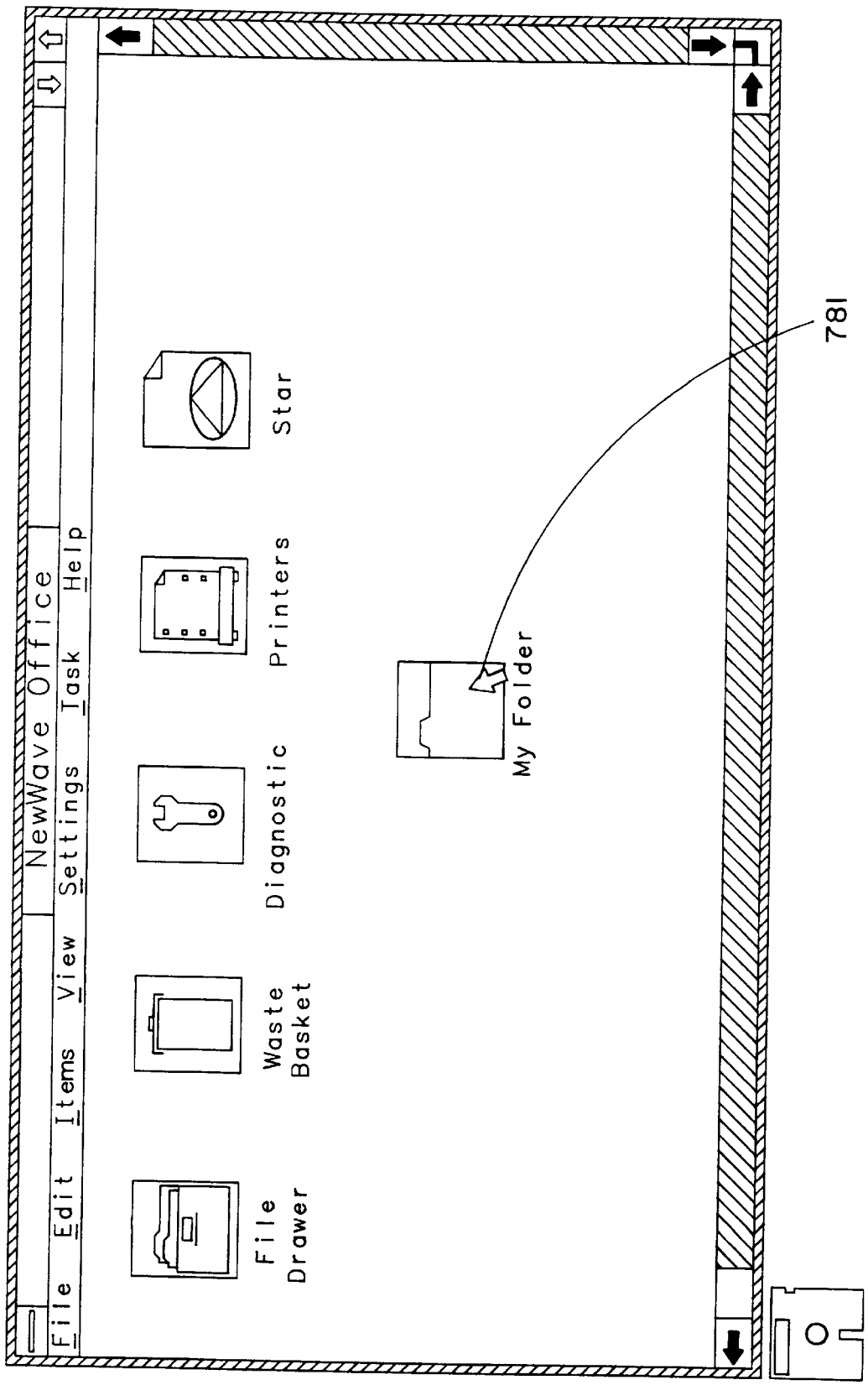
In FIG. 12 a graphic display of a "NewWave Office" desktop is shown, in accordance with the preferred embodiment of the present invention.
Figure 71:
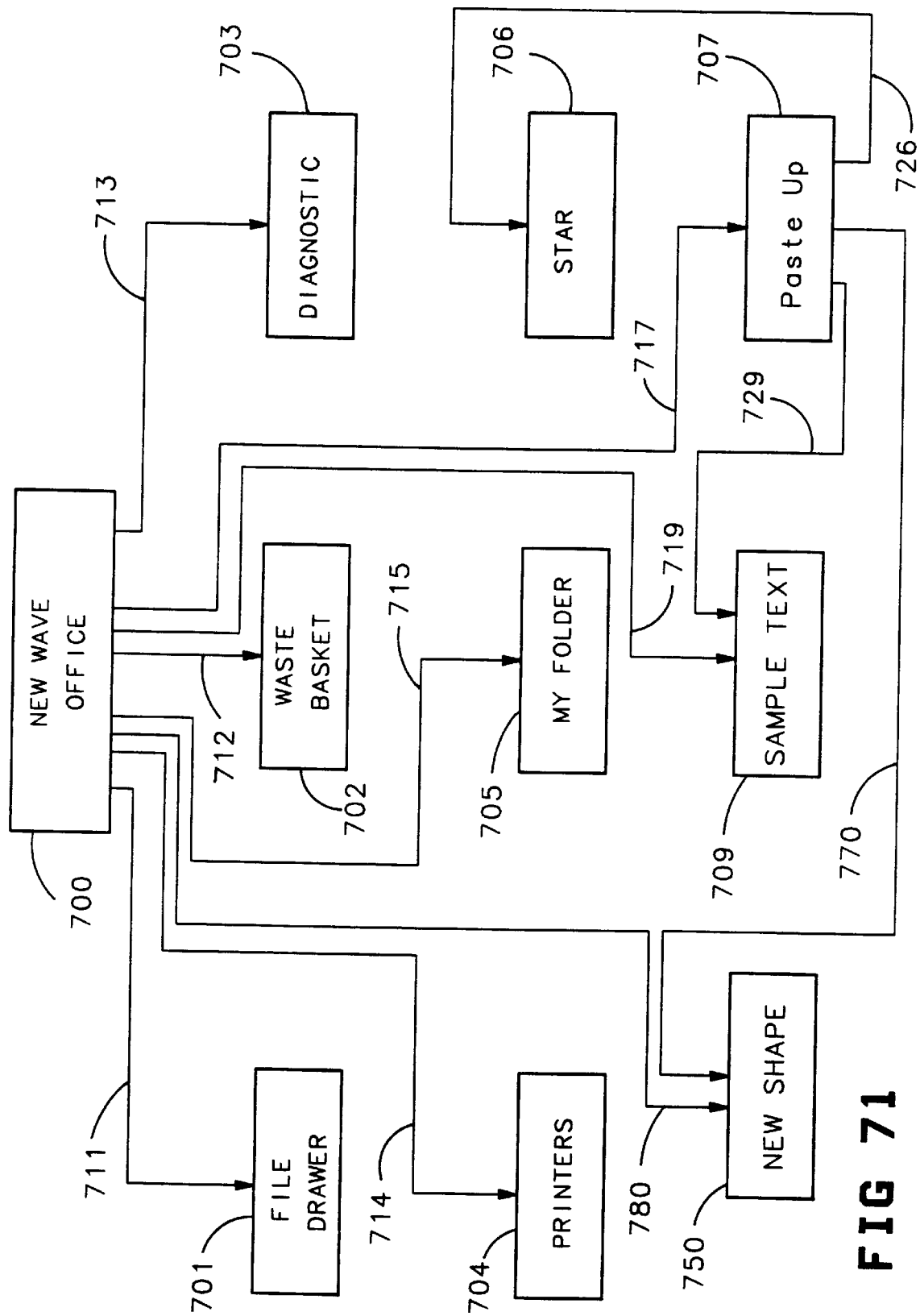
FIG. 71 is a block diagram showing linked objects resulting from the operations illustrated by FIGS. 67, 68, 69 and 70.

In FIG. 12 through FIG. 71, it is shown how objects are displayed to a user on monitor 14. In FIG. 12 a "NewWave Office" desktop is shown to include icons labelled as "File Drawer", "Waste Basket", "Diagnostic", "Printers", "Star" and "My Folder". A user (not shown) has manipulated a cursor 781, using keyboard 19 or mouse 20, to select "My Folder".

Figure 13:
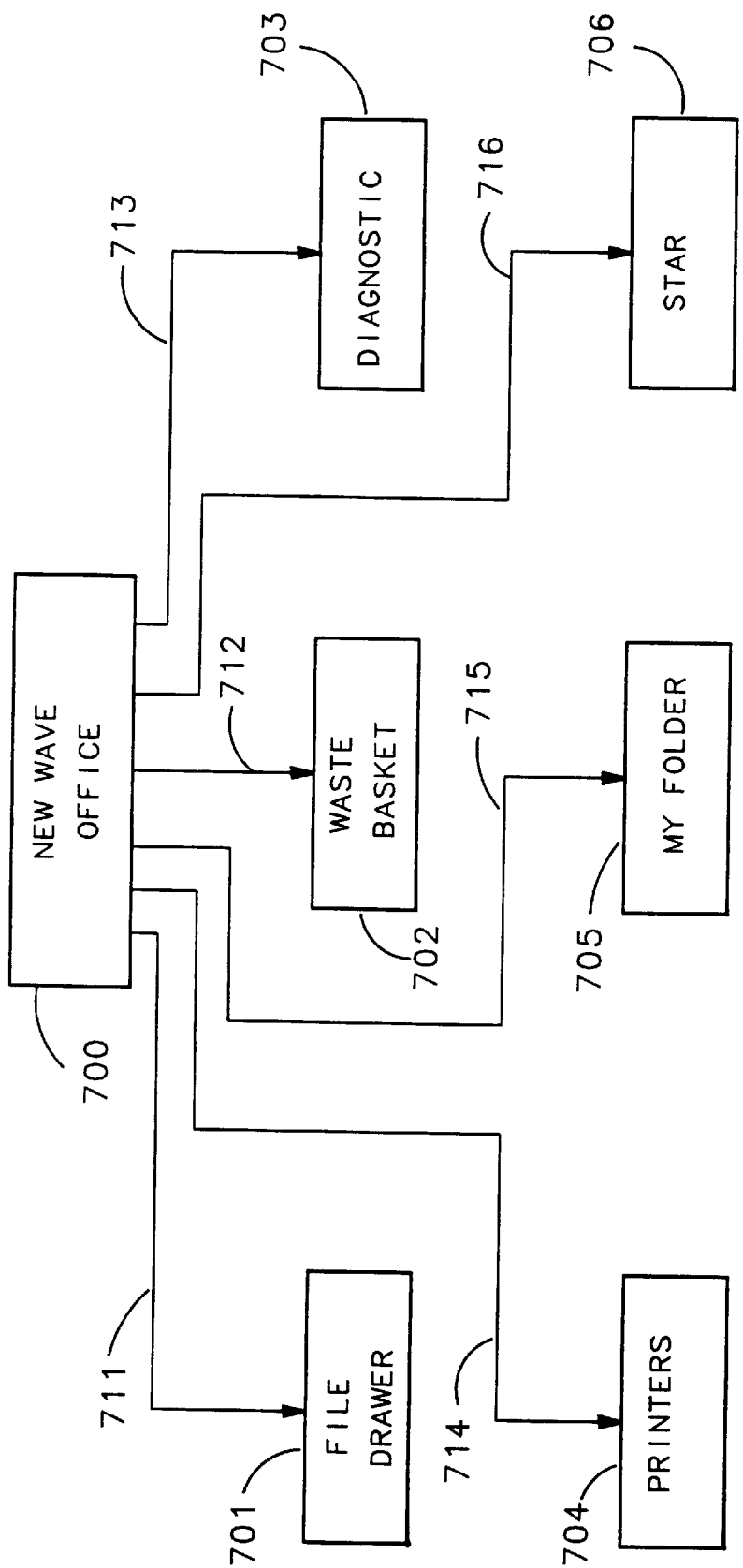
FIG. 13 is a block diagram which shows how objects are linked.

FIG. 13 shows how the objects displayed on monitor 14 are linked. NewWave Office (shown as an object 700) is the parent of "File Drawer" (shown as an object 701) through a link 711, of "Waste Basket" (shown as an object 702) through a link 712, of "Diagnostic" (shown as an object 703) through a link 713, of "Printers" (shown as an object 704)

through a link 714, of "My Folder" (shown as an object 705) through a link 715 and of "Star" (shown as an object 706) through a link 716.

Figure 14:
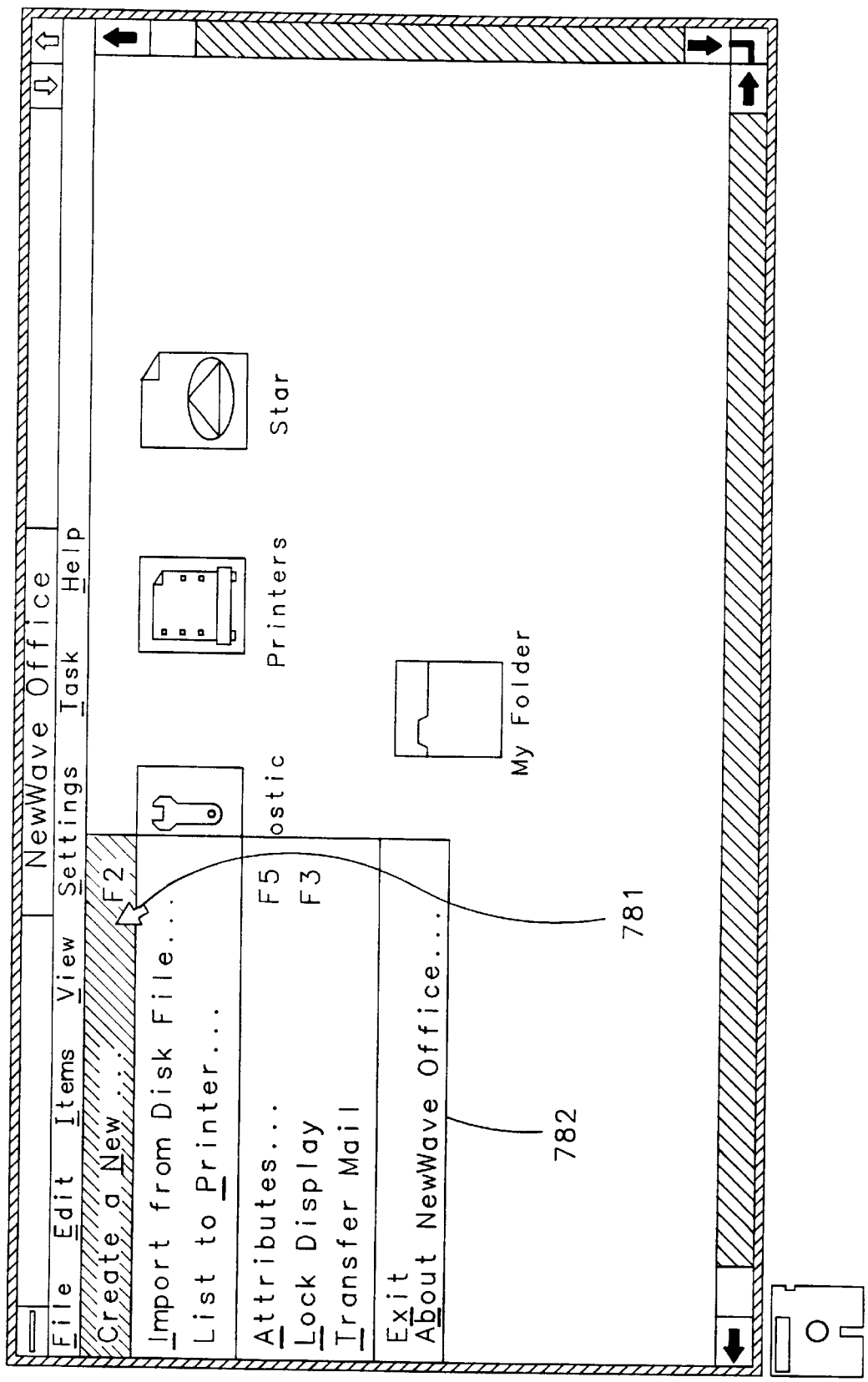
FIGS. 14, 15, and 16 show progress of an operation within a graphic display of the "NewWave Office" desktop.
Figure 15:
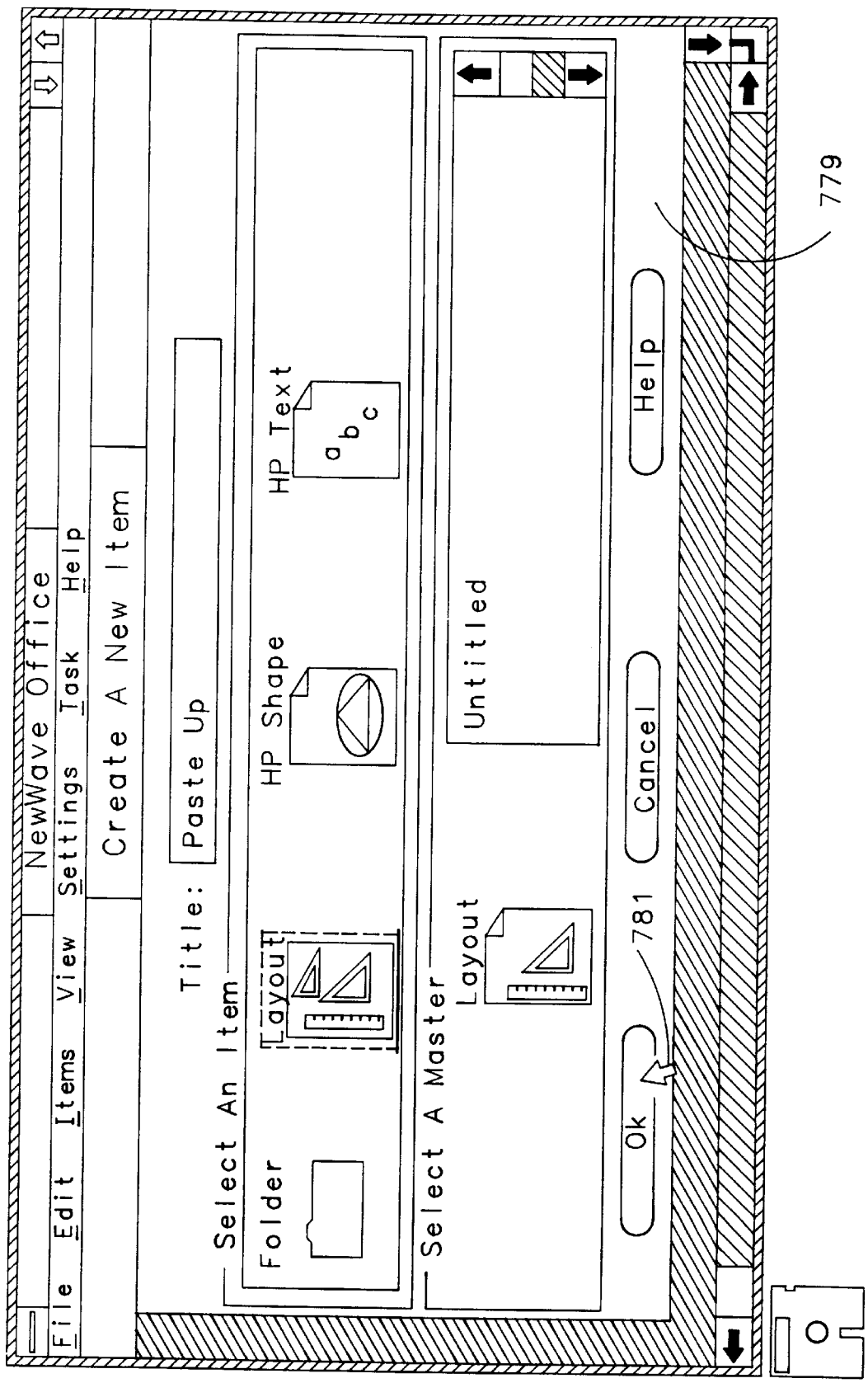
Figure 16:
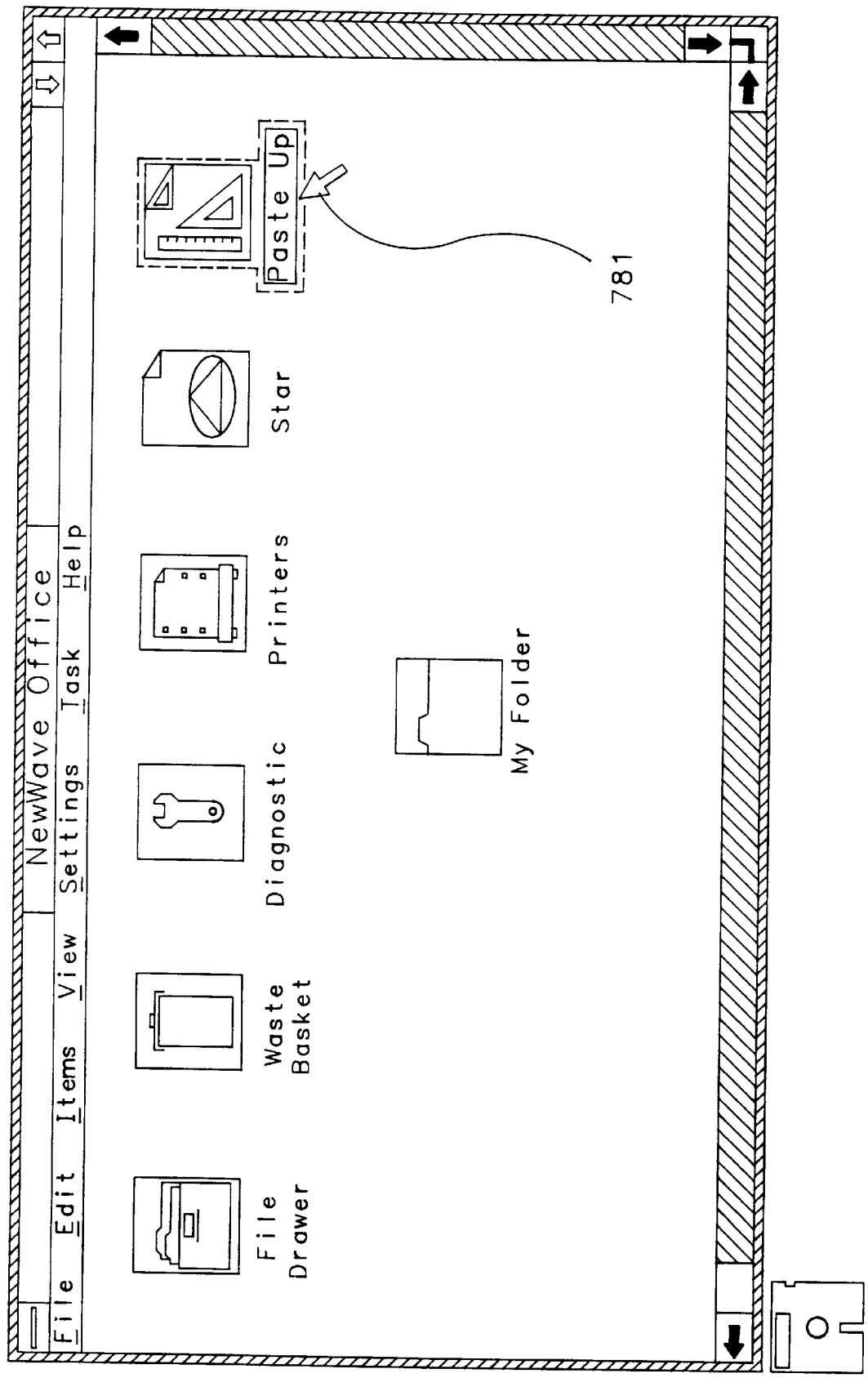

In FIG. 14, the user, using cursor 781, has selected "Create a New . . . " in a pull down menu 782. As a result of this selection a dialog box 779 appears as shown in FIG. 15. Using cursor 781, the user has highlighted the icon "Layout" and using keyboard 19 has typed in the name "Paste Up" as a name for a new object to be created. Cursor 781 now points to a region labelled "OK". Once this region is selected, a new object titled "Paste Up" is created, as is shown in FIG. 16.

Figure 17:
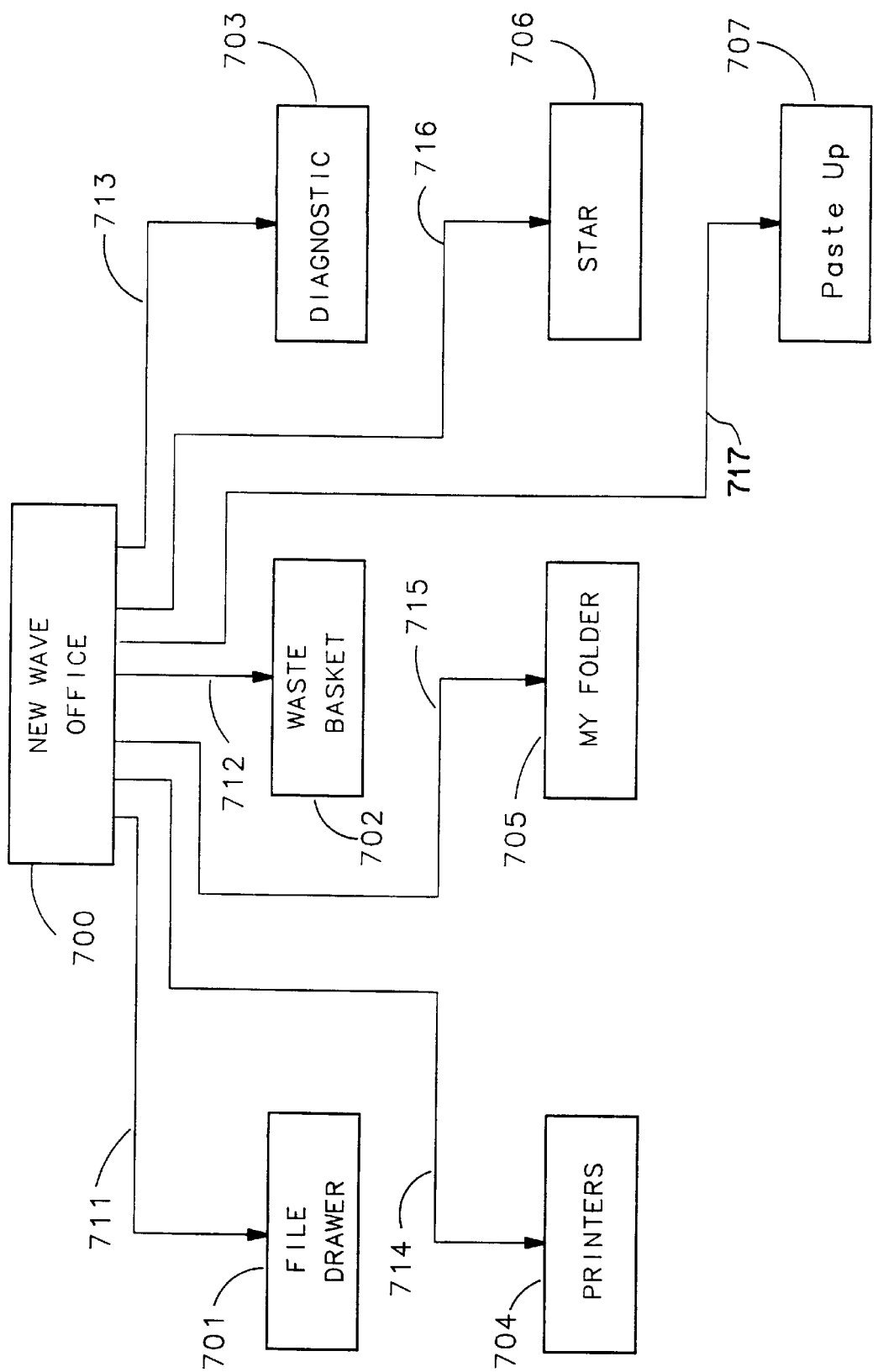
FIG. 17 shows a block diagram of linked objects.

In FIG. 17, "Paste Up" is shown as an object 707 linked as a child of NewWave Office through a link 717.

The basic clipboard operations are Cut, Copy, and Paste. The user must select the data that is to be moved or copied, and then give either the Cut command or the Copy command. Cut moves the selected data to the clipboard (deleting it from its original location). Copy makes a copy of the selected data on the clipboard. The user must then select the location where he wants the data to be moved or copied to, and give the Paste command. This command copies the contents of the clipboard to the selected location.

Figure 18:
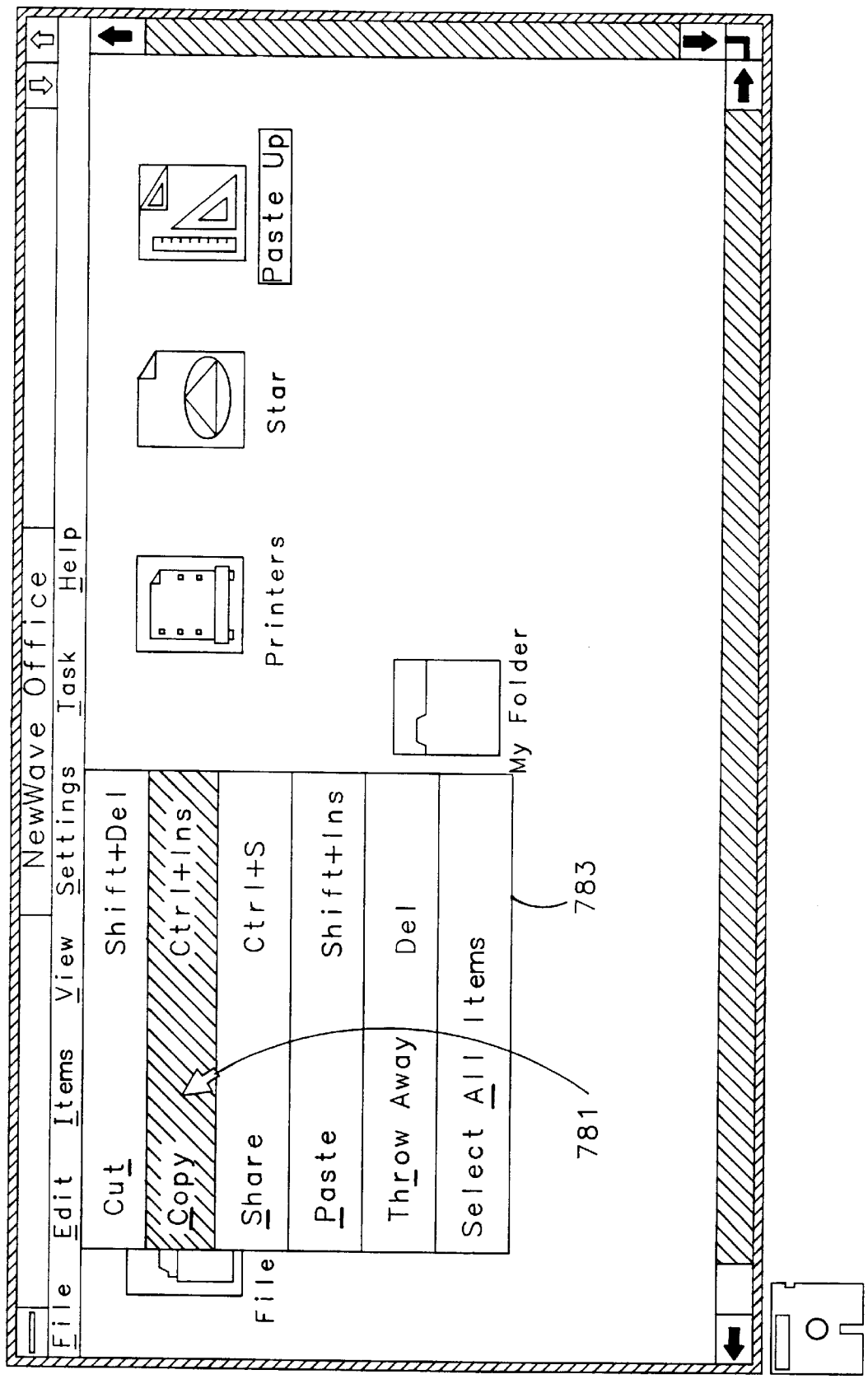
FIG. 18 illustrates an operation within a graphic display of the "NewWave Office" desktop.
Figure 18A:
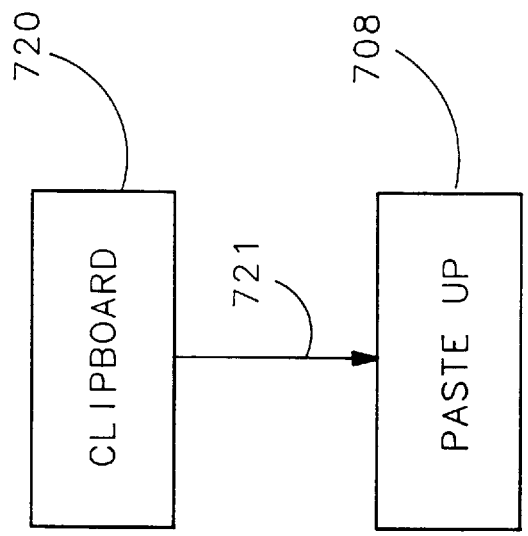
FIG. 18A is a block diagram showing linked objects resulting from the operation illustrated by FIG. 18.

In FIG. 18 a user is shown to have selected "Paste Up". The selection is represented by the icon for "Paste Up" being displayed using inverse video. With cursor 781, the user selects "Copy" from a pull down menu 783. In FIG. 18A a Clipboard object 720 is shown to be a parent of an object 708 through a link 721. Object 708, is a copy of object 707 ("Paste Up").

Figure 19:
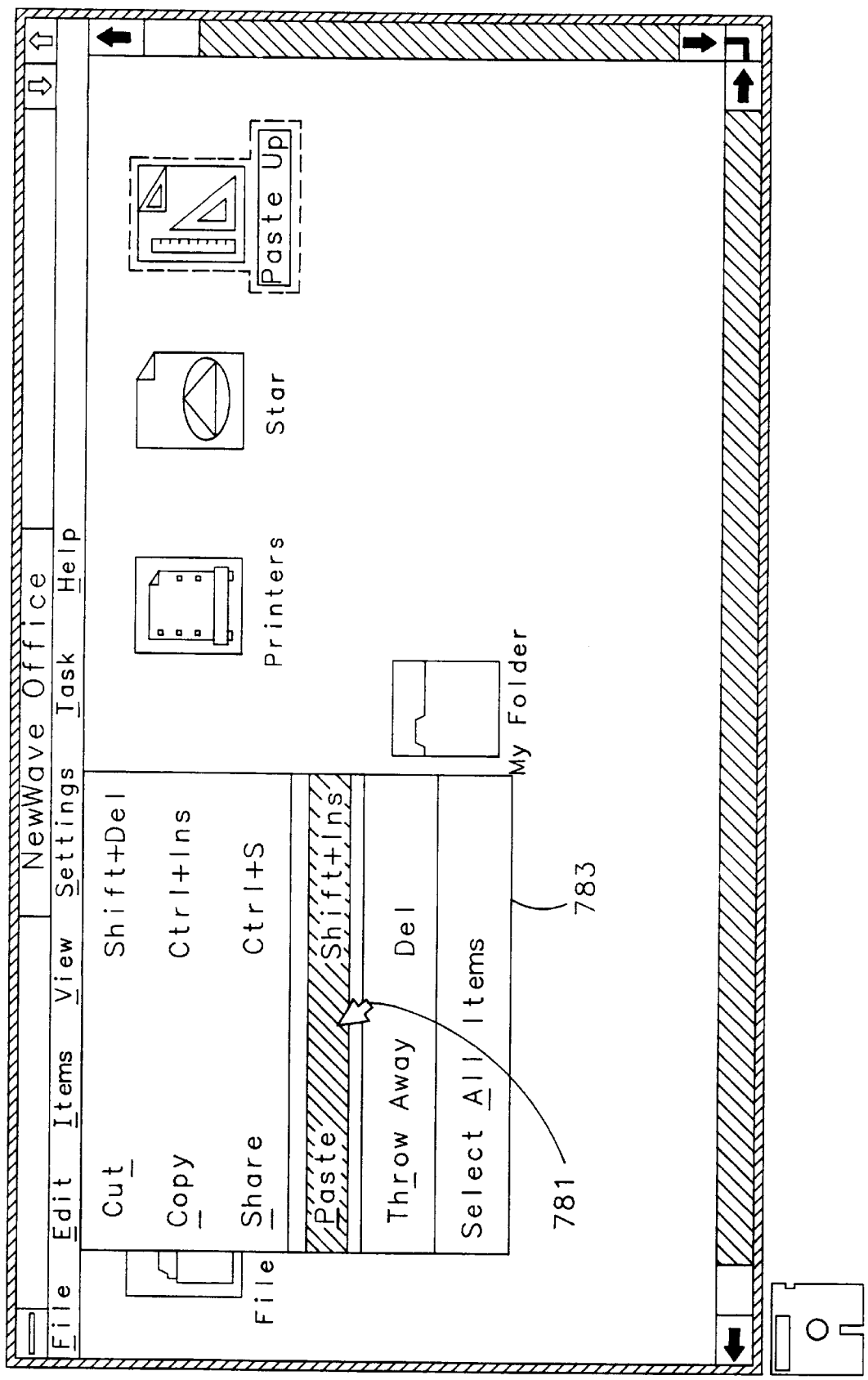
FIGS. 19 and 20 show progress of an operation within a graphic display of the "NewWave Office" desktop.
Figure 20:
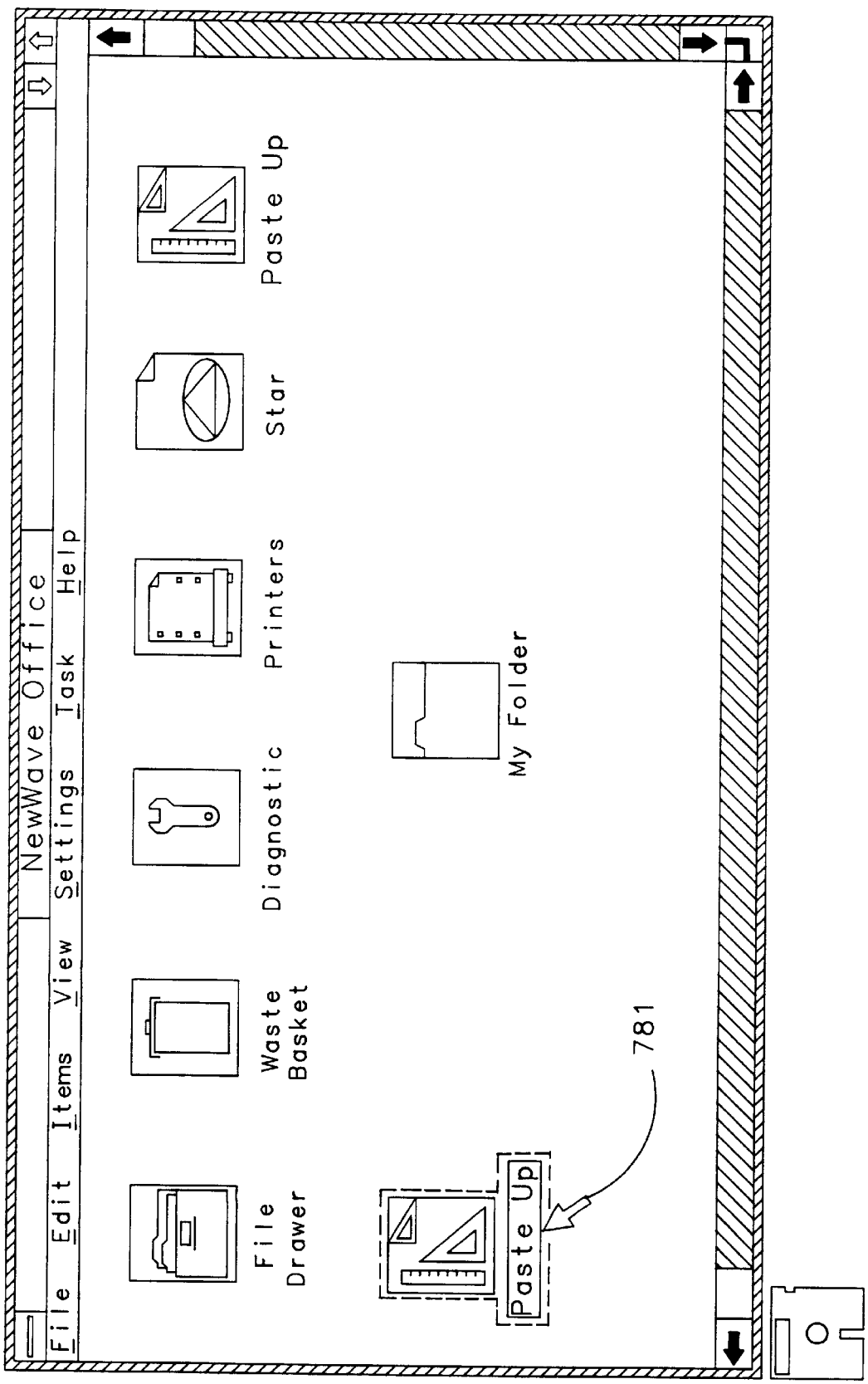

As shown in FIG. 19, next the user selects "Paste" from pull down men 783. The result, shown in FIG. 20, is the addition of an object 708, pointed to by cursor 781, which is a copy of the original "Paste Up" object 707.

Figure 21:
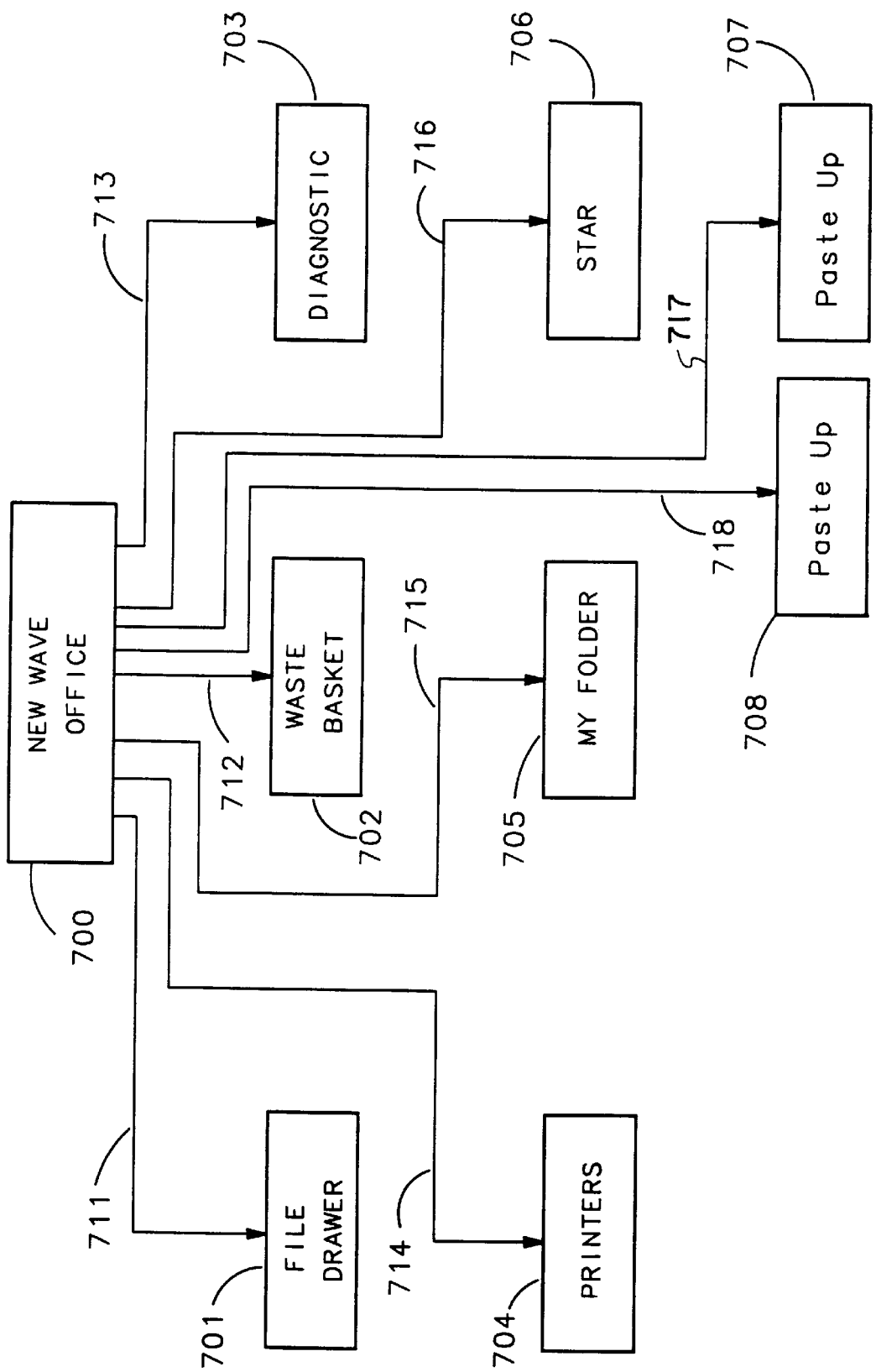
FIG. 21 is a block diagram showing linked objects resulting from the operation illustrated by FIGS. 19 and 20.

In FIG. 21, the new object is shown as object 708 linked as a child of NewWave Office through a link 718.

Figure 22:
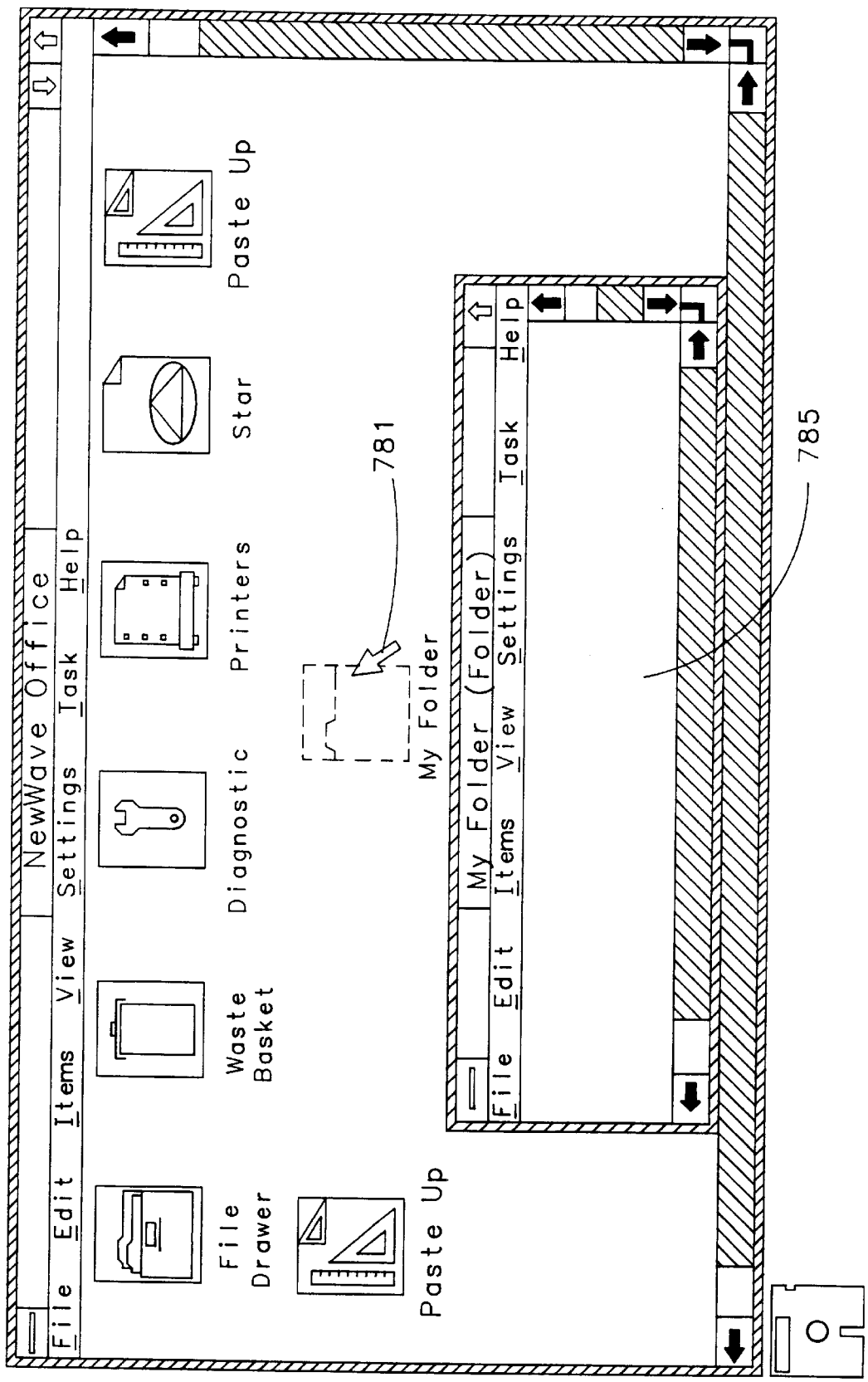
FIGS. 22, 23 and 24 show progress of an operation within a graphic display of the "NewWave Office" desktop.

In FIG. 22, "My Folder", has been opened by double clicking the icon for "My Folder" using cursor 781. The result is a new window 785 representing "My Folder".

Figure 23:
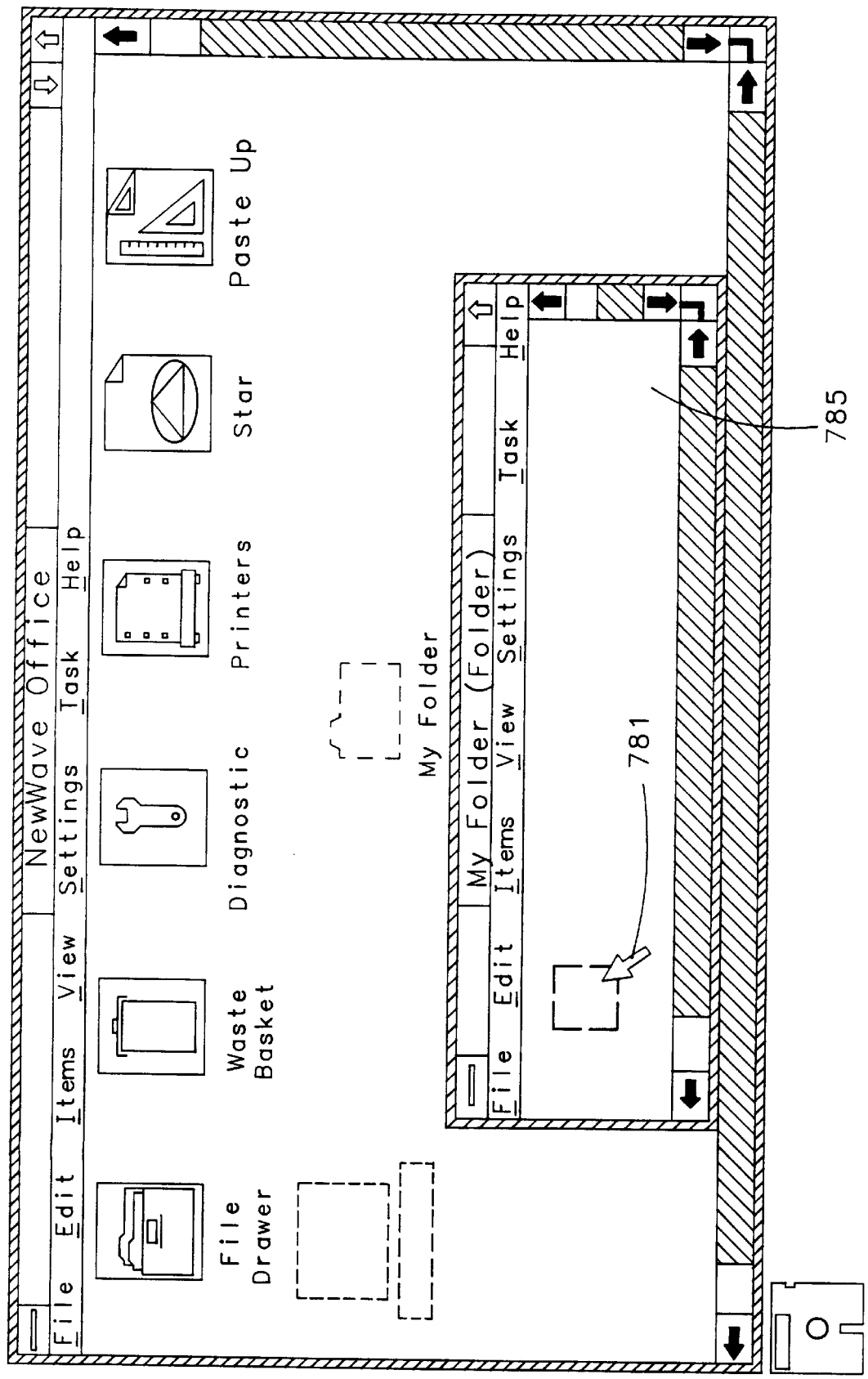
Figure 24:
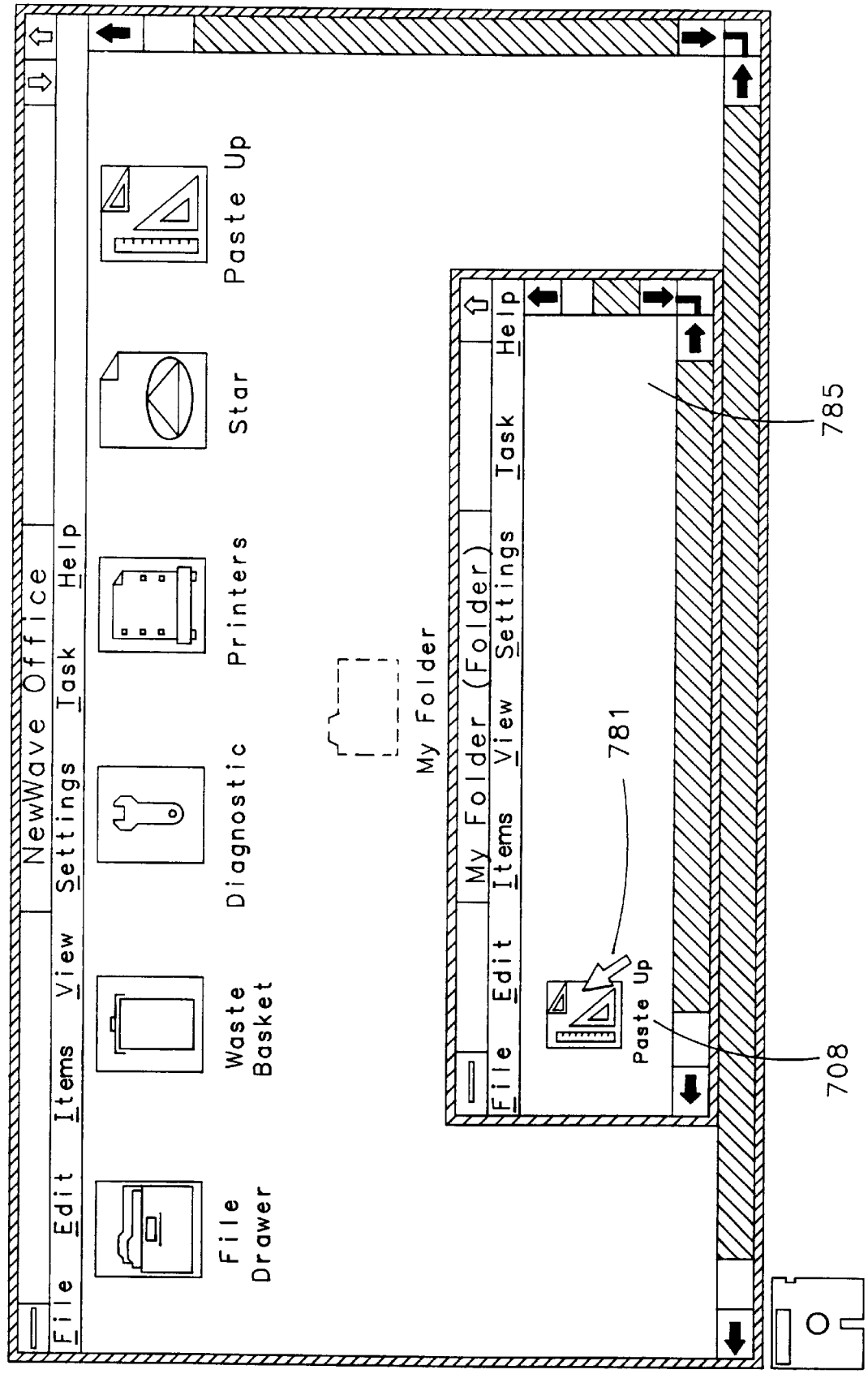
Figure 25:
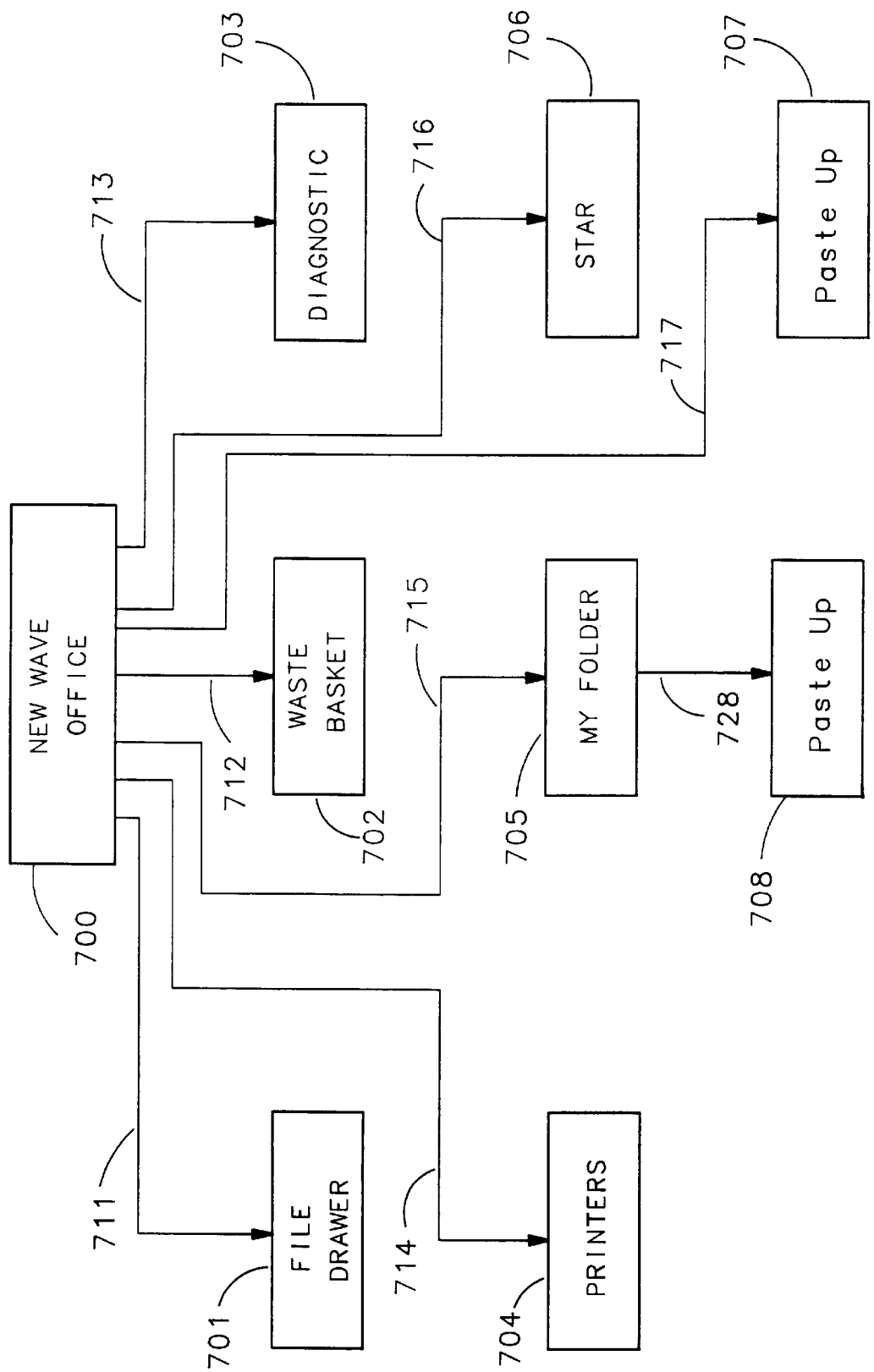
FIG. 25 is a block diagram showing linked objects resulting from the operation illustrated by FIGS. 22, 23 and 24.

In FIG. 23, using cursor 781, "Paste Up" (object 708) is shown being dragged to window 785. In FIG. 24, the process is complete and "Paste Up" (object 708) is now in window "My Folder". In FIG. 25, "Paste Up", shown as object 708, is now a child of "My Folder" through link 728.

The user sets up multiple links by using the Share command. This command is an extension of the clipboard metaphor common in software packages today for moving and copying data around the system. The clipboard is a special buffer that the system uses to hold data that is in transit.

In one way, the Share command operates similarly to the Cut or Copy command described above. That is, using Share, Cut, or Copy, the user selects some data first and then gives the Share command, which results in something being put on the clipboard. In the case of the Share command, however, what is put on the clipboard is neither the actual data nor a copy of the actual data. Instead, it is a link to the selected data. When this link is pasted, a permanent connection is made between the original data and the location of the Paste. Through use of OMF 100, this link is used by the involved applications to provide easy access to the original data (in its full application) and automatic updating when the original data is modified.

Figure 26:
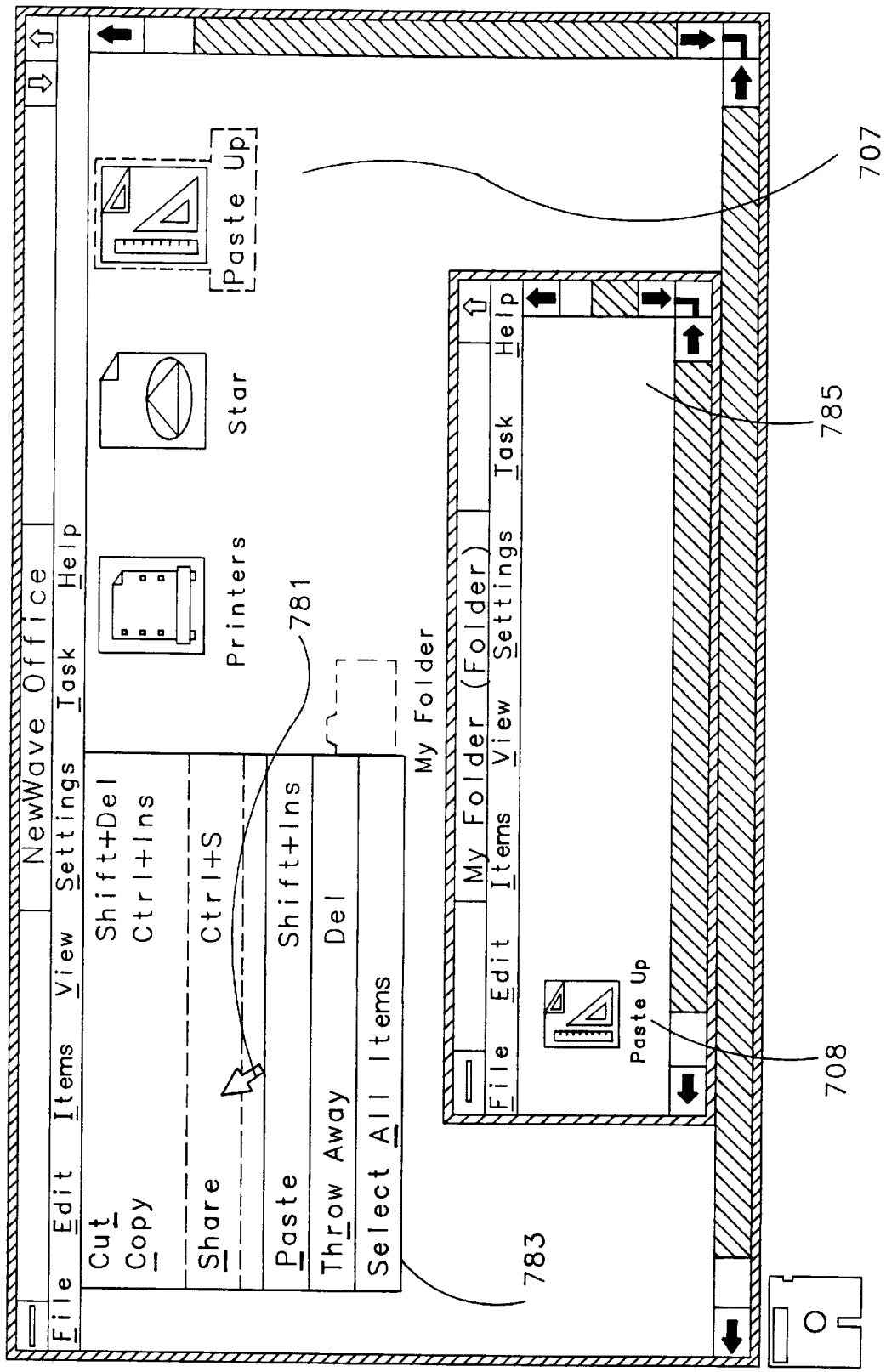
FIG. 26 illustrates an operation within a graphic display of the "NewWave Office" desktop.
Figure 26A:
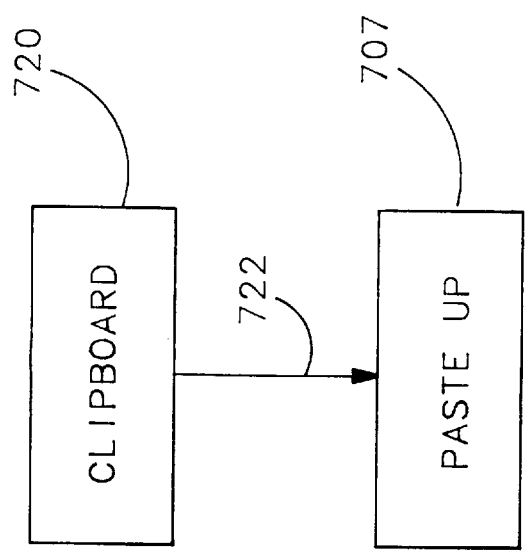
FIG. 26A is a block diagram showing linked objects resulting from the operation illustrated by FIG. 18.

In FIG. 26, the NewWave Office window has been activated. "Paste Up" (object 707) has been selected, as evidenced by "Paste Up" (object 707) being in inverse video. Using cursor 781, "Share" from menu 783 is selected. In FIG. 720, Clipboard object 720 is shown to be a parent of "Paste Up" object 707 through a link 722.

Figure 27:
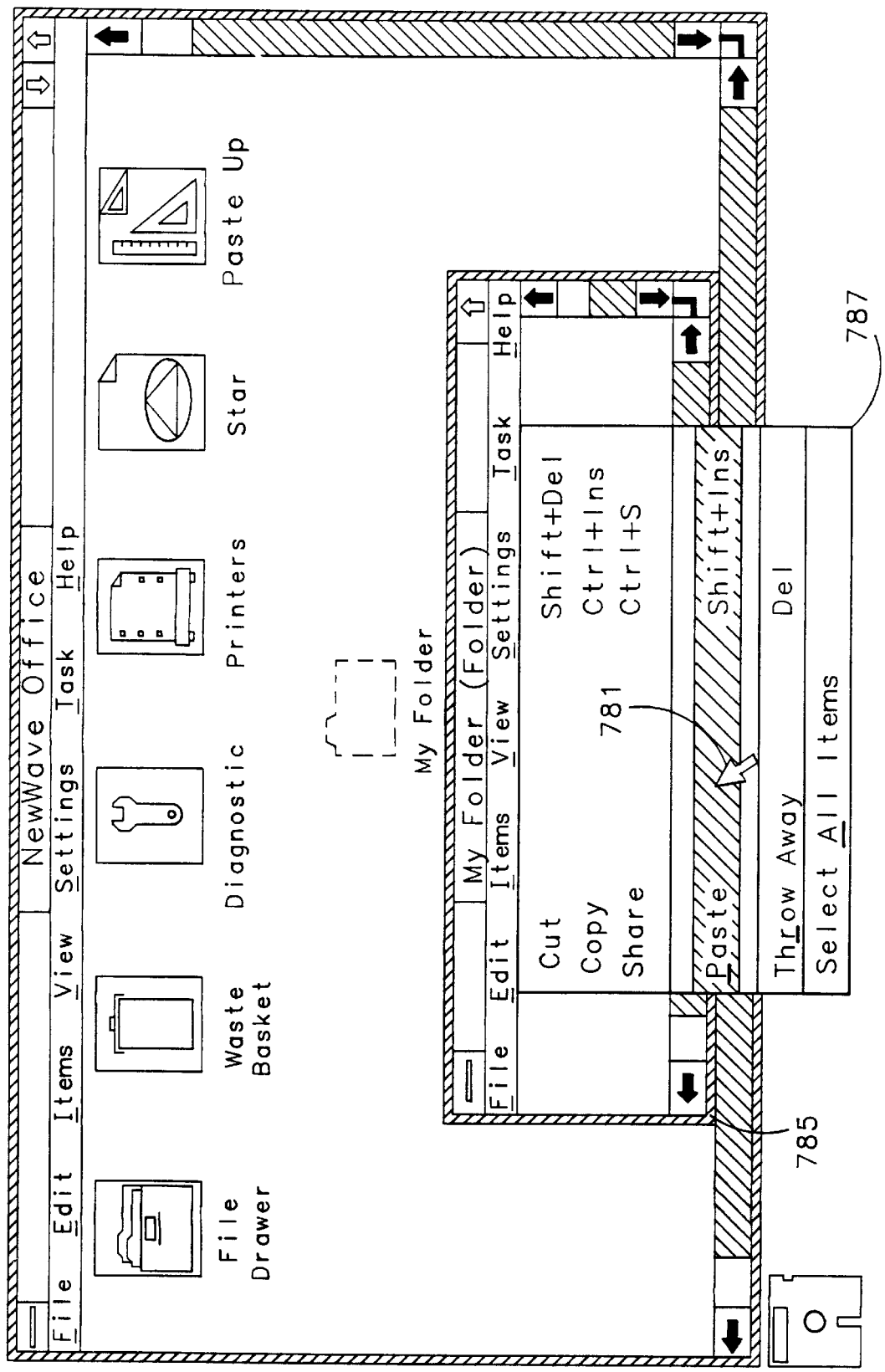
FIGS. 27 and 28 show progress of an operation within a graphic display of the "NewWave Office" desktop.
Figure 28:
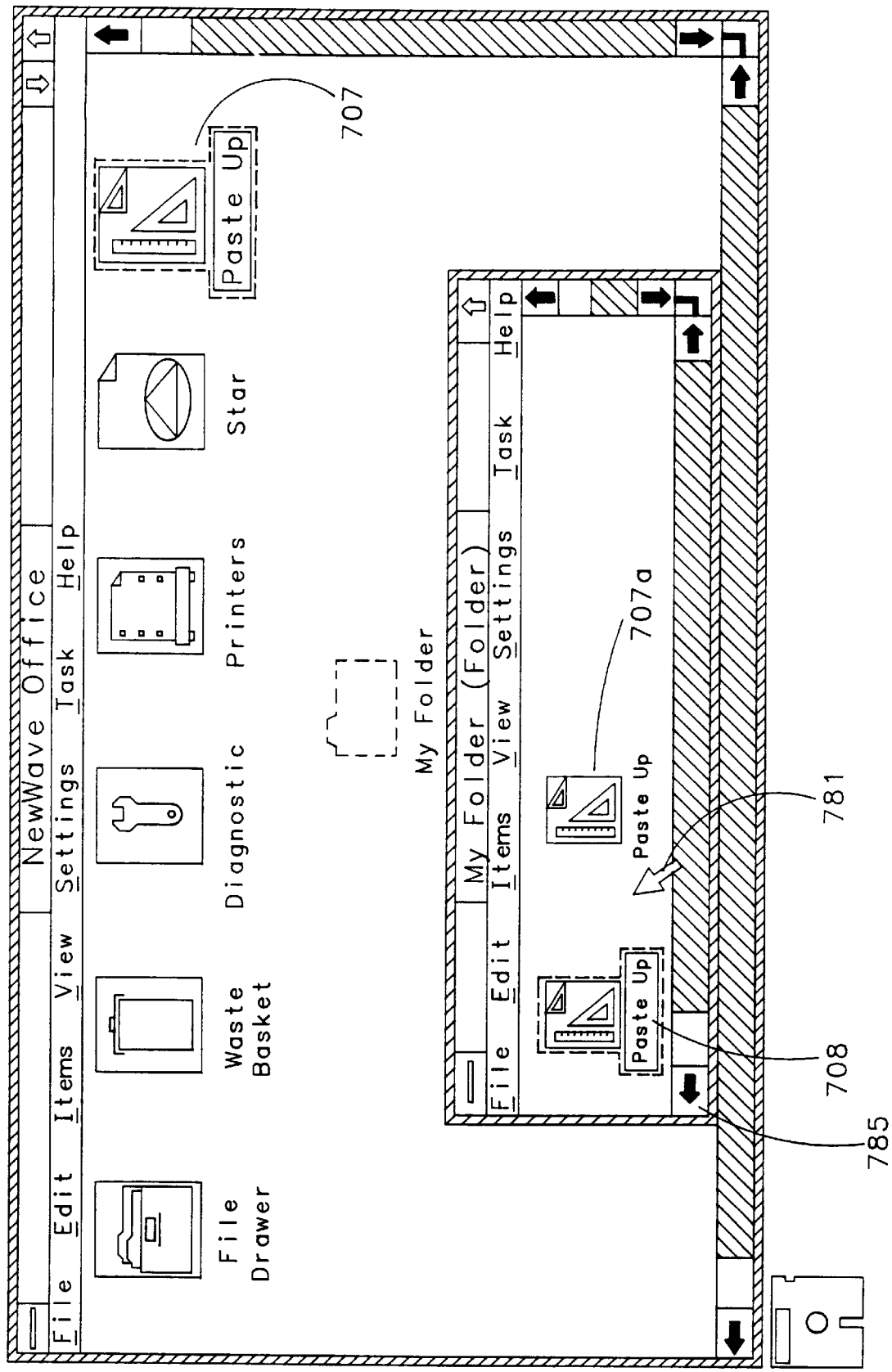
Figure 28A:
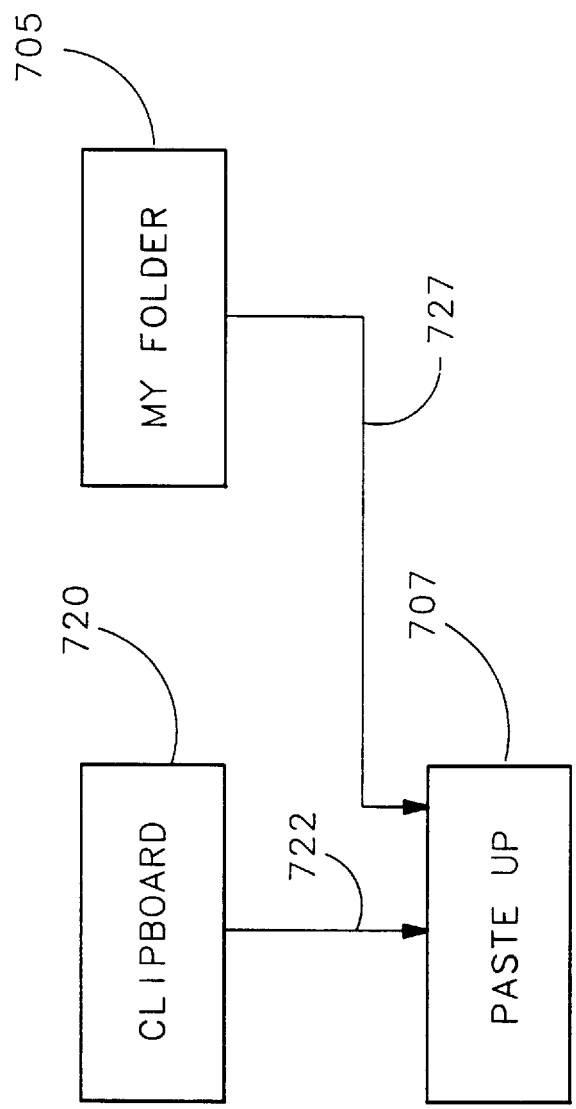
FIG. 28A is a block diagram showing linked objects resulting from the operation illustrated by FIGS. 27 and 28.
Figure 29:
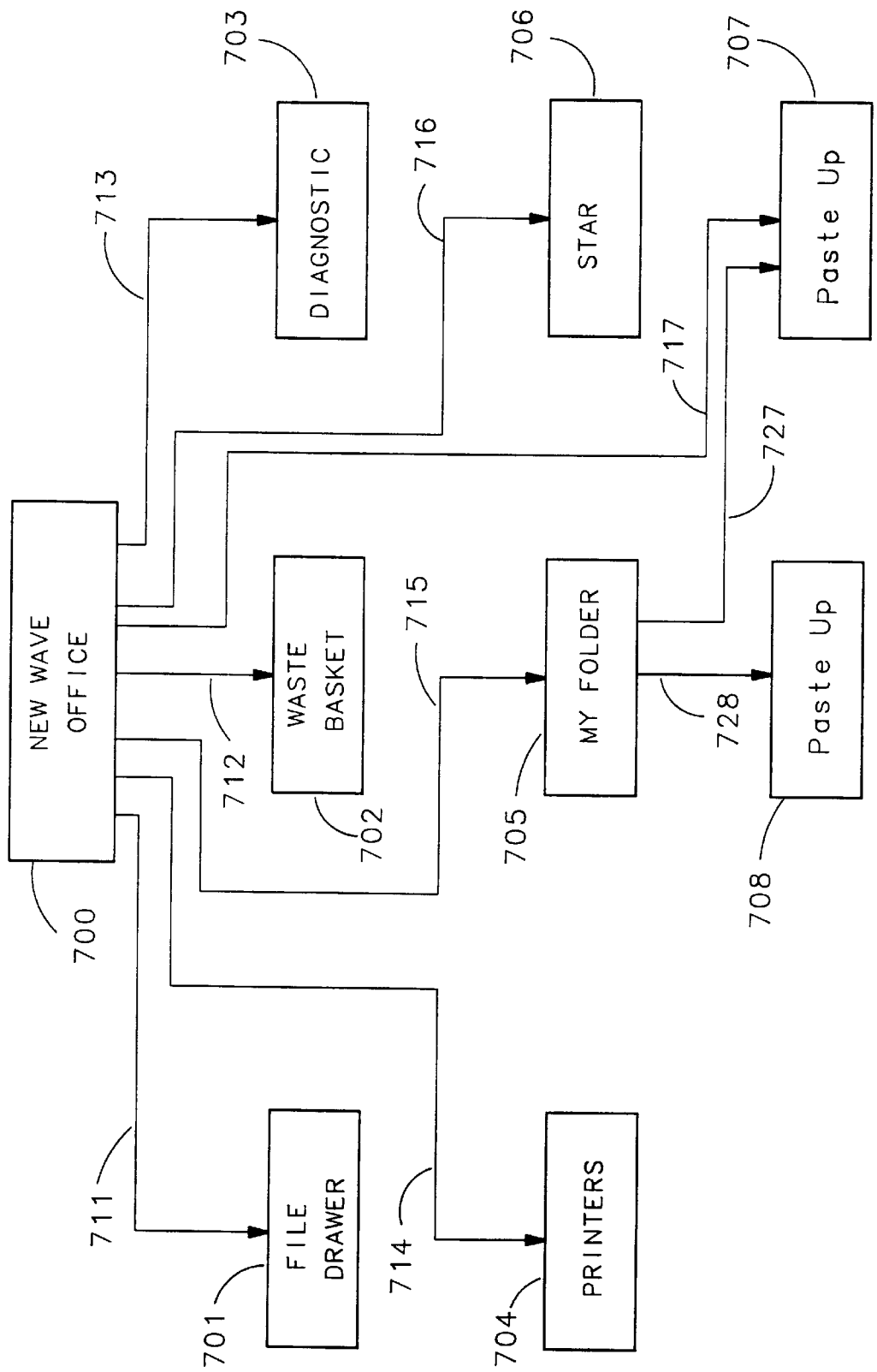
FIG. 29 is a block diagram showing linked objects.

In FIG. 27, window 785 has been activated. From a menu 787, "Paste" is selected. The result, shown in FIG. 28, is an icon 707a appearing in window 785, which indicates that "Paste Up" (object 707) is shared by window 785 and the NewWave Office window. In FIG. 28A, as a result of the paste, "Paste Up" is now shown to be both a child of Clipboard 720 through link 722 and a child of "My Folder" 705 through a link 727. In FIG. 29, showing just the interconnection of objects visible to the user, "Paste Up" (object 707) is shown to be a child of "My Folder" 705 through link 727. Since "Paste Up" (object 707) is shared, not copied, "Paste Up" (object 707) remains a child of NewWave Office through link 717.

One key feature of data links is automated data transfer. When a child object is open and the user changes a part of it which is "shared out", then it makes a call to OMF 100. OMF 100 checks if any of the object's parents "care" about this particular change. If they care and if they are also open, OMF 100 sends to the parents a message informing them that new data is available. The parent can then send messages to the child to produce or display the data. This feature allows the user to establish compound objects with complex data dependencies, and then have changes made to any sub-part be automatically reflected in other parts. For example, changing a number in a spreadsheet could cause a graph to be re-drawn, and updated as a figure in a document. And since an object can have many parents, a single object can be used as "boiler plate" for any number of other objects. A change in the boiler plate will be reflected in all the objects which have links to it. Automated data transfer is illustrated in the following discussion.

Figure 30:
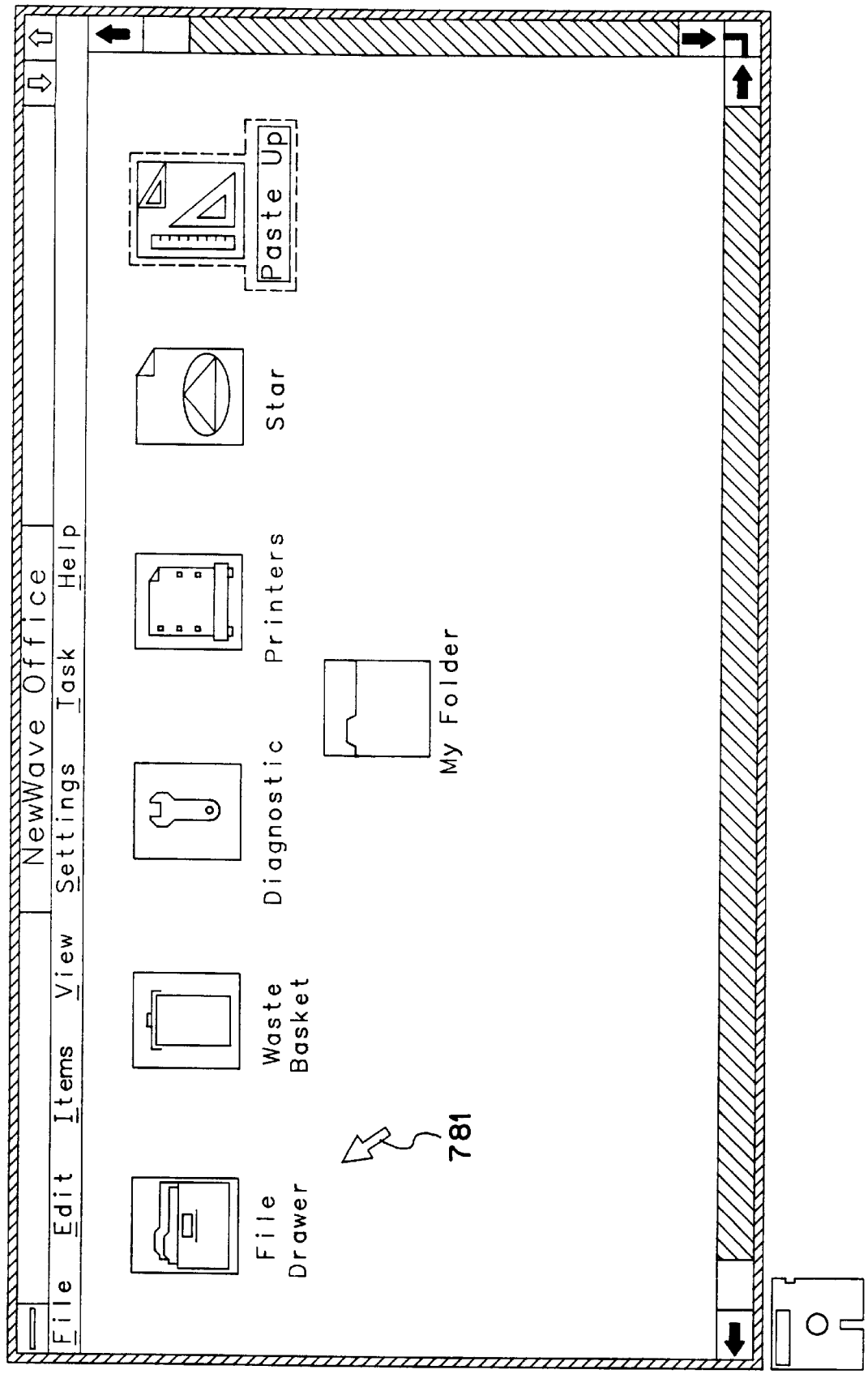
FIGS. 30, 31, 32 and 33 show progress of an operation within a graphic display of the "NewWave Office" desktop.
Figure 31:
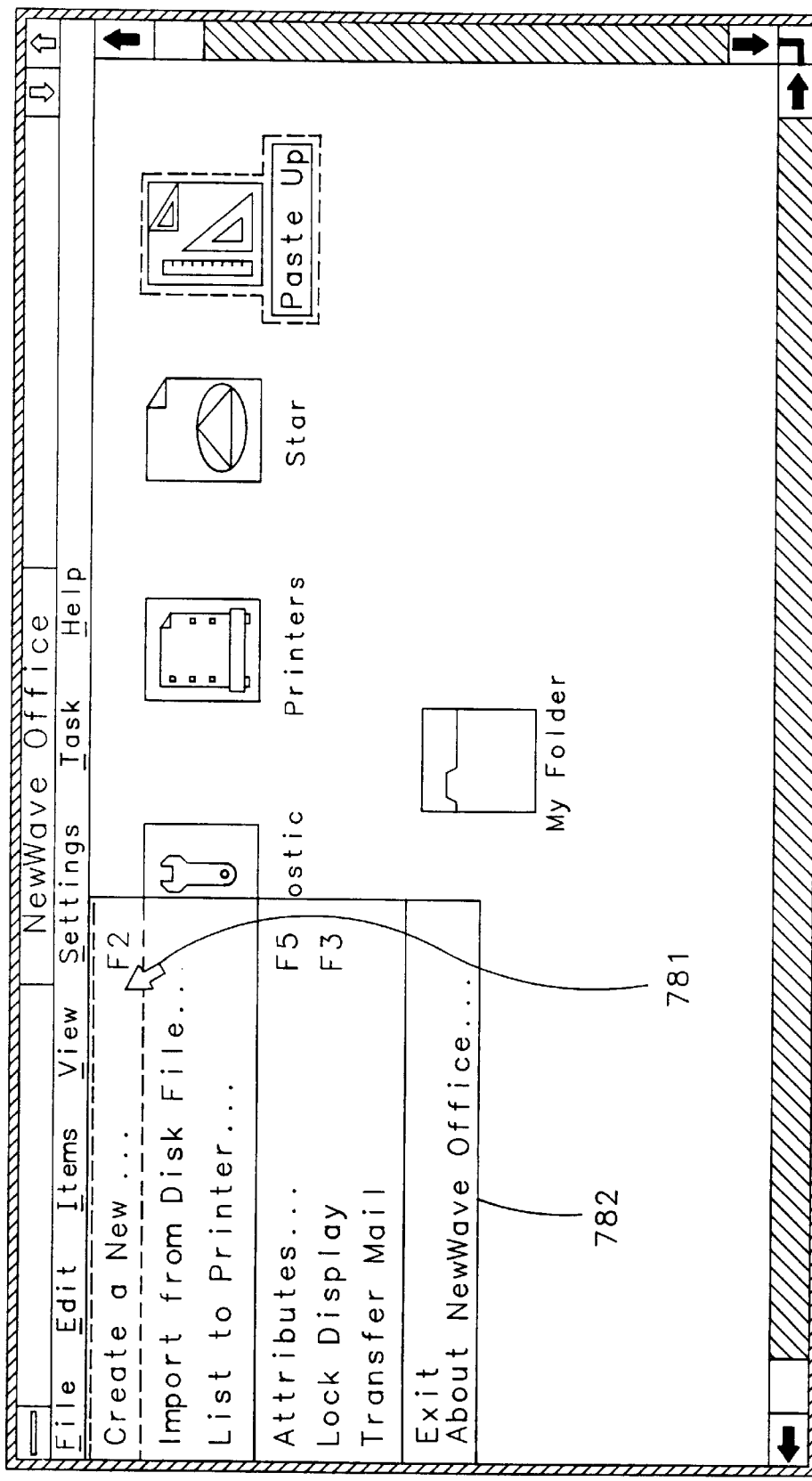
Figure 32:
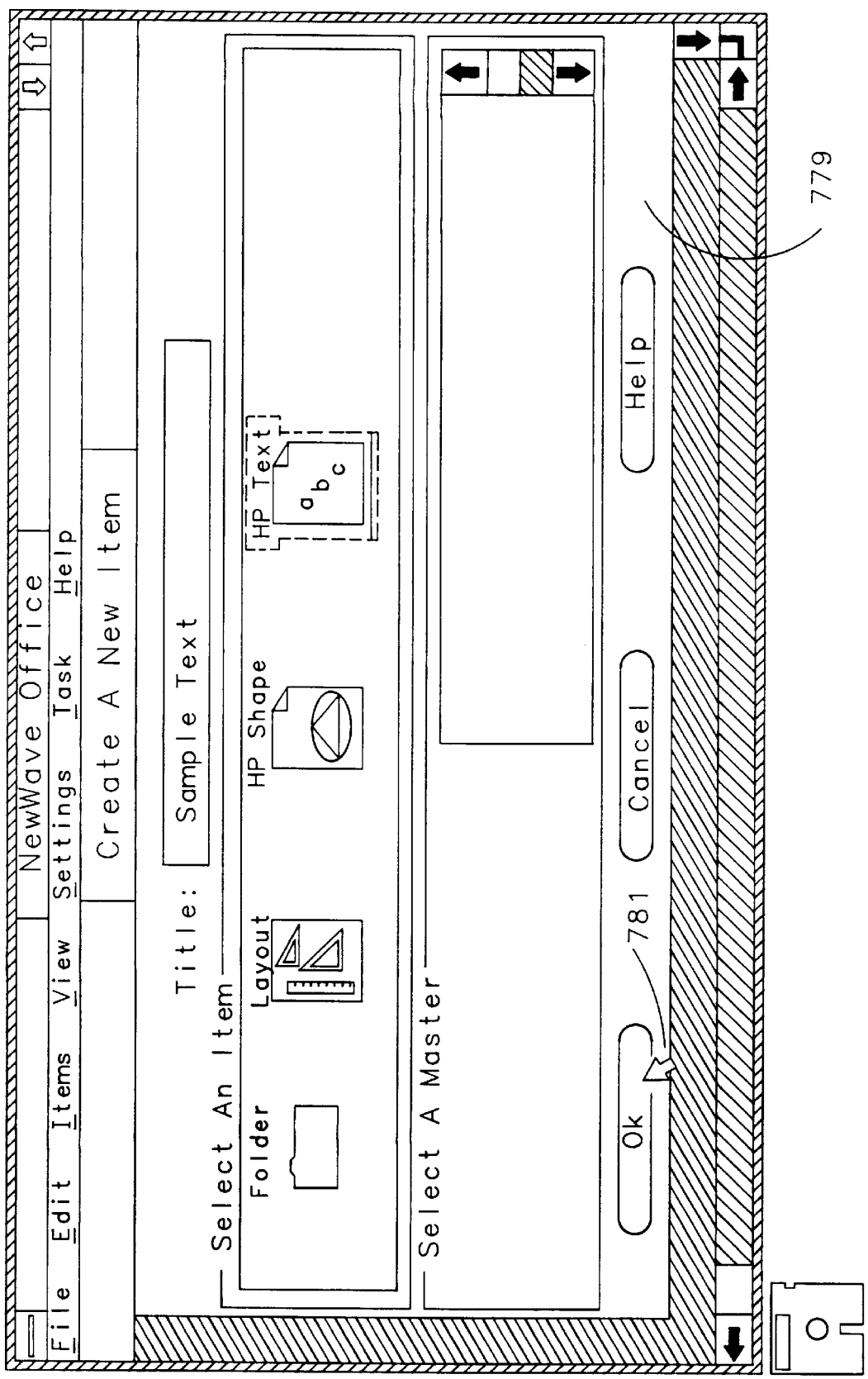
Figure 33:
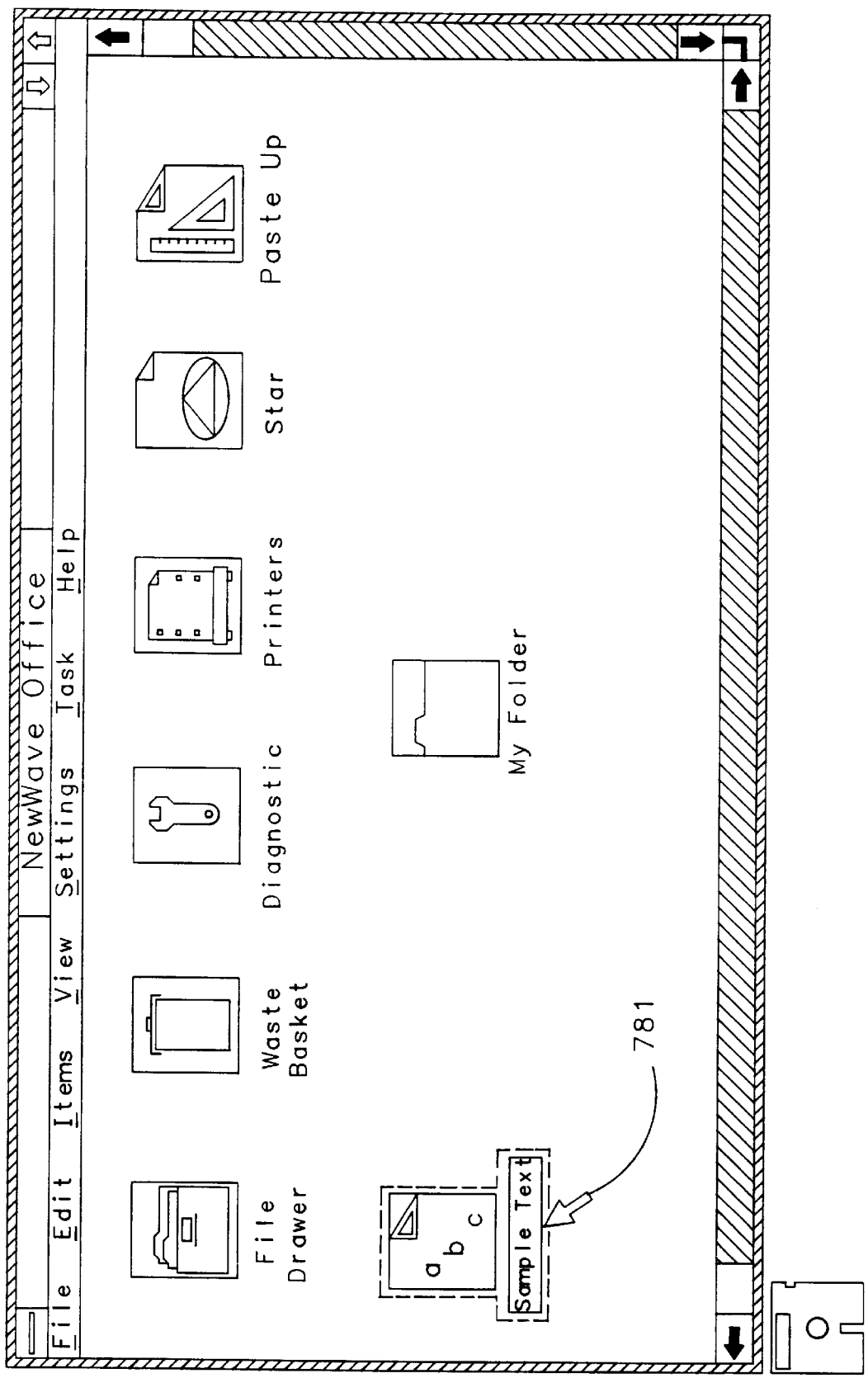

In FIG. 30, window 785 for "My Folder" has been closed. In FIG. 31, cursor 781 is used to select "Create a New . . . " from pull down menu 782. As a result of this selection dialog box 779 appears as shown in FIG. 32. Using cursor 781, the icon HPText has been highlighted and using keyboard 19 the name "Sample Text" has been typed in as the name for a new object to be created. Cursor 781 now points to a region labelled "OK". Once this region is selected, a new object titled "Sample Text" is created, as is shown in FIG. 33.

Figure 34:
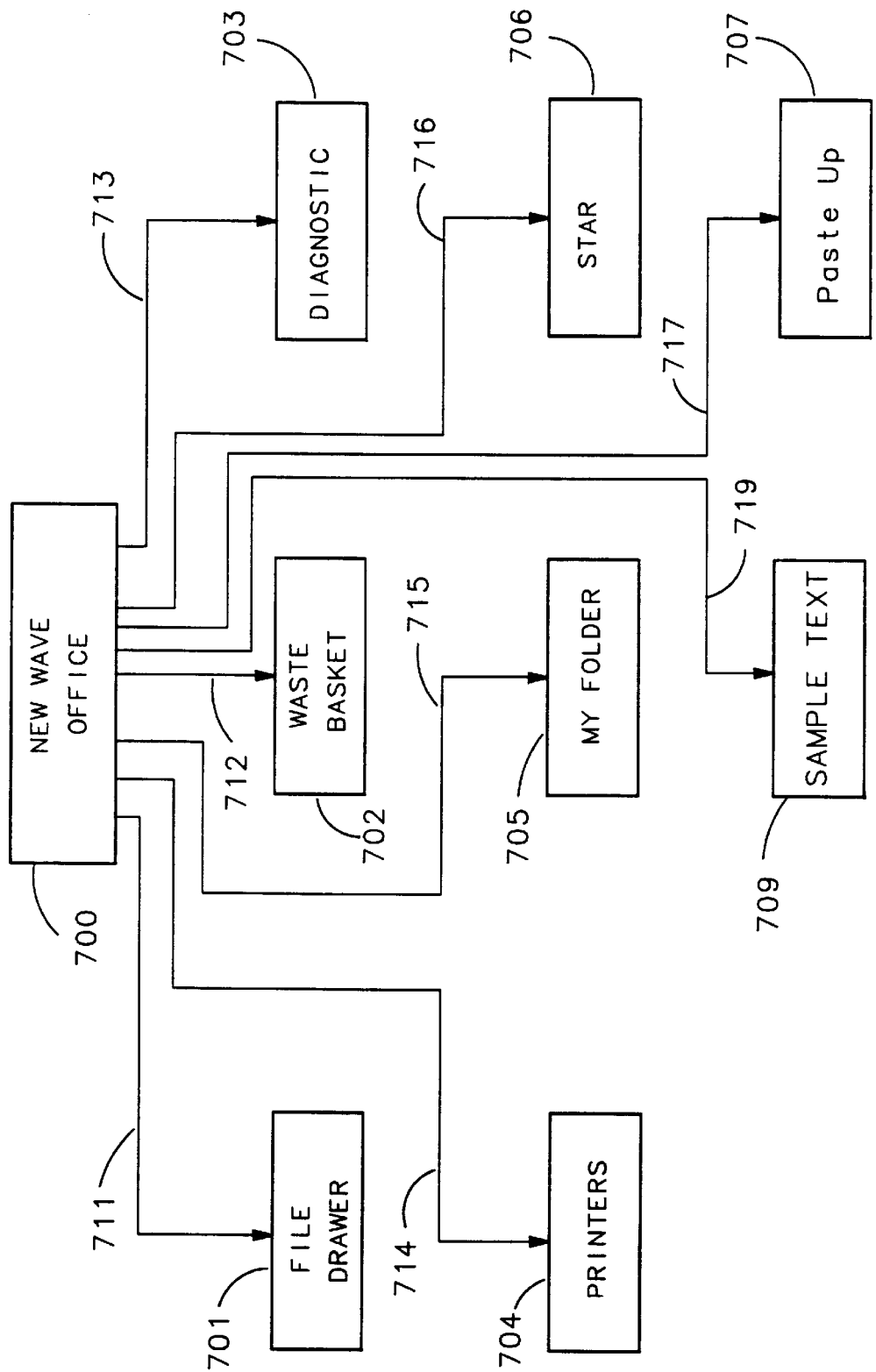
FIG. 34 is a block diagram showing linked objects resulting from the operation illustrated by FIGS. 30, 31, 32 and 33.

In FIG. 34, "Sample Text" (object 709) is shown to be a child of NewWave Office through a link 719. In FIG. 34, since "My Folder" has been closed, "Paste Up" (object 708), link 728 and link 727 are not shown. However, these still exist, but are not currently visible to a user.

Figure 35:
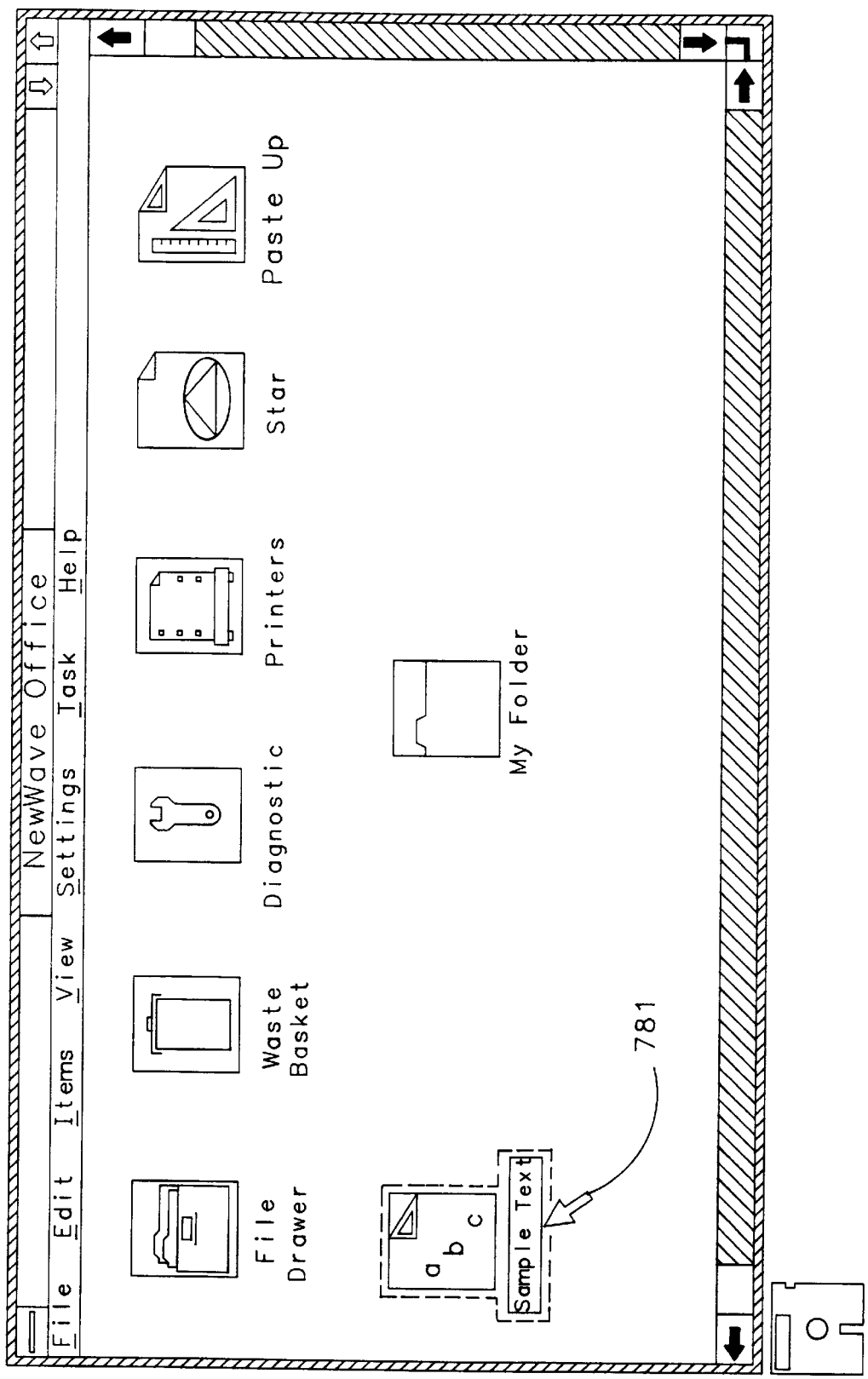
FIGS. 35, 36, 37, 38, 39, 40, 41 and 42 show progress of various operations on a graphic display.
Figure 36:
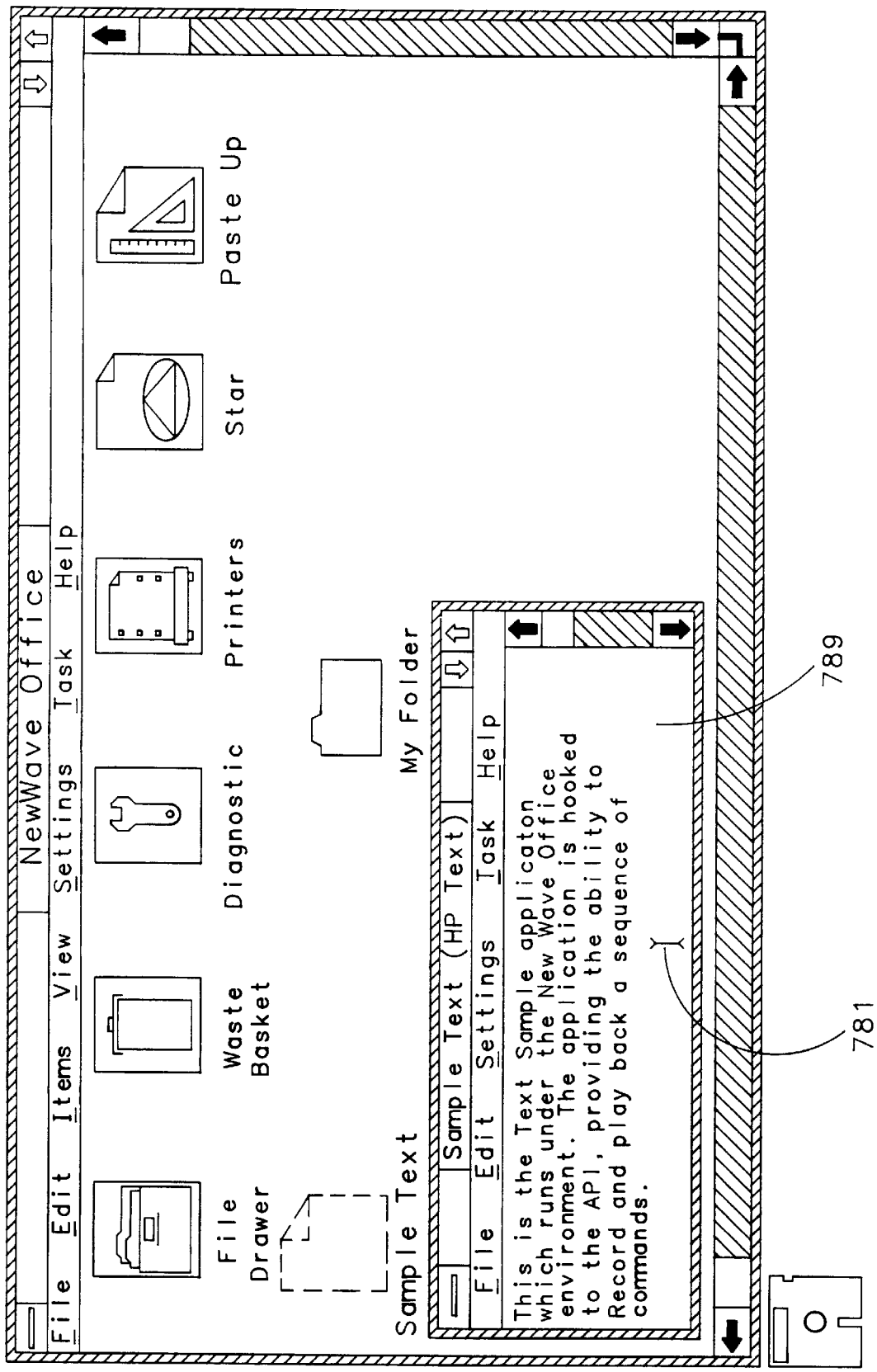

In FIG. 35, placing cursor 781 on the icon "Sample Text" and double clicking a button on mouse 20 results in "Sample Text" being opened. In FIG. 36, an open window 789 for "Sample Text" is shown.

Figure 37:
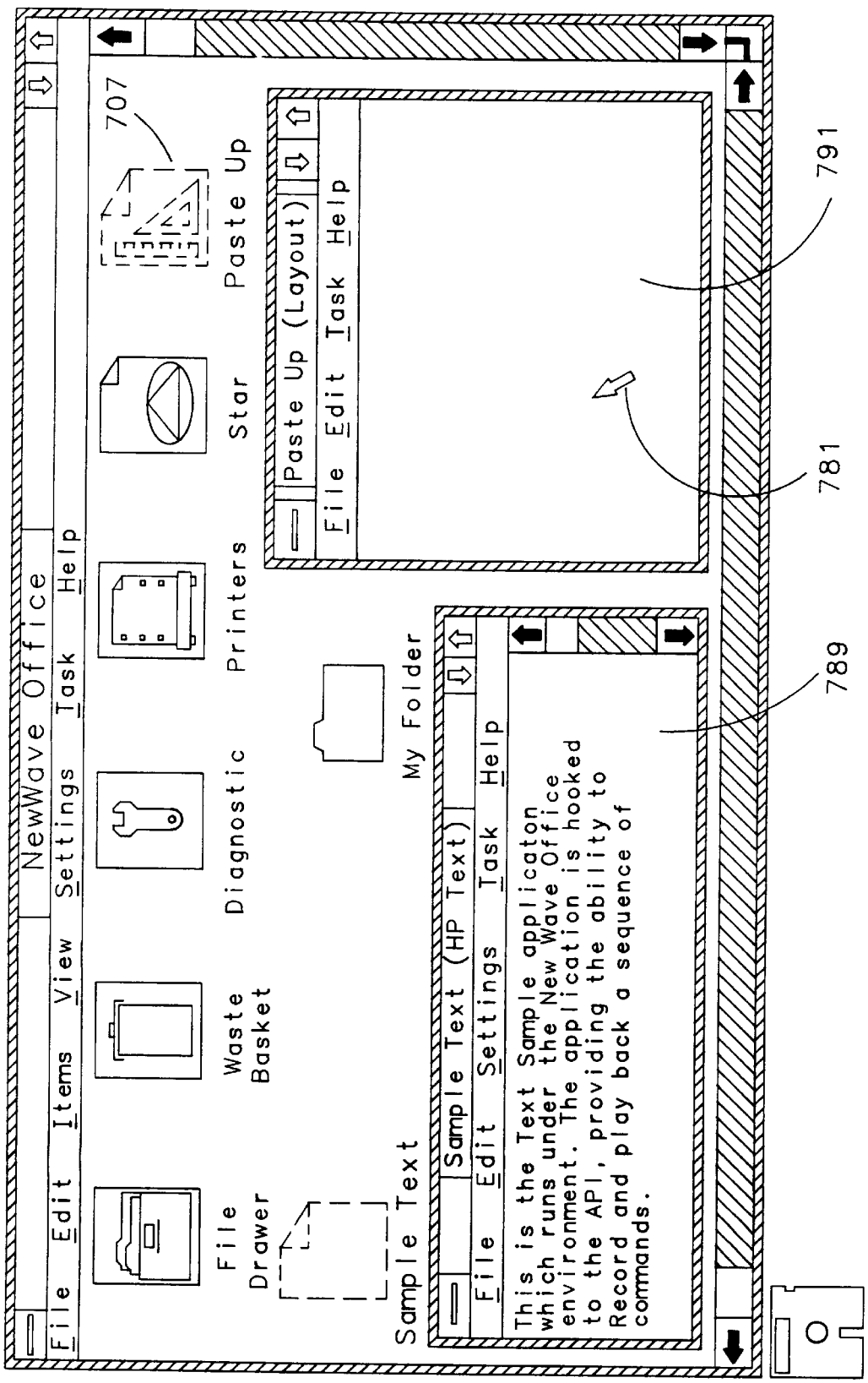
Figure 38:
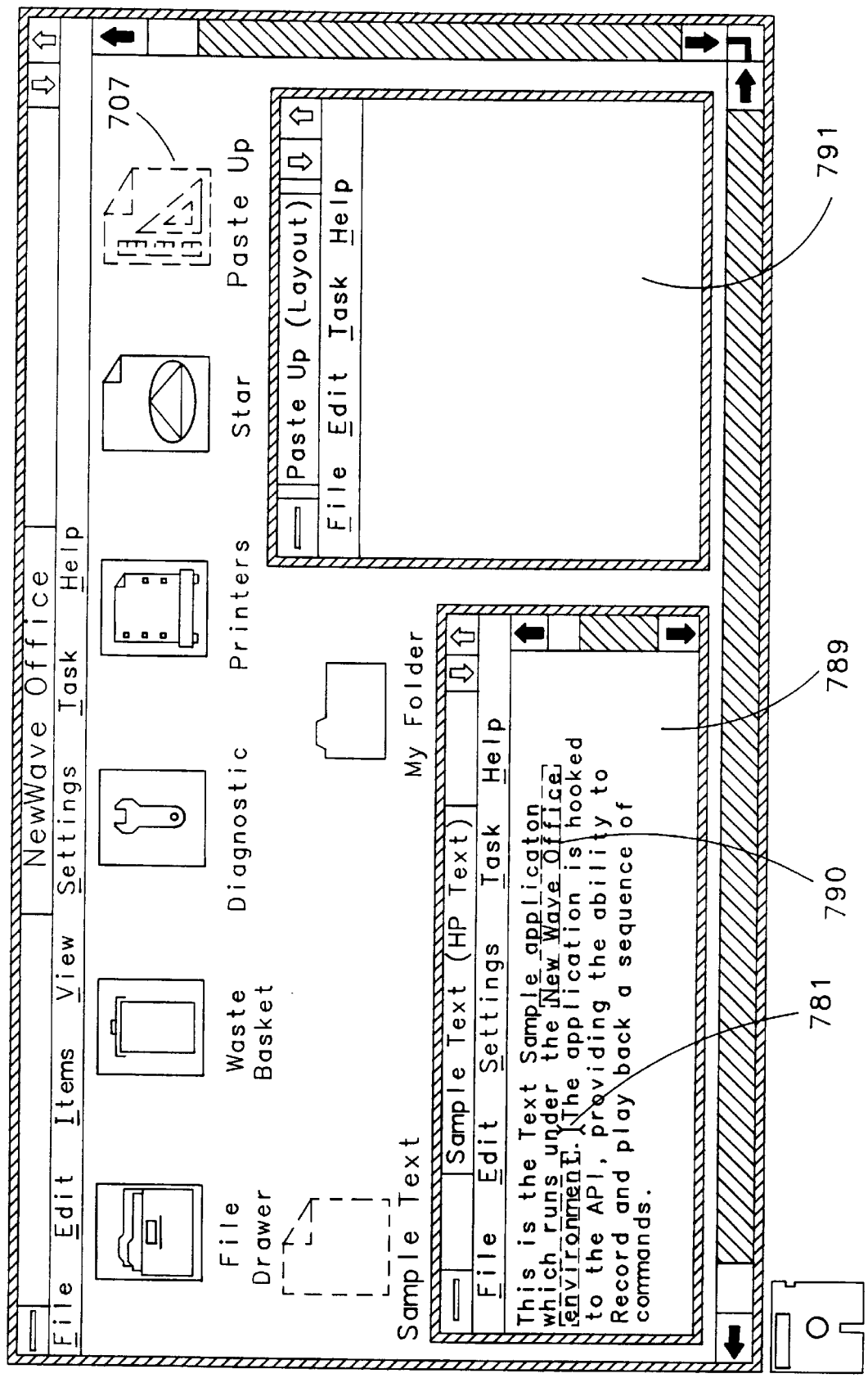

In FIG. 37 a window 791 for "Paste Up" (object 707) has been opened by double clicking on the icon for "Paste Up". In FIG. 38, using Cursor 781, controlled by mouse 20, a portion 790 of the text of "Sample Text" has been selected. The portion in inverse video stating "New Wave Office environment" is portion 790.

Figure 39:
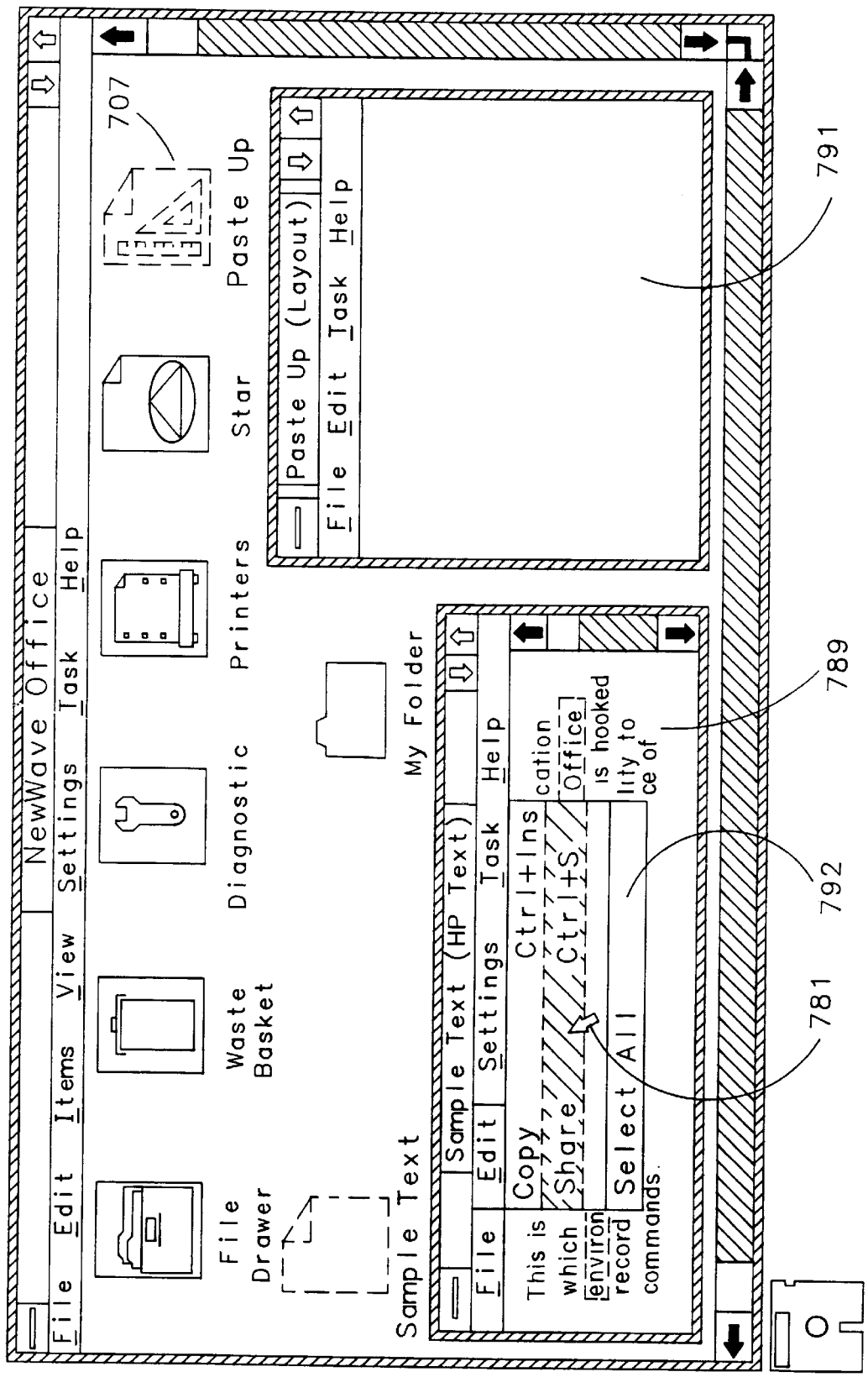
Figure 40:
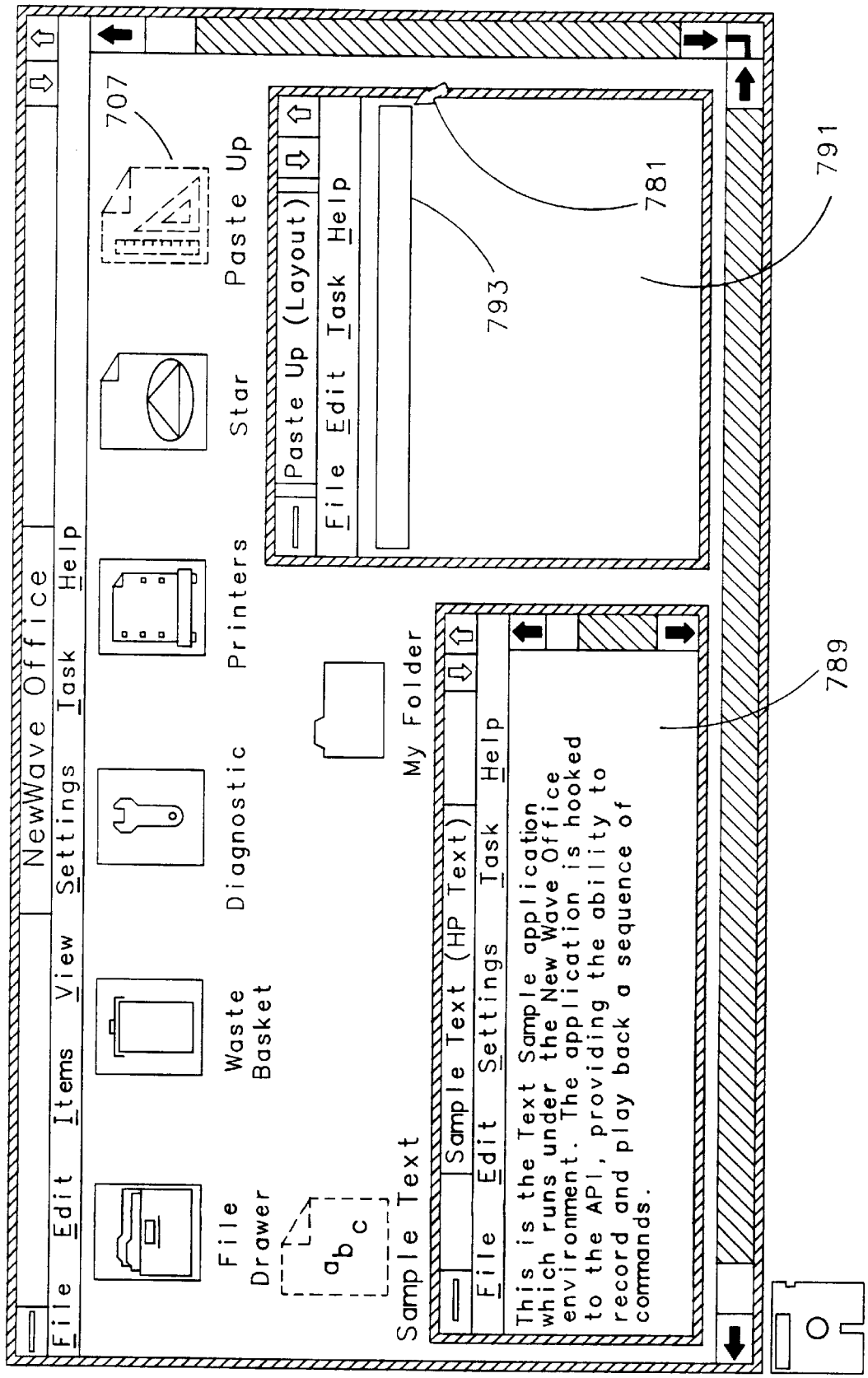
Figure 41:
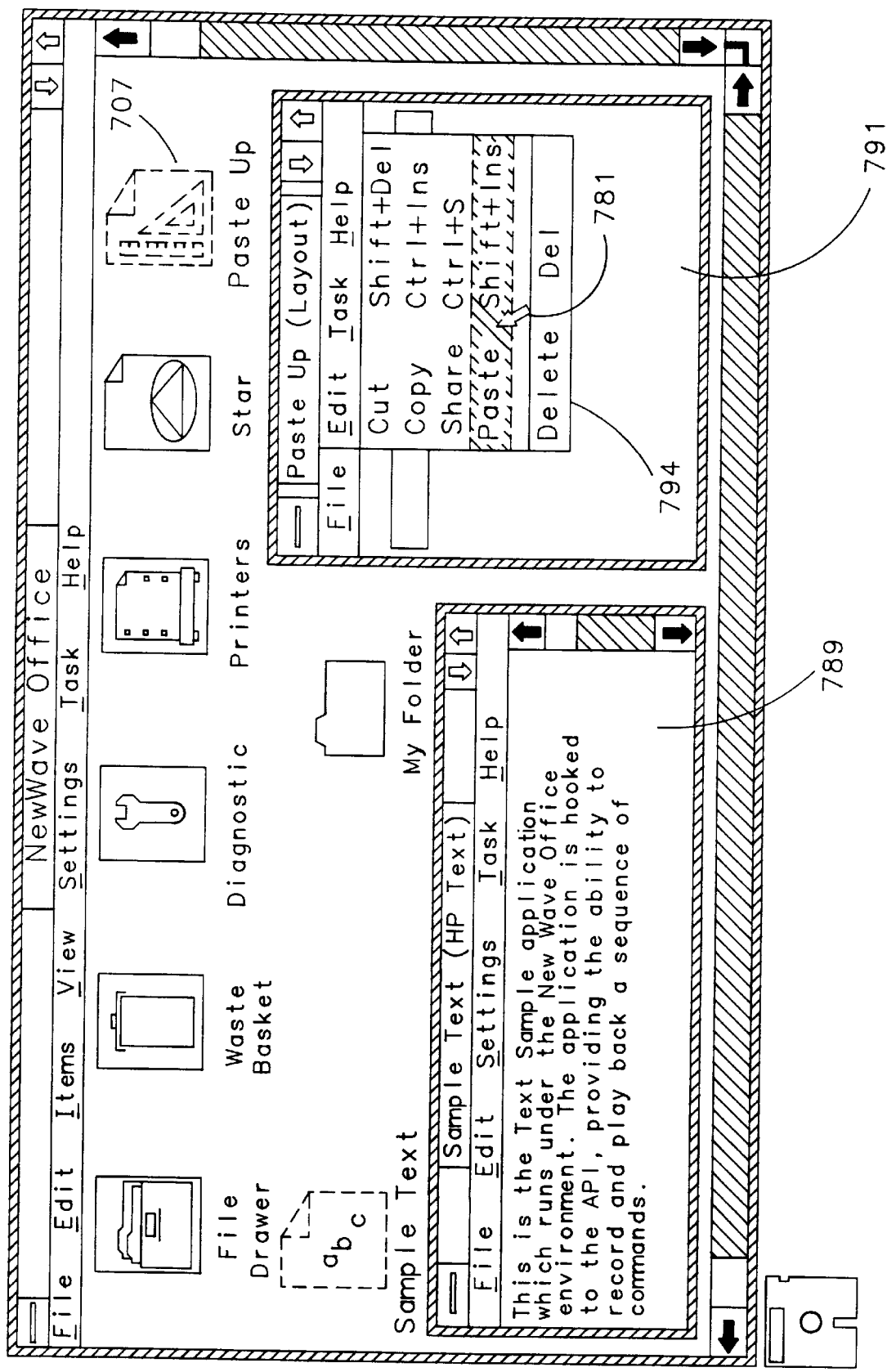
Figure 42:
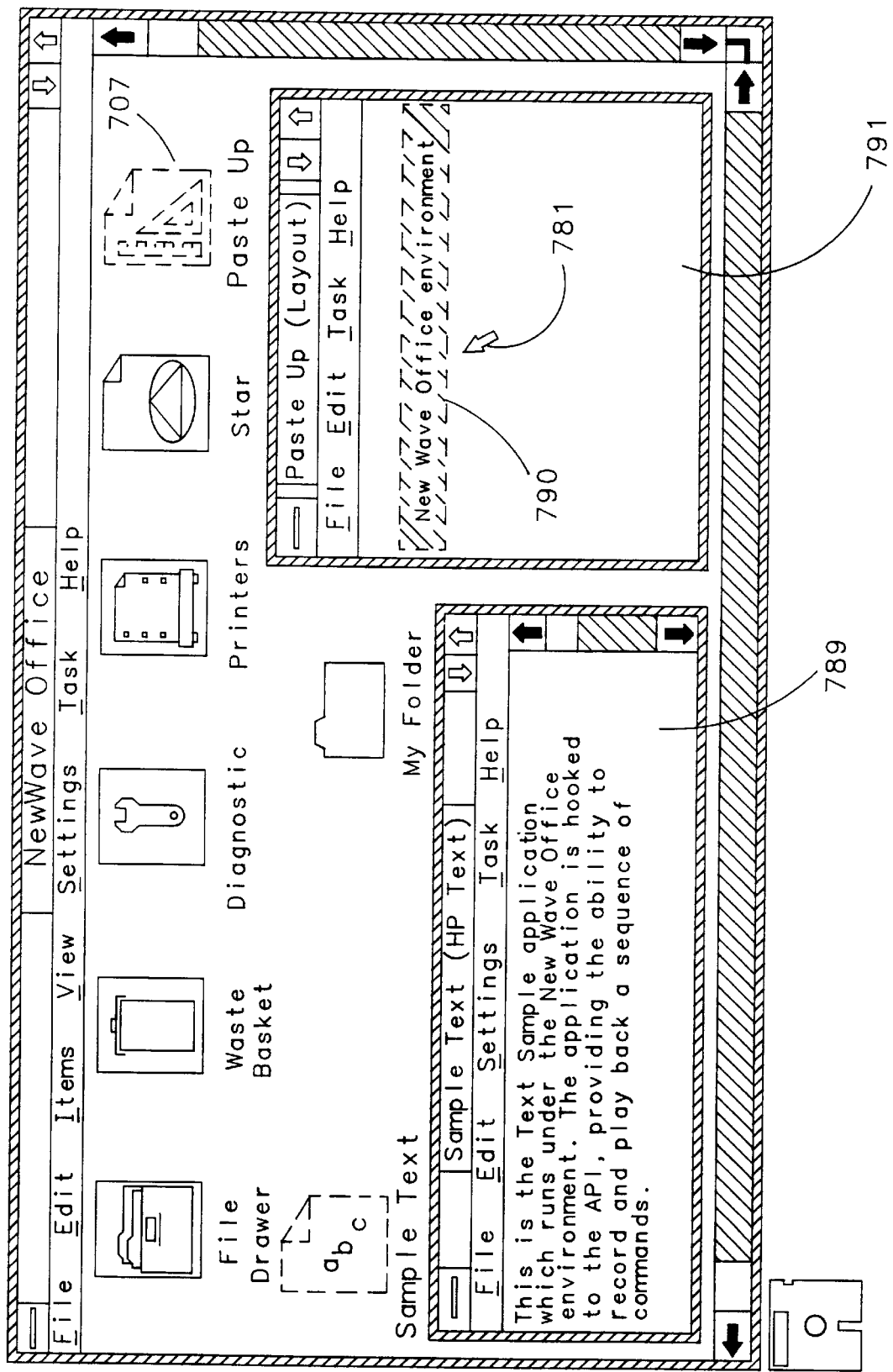
Figure 43:
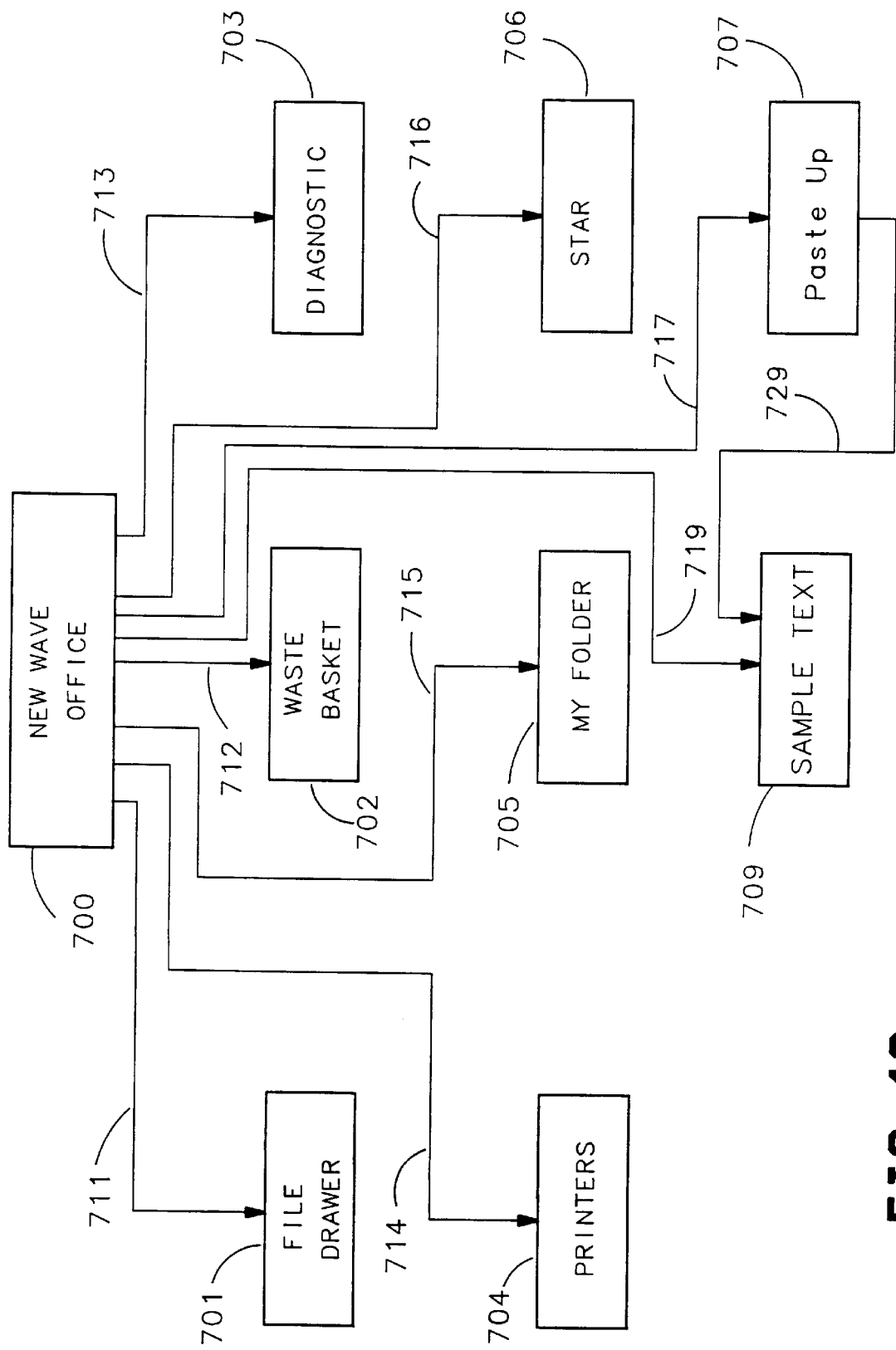
FIG. 43 is a block diagram showing linked objects resulting from the operations illustrated by FIGS. 35, 36, 37, 38, 39, 40, 41 and 42.
Figure 44:
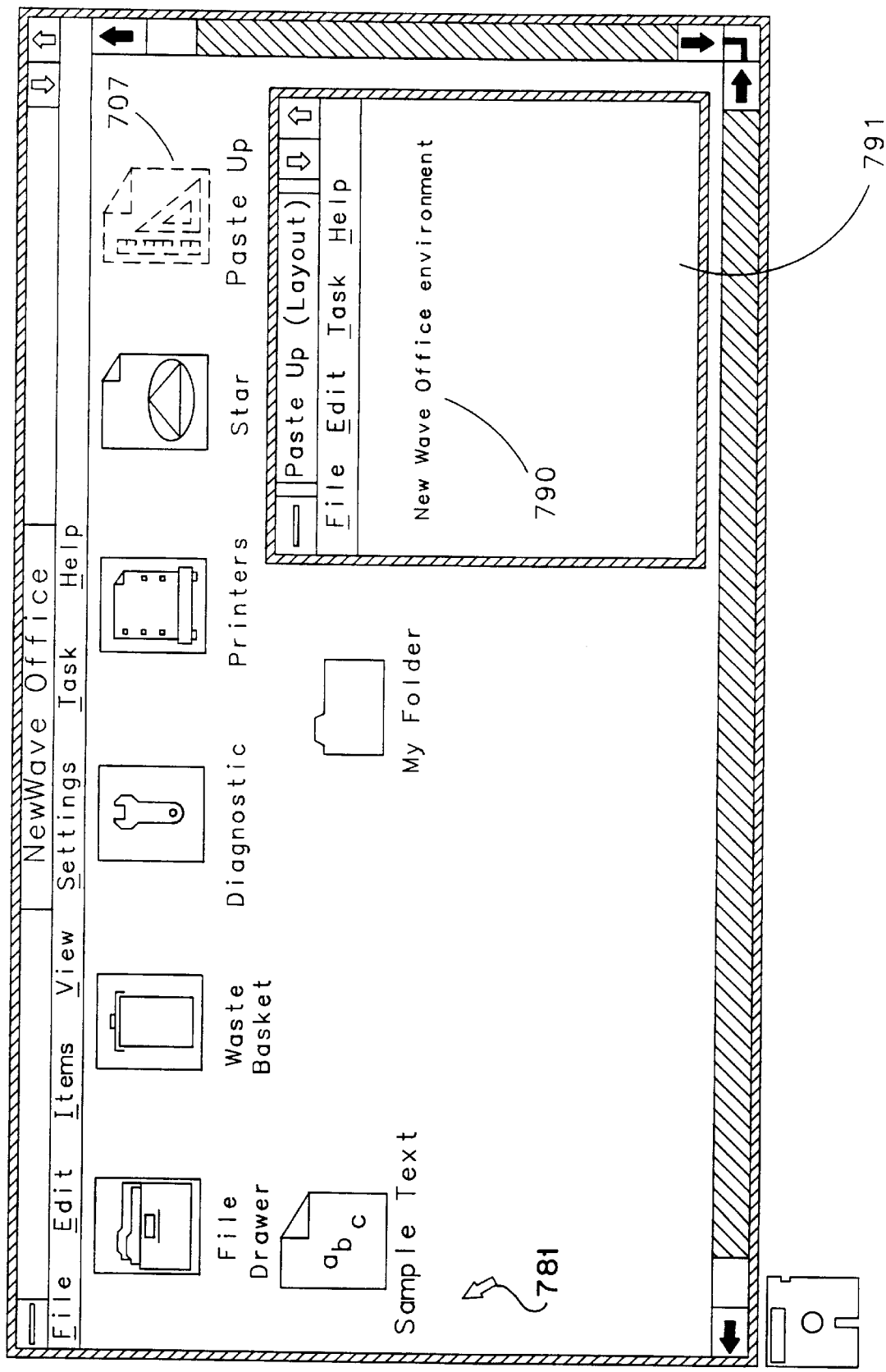
FIGS. 44, 45, 46 and 47 show progress of various operations on a graphic display.

In FIG. 39, cursor 781 is used to select the selection "Share" in a pull down menu 792. In FIG. 40, an area 793 in window 791 is selected using cursor 781. In FIG. 41, a selection "Paste" is selected from a pull down menu 794 using cursor 781. In FIG. 42, "Sample Text" is linked to "Paste Up" (object 707) and displayed text 790 is displayed in "Paste Up" window 791. In FIG. 43 "Sample Text" (object 709) is shown to be a child of "Paste Up" (object 707) through a link 729. In FIG. 42, displayed text 790 is shown in gray because "Star" window 789 is open. In FIG. 44, "Star" window 789 is closed so displayed text 790 is clearly displayed.

Figure 45:
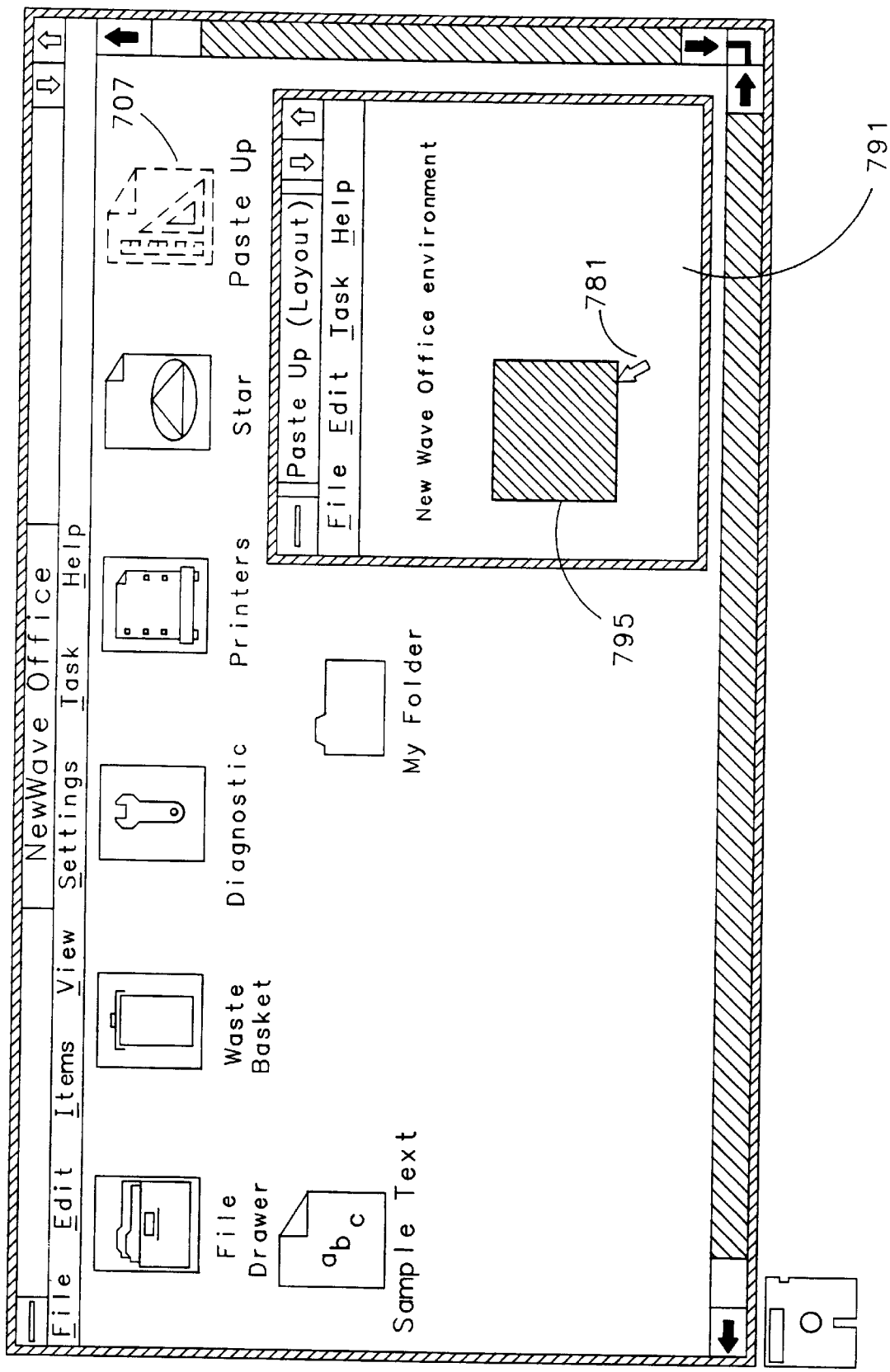
Figure 46:
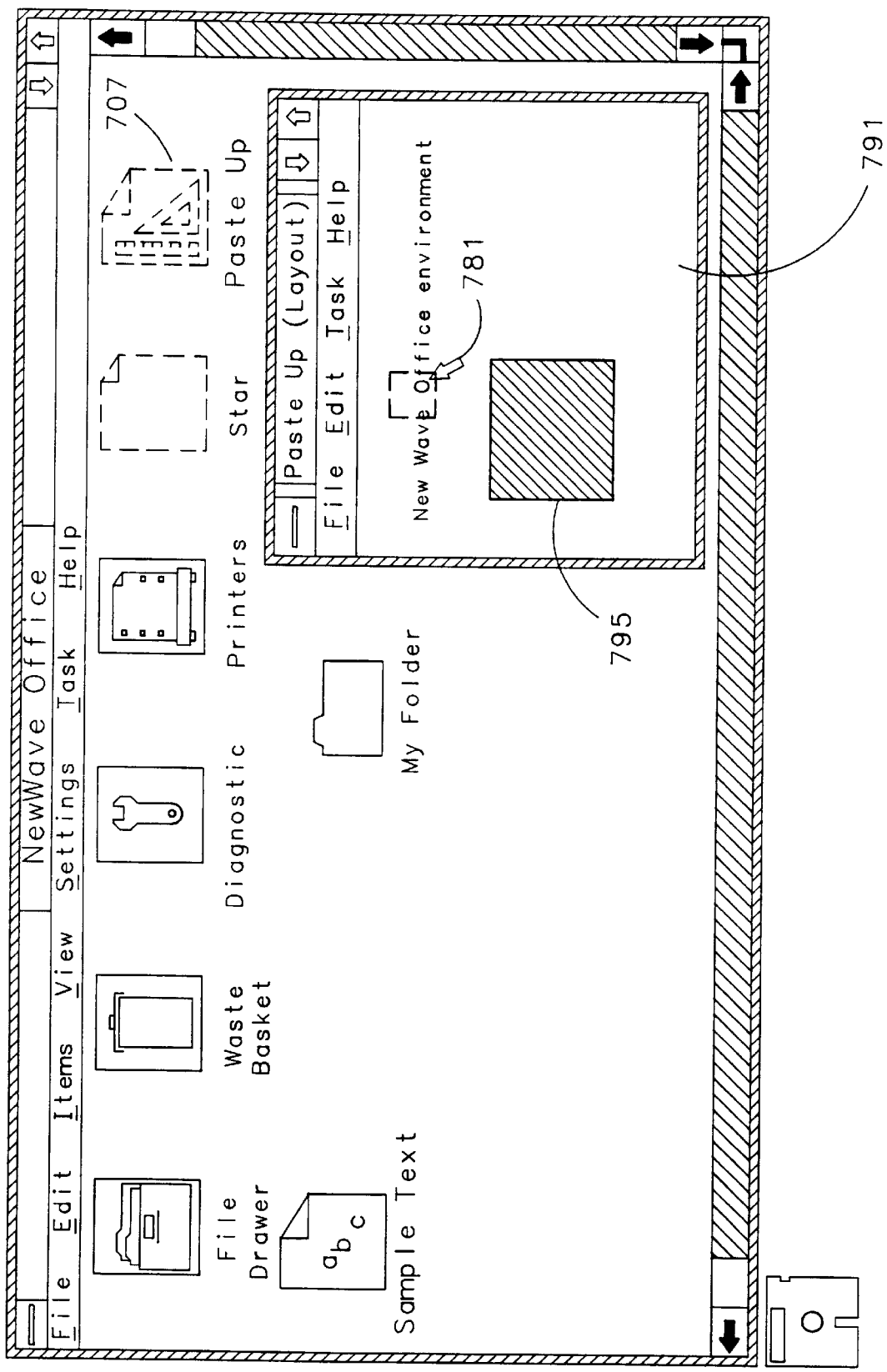

In FIG. 45, a region 795 of window 791 is selected using cursor 781. FIG. 46 shows cursor 781 dragging the icon "Star" into region 795 of window 791.

Figure 47:
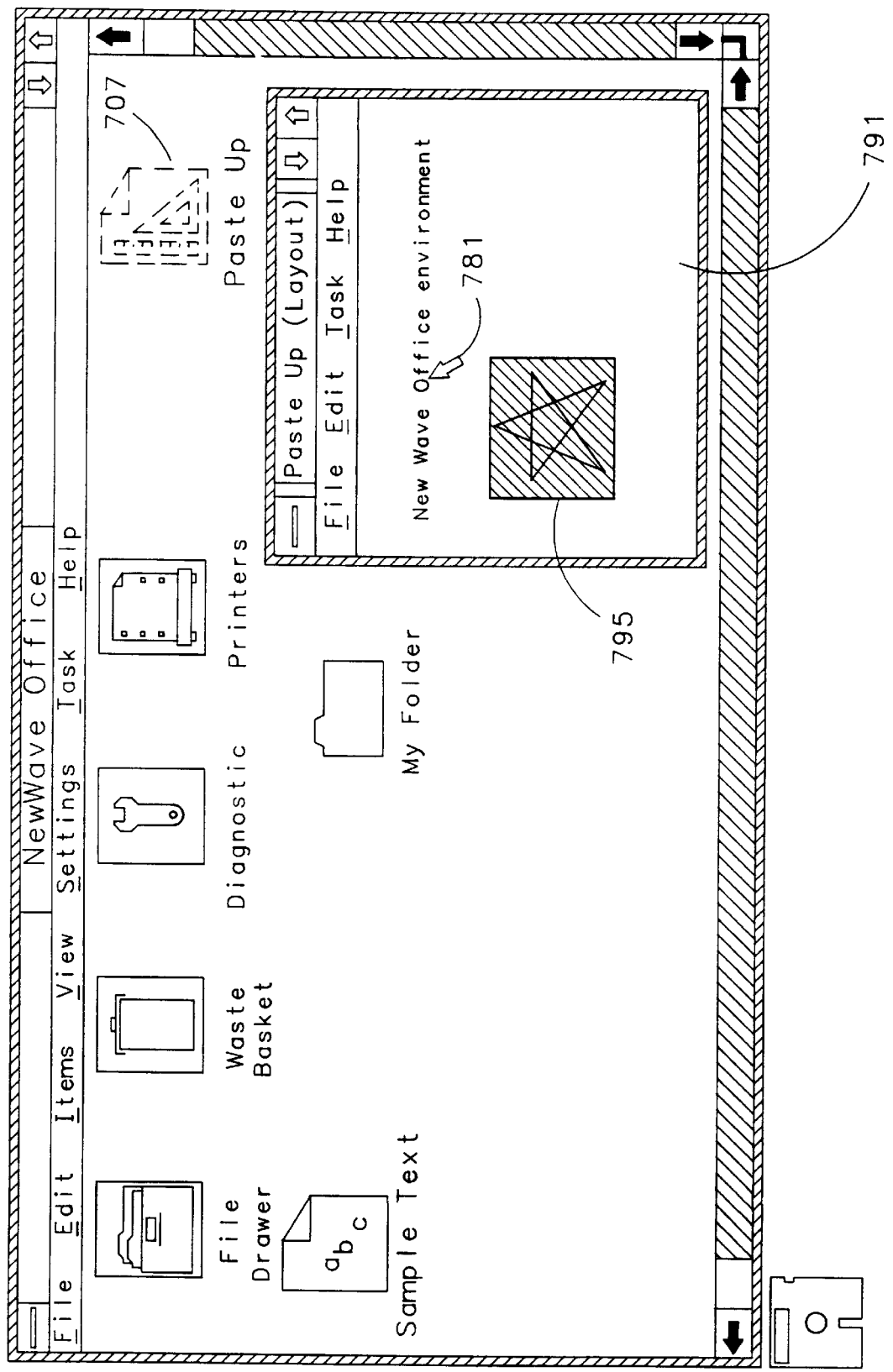
Figure 48:
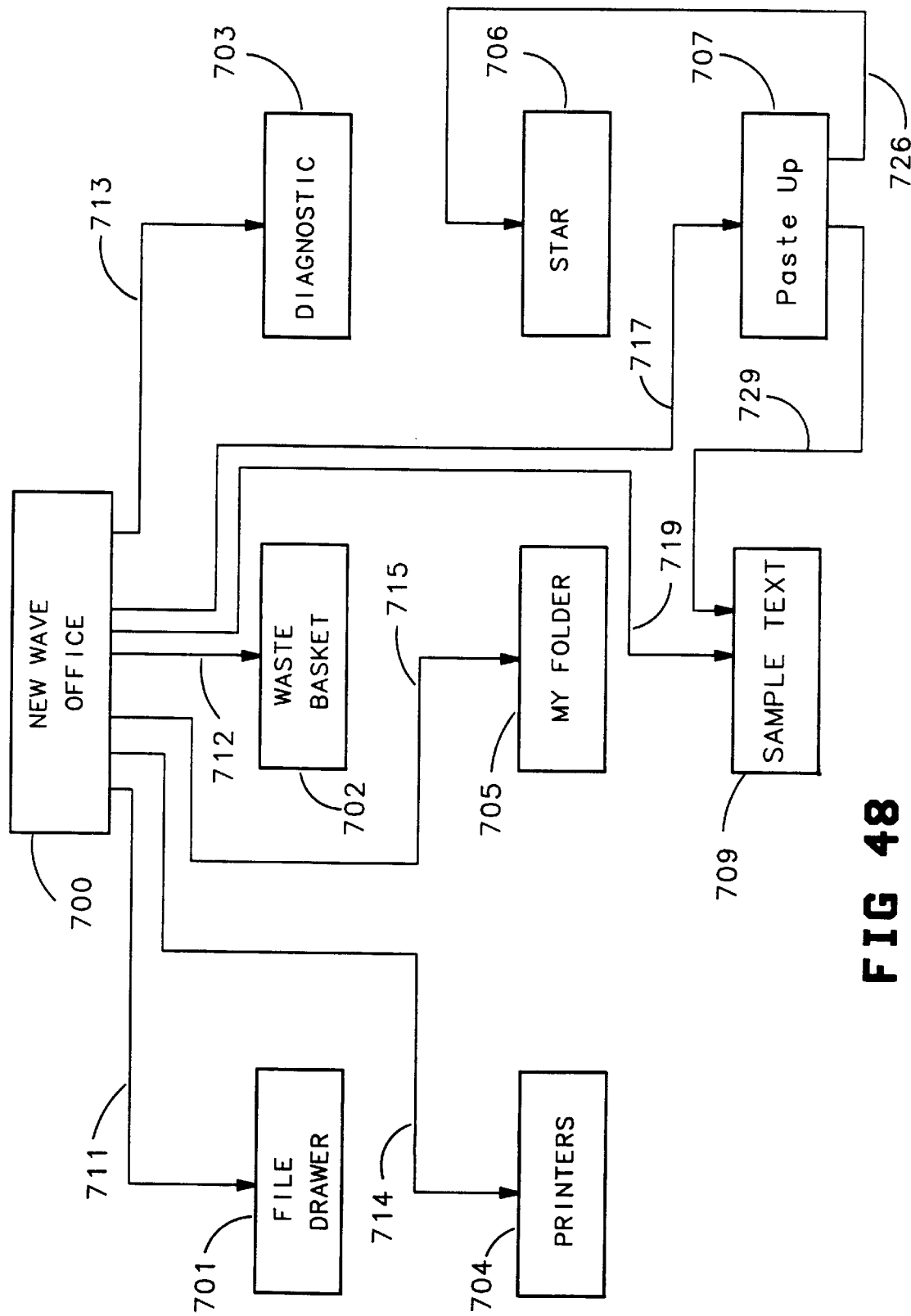
FIG. 48 is a block diagram showing linked objects resulting from the operations illustrated by FIGS. 44, 45, 46 and 47.

In FIG. 47, data from "Star" (object 706) is now displayed in region 795 of window 791. As may be seen in FIG. 48, "Star" (object 706) is now a child of "Paste Up" (object 707) through a link 726.

Figure 49:
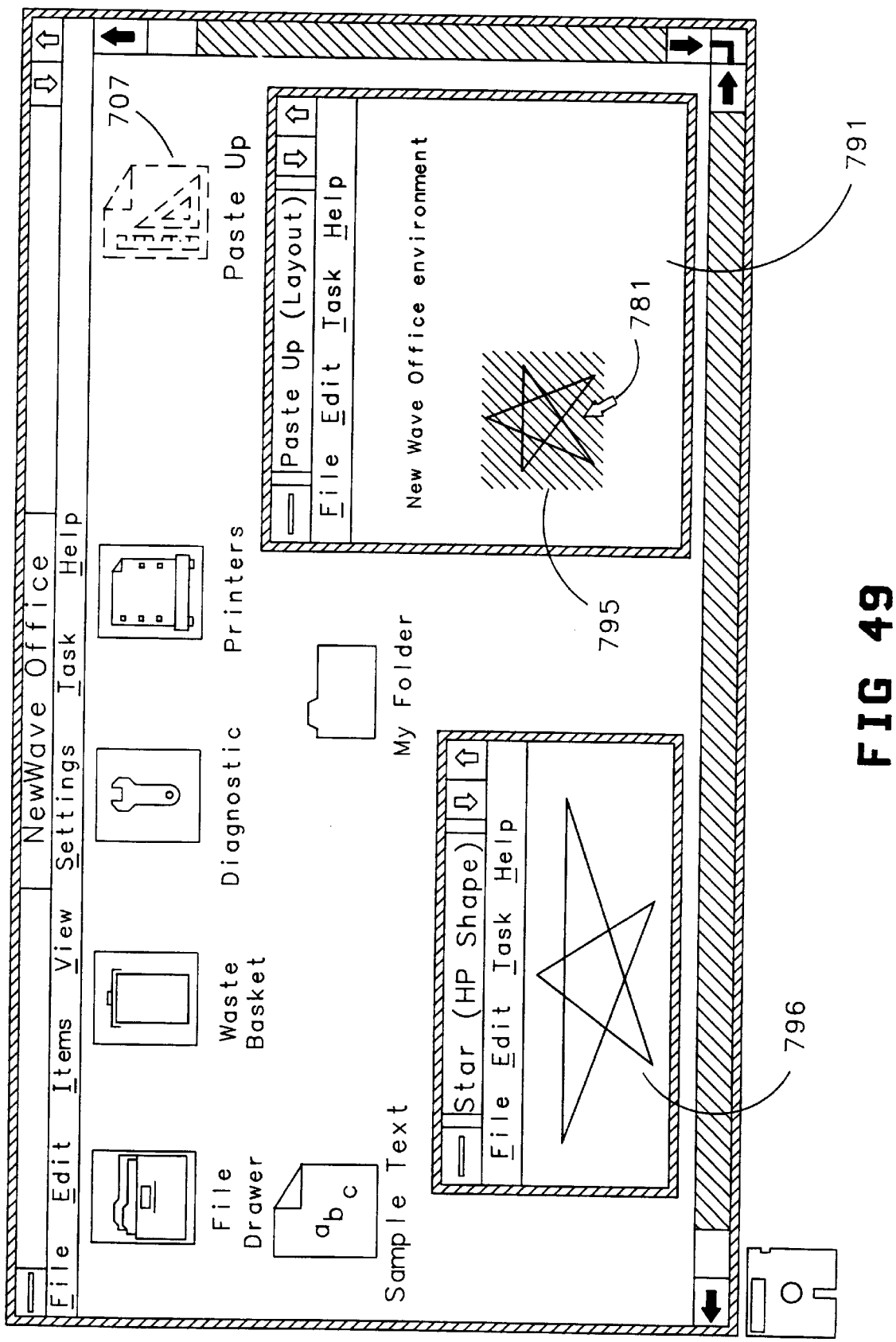
FIGS. 49, 50, 51, 52, 53, 54 and 55 show progress of various operations on a graphic display.
Figure 50:
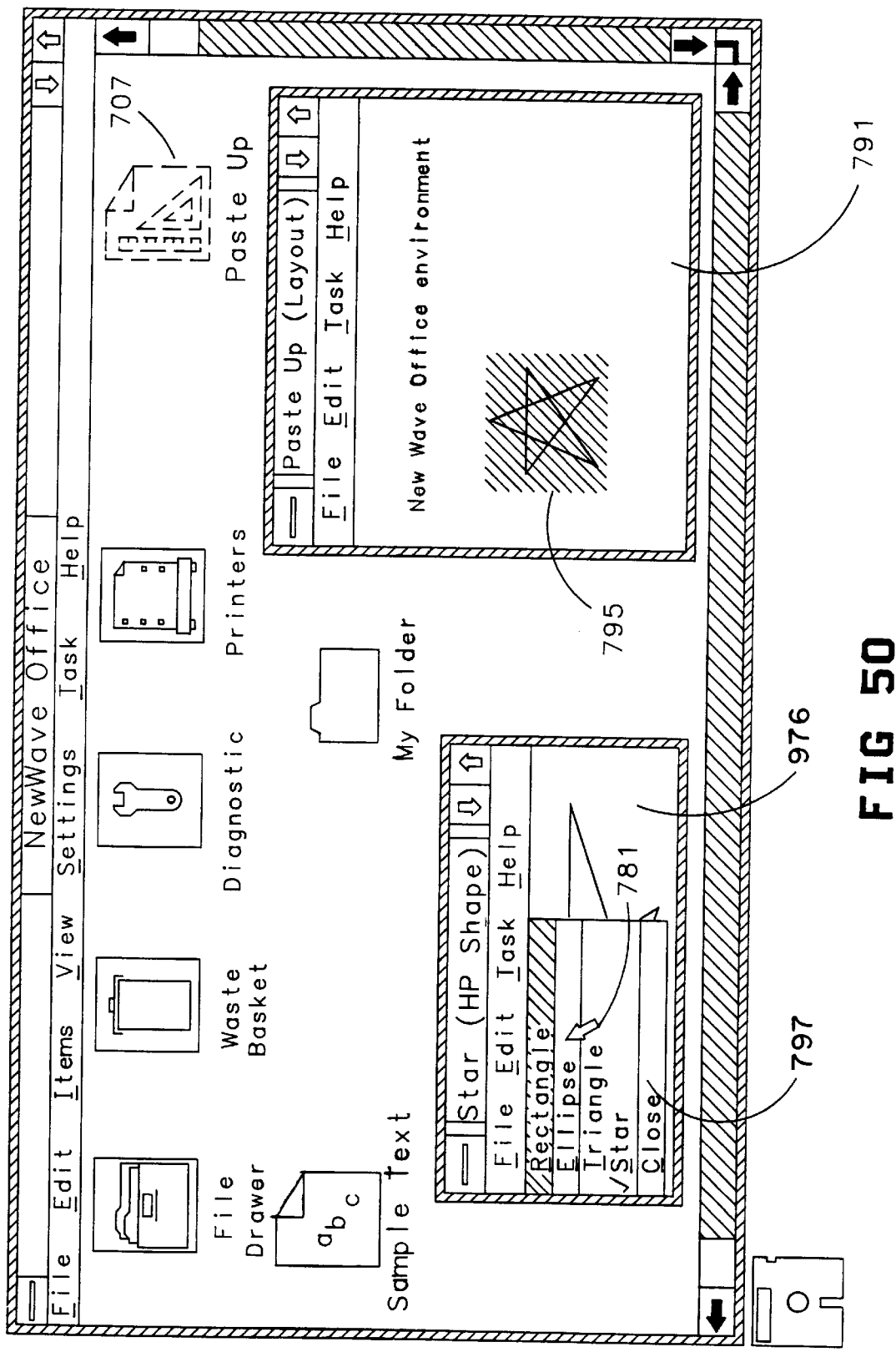
Figure 51:
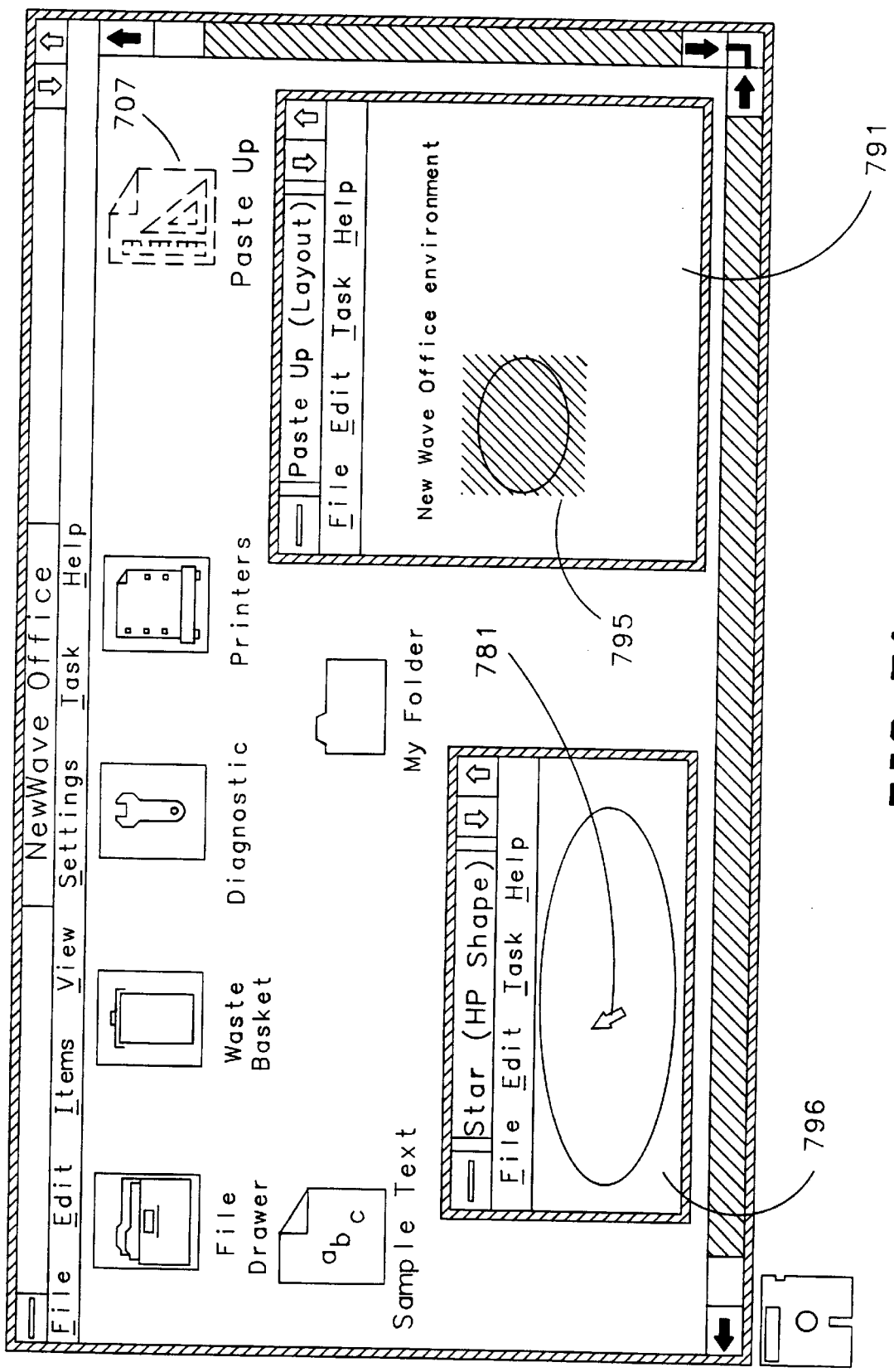

In FIG. 49, a user has placed cursor 781 over region 795 of window 791 and double clicked a button on mouse 20. The result is the opening and display of "Star" (object 706) in a window 796. FIG. 40 shows the use of cursor 781 to select selection "Ellipse" in a menu window 797 which results in the data within "Star" (object 706) being changed from a star to an ellipse. As shown in FIG. 51, the result is a change both in data displayed in window 796 and data displayed in region 795 of window 791.

Figure 52:
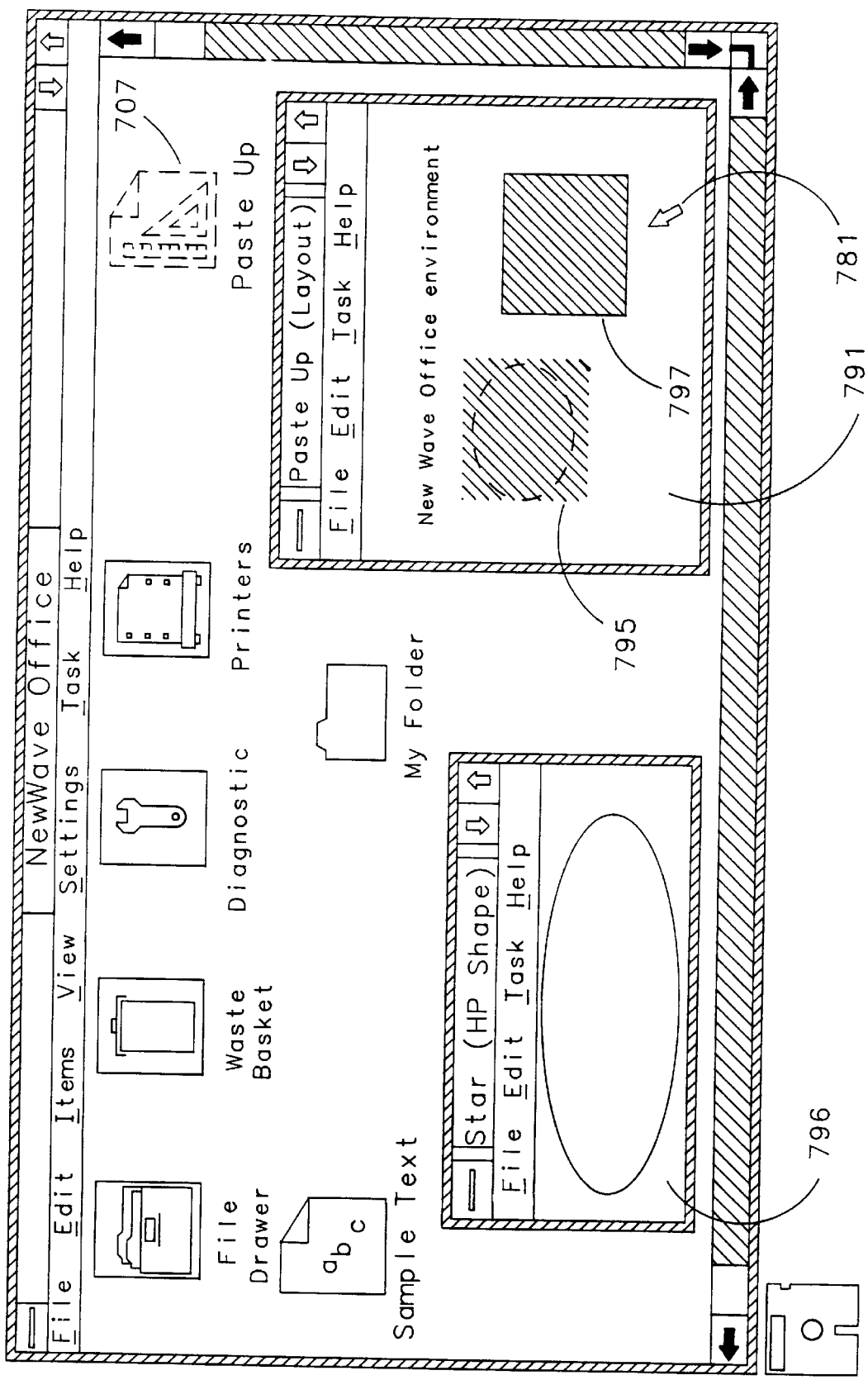
Figure 53:
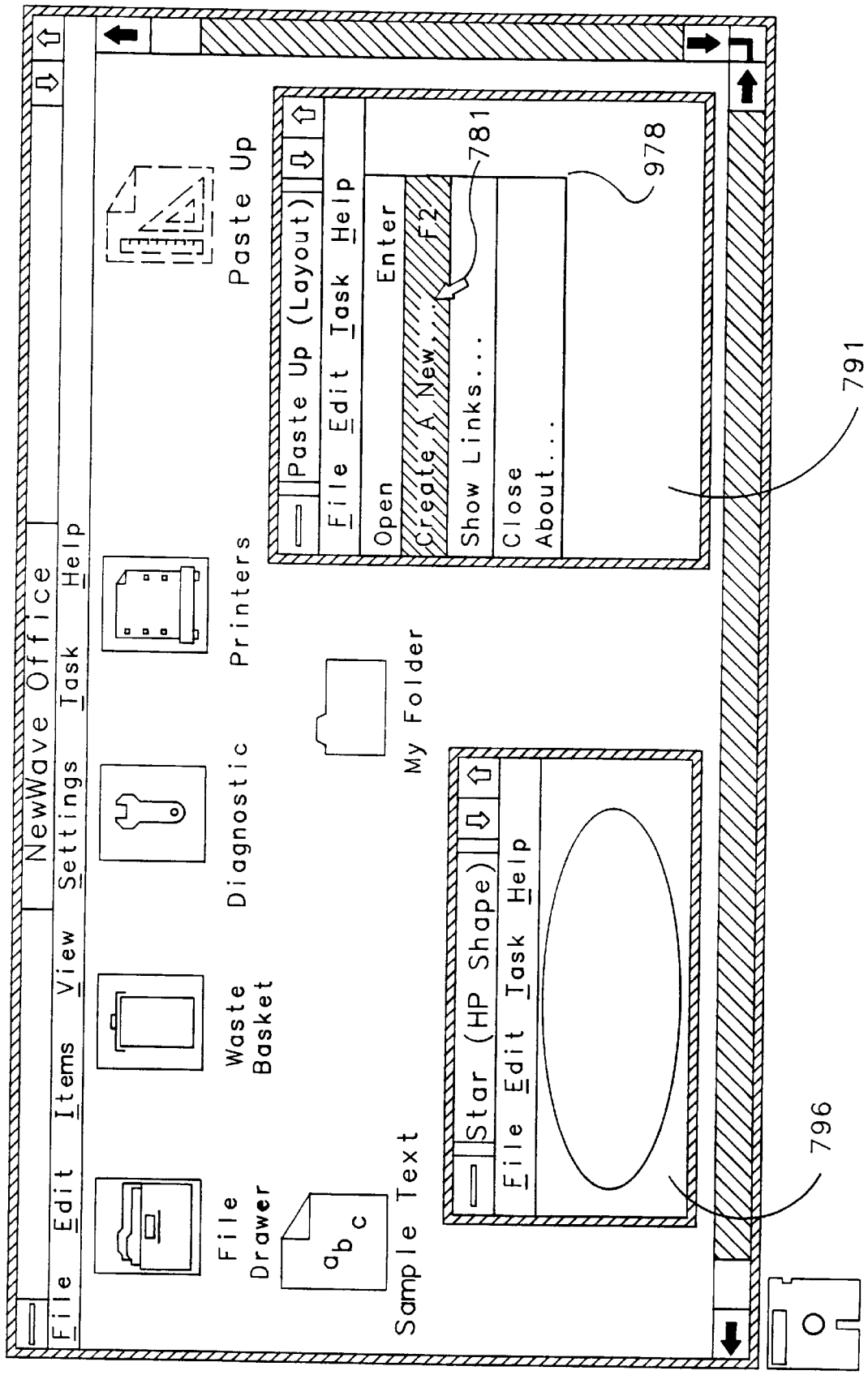
Figure 54:
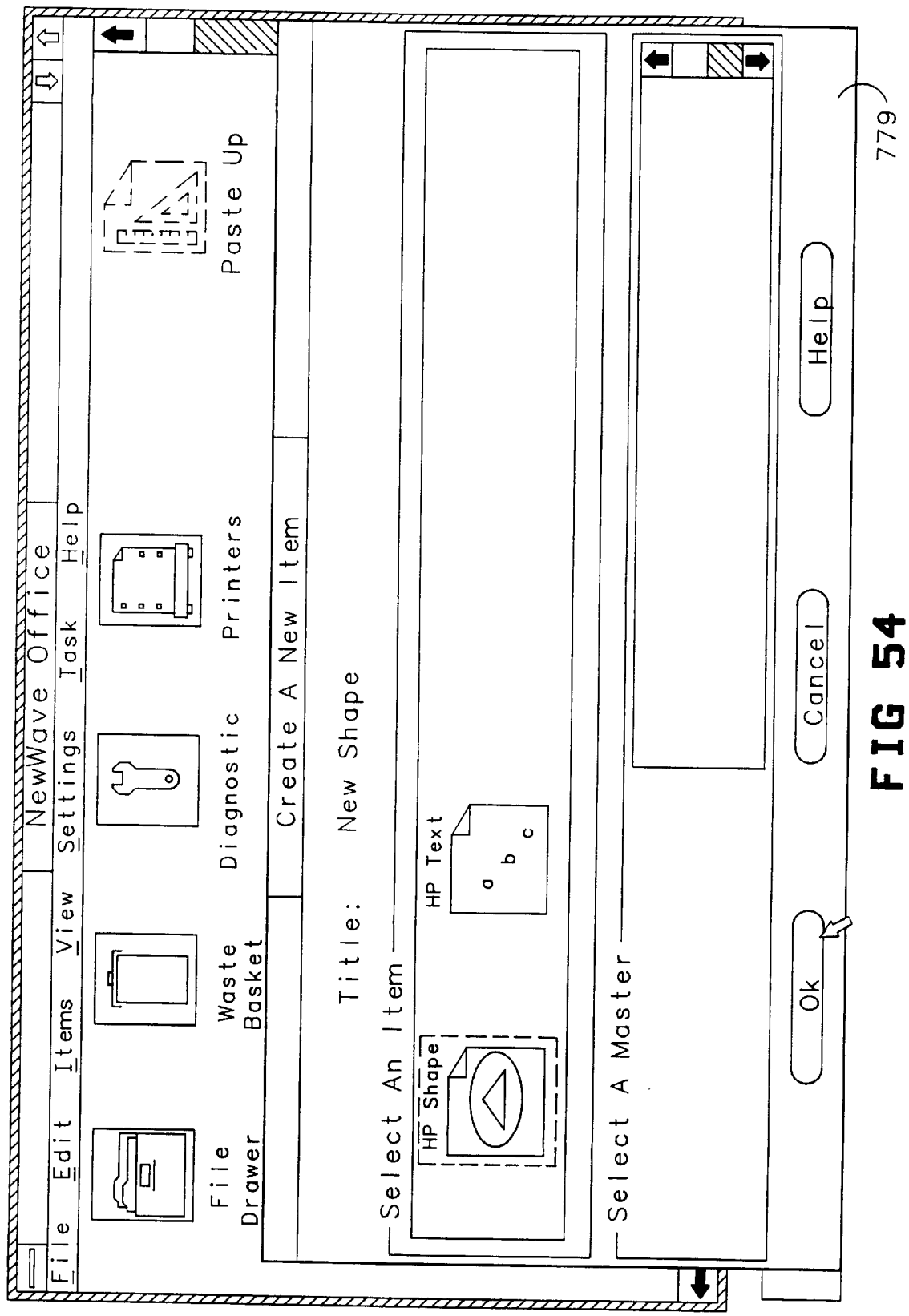
Figure 55:
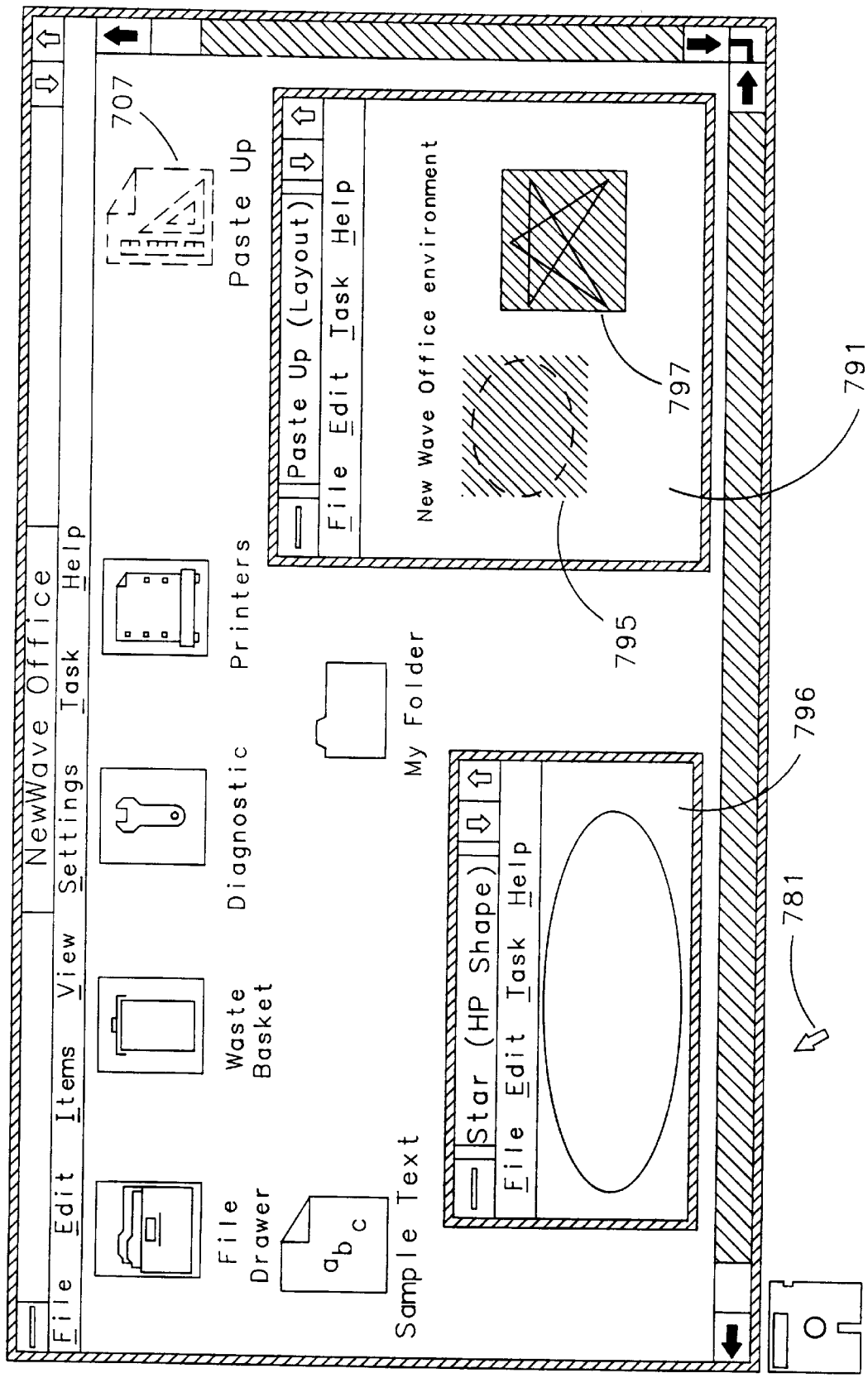
Figure 56:
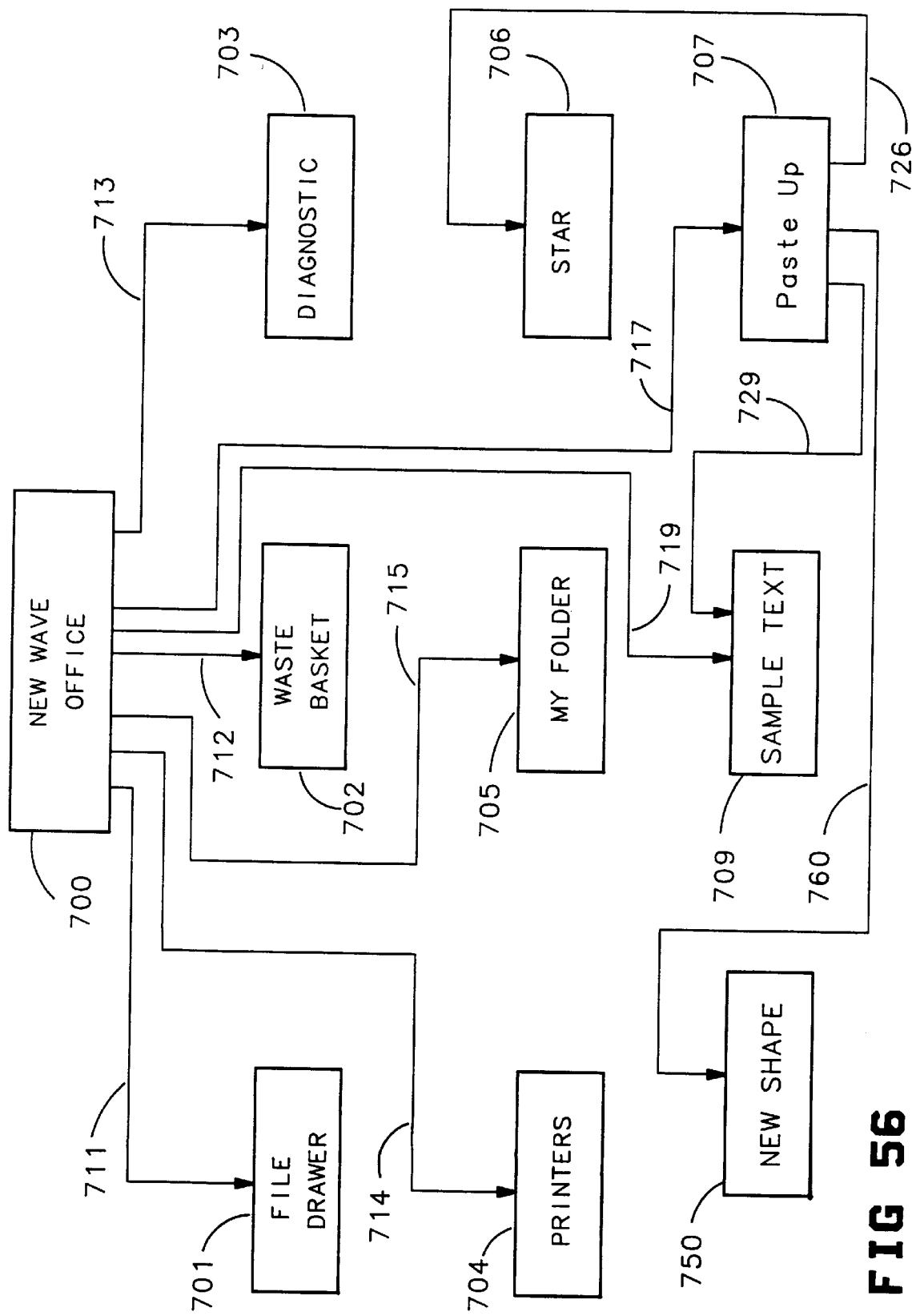
FIG. 56 is a block diagram showing linked objects resulting from the operations illustrated by FIGS. 49, 50, 51, 52, 53, 54 and 55.

In FIG. 52, cursor 781 is used to define a region 797 in window 791. In FIG. 53, cursor 781 is used to select a selection "Create a New . . . " in pull down menu 798. As a result of this selection dialog box 799 appears in FIG. 54. Dialog box 799 contains icons for the two classes of objects available which are able to display data in region 797 of window 791. Using cursor 781, the icon "HP Shape" has been highlighted. Using keyboard 19 the name "New Shape" has been typed in as the name for a new object to be created. Cursor 781 now points to a regions labelled "OK". Once this region is selected, a new object titled "New Shape" is created. Data for "New Shape" is displayed in region 797 of window 791 as is shown in FIG. 55. In FIG. 56, "New Shape", (object 750) is shown to be a child of "Paste Up" (object 707) through a link 760.

Figure 57:
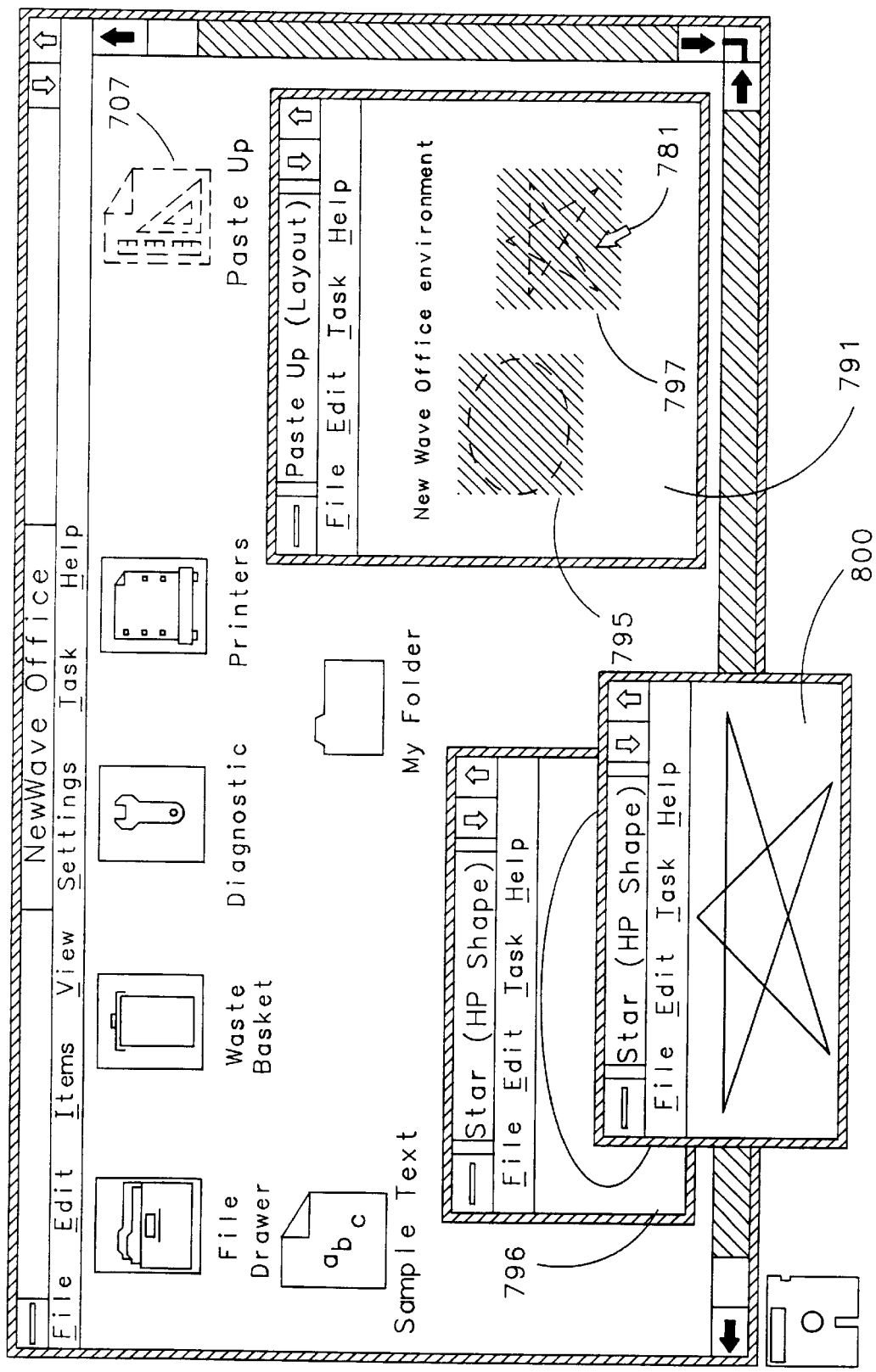
FIGS. 57, 58, 59, 60, 61, 62, 63, 64 and 65 show progress of various operations on a graphic display.
Figure 58:
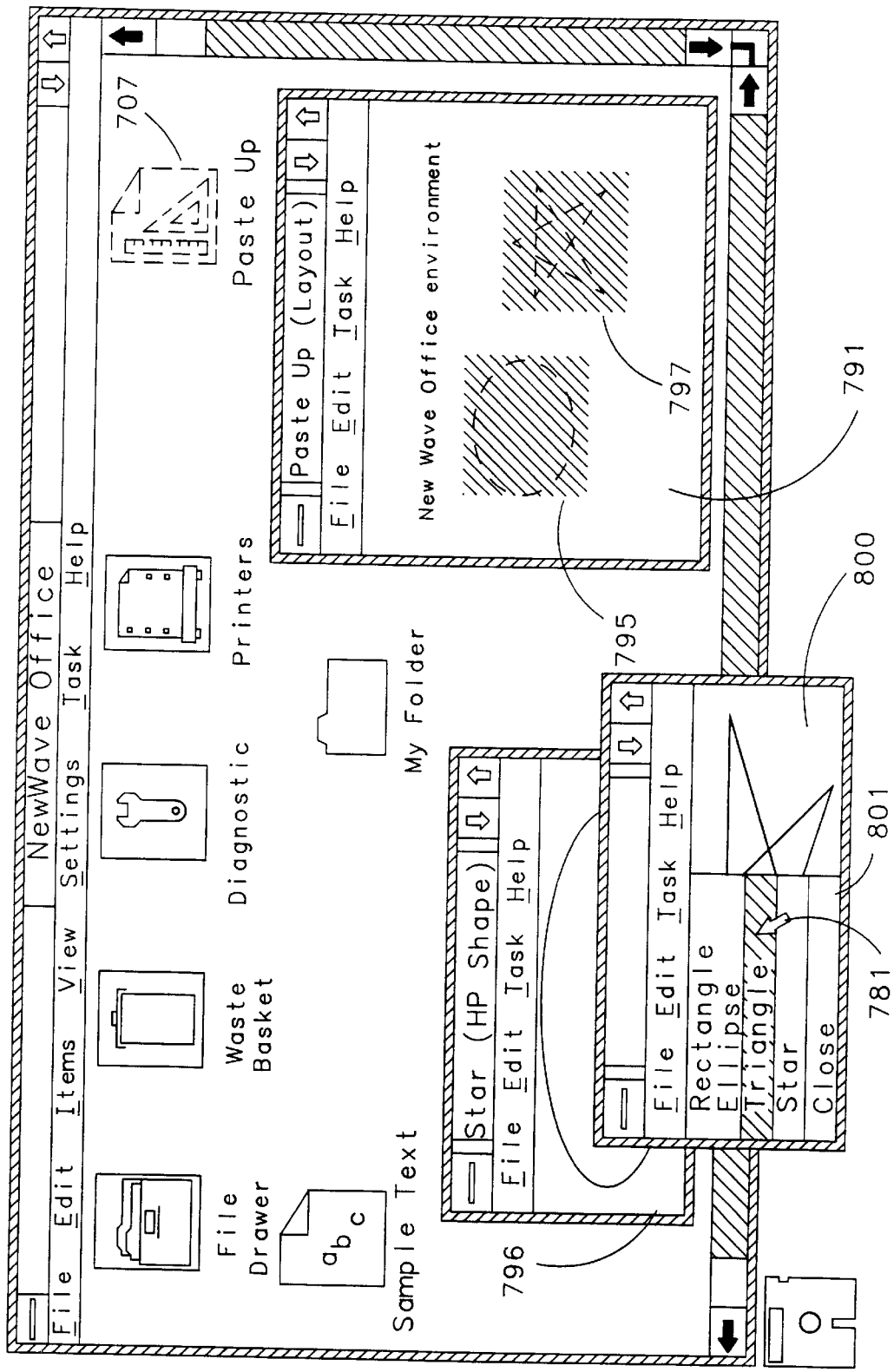
Figure 59:
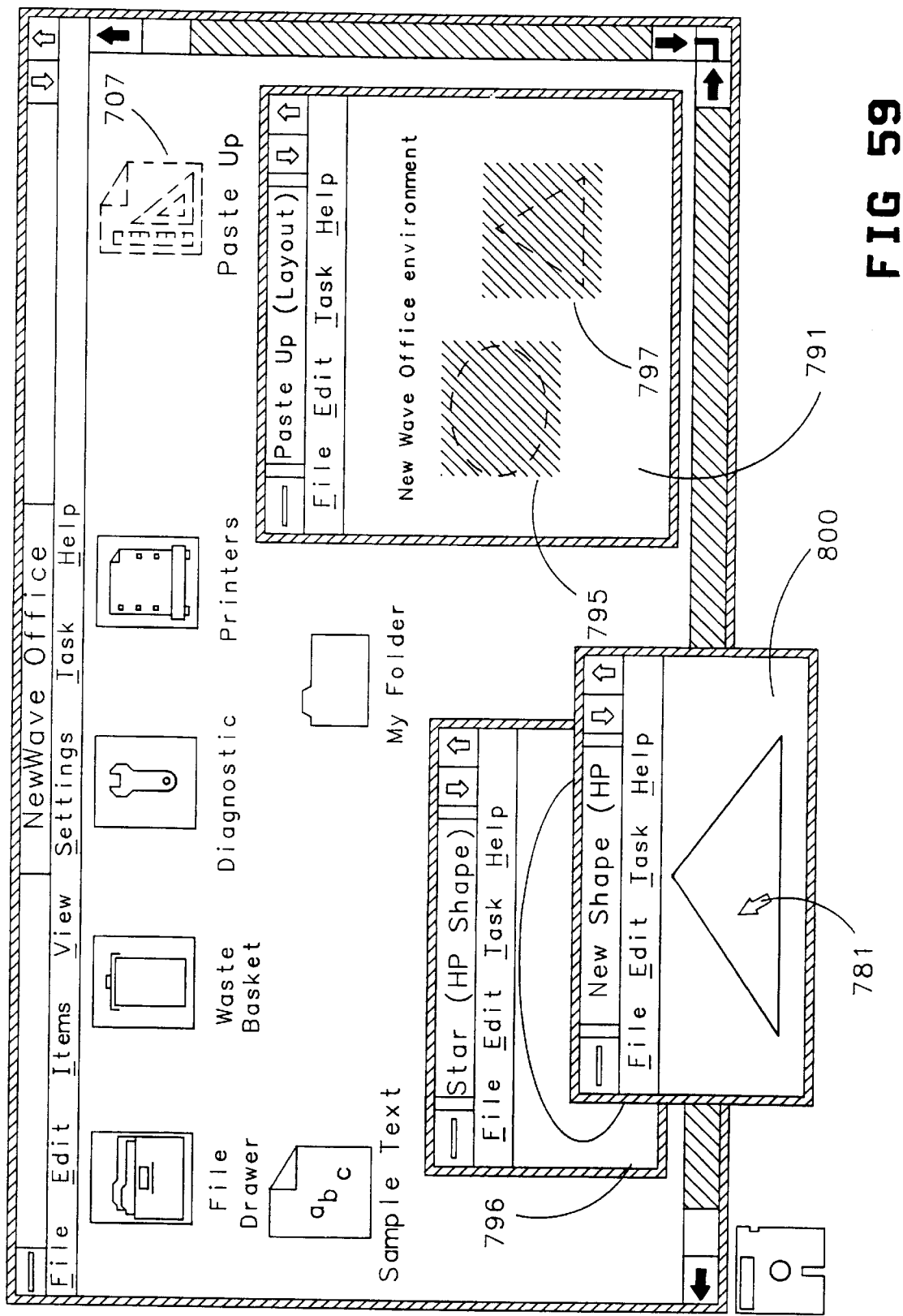

In FIG. 57 a window 800 for "New Shape" was opened by placing cursor 781 over region 797 of window 791 and clicking twice on a button on mouse 20. In FIG. 58, cursor 781 is used to select the selection "Triangle" from a pull down menu 801. The result, as shown in FIG. 59, is that a triangle is now displayed both in window 800 and in region 797 of window 791.

Figure 60:
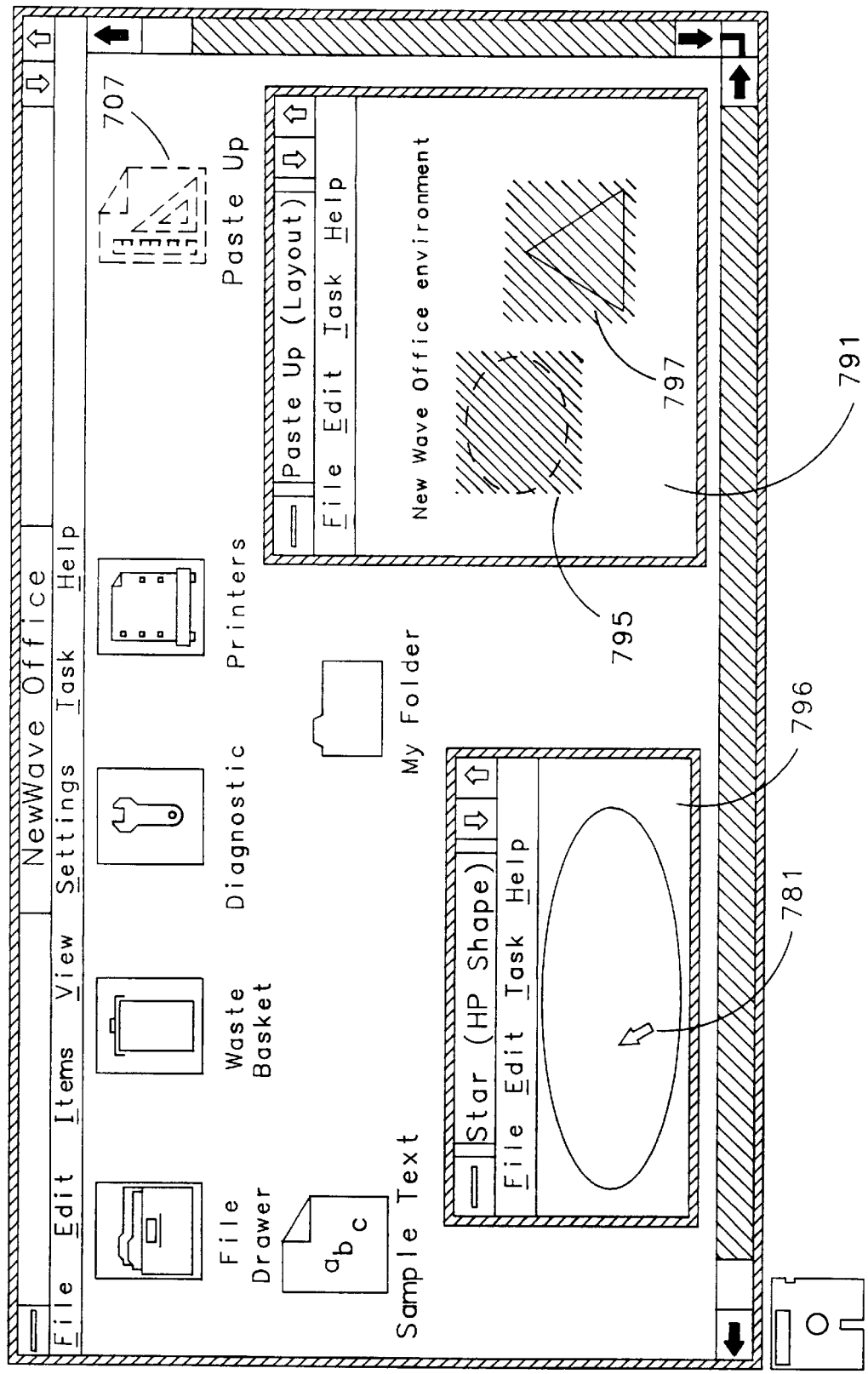
Figure 61:
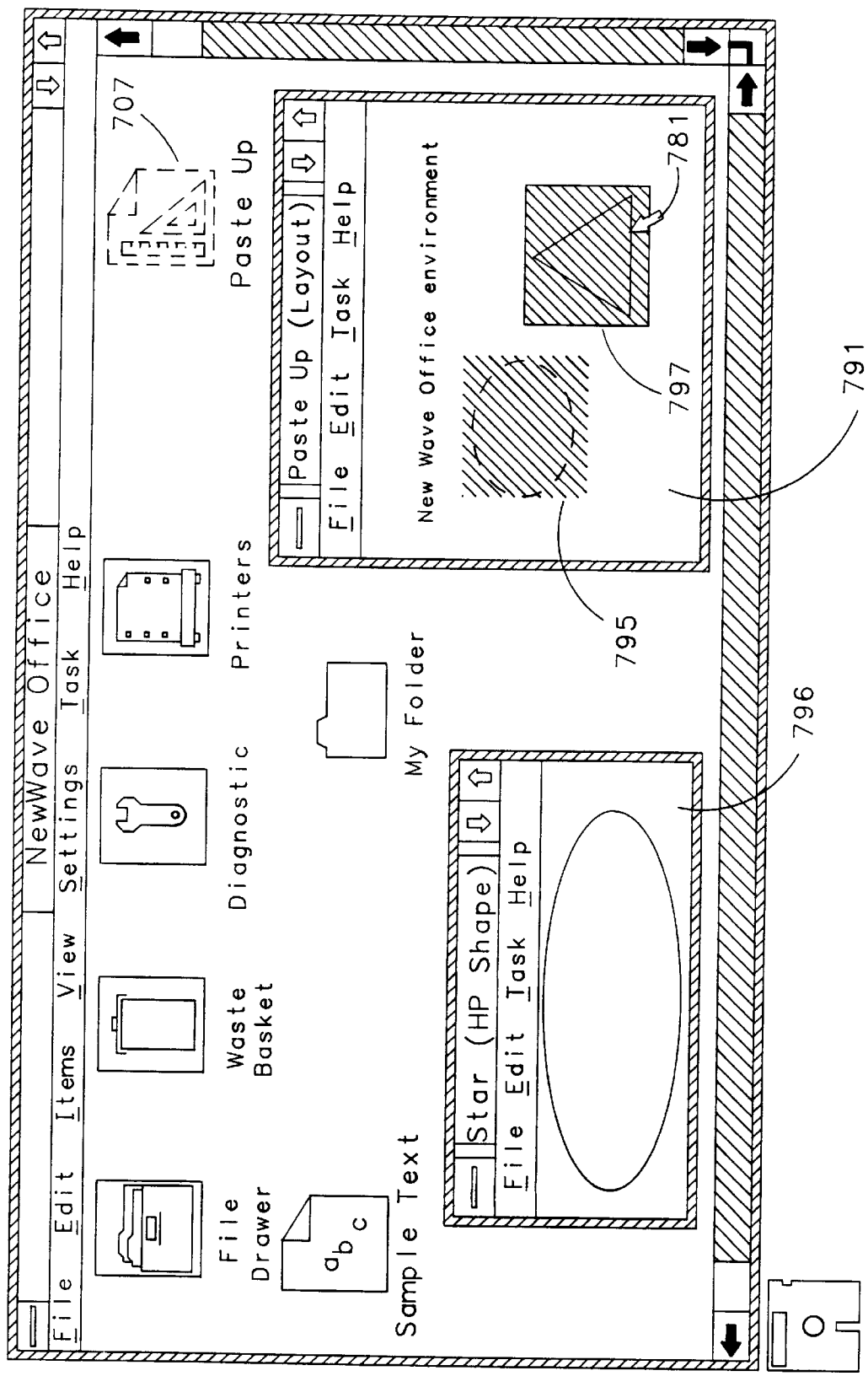
Figure 62:
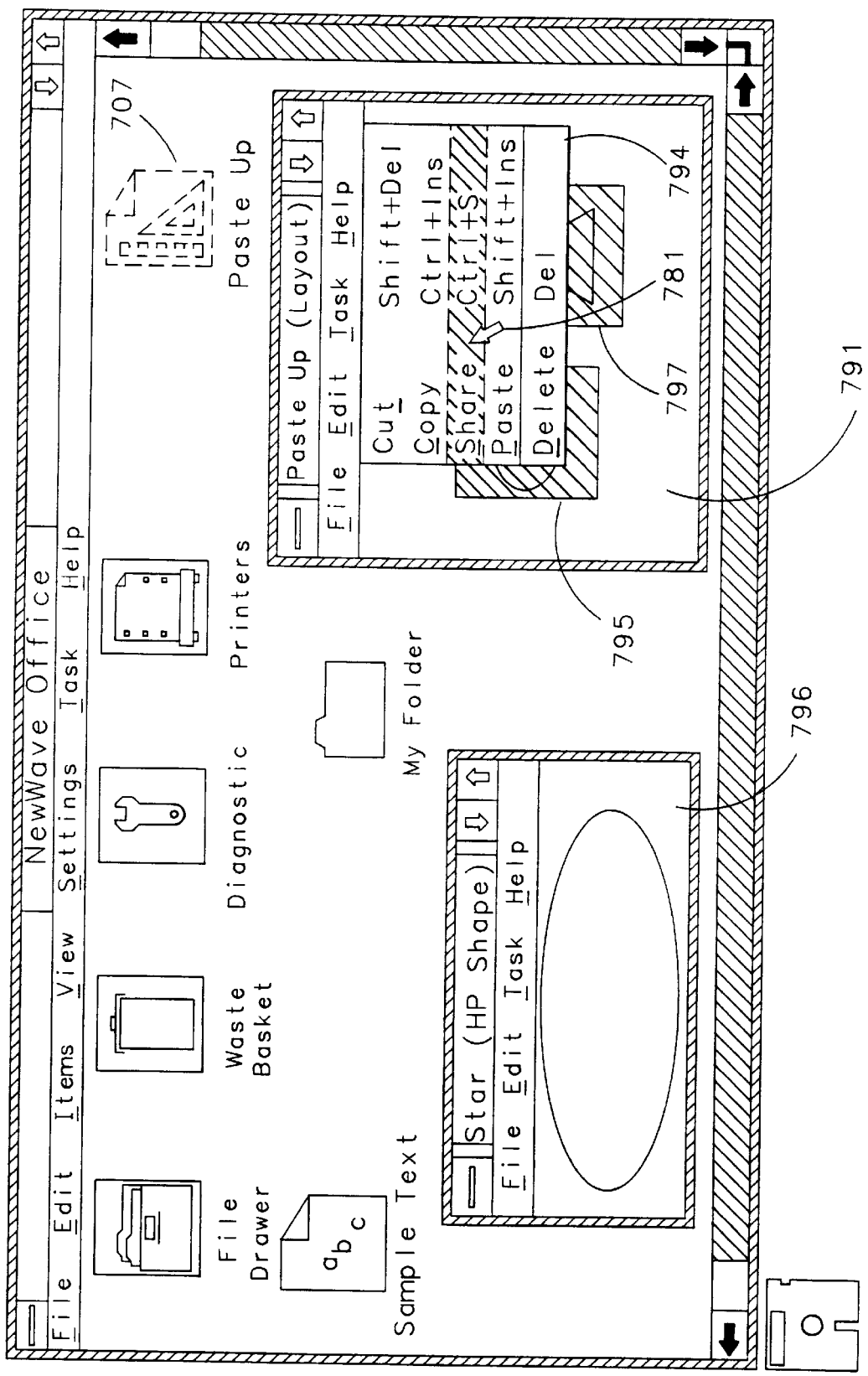
Figure 63:
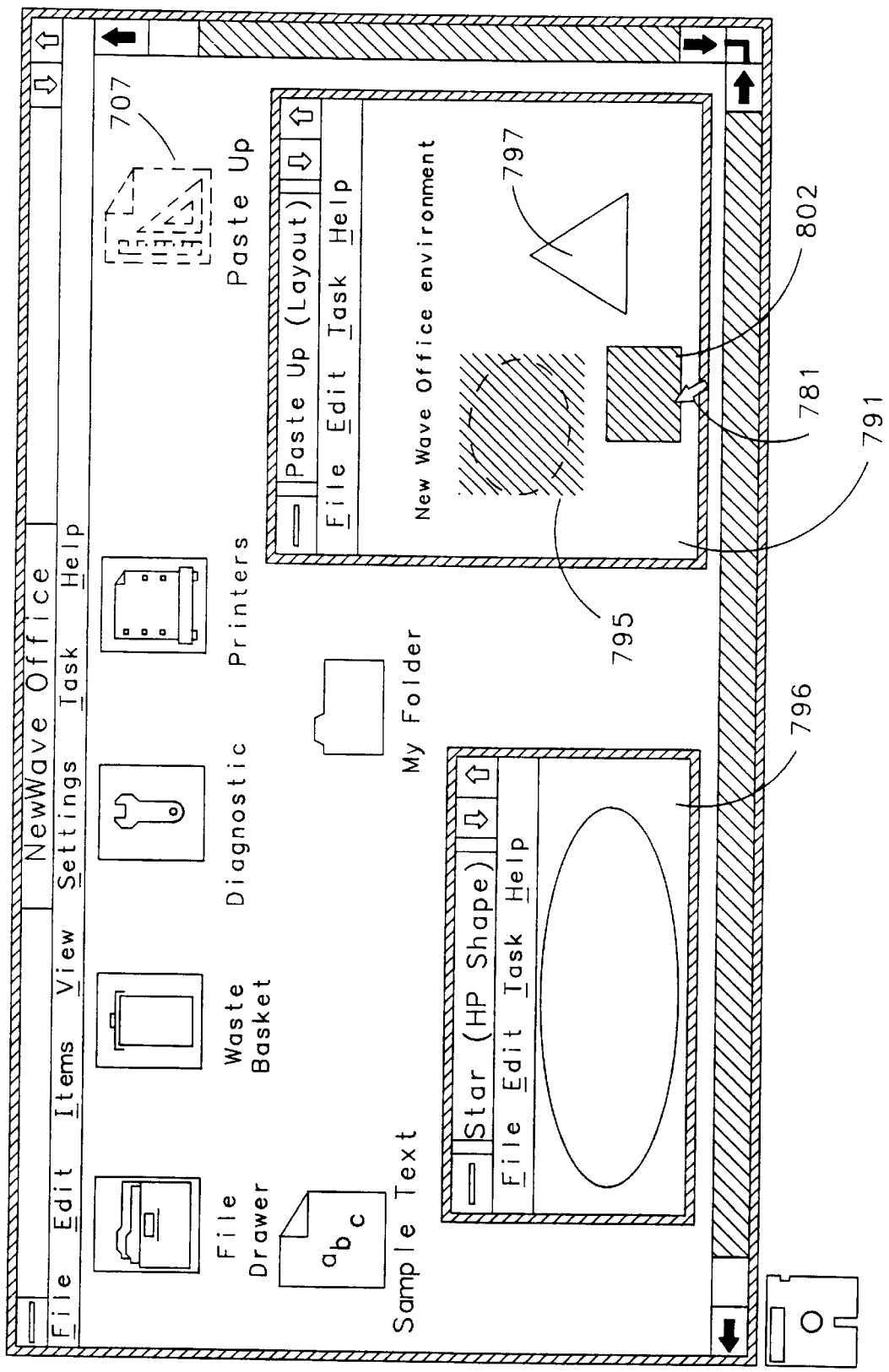
Figure 64:
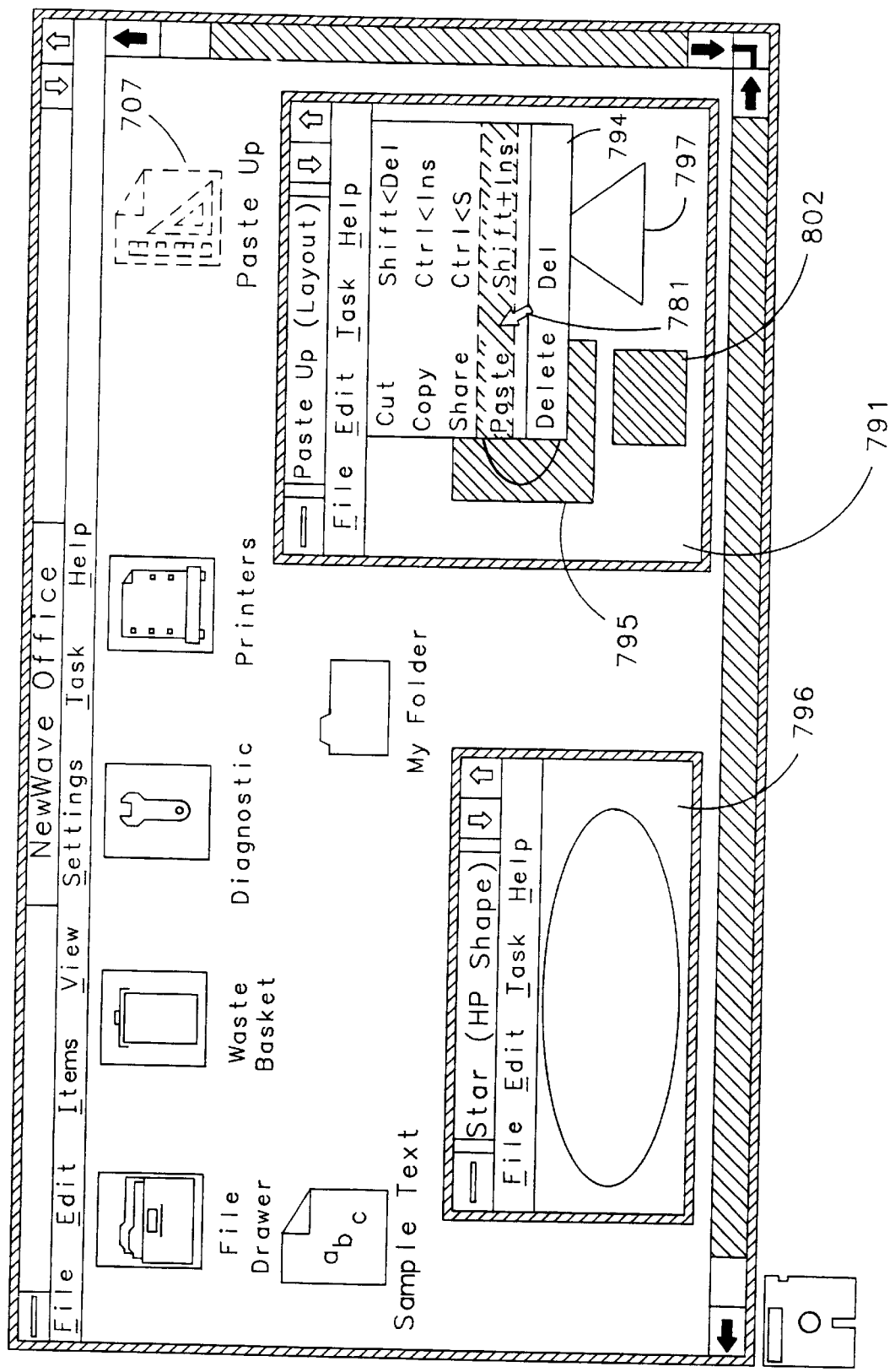
Figure 65:
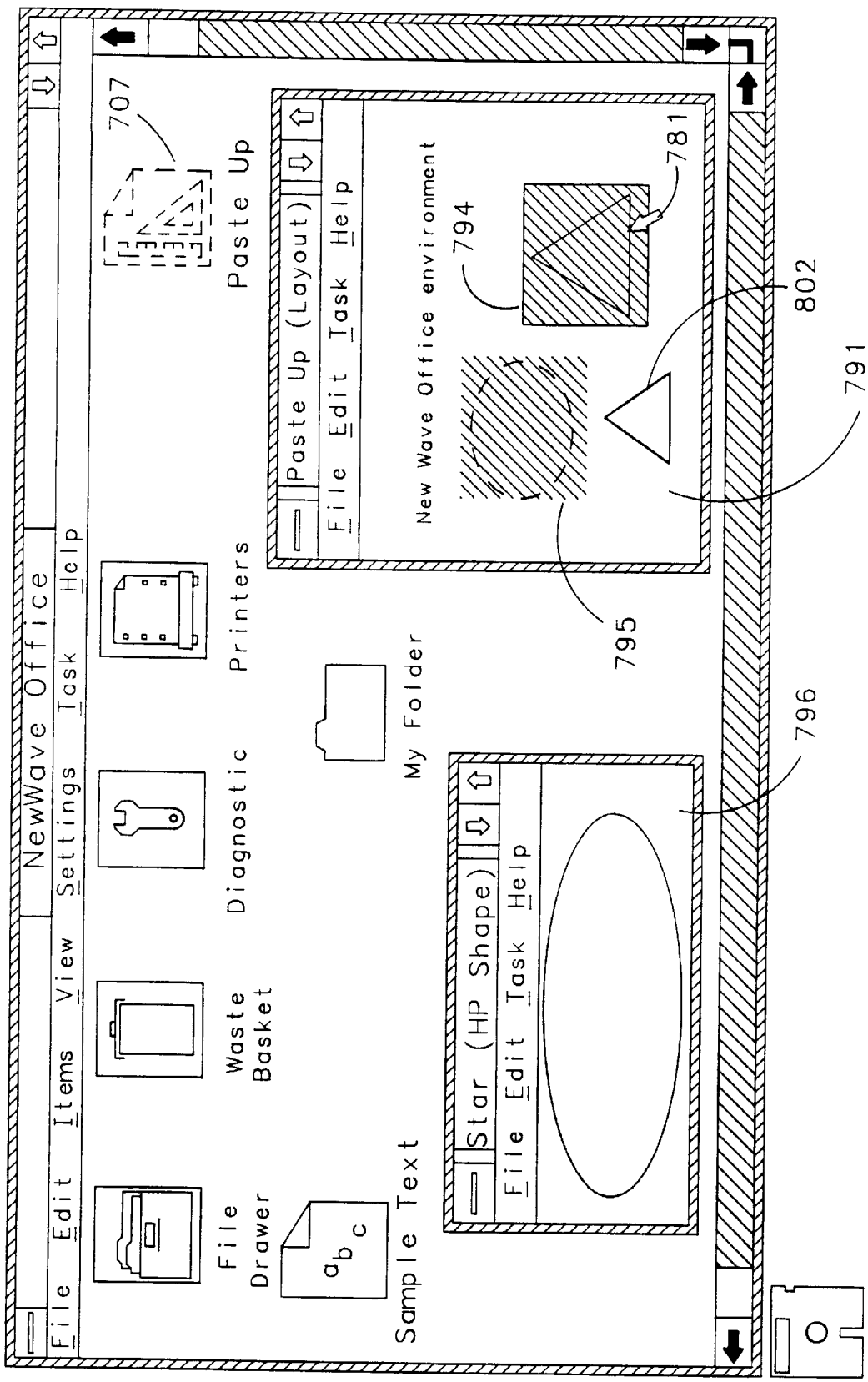
Figure 66:
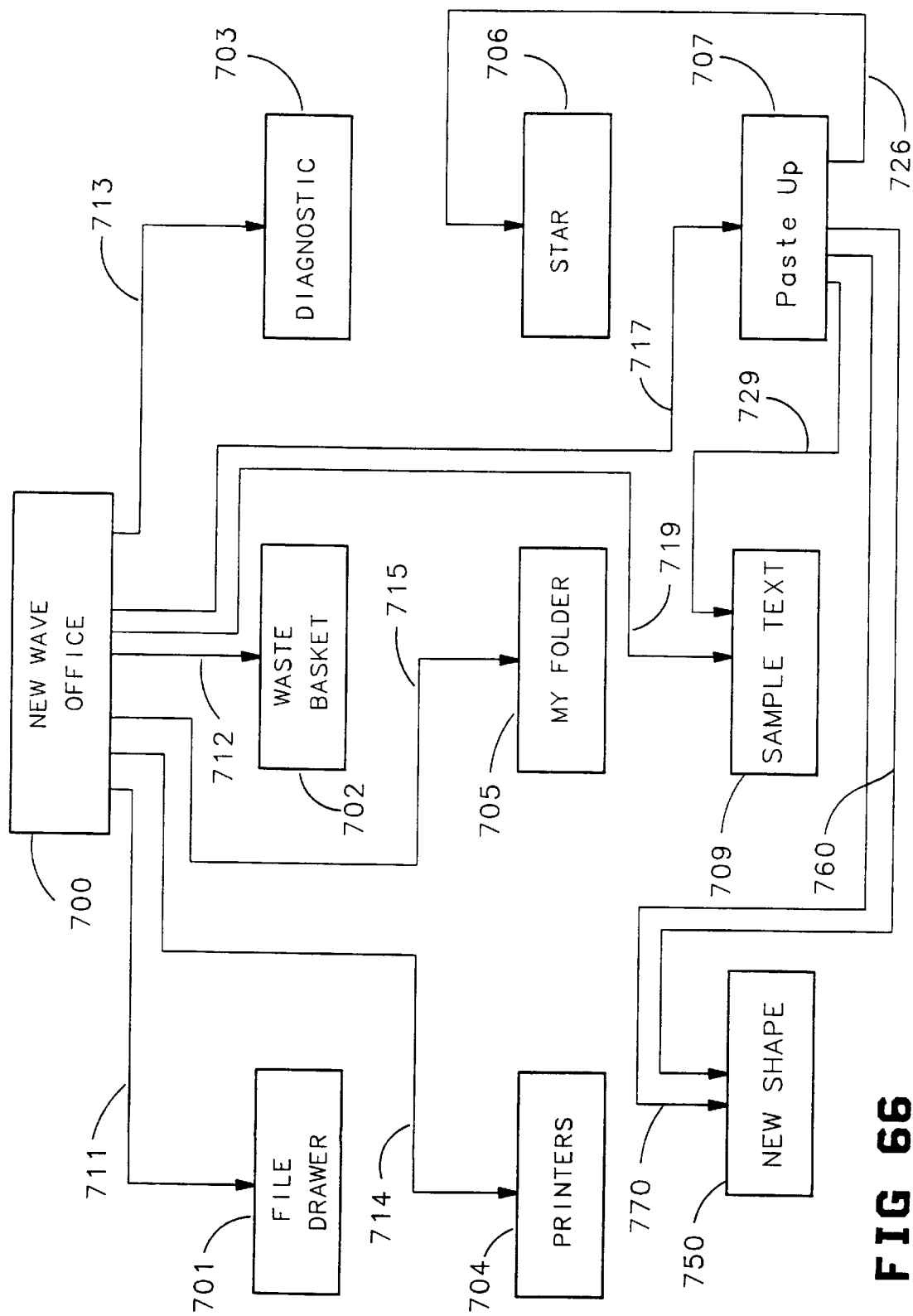
FIG. 66 is a block diagram showing linked objects resulting from the operations illustrated by FIGS. 57, 58, 59, 60, 61, 62, 63, 64 and 65.

In FIG. 60, window 800 has been closed. In FIG. 61, "New Shape" is selected by placing cursor 781 over region 797 of window 796, and clicking a button on mouse 20. In FIG. 62, cursor 781 is used to select selection "Share" from pull down menu 794. In FIG. 63, cursor 781 is used to select a region 802 of window 791. In FIG. 64, cursor 781 is used to select selection "Paste" from pull down menu 794. The result, as shown in FIG. 65, is the sharing of "New Shape" with data from "New Shape" being displayed in region 797 and in region 802 of window 791. In FIG. 66, "New Shape" (object 750) is shown to have an additional link 770, from its parent "Paste Up" (object 707).

Figure 67:
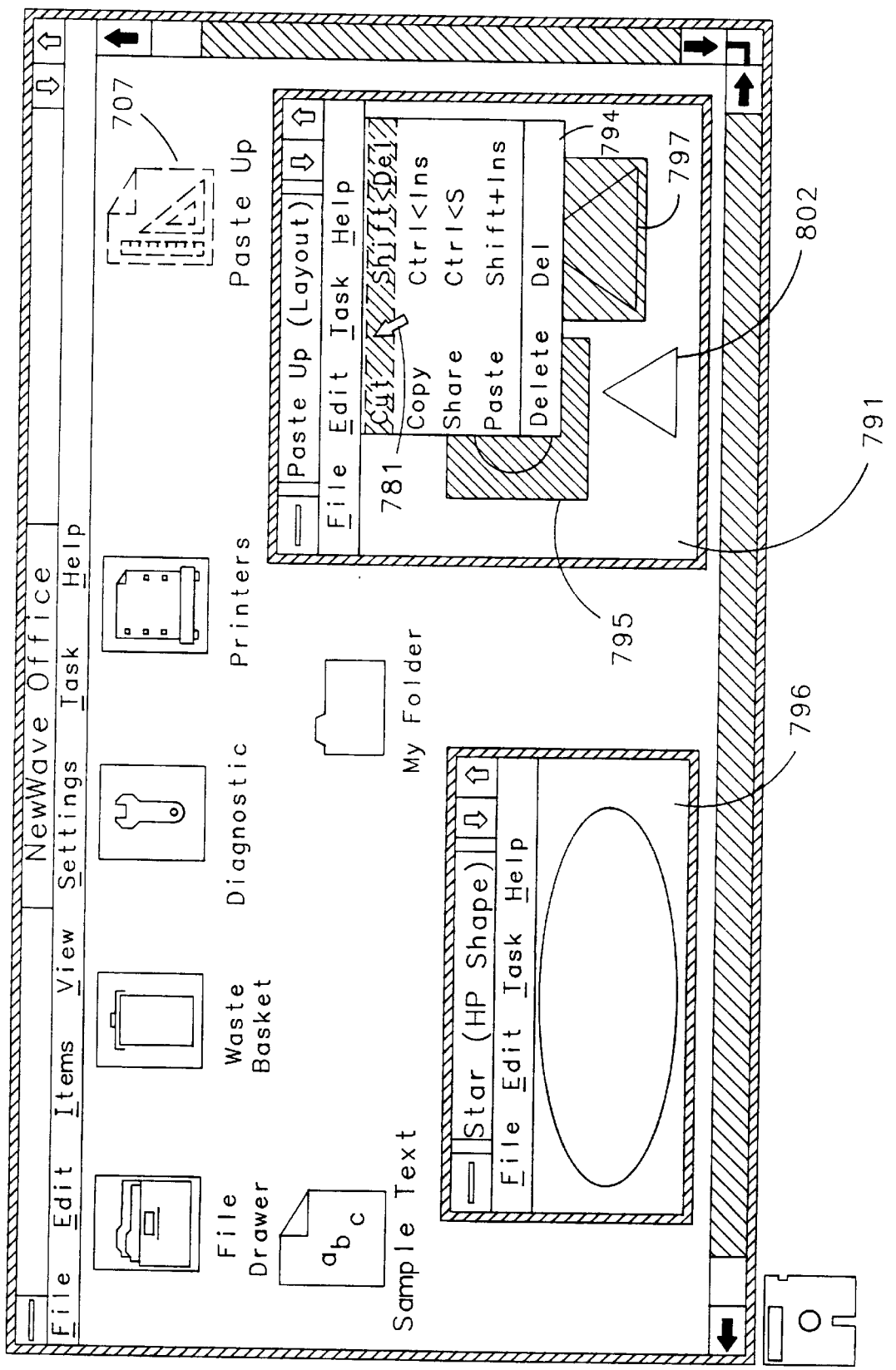
FIGS. 67, 68, 69 and 70 show progress of various operations on a graphic display.
Figure 68:
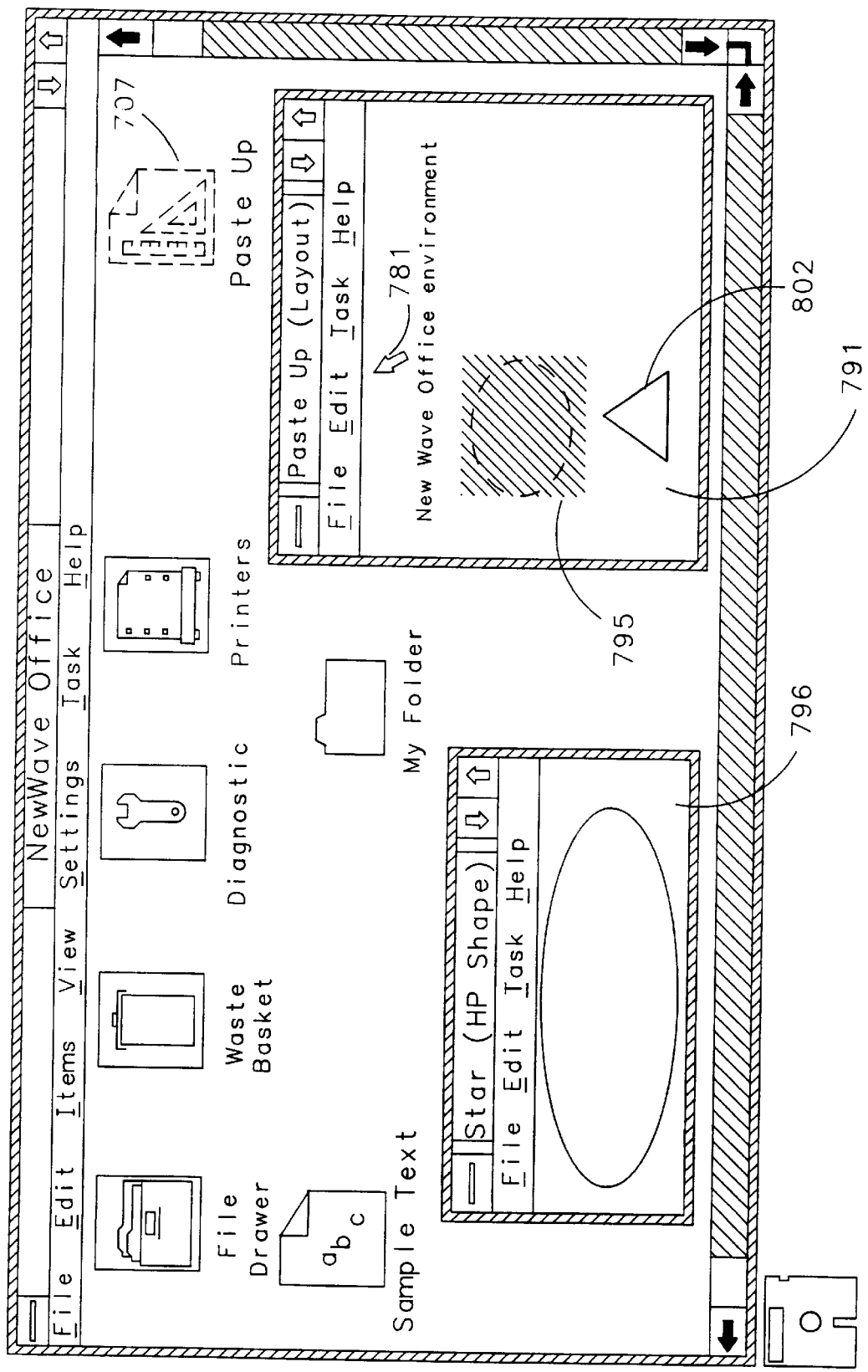
Figure 69:
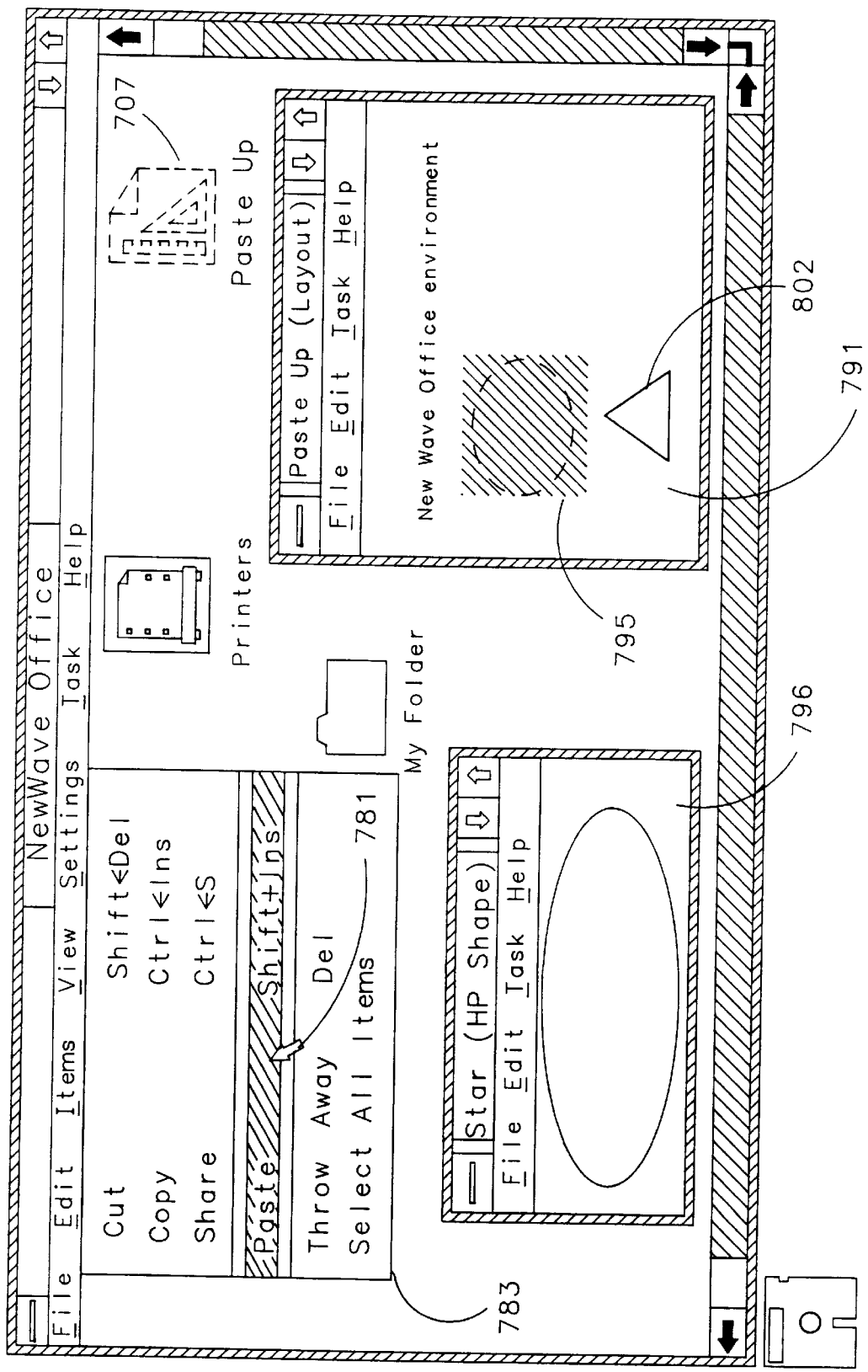
Figure 70:
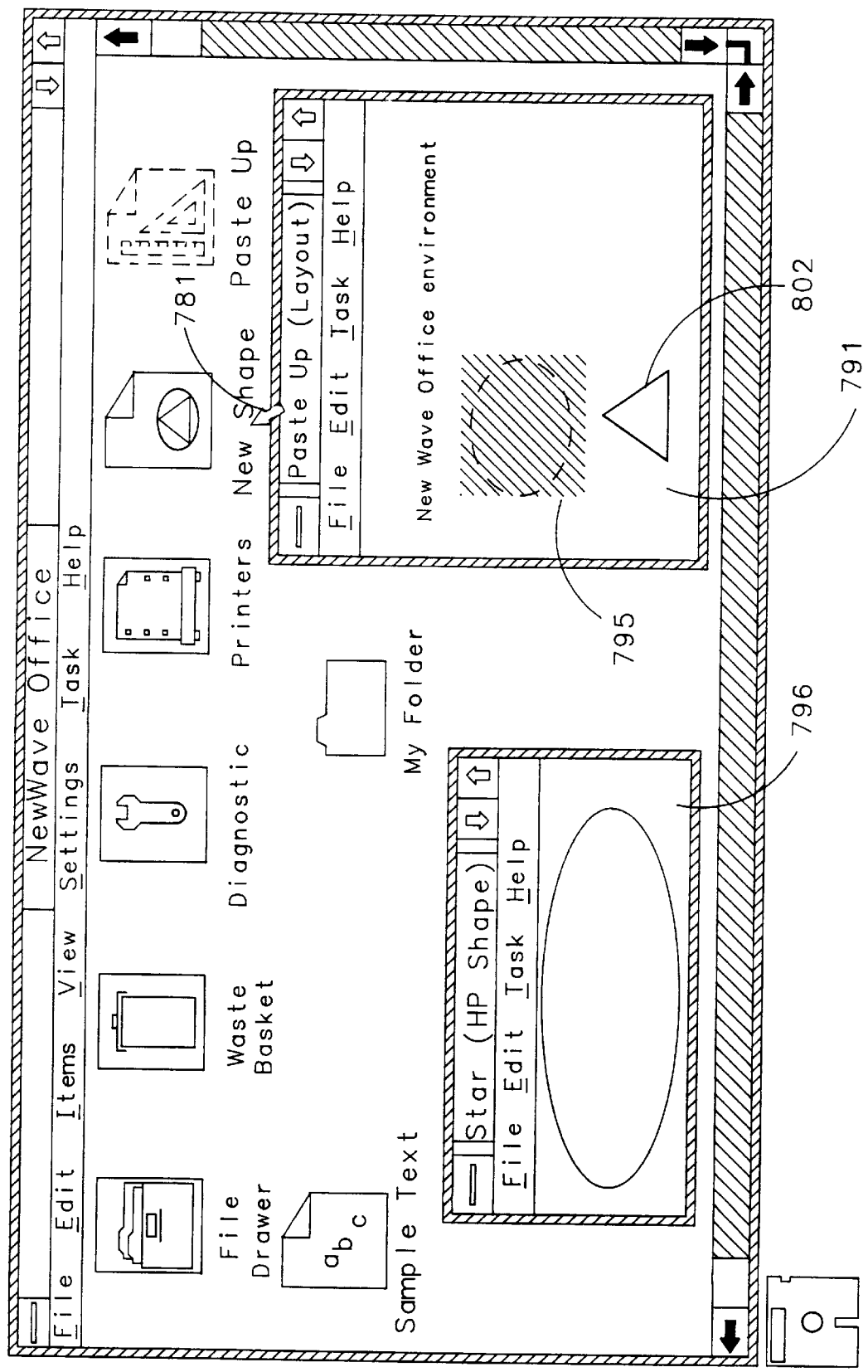

In FIG. 67, region 797 has been selected using cursor 781. Cursor 781 is then used to select selection "Cut" from pull down menu 794. The result, as seen in FIG. 68, is that region 781 has been removed from window 791. In FIG. 69, cursor 781 is used to select selection "Paste" from pull down menu 783. The result, shown in FIG. 70, is an icon for "New Shape", pointed to by cursor 781. In FIG. 71, "New Shape (object 750) is shown to now be a child of NewWave Office (object 100), through a link 780.

Figure 72:
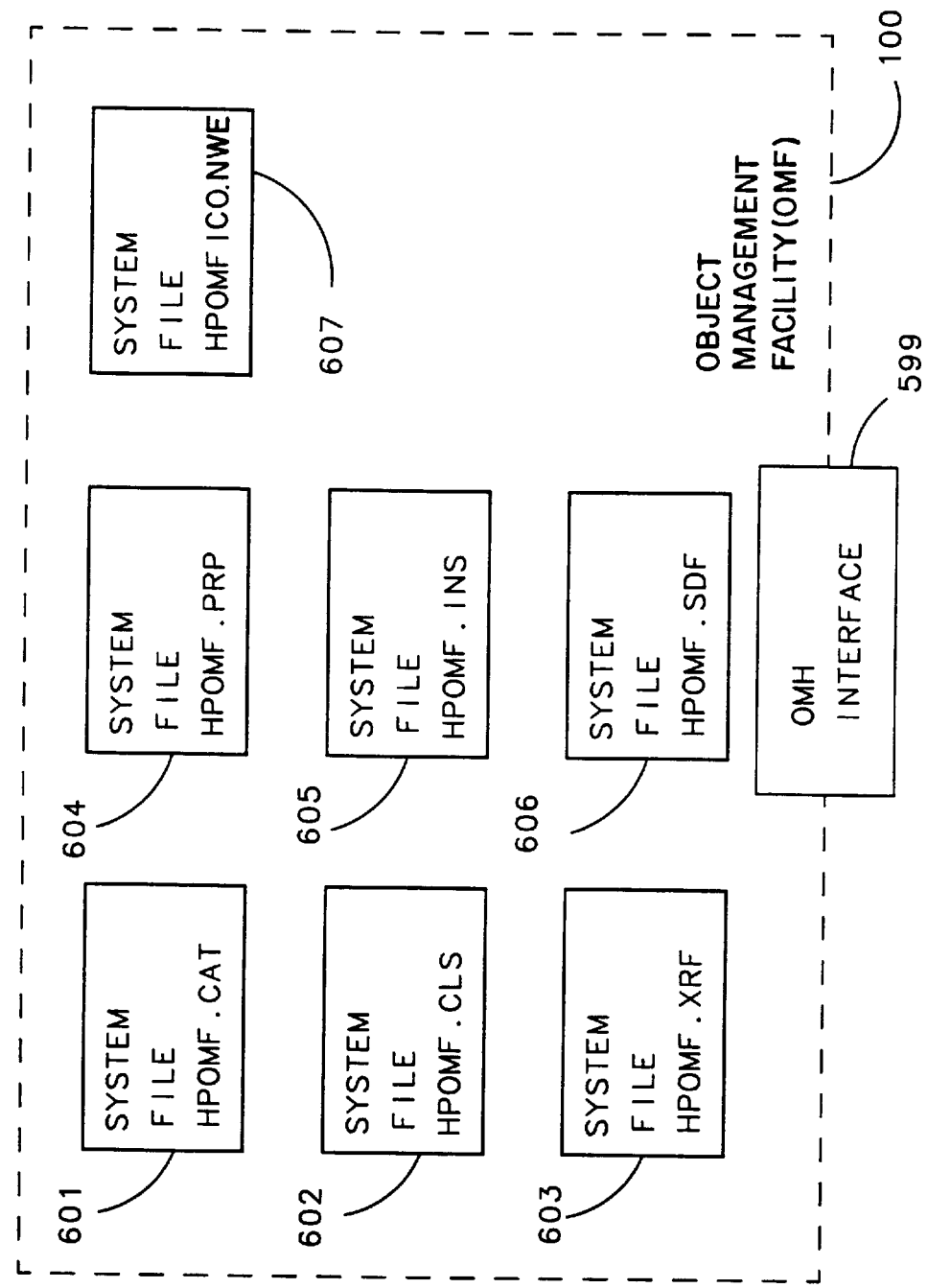
FIG. 72 is a block diagram of an Object Management Facility (OMF) in accordance with the preferred embodiment of the present invention.

In FIG. 72, OMF 100 is shown to contain seven system files: system file 601, system file 602, system file 603, system file 604, system file 605, system file 606 and system file 607. OMF interface 599 serves as interface of OMF to other programs running on computer 18. System files 601–607 serve as a data base that provides various information. They provide information about object properties such as what class each object is what is the name of each object. System files 601–607 provide information about classes of objects such as what application is associated with each class of objects, what icon represents objects of a particular class and lists of what messages (such as those shown in FIG. 2) can be processed by objects of a particular class. System files 601–607 also contain information about links between parent and child objects including a list of parents and reference names of each link from a parent for each object; a list of children and reference names of each link to a child for each object; and additional information to manage data exchange across data links. Additionally, system files 601–607 contain general information such as what files are installed in the operating system for each class that is installed, and what objects have requested automatic restart when the OMF 100 is restarted.

In the preferred embodiment of the present invention system file 601 is referred to as HPOMF.CAT, system file 602 is referred to as HPOMF.CLS, system file 603 is referred to as HPOMF.XRF, system file 604 is referred to as HPOMF.PRP, system file 605 is referred to as HPOMF.INS, system file 606 is referred to as HPOMF.SDF and system file 607 is referred to as HPOMFICO.NWE. A description of each system file is now given.

Figure 73:
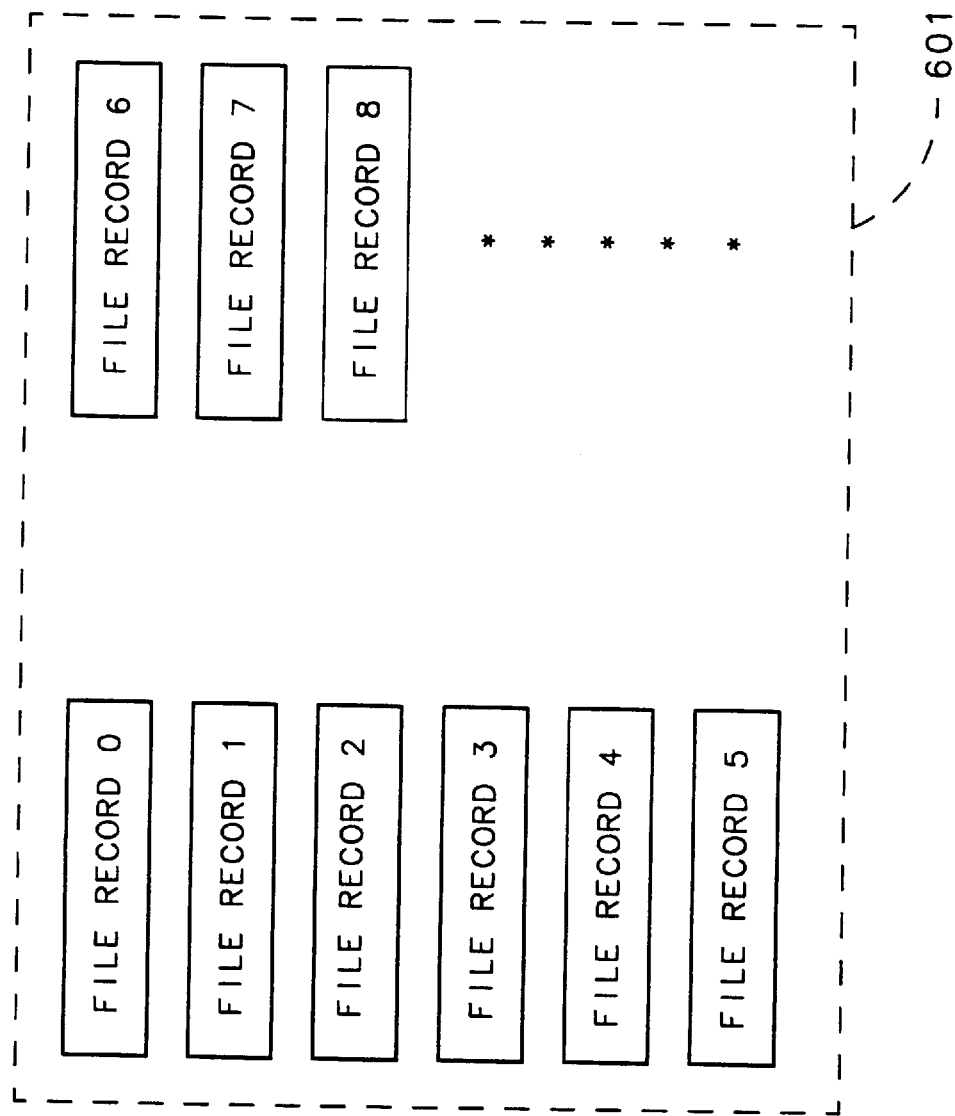
FIG. 73 shows a block diagram of the organization of HPOMF.CAT, a system file included in the OMF shown in FIG. 72.

System file 601, HPOMF.CAT, is also referred to as SYSCAT. HPOMF.CAT is a catalog of all the existing objects in the system. In FIG. 73, HPOMF.CAT is shown to be record oriented. HPOMF.CAT has a plurality of file records. In FIG. 73, file record 0 through file record 8 are shown, although HPOMF.CAT may contain many more file records than are shown in FIG. 73. File record 0 is a header which contains various signatures and is used to manage a list of free file records. A signature is some known value which if present indicates that the file is not corrupted. File record 1 through file record 8 and additional file records (not shown) either define an existing object, or are free. In the preferred embodiment HPOMF.CAT can grow dynamically, as more file records are needed, but cannot shrink.

Figure 74:
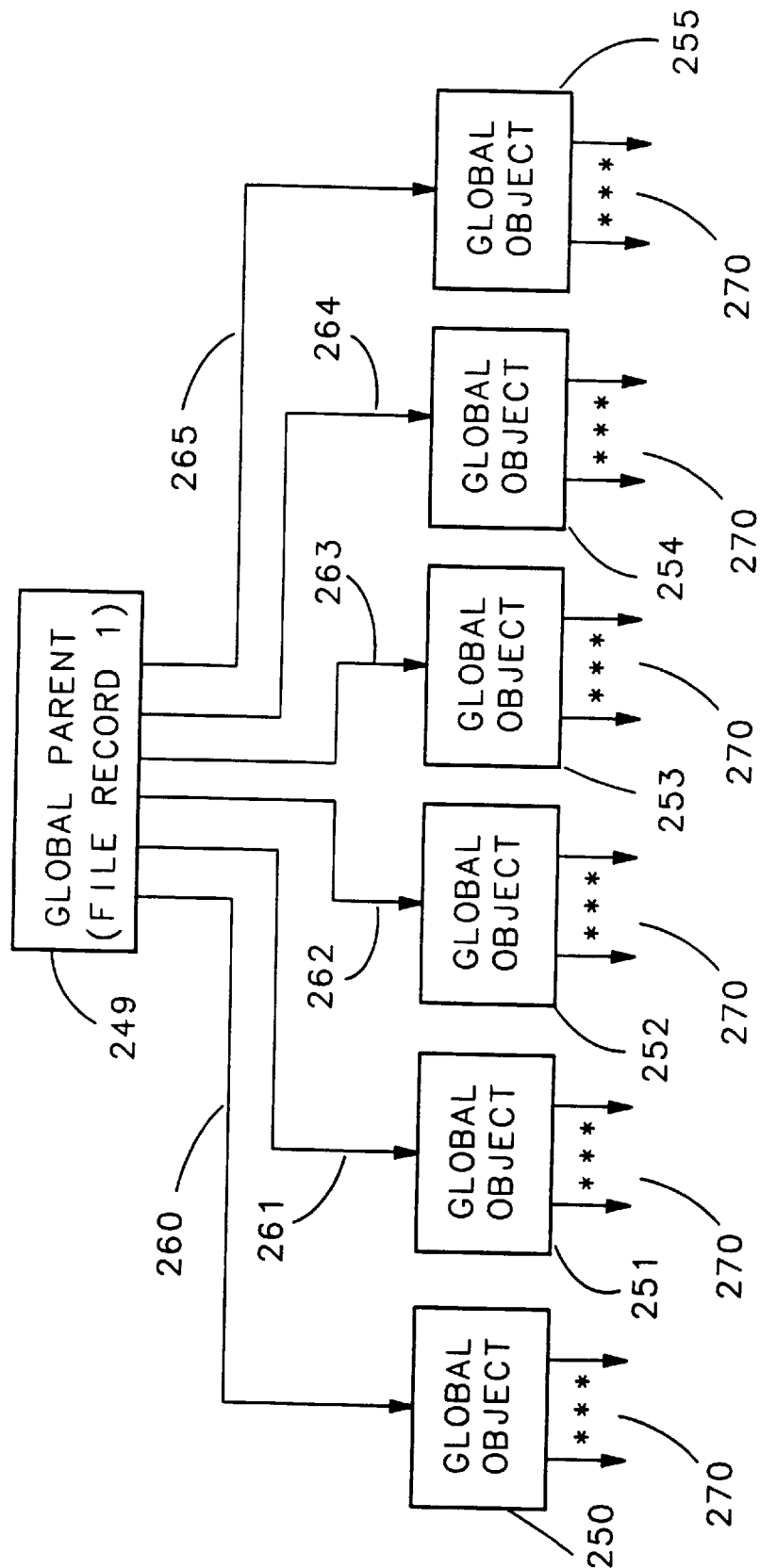
FIG. 74 shows the relation between a global parent and global objects in accordance with the preferred embodiment of the present invention.

File record 1 defines a special object called the global parent. The global parent has a form different than every other object, and may be regarded as a "pseudo" object. FIG. 74 shows the global parent to be the parent of global object 250 through link 260, global object 251 through link 261, global object 252 through link 262, global object 253 through link 263, global object 254 through link 264 and global object 255 through link 265, as shown. Global objects 250–255 are also within HPOMF.CAT. Each global object 250–255 may be a parent of one or more objects in HPOMF.CAT. Each object in HPOMF.CAT which is not a global object, is a descendant of a global object. Although FIG. 74 shows only six global objects, the number of global objects operating on a system is a matter of system configuration. Any object in the system can refer to a global object by using the reference name of the link to that global object from the global parent.

As may be seen from FIG. 73, file records in HPOMF.CAT are numbered consecutively. These numbers serve as tags, which identify each object.

In the preferred embodiment of the present invention, each record is 128 bytes in length. The fields for file record 0 are listed in Table 1 below:

TABLE 1

| | |
|---|---|
| 1FirstFreeEntry | Contains the record number of the first free record in HPOMF.CAT, or "0" if there are no free records. |
| FileId | Contains the null terminated string "HPOMF.CAT". This serves as a signature. |
| Version | Contains the file format version nunber, which also serves as a signature. |
| 1MaxRecordNumber | Contains the number of the highest record ever allocated from within HPOMF.CAT (this highest record may or may not be free). |

Table 2, below, contains the fields for file records in HPOMF.CAT for file records other than file record 0:

TABLE 2

| | |
|---|---|
| 1FirstFreeEntry | Is "−1" if this record defines an object, otherwise this record is free and this field is the record number of the next free record, or "0" if there are no more free records. If the record is free, none of the other fields in the record is meaningful. |
| TypeInclass | Specifies the class of this object. This is the number of the record in HPOMF.CLS that indicates to which class the object belongs (see discussion of class above). |
| SysCatFlags | Specifies if the object is global if the bit masked by the number 20 (hexadecimal) is set in this byte. In the preferred embodiment all other bit positions must contain "0" and are not used. |
| properties | Specifies the number of properties, the length of the property names and the location in HPOMF.PRP of the object's properties. See the description of HPOMF.PRP below for further definition of the structure of this field. |
| fastprops | Certain object properties, such as name, are so heavily accessed that they are stored directly in this field, rather than indirectly in the properties file. Properties stored in this field are called "fast properties." |

System file 602, HPOMF.CLS is also referred to as SYSCLASS. This system file is a list of all installed classes in the system. It is record oriented. The first record, numbered 0, is a header which contains various signatures (see above) and is used to manage a list of free records. All other records either define an installed class or are free. In the preferred embodiment HPOMF.CLS can grow dynamically, but cannot shrink.

Each file record in HPOMF.CLS is thirty-two bytes in length. HPOMF.CLS file record 0 (the header) contains the following fields listed in Table 3:

TABLE 3

| | |
|---|---|
| 1FirstFreeEntry | Contains the record number of the first free record in HPOMF.CLS, or "0" if there are no free records. |
| FileId | Contains the null terminated string "HPOMF.CLS" |
| Version | Contains the file format version number. |
| 1MaxRecordNumber | Contains the number of the highest record ever allocated from within HPOMF.CLS (this highest record may or may not be free). |

Table 4, below, contains the fields for file records in HPOMF.CLS for file records other than file record 0:

TABLE 4

| | |
|---|---|
| 1FirstFreeEntry | Is "−1" if this record defines an installed class, otherwise this record is free and this field is the record number of the next free record, or "0" if there are no more free records. If the record is free, none of the other fields in the record is meaningful. |
| ModuleFileName | Specifies the name of the application associated with objects of this class as a null - terminated string. |
| properties | Specifies the number of properties, the length of the property names and the location in HPOMF.PRP of the object's properties. See the description of HPOMF.PRP below for further definition of the structure of this field. |

Figure 75:
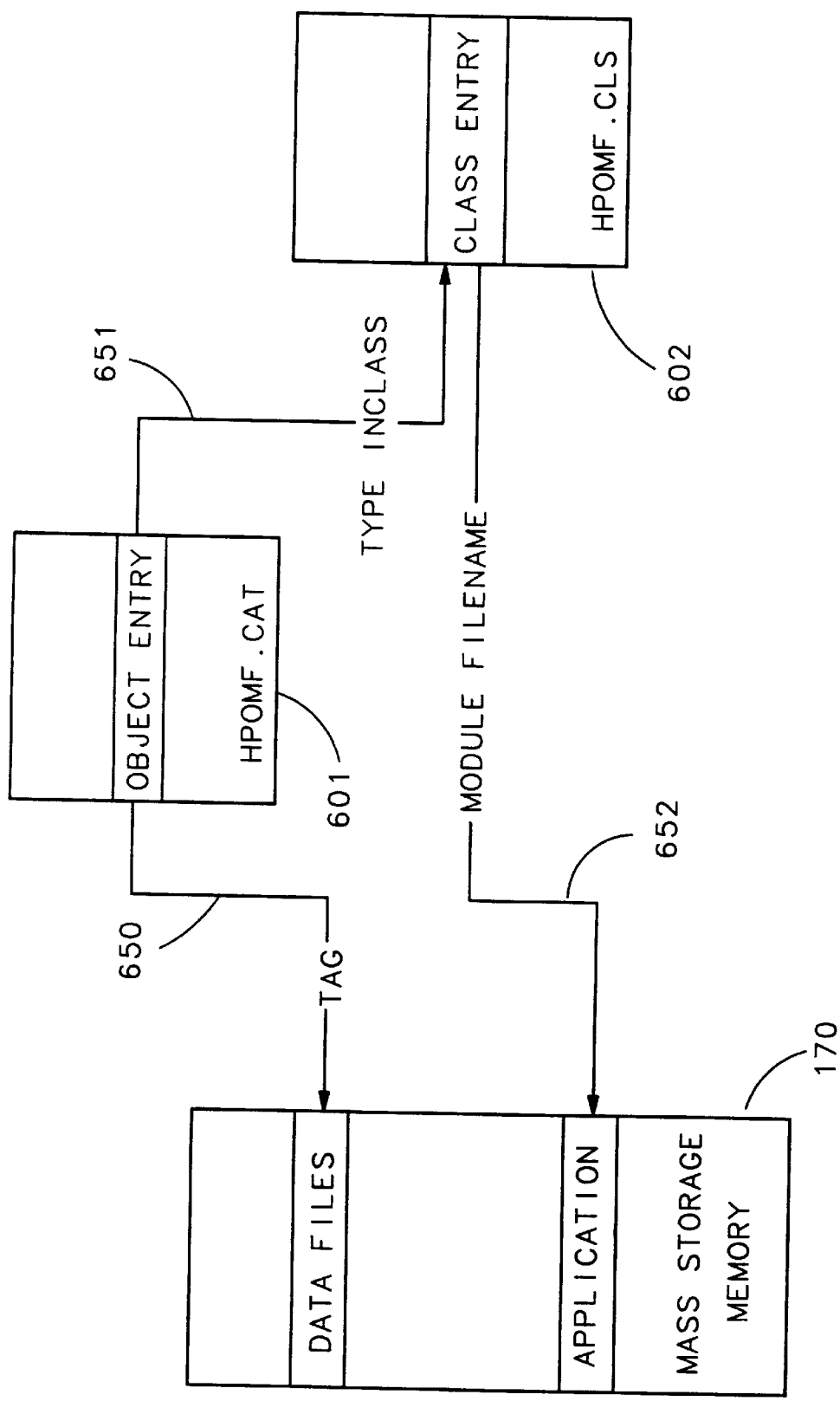
FIG. 75 is a block diagram which shows how system files within the OMF shown in FIG. 72 accesses data files and applications from a memory shown in FIG. 1.

In FIG. 75, the relationship of HPOMF.CAT and HPOMF.CLS is shown. Within each object entry within HPOMF.CAT, the record number, which is an object's tag, serves as an identifier 650 of data files in a mass storage memory 170 associated with the object. The field "TypeInClass" serves as an identifier 651 of the class entry in HPOMF.CLS, which identifies the class of each object. Within each class entry in HPOMF.CLS, the field "ModuleFileName" serves as an identifier 652 of the application file in mass storage memory 170 which is associated with the class.

Figure 76:
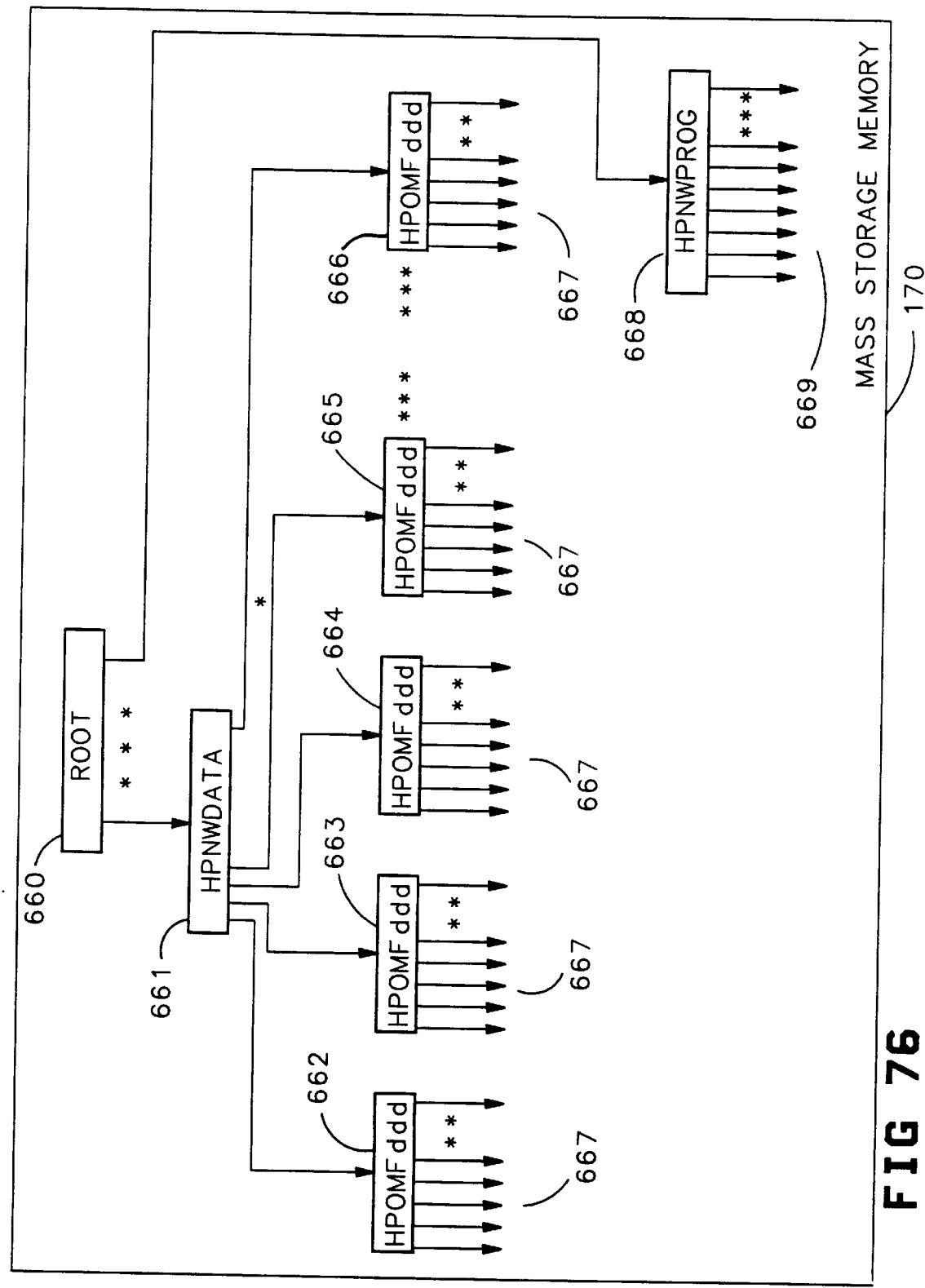
FIG. 76 is a block diagram of the organization of the memory shown in FIG. 75.

In FIG. 76, the organization of a portion of mass storage memory 170 is shown. A root directory 660 contains pointers to an HPNWDATA directory 661 and HPNWPROG directory 668. HPNWPROG directory 668 is the location of storage for applications files, represented by arrows 669. HPNWDATA contains a plurality of HPOMFddd directories, represented by directories 662, 663, 664, 665 and 666. In the HPOMFddd directories are stored data files associated with objects. The "ddd" in HPOMFddd stands for a three digit, leading zeros, hexadecimal number. Each HPOMFddd directory has a different "ddd" hexadecimal number. The "ddd" number indicates which HPOMFddd directory stores data files for a particular object. Data files for a particular object are stored in the HPOMFddd directory which has a "ddd" number equal to the tag for the object divided by an integer number, e.g., fifty four. Within each HPOMFddd directory, files are stored by tag numbers, e.g. data file names have the format xxxxxxxx.lll, where "xxxxxxxx" is an eight digit leading zeros hexadecimal tag, and "lll" are a reference chosen by the application.

System file 603, HPOMF.XRF is also referred to as SYSXREF. This file is a list of all the links existing in the system. It is record oriented, but does not have a header record. Each record file is either free, or defines an existing link, or is used as an overflow record from the previous record to specify additional view specification information. Records that contain view specifications are called view specification file records. View specification file records can be identified only by a previous record which defines an existing data link; view specification file records cannot be identified by the content within a view specification file record. HPOMF.XRF is increased in size 16K bytes at a time. A newly allocated portion of HPOMF.XRF is filled with zeros. File records within HPOMF.XRF which are free or which define a link have the following fields listed in Table 5:

TABLE 5

| | |
|---|---|
| ParentTag | Contains the tag (HPOMF.CAT record number) of the parent object of this link. If this field is 0, then this record does not define a link and is free. |
| ChildTag | Contains the tag of the child object of this link. If ParentTag in this record is 0, and this field is also 0, then no record beyond this record in HPOMF.XRF defines a link. |
| RefName | Contains the reference name that the parent has assigned to the link. This field is meaningless if ParentTag or ChildTag is zero. Otherwise, if the top three bits of this value are 110, the next record in the file is a view specification. |

File records within HPOMF.XRF which are view specification file records have the following fields listed in Table 5A:

TABLE 5A

| | |
|---|---|
| DataId | Contains the value that the child has assigned to identify the part of itself that is being viewed through the link. |
| Snapshot | Contains the tag (HPOMF.CAT record number) of the object which is the view's snapshot, or if zero, the view has no snapshot. For further discussion of snapshots, see below. |
| Misc | Composed of several bit fields described below: |
| VS_NEWDATASET | Set if child has told OMF that new data is available, but has not been announced to the parent. The hexadecimal number 8000 0000 is a mask which indicates which bits are used for this bit field. |
| VS_NEWDATAANNOUNCED | Set if child has told OMF to announce new data to parent, but parent was inactive and was not notified. The hexadecimal number 4000 0000 is a mask which indicates which bits are used for this bit field. |

TABLE 5A-continued

| | |
|---|---|
| VS_SNAPSHOTOLD | Set if child has told OMF that the view's snapshot is out-of-date. The hexadecimal number 2000 0000 is a mask which indicates which bits are used for this bit field. |
| VS_WANTMESSAGES | Set if child has told OMF that it wants to process view messages when snapshot is out-of-date. The hexadecimal number 1000 0000 is a mask which indicates which bits are used for this bit field. |
| VS_TEXTDISKLOC | File position in HPOMF.PRP where a view's 32 character textual data ID is located. This contains zero if no textual data ID has been defined by the child. The low order five bits of the file position are always zero and are thus not stored in the Misc field. The hexadecimal number 0FFF FFE0 is a mask which indicates which bits are used for this bit field. |
| VS_INITIALIZED | Set if the view specification has been initialized. If clear, all information in the view specification is zero. The hexadecimal number 0000 0010 is a mask which indicates which bits are used for this bit field. |
| VS_RESERVED | Reserved for future expansion. The hexadecimal number 0000 0008 is a mask which indicates which bits are used for this bit field. |
| VS_VIEWCLASS | Specifies the view class the child assigned to the view. The view class defines what view methods are available to the parent. The hexadecimal number 0000 0007 is a mask which indicates which bits are used for this bit field. |

Figure 77:
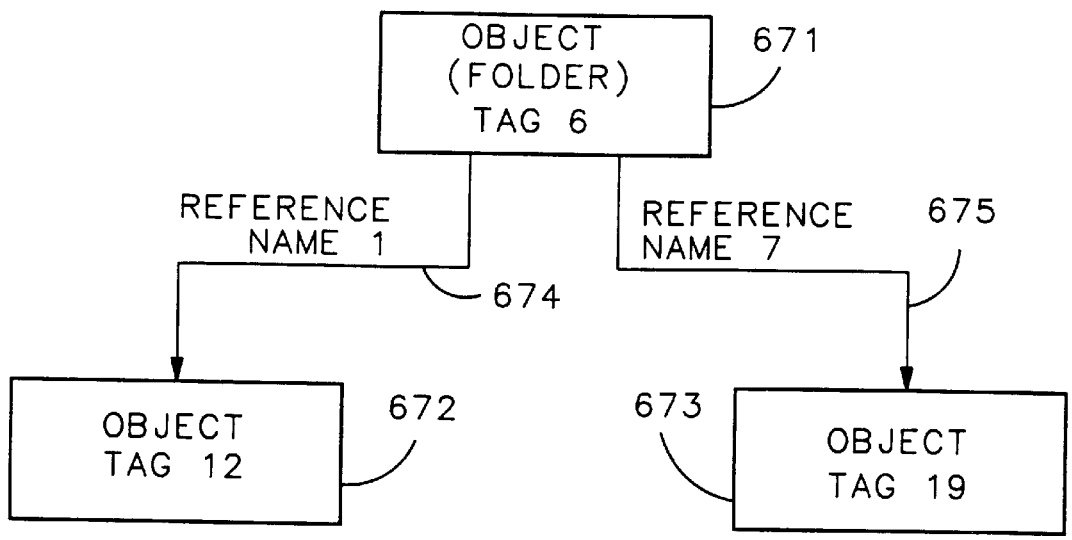
FIG. 77 and FIG. 78 show objects and links in accordance with the preferred embodiment of the present invention.

For example, in FIG. 77, Object 671 is a folder and has a tag of "6". Object 671 is a parent of an object 672 through a link 674 and a parent of an object 673 through a link 675. Object 672 has a tag of "12". Link 674 as a reference name "1". Object 673 has a tag of "19". Link 675 has a reference name "7". Reference names are picked by the parent object and need to be unique for the particular parent object; however, other parents may have a link with the same reference name provided each reference name is unique for each parent.

Figure 79:
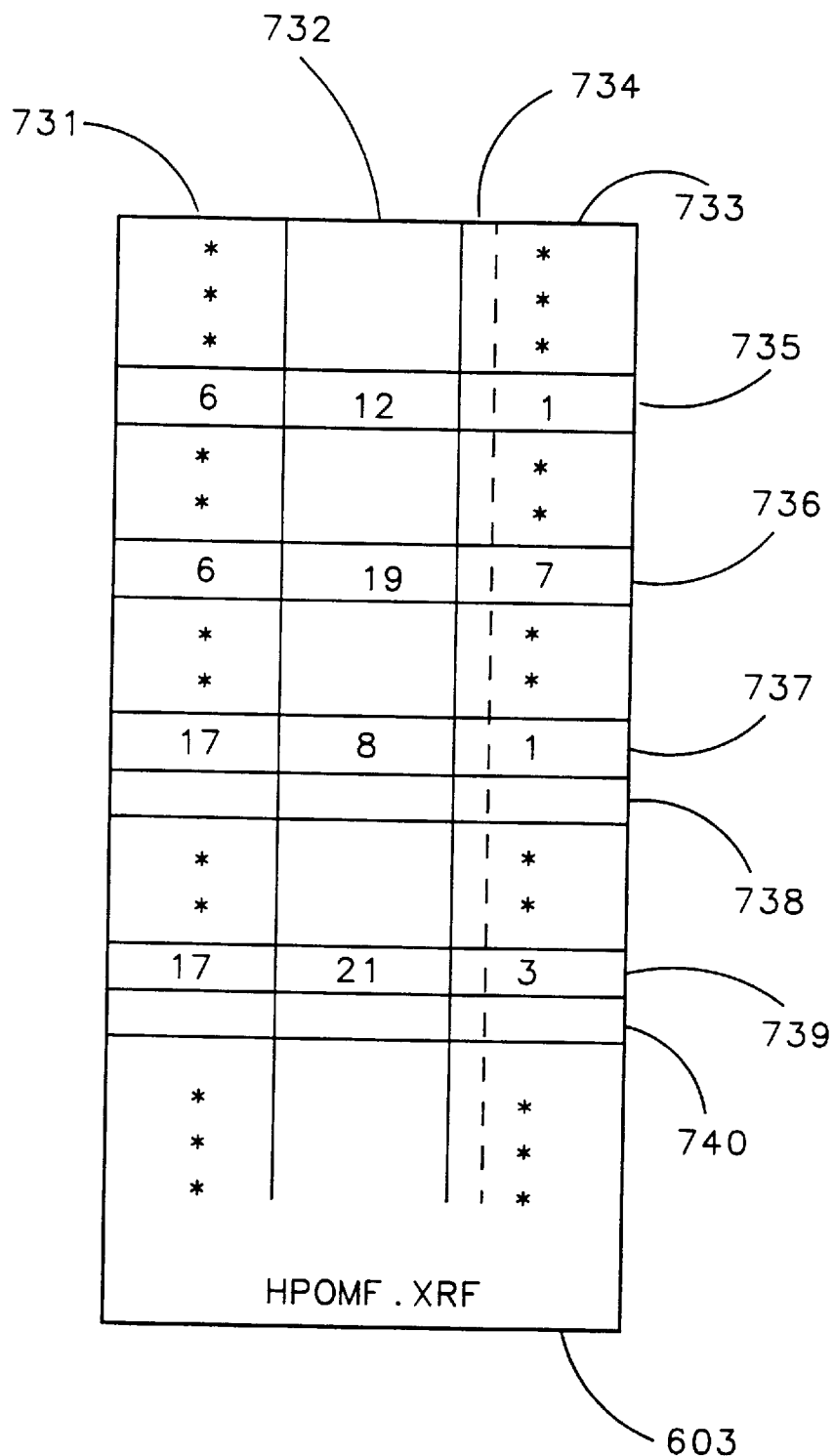
FIG. 79 is a block diagram of the organization of HPOMF.XRF, a system file included in the OMF shown in FIG. 72.

FIG. 79 shows a block diagram of HPOMF.XRF 603. HPOMF.XRF contains an entry for each link between parents and children. In HPOMF.XRF 603 column 731 contains the tag of the parent for each link. Column 732 contains the tag of the child for each link. Column 733 contains the reference name for each link. The first three bit positions of column 733, shown in FIG. 79 as sub-column 734, indicate whether a view specification file record is present ("110") whether no view specification file record follows ("000") or whether the link is between is a link from the global parent to a global object ("100").

As may be seen, entry 735 is an entry which describes link 674 shown in FIG. 77. That is, in column 731 of entry 735 there is the parent tag "6". In column 732 there is the child tag "12" and in column 733 there is the reference name "1". Since object 671 is a folder, there is no view, therefore the three bits within subcolumn 734 would be "000".

Similarly, entry 736 is an entry which describes link 675 shown in FIG. 77. That is, in column 731 of entry 736 there is the parent tag "6". In column 732 there is the child tag "19" and in column 733 there is the reference name "7". Since object 671 is a folder, there is no view, therefore the three bits within subcolumn 734 would be "000".

Figure 78:
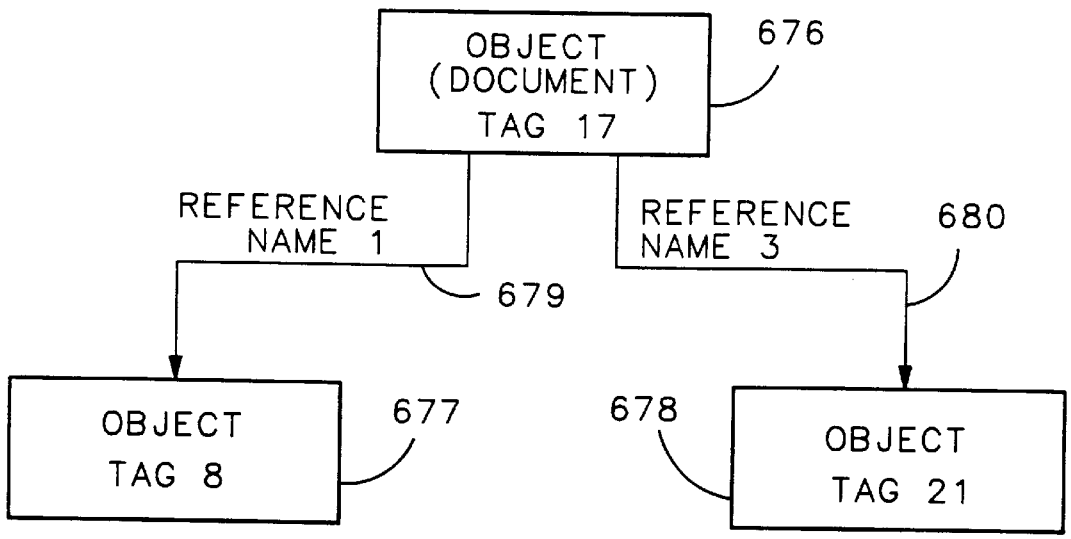

In FIG. 78, Object 676 is a document and has a tag of "17". Object 676 is a parent of an object 677 through a link 679 and a parent of an object 678 through a link 680. Object 677 has a tag of "8". Link 679 as a reference name "1". Object 678 has a tag of "21". Link 680 has a reference name "3".

In FIG. 79, an entry 737 describes link 679 shown in FIG. 78. That is, in column 731 of entry 737 there is the parent tag "17". In column 732 there is the child tag "8" and in column 733 there is the reference name "1". Object 676 is a document, and assuming there is a view associated with link 679, the three bits within subcolumn 734 contain the three bits "110" and entry 738 is a view specification record.

Similarly, an entry 739 describes link 680 shown in FIG. 78. That is, in column 731 of entry 739 there is the parent tag "17". In column 732 there is the child tag "21" and in column 733 there is the reference name "3". Assuming there is a view associated with link 680, the three bits within subcolumn 734 contain the three bits "110" and entry 740 is a view specification record.

Figure 80:
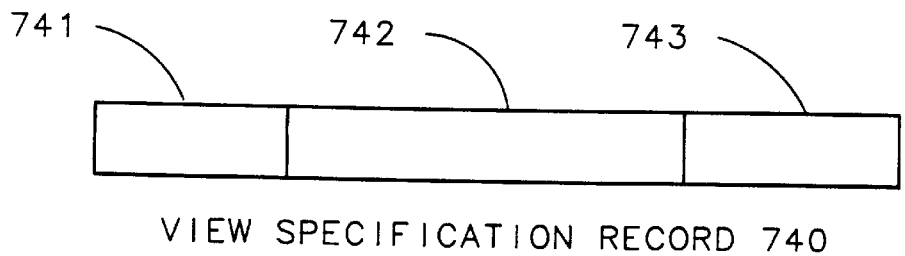
FIG. 80 shows a view specification record in accordance with the preferred embodiment of the present invention.

In FIG. 80, view specification record 740 is shown to include a field 741 which contains a data identification for the view, a field 742 which indicates whether there is a snapshot used in the view, and a field 743 which contains miscellaneous information about the view. The data identification number is used by the child object of the link, to determine what data is sent through the link.

FIGS. 37–43 show the establishment of a link with a view. As has been discussed before, in FIG. 37 window 791 for "Paste Up" (object 707) has been opened by double clicking on the icon for "Paste Up". In FIG. 38, using Cursor 781, controlled by mouse 20, portion 790 of the text of "Sample Text" has been selected. The portion in inverse video stating "New Wave Office environment" is portion 790.

In FIG. 39, cursor 781 is used to select the selection "Share" in a pull down menu 792. Once "Share" is selected, child object 709 ("Sample Text") creates a data identification number which identifies portion 790 of the text to child object 709. Child object 709 also causes OMF 100 to put a link to child object 709 on clipboard 720—Child object 709 communicates to OMF 100 through command set forth in Appendix B, which can be found in the application file. Child object 709 also informs OMF 100 what data identification number is associated with the new link between the child 709 and clipboard 720. If there is a snapshot associated with the link, child 709 will also inform OMF 100 if there is a snapshot associated with the link. Snapshots are discussed more fully below. As a result OMF 100 will make an entry in HPOMF.XRF 603 for a link between clipboard 720 and child object 709. The view specification record for the link will include the data identification number given to OMF 100 by child 709.

In FIG. 40, area 793 in window 791 is selected using cursor 781. In FIG. 41, a selection "Paste" is selected from a pull down menu 794 using cursor 781. At this point parent object 707 ("Paste Up") requests OMF 100 for a link making him the parent of what is on clipboard 720. The view specification record for the between clipboard 720 and child 709 is copied for link 729 between parent 707 and child 709. In FIG. 43 "Sample Text" (object 709) is shown to be a child of "Paste Up" (object 707) through link 729.

In FIG. 42, "displayed text 790 is displayed in "Paste Up" window 791. In accomplishing this, parent object 707 makes a call to OMF 100 asking that a message be sent to the object identified by the reference name for link 729. This message requests the child object 709 to display data from this link into a location specified by parent object 707. OMF 100 takes the message from parent 707, adds the data identification number from the view specification record for link 729, and delivers the message to child 709. Child 709 displays the data in the specified location, in this case area 793. The name of the message sent from parent 707 to OMF 100 to child 709 is "DISPLAY_VIEW", further described in Appendix B, which can be found in the application file.

Another message "PRINT_SLAVE", also described in Appendix B, which can be found in the application file, may be used when it is desired to print data on a printer rather than display data on a terminal screen.

In addition, Parent 707 may send a "GET_SIZE" message to child object 709. In a "GET_SIZE" message, parent object 707 identifies a reference name for link 729 and indicates coordinates for a display. OMF 100 takes the GET_SIZE message from parent 707, adds the data identification number from the view specification record for link 729, and delivers the message to child 709. Child 709 returns to parent 707 the size of the portion of the specified area that child 709 would use to display the data. This allows parent 707 to modify the region reserved for displaying data from child 709 when child 709 is not able to scale the data to fit in the region specified by parent 707.

When a data from a child object is being displayed by a parent object, and the child object changes the displayed data, the child objects notifies OMF 100 that there has been a change in the data object. For example, as described above, in FIG. 47, data from "Star" (object 706) now displayed in region 795 of window 791. And, as may be seen in FIG. 48, "Star" (object 706) is a child of "Paste Up" (object 707) through a link 726. Since data is being passed from child object 706 to parent object 707, link 726 is a data link which includes a view specification.

In FIG. 49, the method for changing data in child object 706 is shown. A user places cursor 781 over region 795 of window 791 and double clicks a button on mouse 20. The result is the opening and display of "Star" (object 706) in a window 796. Using cursor 781 to select selection "Ellipse" in a menu window 797 results in the data within "Star" (object 706) being changed from a star to an ellipse. As shown in FIG. 51, the result is a change both in data displayed in window 796 and data displayed in region 795 of window 791.

Child object 706 accomplishes this change by making a call to OMF 100 stating that data associated with the data identification number associated with link 726 is changed. OMF 100 looks up all of the links that use the data identification number. If the parent object of any of the links is not active, OMF 100 sets the bit VS_NEWDATAANNOUNCED for that link in HPOMF.XRF. When the parent object is activated, the parent object can then request the new data.

If the parent object is active, OMF 100 will send a message to the parent object saying that new data is available. OMF 100 will identify to the parent object the reference name of the link for which there is additional data. The parent object sends a message to the child object if it wants the new data displayed. In the present case parent object 707 is active, and has requested the new data to be displayed in region 795 of window 791. A further description of the View Specifications are found in Appendixes B, C and D, all of which can be found in the application file.

The advantage of the present invention is that parent object 707 is able to communicate with child object 706 through OMF 100, without parent object 707 or child object 706 knowing the identity or any other details about each other. The parent object identifies the link using only the reference name of the link. The child object identifies the link using just the data identification number of the link. OMF 100 does all the translation and identification of which links and which objects are involved.

System file 604, HPOMF.PRP, is also referred to as SYSPROP. HPOMF.PRP contains all the object and class properties except for the fast object properties which are contained in HPOMF.CAT. Each record in system file 601 (HPOMF.CAT) and system file 602 (HPOMF.CLS) has a properties field, as described above. Each properties field contains the fields described in Table 6 below:

TABLE 6

| | |
|---|---|
| DirDiskLoc | Contains the position (byte offset) within HPOMF.PRP of the property list directory. |
| nProps | Contains the number of properties in the property list. This is the number of entries in the directory entry array described below. |
| PoolSize | Contains the conbined length of all the names of the properties in the property list, including a null-terminating byte for each name. This is the size of the directory name pool described below. |

For each object and for each class, at the DirDiskLoc position in the HPOMF.PRP file is the property directory for that object or that class. The directory has two major portions: the entry array, followed by the name pool. The entry array has one entry for each property in the property list. Each entry has fields set out in Table 7 below:

TABLE 7

| | |
|---|---|
| ValueLen | Specifies the length in bytes of the associated ptop.erty. This can be zero. |
| ValueDiskLoc | Contains the position within HPOMF.PRP of the value of the associated property. If ValueLen is zero, this is also zero, and there is no value stored anywhere. |
| CacheOffset | This field is only used at run time and is not meaningful in the file. |

Immediately following the entry array is the name pool. This portion of HPOMF.PRP contains the null-terminated names of properties in the property list, in the same order as the entry array. Properties may include such things as titles, user comments, date and time of creation, the user who created the object, etc. For more information on properties, see Appendix D, which can be found in the application file.

HPOMF.PRP grows dynamically as need. At the beginning of HPOMF.PRP there is a 128 byte bitmap which controls the allocation of the first 1024 pages of HPOMF-.PRP. Each page is 32 bytes in length. These pages immediately follow the bit map. The bitmap is an array of words with the most significant bit of each word used first. Thus, bits 15 through 0 of the first word of the bitmap control the allocation of pages 0 through 15 of the file, respectively.

When storage in the first 1024 pages is insufficient, a second bitmap is added to the file following page 1023. This bitmap controls the allocation of pages 1024 through 2047, which immediately follow the second bitmap. Additional bitmaps and pages are added in the same way, as needed.

Each directory and property value is stored as a single block in the file, i.e., as a contiguous run of pages that are all allocated in the same bitmap. This causes the restriction that no directory or value can exceed 32K bytes (1024 times 32) in length.

System file 605, HPOMF.INS, is also referred to as SYSINSTL. HPOMF.INS contains a list of the files that were copied to the system when each class was installed. This information is used so that these files can be deleted when the class is de-installed.

The very beginning of HPOMF.INS is a double word value which serves as a validity/version identifier. In the preferred embodiment the value of this double word must be 0101ABCD hex to be valid. In Table 8, this number is stored as shown because of the protocols for storage in the particular processor used by the preferred embodiment, i.e. an 80286 microprocessor made by Intel Corporation.

Following the double word comes a series of variable length records. There is one record for each installed class. The first word of each record is the length of the rest of the record, in bytes. This is followed by the null—terminated class name of the installed class. Then follows the file names of the files copied to the OMF directories, each terminated by a null byte, and preceded by a byte which gives the length of the file name, including the length byte and the null terminator. If the file name begins with the special character "*", the file is assumed to be located in the HPNWPROG directory. If the file name begins with the special character "+" the file is assumed to be located in the HPNWDATA directory.

For example, assume two classes are installed: class "AB" and class "CDE". Class "AB" caused two files to be installed: "Z" to HPNWPROG directory 668 and "YY" to the HPNWDATA directory. Class "CDE" caused 1 file to be installed: "XXX" to HPNWPROG directory 668. Given this case Table 8 below shows the contents of HPOMF.INS for this example:

TABLE 8

| offset | content | comments |
|---|---|---|
| 0 | CD AB 01 01 | File header/version check |
| 4 | 0C 00 | Length of AB record (12 decimal) |
| 6 | 41 42 00 | "AB" + Null |
| 9 | 04 | Length of length byte "*Z" + Null |
| A | 2A 5A 00 | "*Z" + Null |
| D | 05 | Length of length byte + "+YY" + Null |
| E | 2B 59 59 00 | "+YY" + Null |
| 12 | 0A 00 | Length of CDE record (10 decimal) |
| 14 | 43 44 45 00 | "CDE" + Null |

TABLE 8-continued

| offset | content | comments |
|---|---|---|
| 18 | 06 | Length of length byte + "*XXX" + Null |
| 19 | 2A 58 58 58 00 | "*XXX" + Null |

System File 606, HPOMF.SDF is also referred to as the "shutdown file". HPOMF.SDF exists only when the system has been cleanly shut down. It is deleted as the system starts, and created as it shuts down. On startup, if this file is missing, OMF assumes that the last session ended abnormally, and so it goes through its crash recovery procedures to validate and repair the system files as best it can. The system files can be in an invalid but predictable state on a crash. These errors are corrected without user intervention. Certain other kinds of file consistency errors are detected, but are not really possible from an "ordinary" system crash. These errors are in general not correctable and the OMF will not allow the system to come up in this case.

If HPOMF.SDF is present, it contains a list of objects. When the system is being shut down normally, each object which is active at the time can request that the OMF restart them when the system is restarted. The list of objects, then is the list of tags of objects which have requested that they be restarted when the system is restarted.

The first word in HPOMF.SDF is a flag word. If this word is non-zero, OMF will execute its crash recovery code even though HPOMF.SDF exists. Normal shutdown will set this flag when producing the file if some serious error occurred in the session being ended.

After the first word, the rest of the file is a sequence of three byte records. The first two bytes of each record contain the tag of the object to be restored. The least significant byte is first. The third byte is not used in the preferred embodiment, and is zero.

For example, if the system is shut down cleanly in the last session and two objects, having tags of 2 and 7, respectively, have requested restart, the contents of HPOMF.SDF will be as set out in Table 9 below.

TABLE 9

| offset | content | comments |
|---|---|---|
| 0 | 00 00 | Indicates no crash recovery needed |
| 2 | 02 00 | Tag of first object to restart |
| 4 | 00 | Unused and reserved |
| 5 | 07 00 | Tag of second object to restart |
| 7 | 00 | Unused and reserved |

System file 7, HPOMFICO.NWE, is a Microsoft Windows dynamic library executable file which contains a dummy entry point and no data. Microsoft Windows is a program sold by Microsoft Corporation, having a business address at 16011 NE 36th Way, Redmond, Wash. 98073-9717. HPOMFICO.NWE also contains as "resources" the icons of each installed class. OMF modifies HPOMFICO.NWE directly during run time, and loads and unloads it to get the icon resources from it. The format of HPOMFICO.NWE is defined in Microsoft Windows documentation distributed by Microsoft Corporation.

Normally working with a view (see discussion on views above) causes a child's application to be invoked. Where large applications are involved, this can cause a lot of unnecessary overhead. The use of snapshots allow this overhead to be eliminated.

A snapshot is an object that uses executable code from a separate library referred to as a dynamic access library (or DAL) rather than using the full application executable code. The only data file associated with a snapshot contains data which is to be sent from a child object to a parent object. The code which encapsulates the data file although referred to as a dynamic library, is still stored in directory HPOMFPROG (directory 668).

Figure 81:
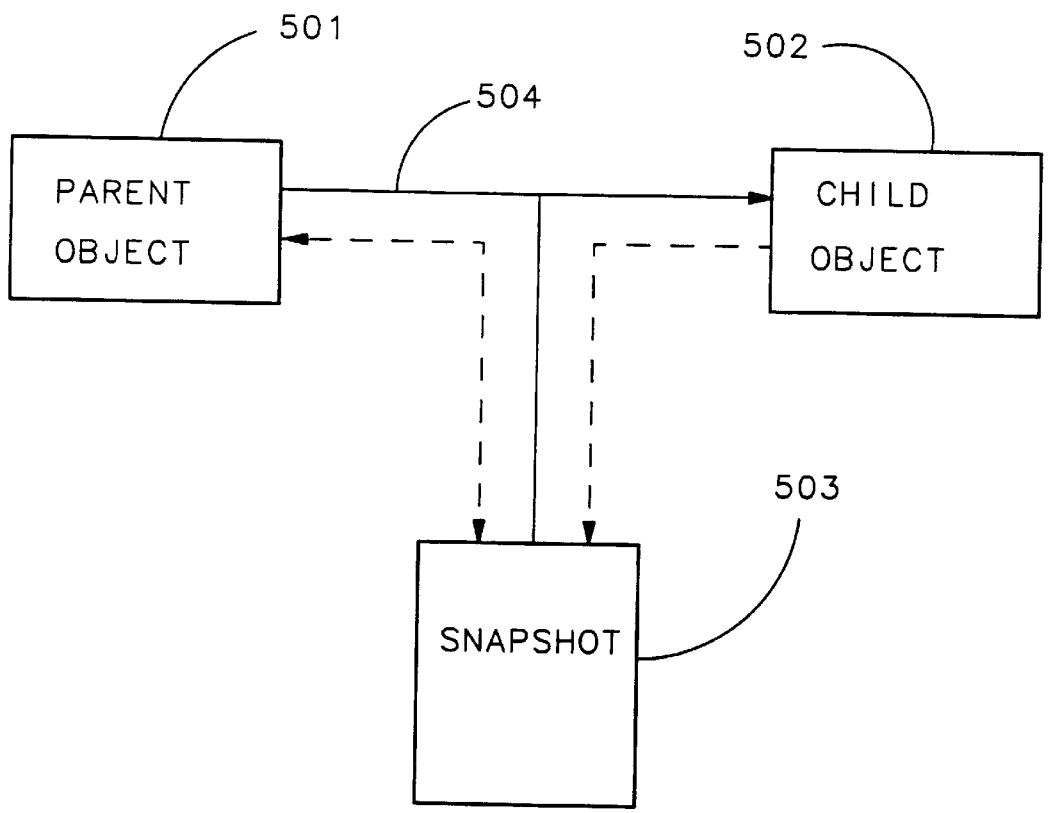
FIG. 81 shows the use of a snapshot in accordance with a preferred embodiment of the present invention.

For example, FIG. 81 shows a parent object 501 linked to a child object 502 through a link 504. Associated with link 504 is a snapshot 503. Once child object has designated snapshot 503 in a view specification record for link 504, snapshot 503 is able to provide data from child object 502 to parent 501 without the necessity of invoking an application associated with child object 502.

Figure 82:
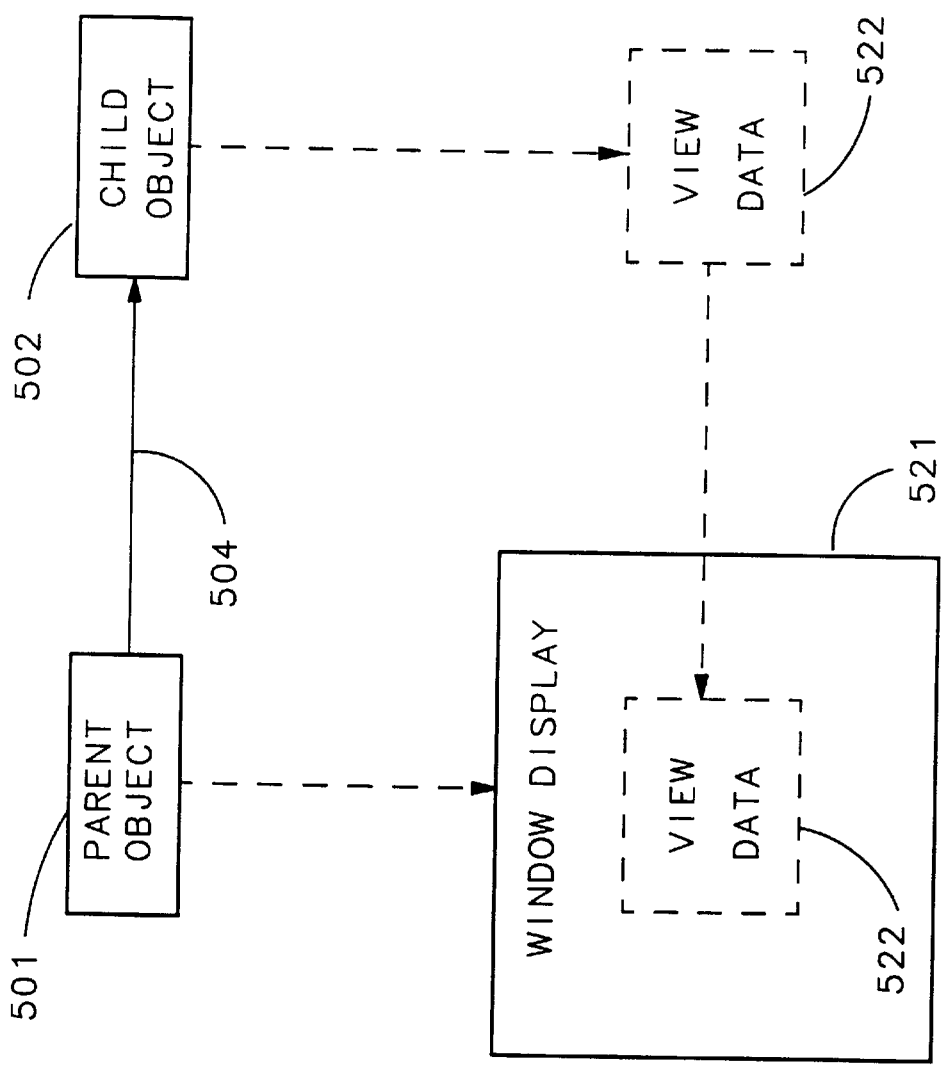
FIG. 82 shows the data path of a view when there is no snapshot, in accordance with a preferred embodiment of the present invention.
Figure 83:
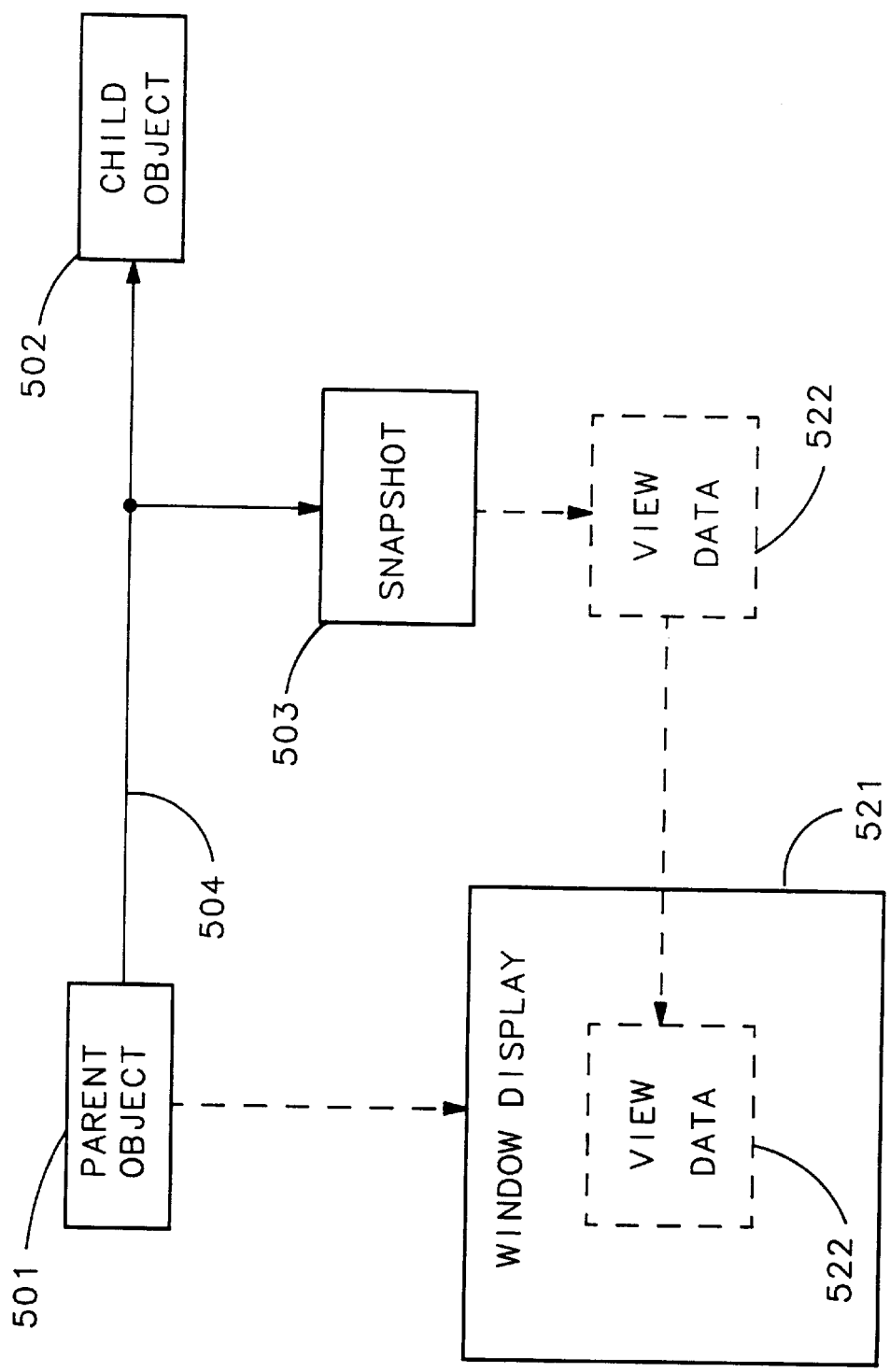
FIG. 83 shows the data path of a view when there is a snapshot, in accordance with a preferred embodiment of the present invention.

As shown in FIG. 82, when there is no snapshot, child object 502 must be active in order to send view data 522 to parent object 501, in order for parent object 501 to display view data 522 in a window display 521. In FIG. 83, however, snapshot 503 is shown to provide view data 522 to parent object 501 without the necessity of child 502 being active. Further implementation details of snapshots are given is Appendix B, Appendix C and Appendix D, all of which can be found in the application file.

A program not originally written for use with OMF 100 may be encapsulated and inherit many features of programs designed for use with OMF 100. In Chapter 6 of the HP NewWave Environment: Programmer's Guide, attached hereto as Appendix D, which can be found in the application file, implementation details for designing an encapsulating program are given. In Appendix E, which can be found in the application file, a listing is given of a program which provides for generic encapsulation of programs. In Appendix F, which can be found in the application file, examples are given of files which need to be created for encapsulation of a program into the NewWave Environment.

Figure 84:
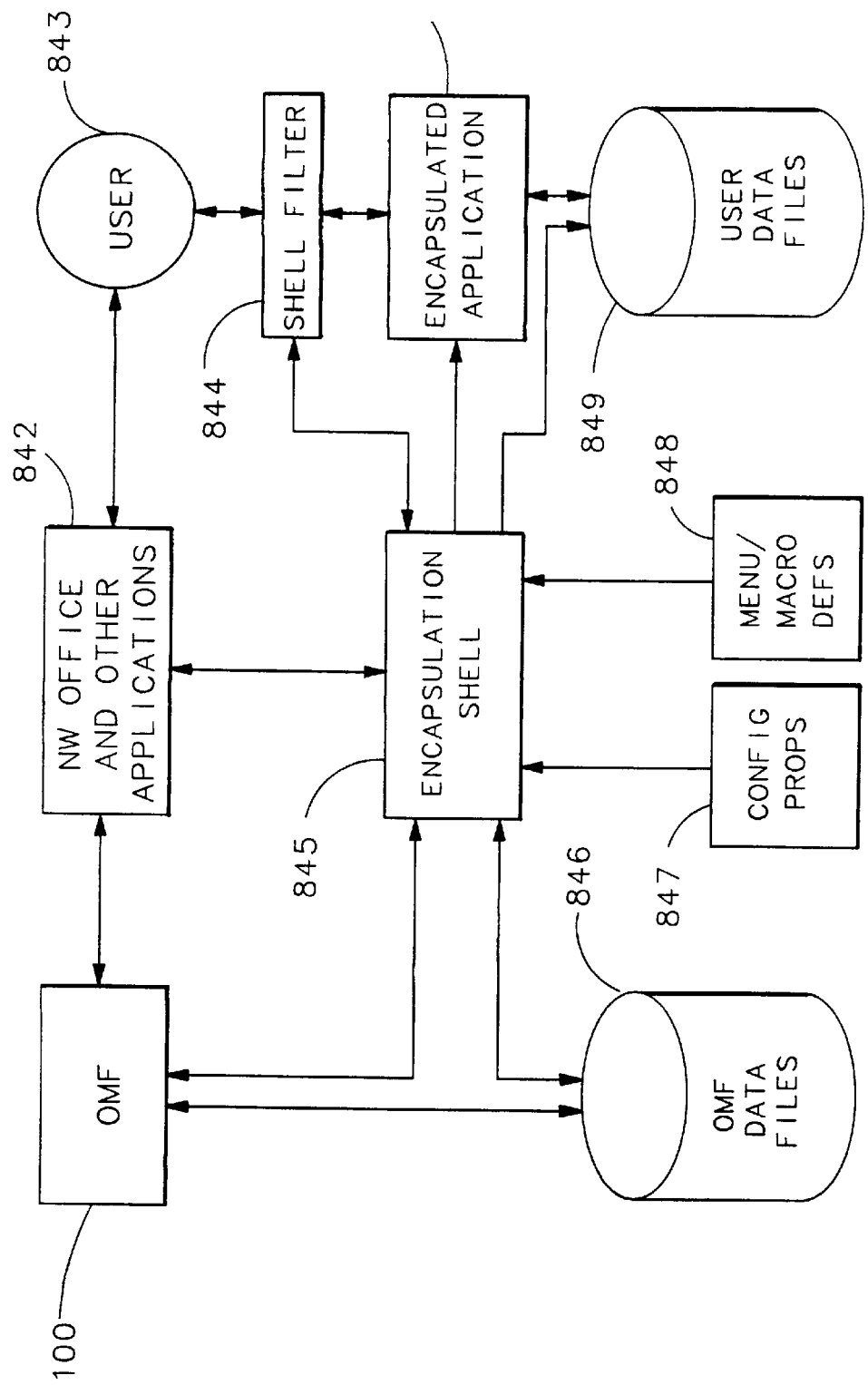
FIG. 84 shows an encapsulation shell interacting with the OMF shown in FIG. 72 in accordance with the preferred embodiment of the present invention.
Figure 145:
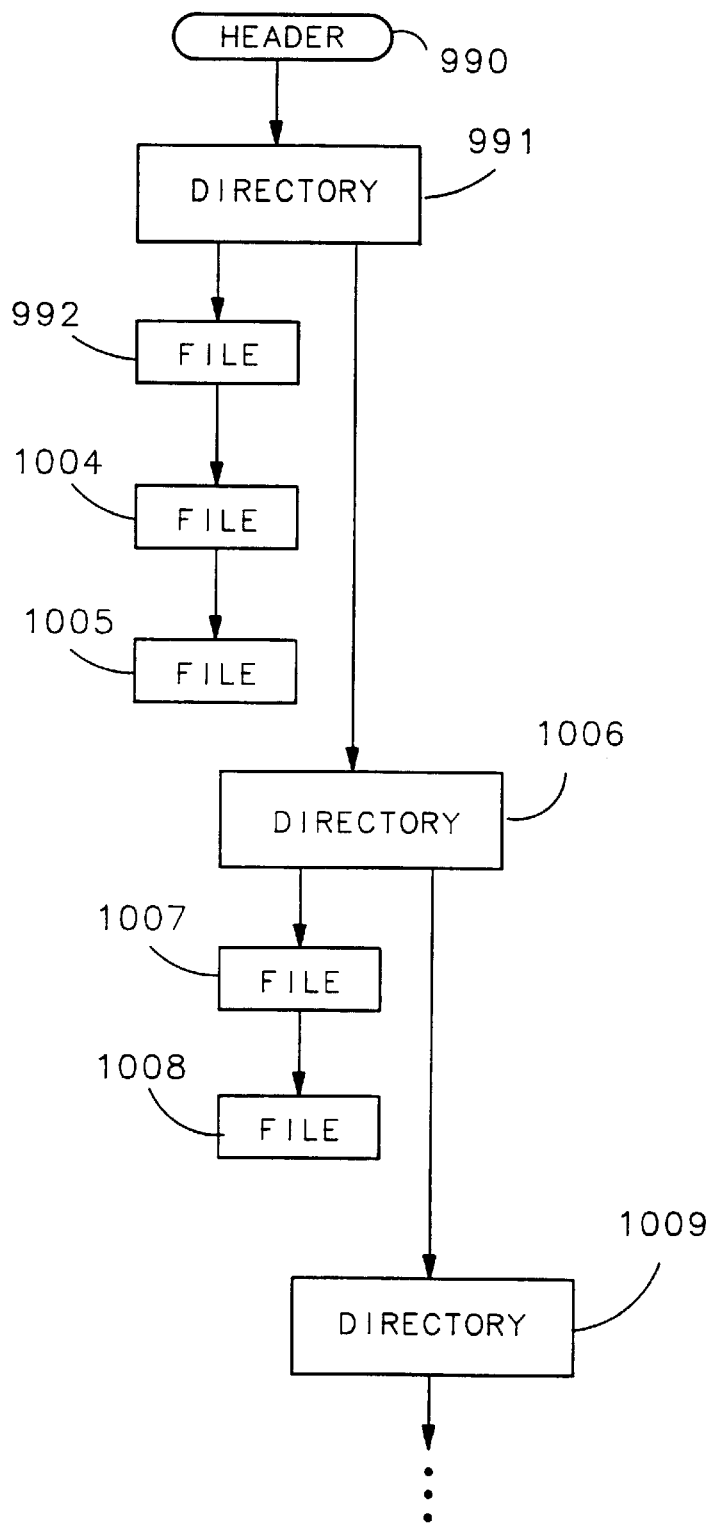
FIG. 145 shows the logical structure of records within the file HPOMF.DOS in accordance with the preferred embodiment of the present invention.

With the use of FIGS. 84–145 the features of encapsulated applications are described.

FIG. 84 is a block diagram which shows how an application 846 may be encapsulated for use with OMF 100. As may be understood from prior discussion and illustrated by FIG. 84, typical applications 842 written for the NewWave environment are able to interact directly with a user 843 and with OMF 100. Data files for applications 842 are part of OMF data files 840. When any of applications 842 wish to access data files, they do so through OMF 100.

In accordance with the preferred embodiment of the present invention, no modifications need be made to encapsulated application 846 in order to integrate it into the NewWave Environment. Encapsulated application 846 is allowed to continue to directly manipulate its own user data files 849. An encapsulation shell 845 serves as an interface between OMF 100 and encapsulated application 846. Encapsulated application does not know that encapsulation shell 845 exists, therefore encapsulated application 846 does not send data to encapsulation shell 845. However encapsulation shell 845 does interact with encapsulated application 846 and with user data files 849.

A shell filter 844 acts as a monitoring program between user 843 and encapsulated application 846. Most communication between user 843 and encapsulated application 846, shell filter 844 merely passes on. However, where appropriate shell filter may intercept communication between user 843 and encapsulated application 846. Once the communication has been intercepted shell filter may, for example, pass the communication to encapsulation shell 845 for further processing.

Encapsulation shell 845 is written to generically handle a number of different types of applications. However, there is some information which encapsulation shell 845 needs to know about each encapsulated application. Therefore, each encapsulated application has associated with it configuration properties which encapsulation shell 845 accesses for information encapsulation shell needs to know about that encapsulated application. For encapsulated application 846, encapsulation shell 845 accesses information stored in configuration properties 847.

Further, using shell filter 844 and encapsulation shell 845 additional features may be added to an encapsulated application. Definitions for such added features particular to a specific application may be stored in a separate file accessed by encapsulation shell 845. For example, definitions for features specific to encapsulated application 846 are stored in a menu/macro definitions file 848.

Figure 84A:
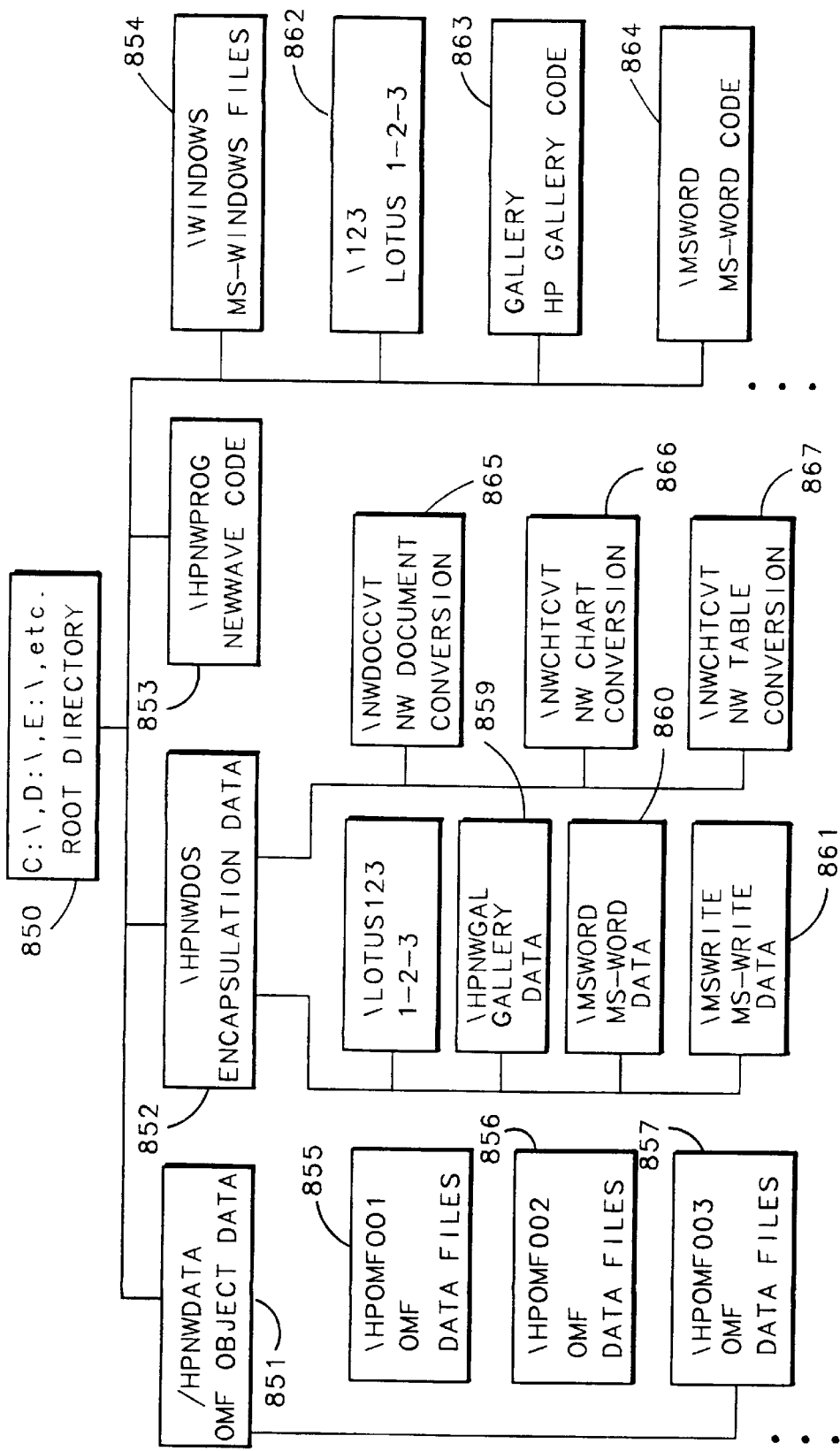
FIG. 84A shows a file structure for the computer shown in FIG. 1 in accordance with the preferred embodiment of the present invention.

FIG. 84A shows an an example of how a file structure may be implemented in accordance with a preferred embodiment of the present invention. A root directory 850 has a plurality of subdirectories. A subdirectory 851 contains a series of subdirectories—e.g., subdirectory 855, subdirectory 856 and subdirectory 857—which contain OMF object data files. The files within subdirectory 851 are files which are within the NewWave data domain, that is these files are accessed through OMF 100. A subdirectory 852 contains a series of subdirectories—e.g., subdirectory 858, subdirectory 859, subdirectory 860 and subdirectory 861—which contain encapsulation data files for various encapsulated applications. Subdirectory 852 contains a second series of subdirectories—e.g., subdirectory 865, subdirectory 866 and subdirectory 867—which contain temporary data files used for encapsulation conversion. A subdirectory 853 contains files which include executable code which create and maintain the NewWave environment. Subdirectory 854, subdirectory 862, subdirectory 863 and subdirectory 864 contain executable code for applications which are not specifically designed to operate in the NewWave environment.

Figure 84B:
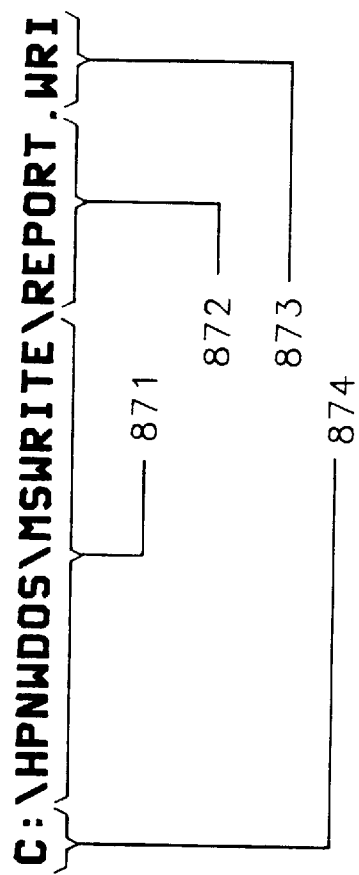
FIG. 84B shows the anatomy of a File Specification for programs which function on the MS-DOS operating system.

In FIG. 84B, the anatomy of a file specification for files used in MS-DOS systems is shown. File specification includes a drive designation 874, a directory path 871, a file root name 872 and an extension 873.

In the following discussions, a computer session in conjunction with figures depicting screens appearing on monitor 14, is used to illustrate the functionality of encapsulation shell 845 with an encapsulated application.

Figure 85:
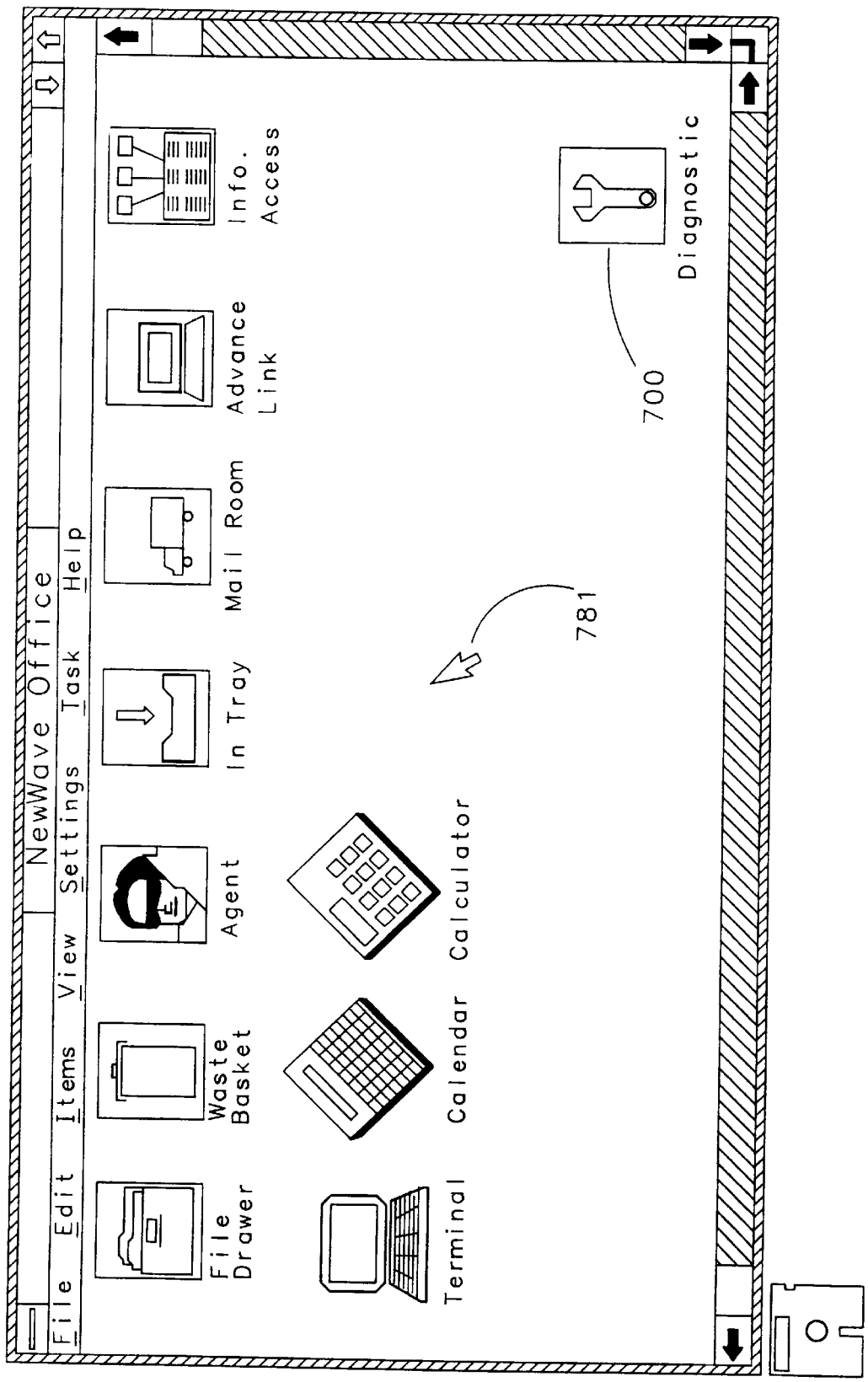
FIG. 85 shows the NewWave office with a number of icons some of which represent objects which are encapsulated applications.

In FIG. 85 the window for NewWave office is shown to have a number of icons some of which represent objects which are encapsulated applications. Of the shown objects "AdvanceLink", "Info. Access", "Terminal", "Calendar" and "Calculator" are encapsulated applications.

Figure 85A:
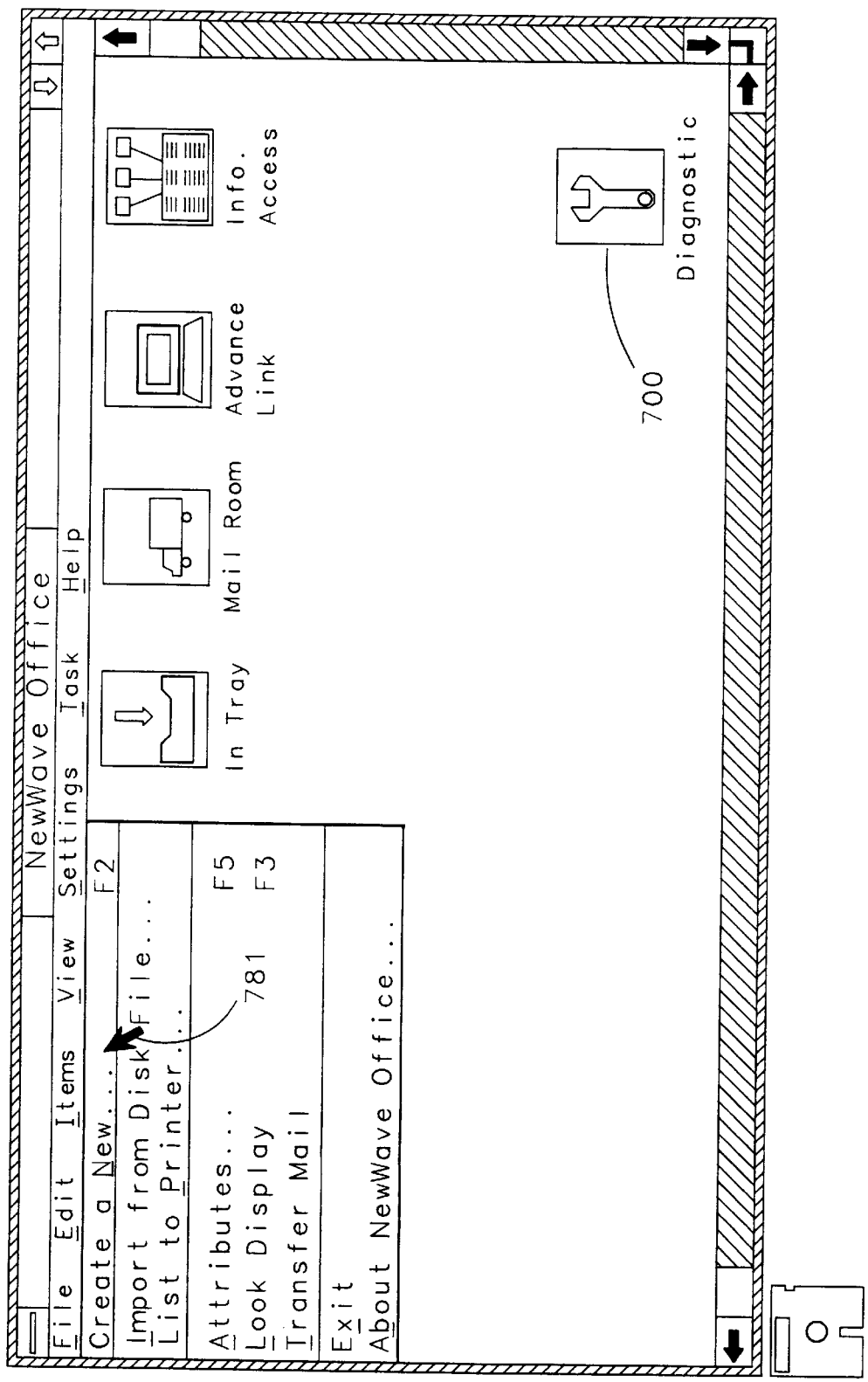
FIG. 85A shows a cursor being used to select "Create a New . . . " from a pull down menu.

From a user's point of view, creating a new encapsulated object may be done similar to creating ordinary objects. In FIG. 85A, cursor 781 is used to select "Create a New . . . " from pull down menu 782.

Figure 86:
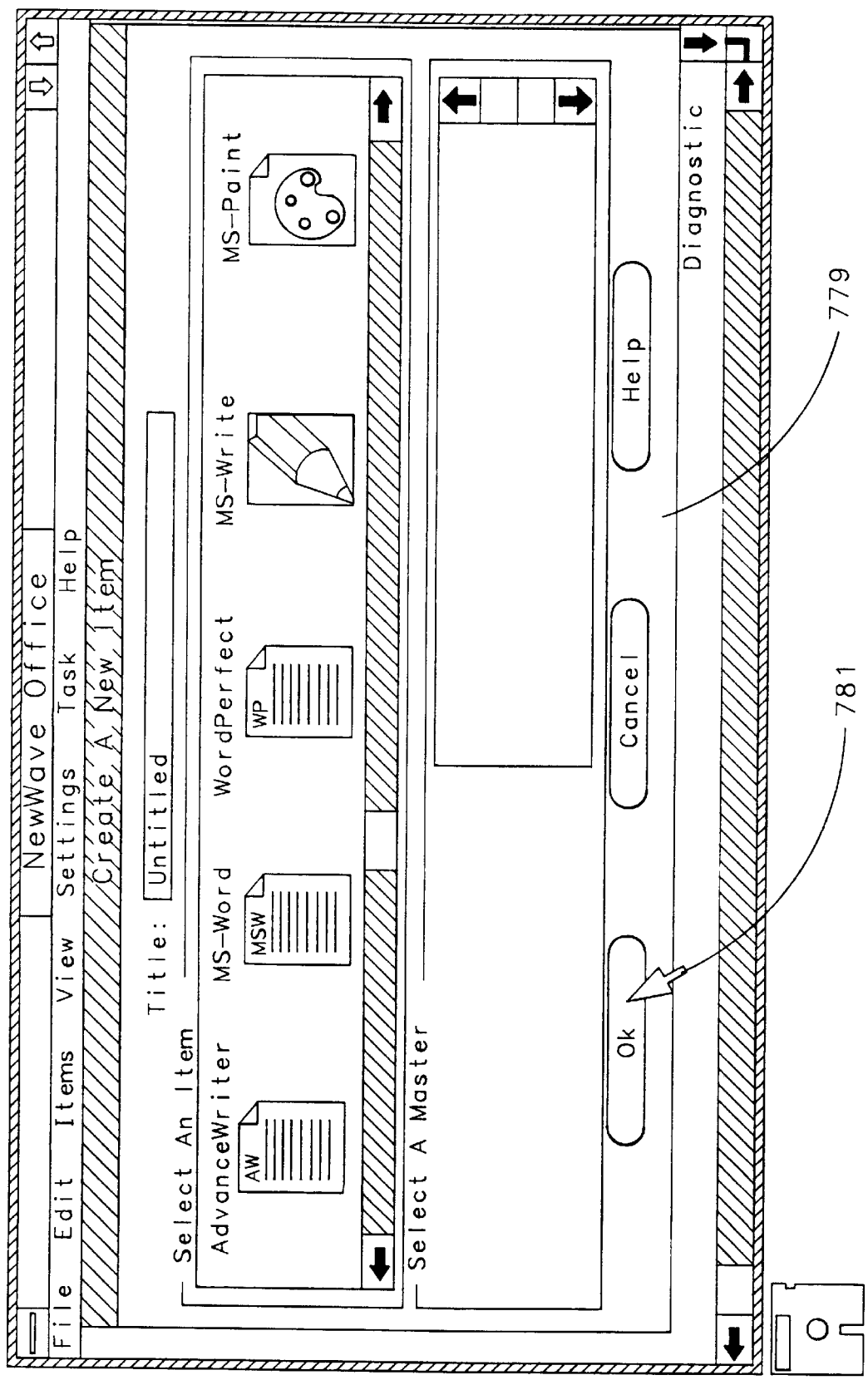
FIG. 86 shows appearance of a dialog box.

After the selection, dialog box 779 appears, as shown in FIG. 86. The five icons displayed within dialog box 779—"AdvanceWrite", "MS-Word", "WordPerfect", "MS-Write" and "MS-Paint"—represent encapsulated applications. Icon "MS-Write" is highlighted and thus selected. Cursor 781 now is used to select the region labelled "OK".

Figure 87:
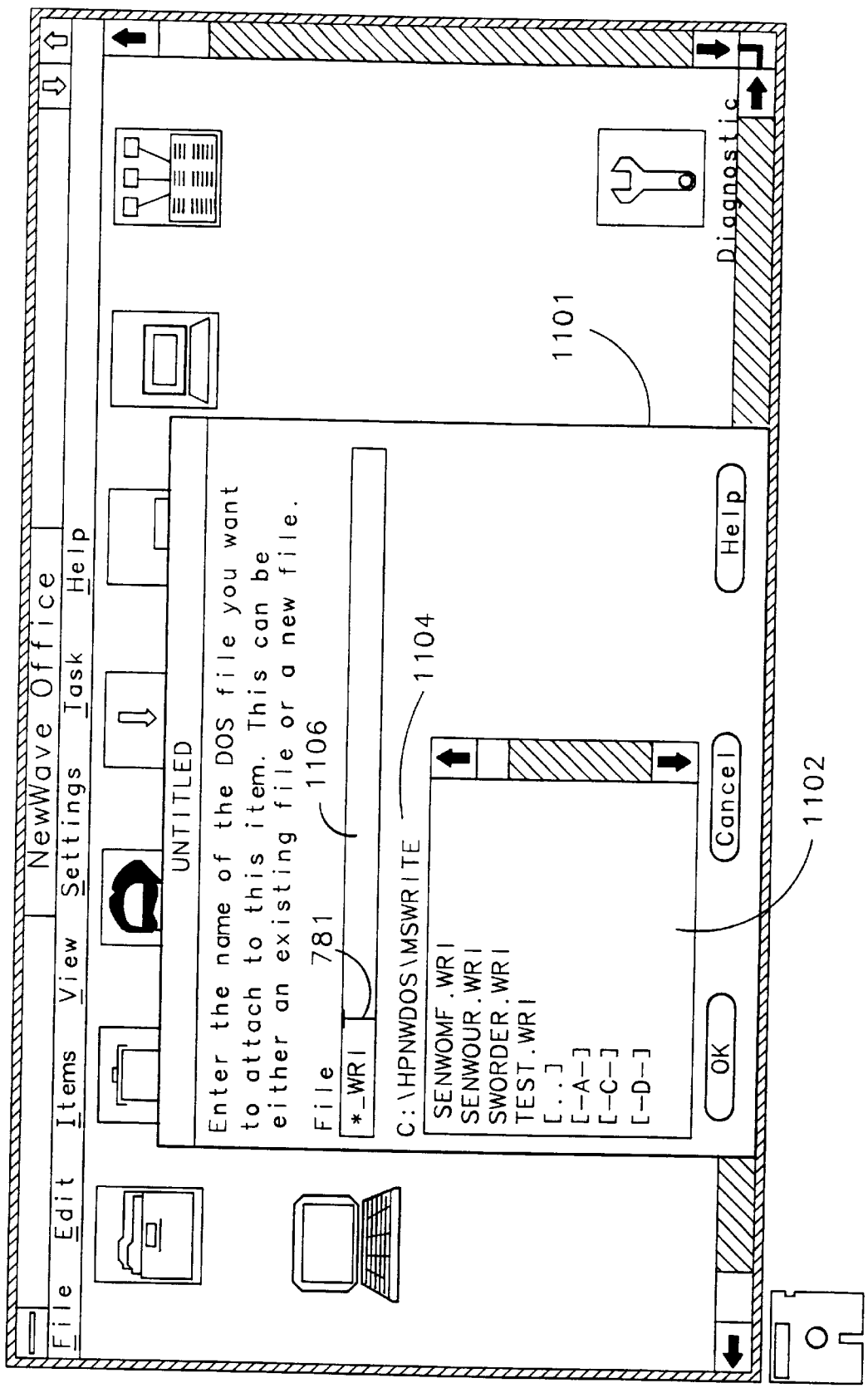
FIG. 87 shows another dialog box.
Figure 88:
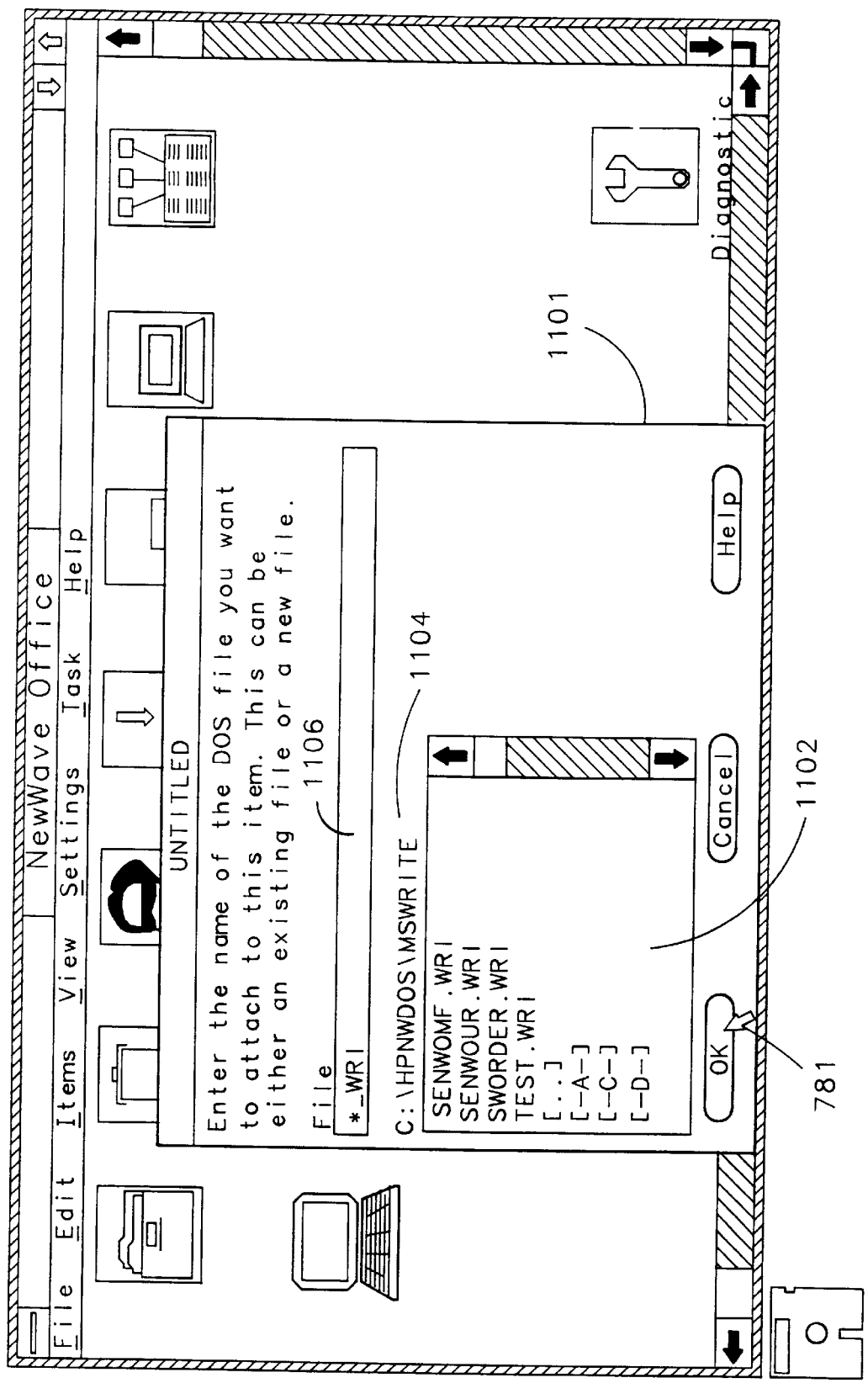
FIG. 88 shows the name "sample" having been typed into a region.
Figure 89:
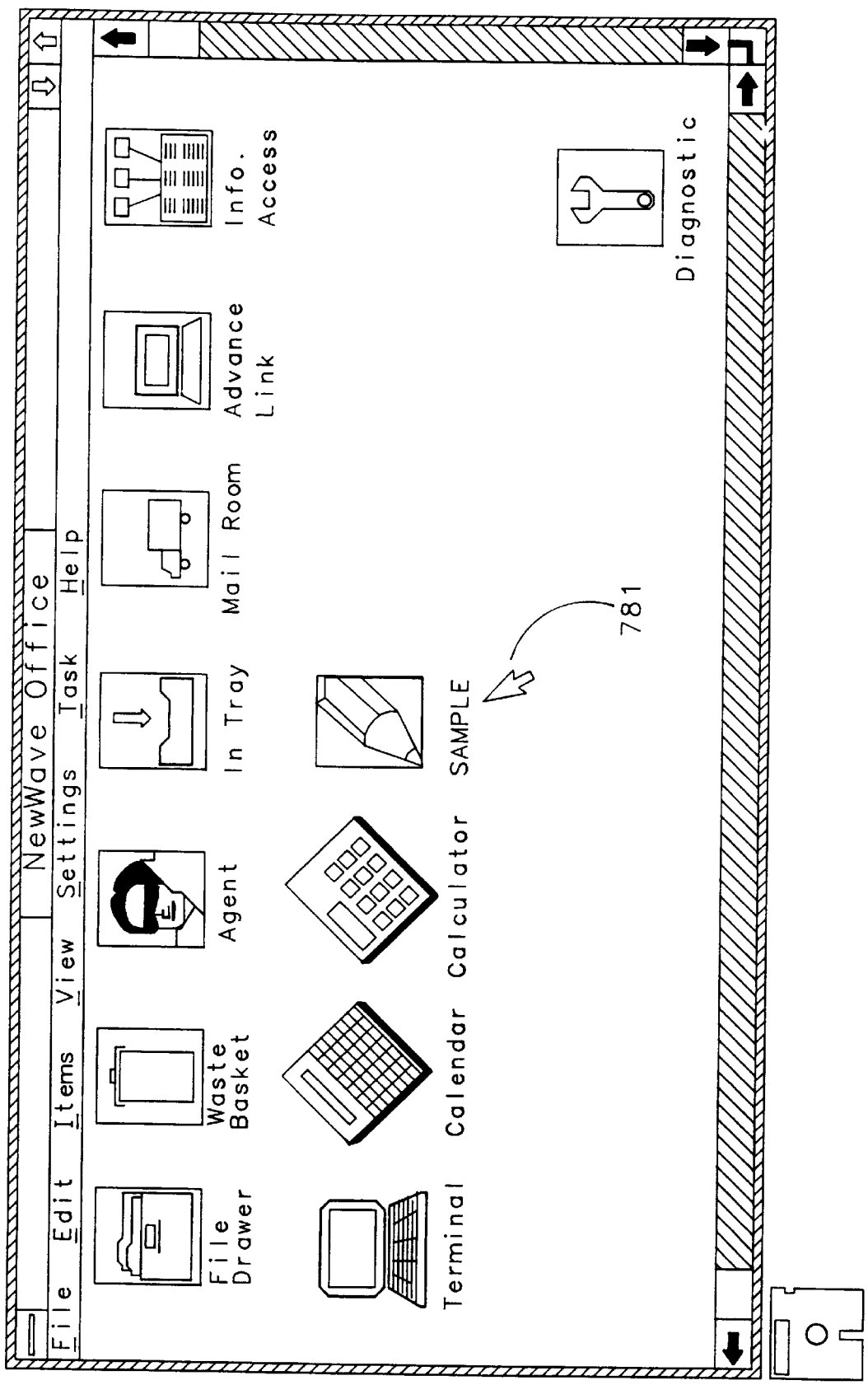
FIG. 89 shows an object "Sample" appearing in the window for "NewWave Office."

Once this region is selected, a dialog box 1101 appears, as shown in FIG. 87. A default directory for data files for "MS-Write" appears in a region 1104. The default directory is "C:\HPNWDOS\MSWRITE". This corresponds to subdirectory 861 shown in FIG. 84A. In a box 1102 is listed the existing applications files in the default directory. A new name for a file may be written into a region 1106 using keyboard 19. In FIG. 88, the name "sample" has been typed into region 1106. After cursor 781 is used to select the region labelled "OK", an object "Sample" appears in the window for "NewWave Office" as shown in FIG. 89 and pointed to by cursor 781. A data file "SAMPLE.WRI" is created and placed in directory "C:\HPNWDOS\MSWRITE" (subdirectory 861).

Although the user sees very few differences in the creation of an object which references an encapsulated program, OMF 100 and encapsulation shell 845 make various adjustments to the standard procedure. In the description of the flowchart in FIG. 143, below, the process OMF 100 and encapsulation shell 845 go through when an object is created is described.

Figure 90:
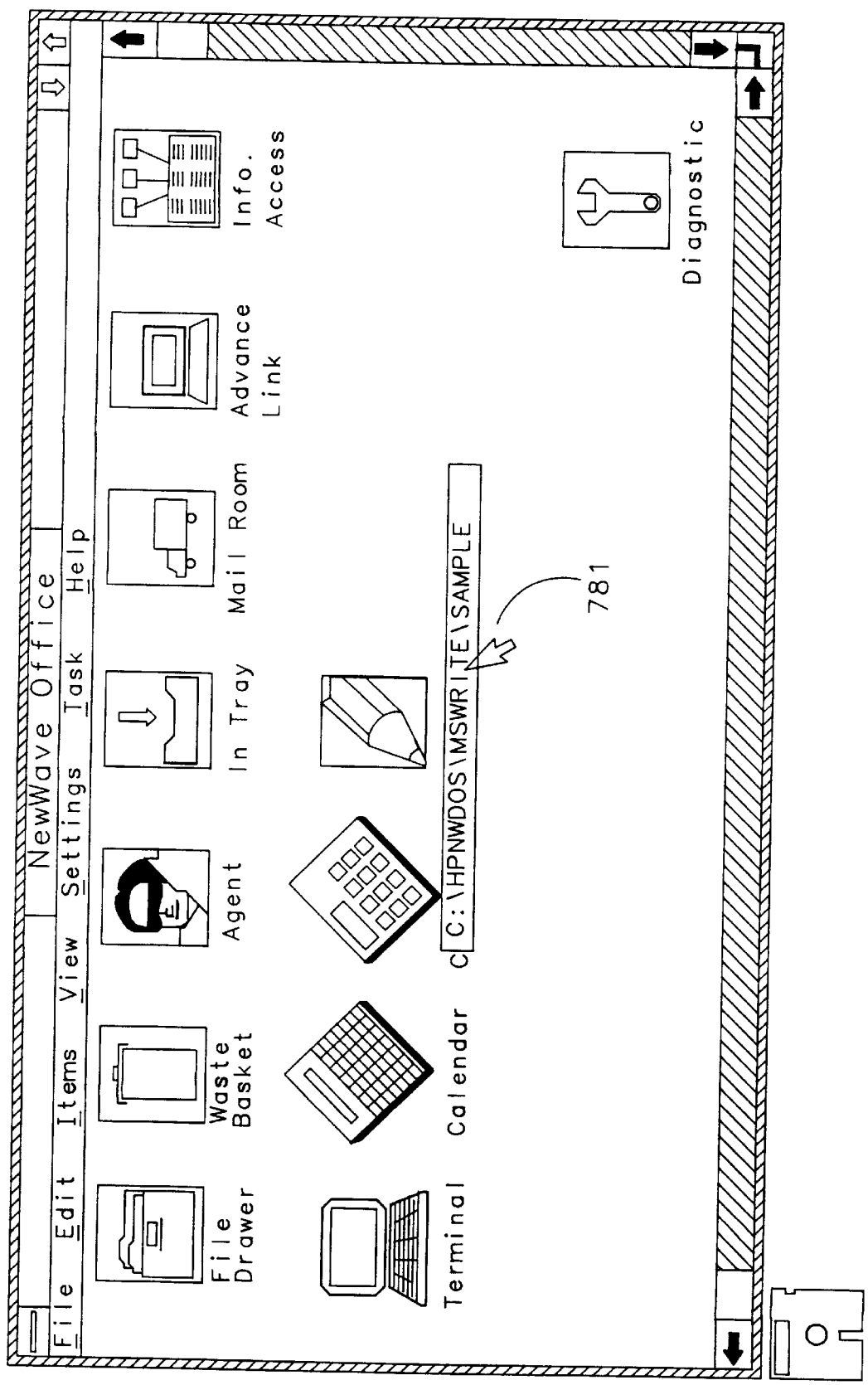
FIG. 90 shows display of the directory location of the data file "SAMPLE.WRI."
Figure 91:
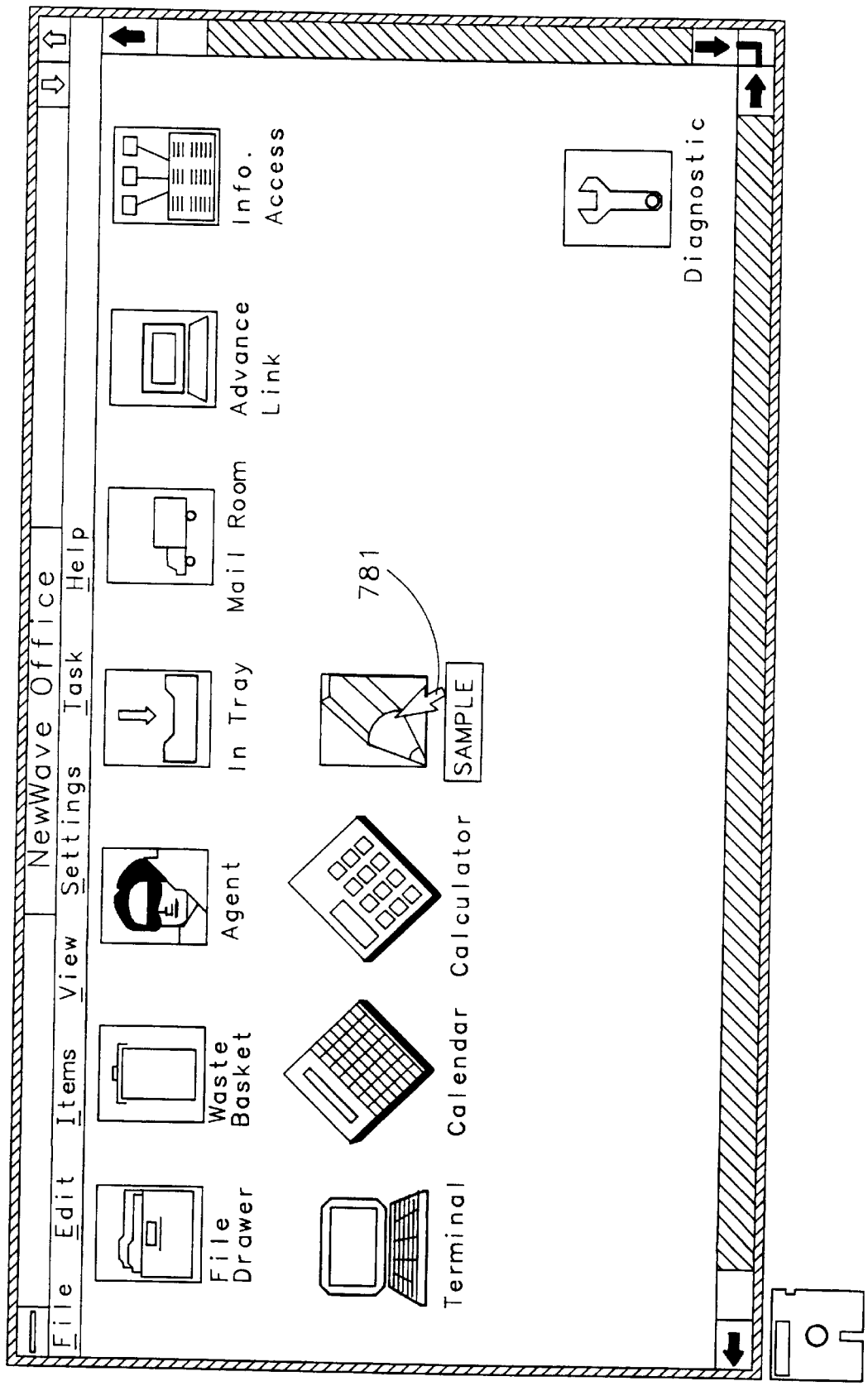
FIG. 91 shows the directory location no longer being shown

When cursor 781 is placed over the word "SAMPLE" in icon "SAMPLE" a button on mouse 20 is clicked, the directory location of the data file "SAMPLE.WRI" is displayed, as shown in FIG. 90. The object name "SAMPLE" may not be changed. In the preferred embodiment, the only way to change the name is to copy the object, thus making a new data file in directory "C:\HPNWDOS\MSWRITE". Another click on a button of mouse 20 results in the directory location no longer being shown, as is seen in FIG. 91. The application for "SAMPLE" may be opened by placing cursor 781 over the icon for "SAMPLE", as shown in FIG. 91, and twice clicking a button on mouse 20.

In the description of the flowchart in FIG. 141, below, the process OMF 100 and encapsulation shell 845 go through before opening an object for an encapsulated application is further described. Once OMF 100 determines that it can open the encapsulated application, OMF 100 sends to encapsulation shell 845 a message to open the object associated with the selected encapsulated application. Encapsulation shell 845 accesses configuration properties 847 for a command string and parameters (and optionally a keystroke macro) which will start the selected encapsulated application. Encapsulation shell 845 monitors the initiation of the encapsulated application and installs shell filter 844 to control interactions between user 843 and the encapsulated application 846. The optional keystroke macro is fed to the encapsulated application via shell filter 844.

For encapsulated applications for which menu/macros have been written, encapsulation shell 845 secures information about menu/macros from menu/macro definitions file 848. This information is maintained in the memory of computer 18 to allow shell filter 844 to respond to any actions by the user which invoke a menu/macro. This involves, for example, the interception by shell filter 844 of a particular keystroke sequence. When this keystroke sequence is recognized, shell filter 844 displays the menus specified by menu/macro definitions file 848. At this point shell filter 844 intercepts all user commands from keyboard 19 or mouse 20 until user 843 selects a menu command or cancels the menu access. When a menu command is selected, shell filter 844 sends a keystroke macro, stored in menu/macro definitions file 848, which is associated with the selected menu command to encapsulated application 846.

Figure 92:
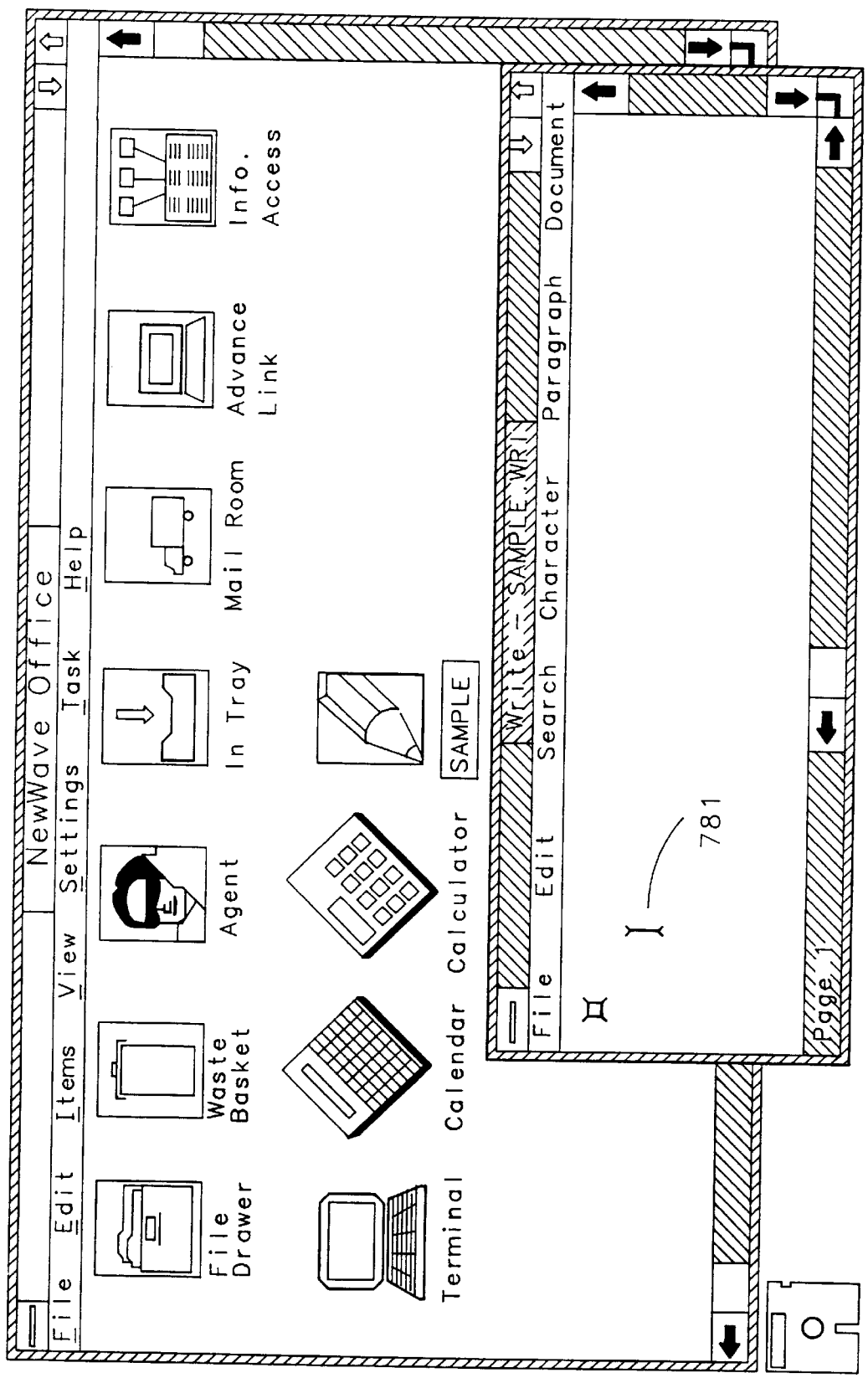
FIG. 92 shows an open window for the application "Write."
Figure 93:
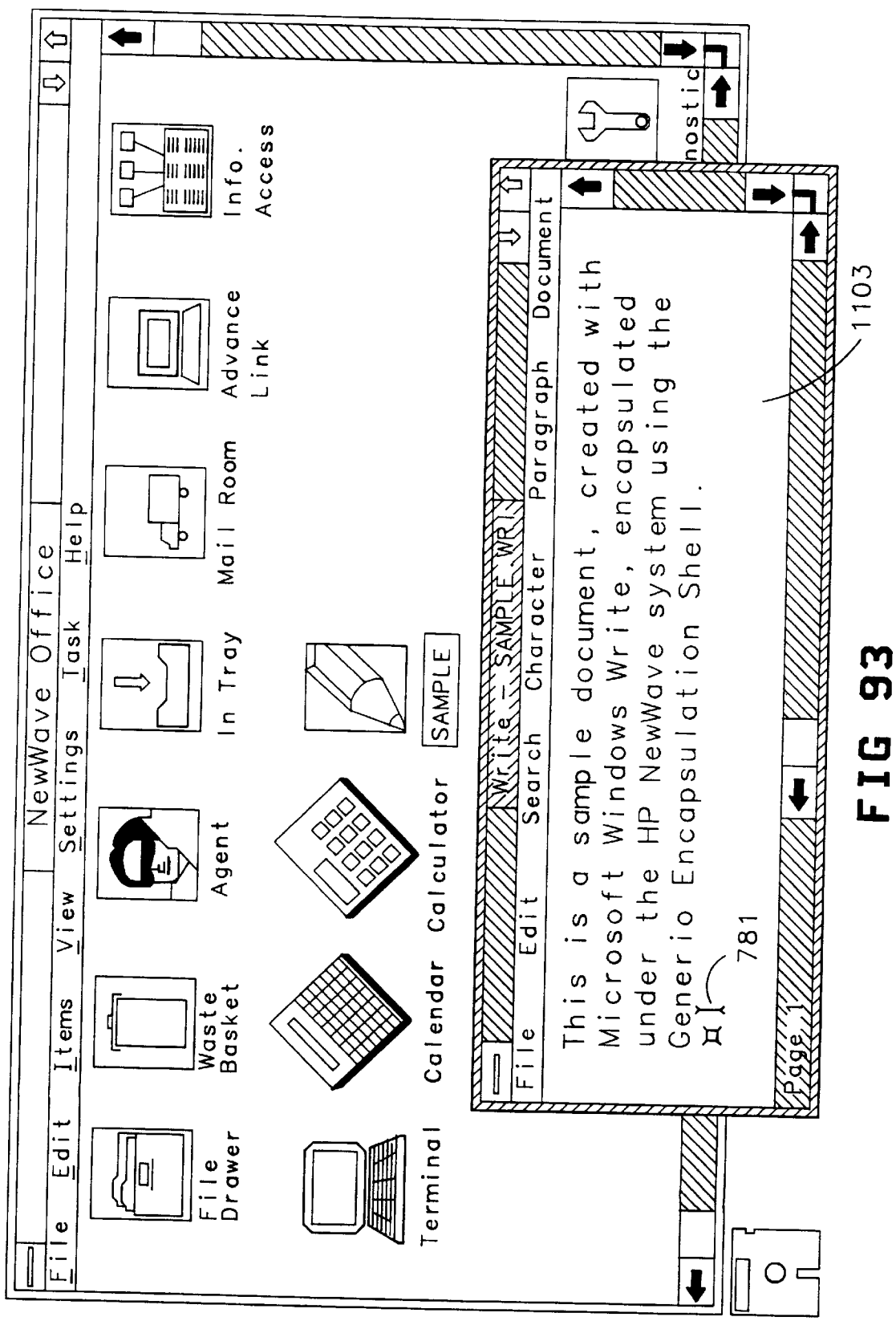
FIG. 93 shows result of data entry by a keyboard.
Figure 94:
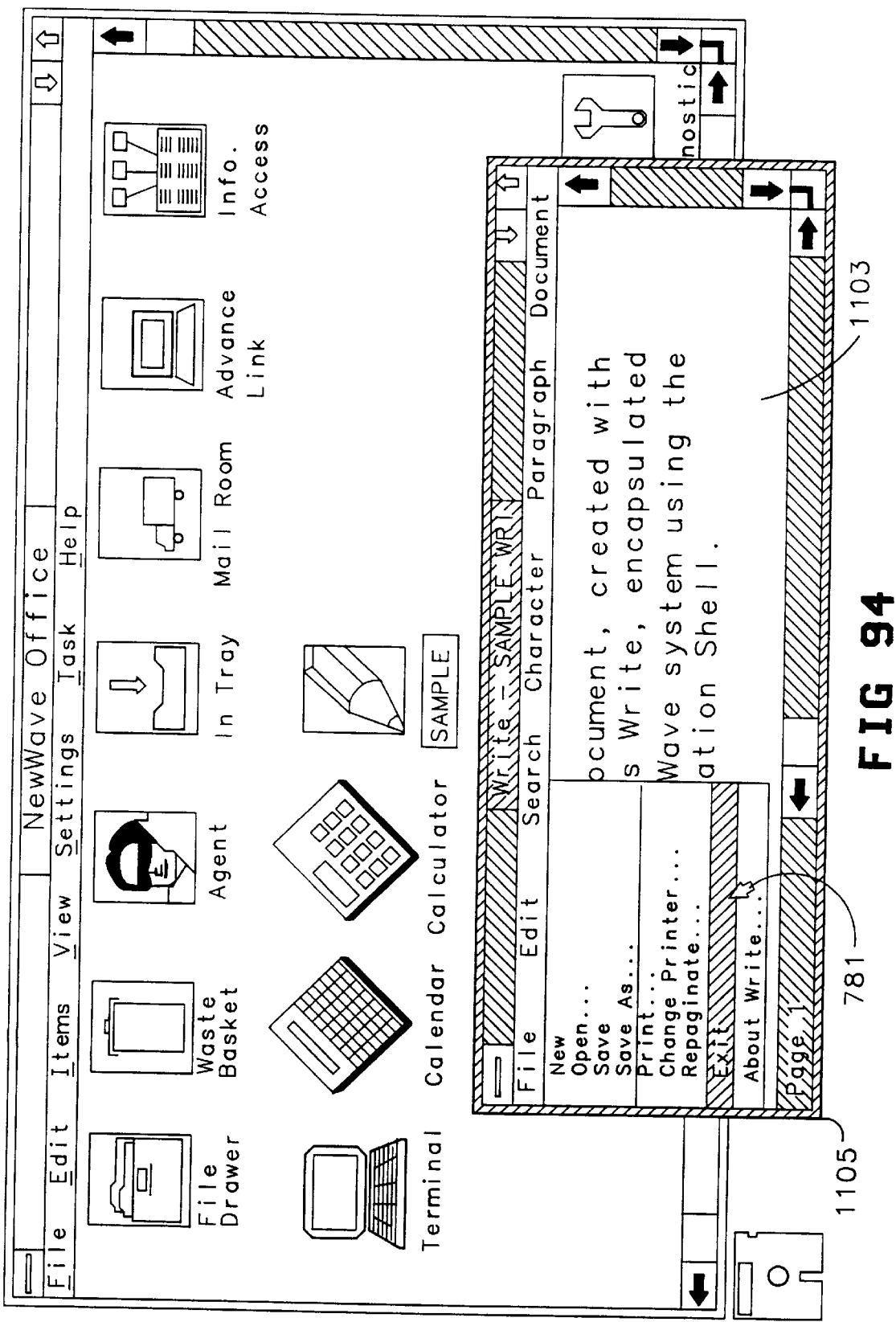
FIG. 94 shows selection of "Exit" in a pull down menu.
Figure 95:
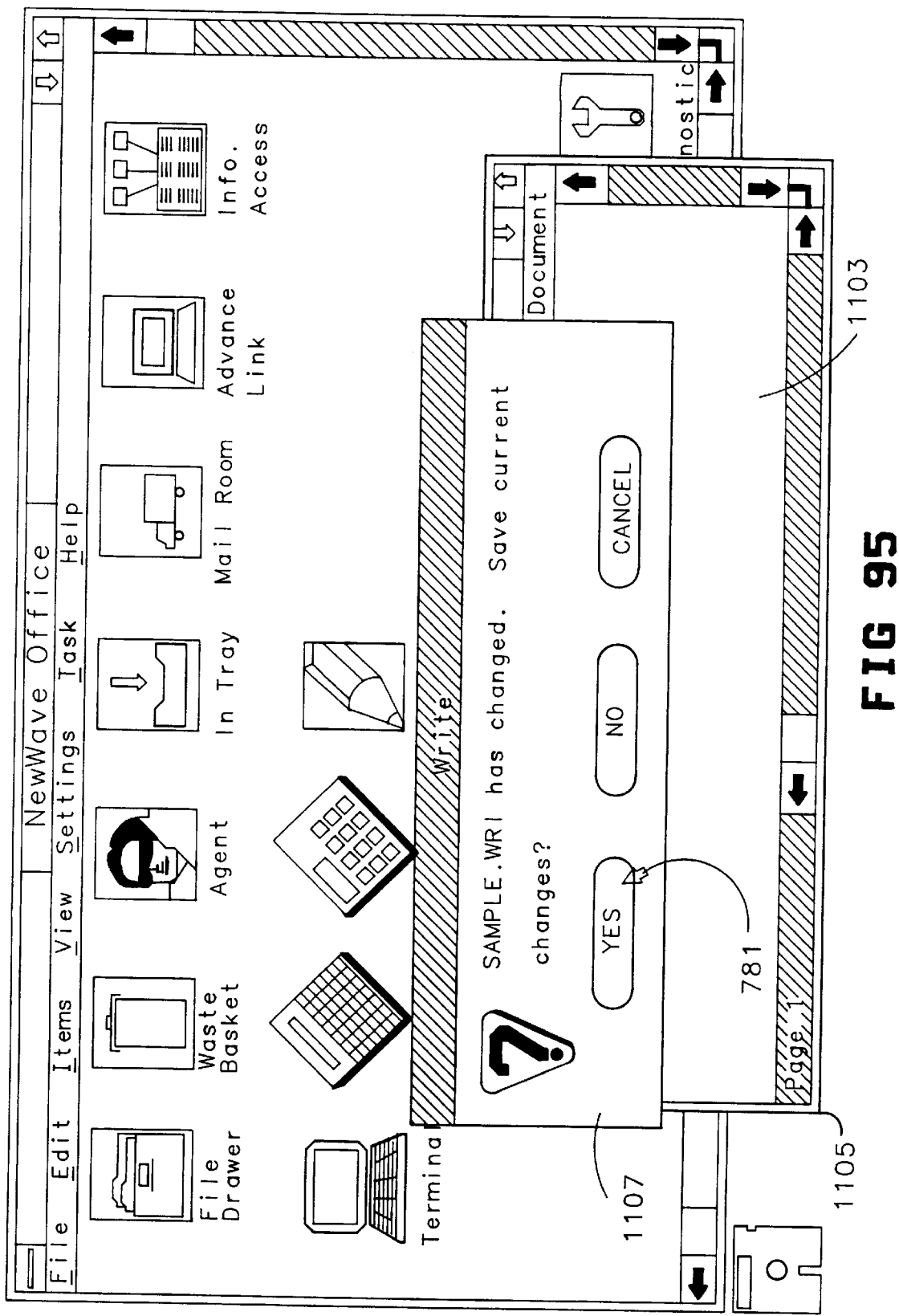
FIG. 95 shows part of the exiting procedure "Write."

In FIG. 92 a window 1103 is shown open for the application "Write". "Write" is a word processing program distributed my Microsoft Corporation and is designed to operate in conjunction with Microsoft's Windows program. The application name appears in the title of Window 1103 as "Write". Using keyboard 19, data may be entered as shown in FIG. 93. Using cursor 781 to select "Exit" in a pull down menu 1105, as shown in FIG. 94, starts the Exit process. Shell filter 844 intercepts this message requesting termination. As shown in FIG. 95, as part of the exiting procedure "Write" produces dialog box 1107 which asks whether the user wishes to save changes made to the file. If yes, the changes are made to data file "SAMPLE.WRI" in directory "C:\HPNWDOS\MSWRITE".

Shell filter 844 notifies encapsulation shell 845 that the user is terminating his session with encapsulated application 849. Encapsulation shell 845 informs OMF 100 that the encapsulated application is closing. Encapsulation shell 845 terminates shell filter 844. Based on information supplied in configuration properties 847, encapsulation shell 845 performs automatic registration of files and file conversions procedures discussed below. Then encapsulation shell 845 returns control to OMF 100.

When specified in configuration properties 847, encapsulation shell 845 performs automatic registration of files as follows. Encapsulation shell 845 records the system time when it starts encapsulated application 846. When encapsulated application 846 is terminated, encapsulation shell 845 searches the default referenced file area for the encapsulated application—i.e., the subdirectory of subdirectory 852 which corresponds to the encapsulated application—and compares a timestamp of each file with the recorded start time of the encapsulated application. If a new file is located and that file is not already referenced by an object, encapsulation shell 845 automatically creates a new object of the same class as encapsulation shell 845. The new object references the new file and encapsulation shell 845. The title of the new object is set to the file name of the new file. This process is done for all new files that are found. This allows the user to create new files while running the encapsulation program. When the application is closed, new icons are displayed which represent the files that were created.

In addition, if specified by configuration properties 847, at termination time other subdirectories within subdirectory 852 which represent other encapsulated classes may be searched for files which have a timestamp later than the recorded start time of the encapsulated application. Encapsulation shell 845 may then create objects for these files, which are of the appropriate class. These new files also appear as new icons when the application is closed.

Figure 96:
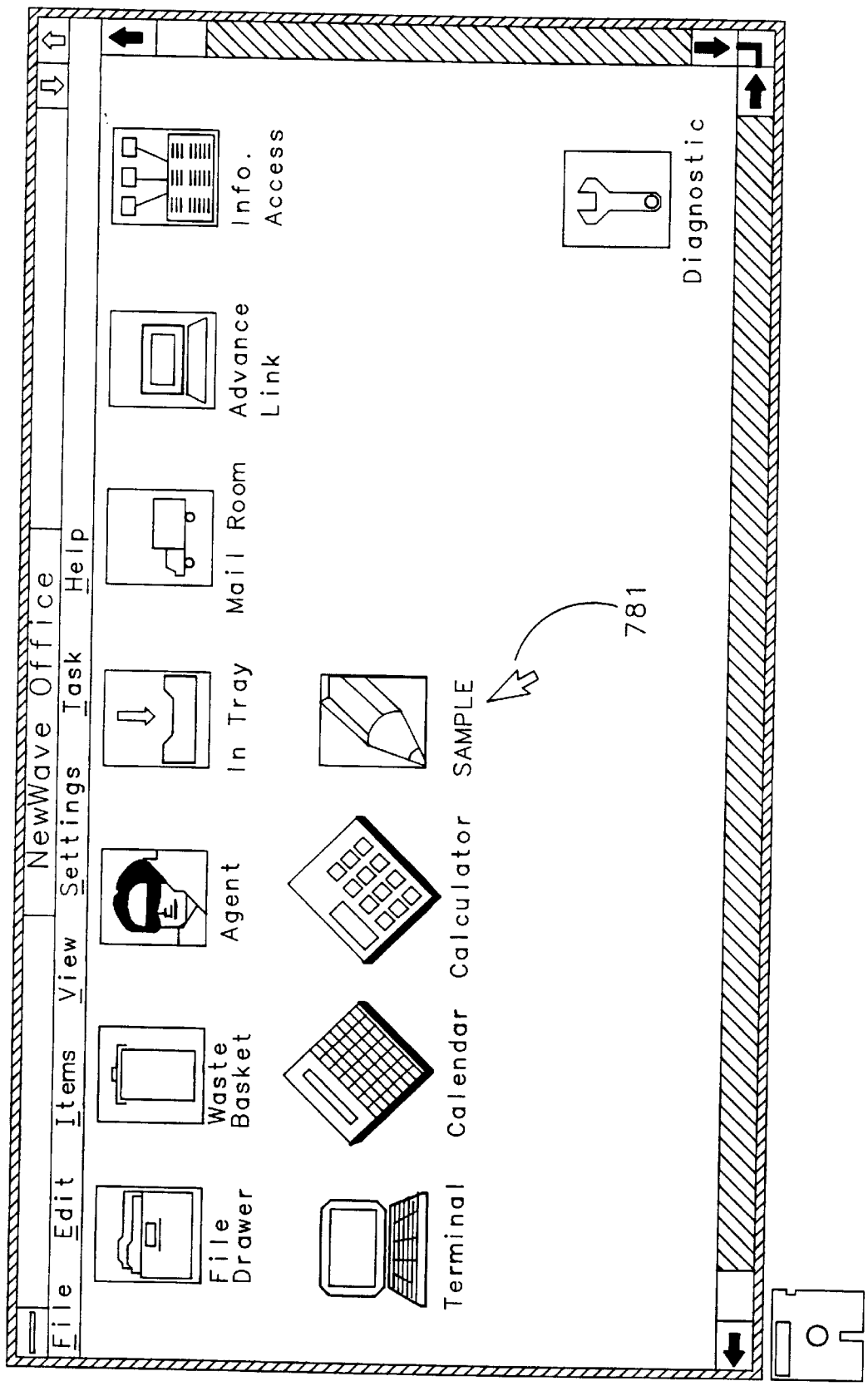
FIG. 96 shows "SAMPLE" being closed.

In FIG. 96, "SAMPLE" has been closed.

Figure 97:
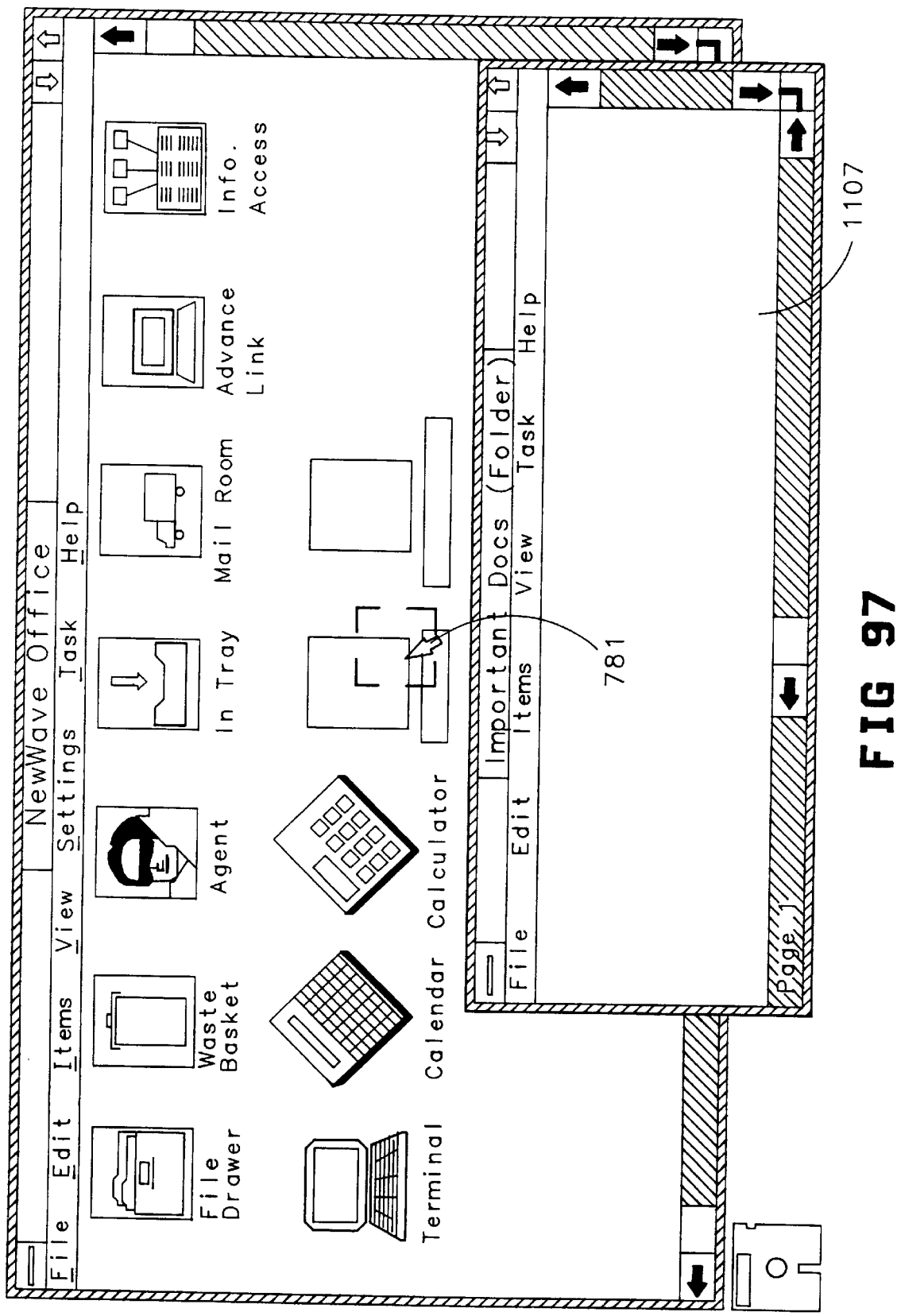
FIG. 97 shows a new folder entitled "Important Docs" having been created and opened.
Figure 98:
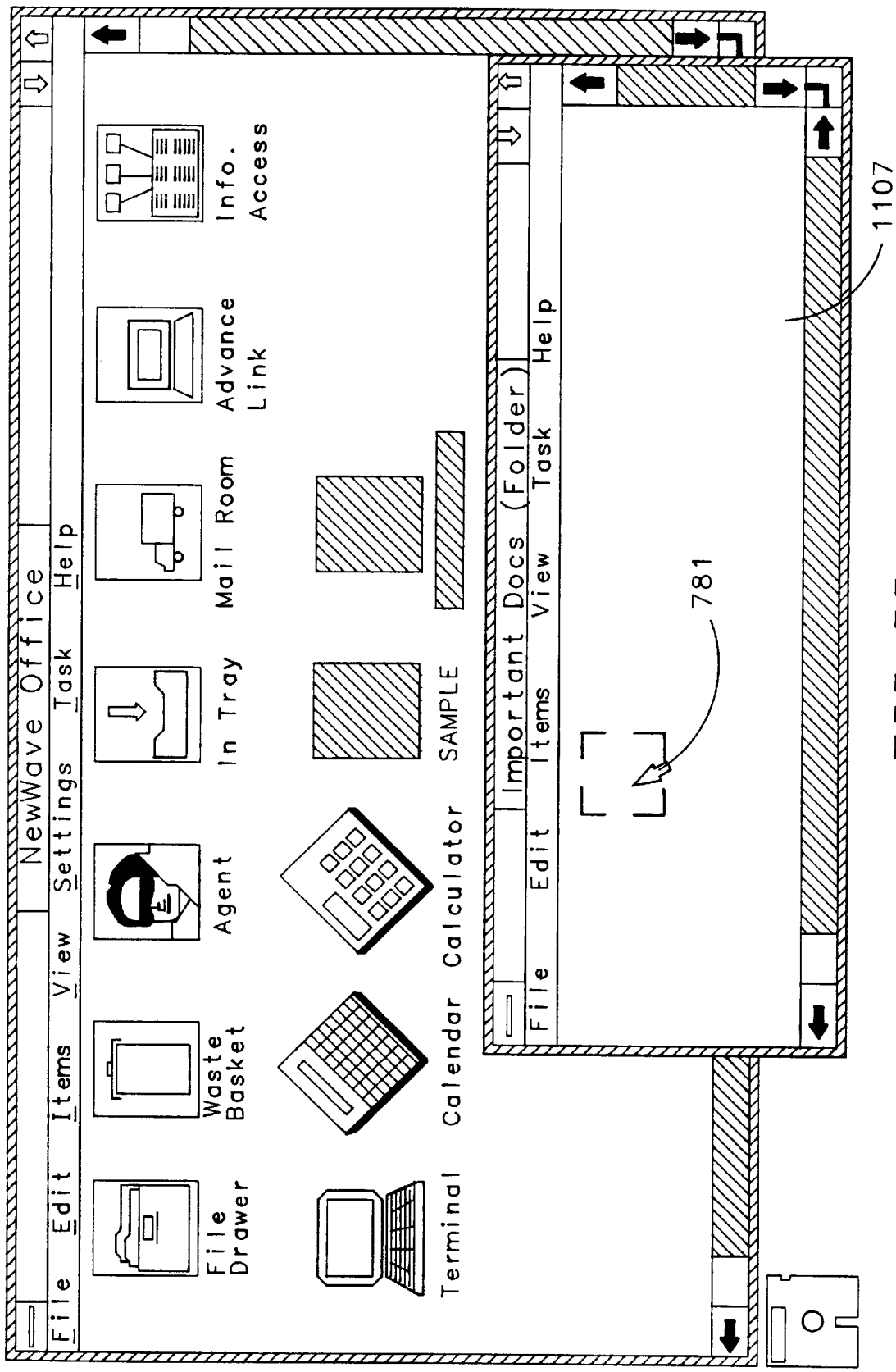
FIG. 98 shows a cursor moving the object "SAMPLE" to an opened window.
Figure 99:
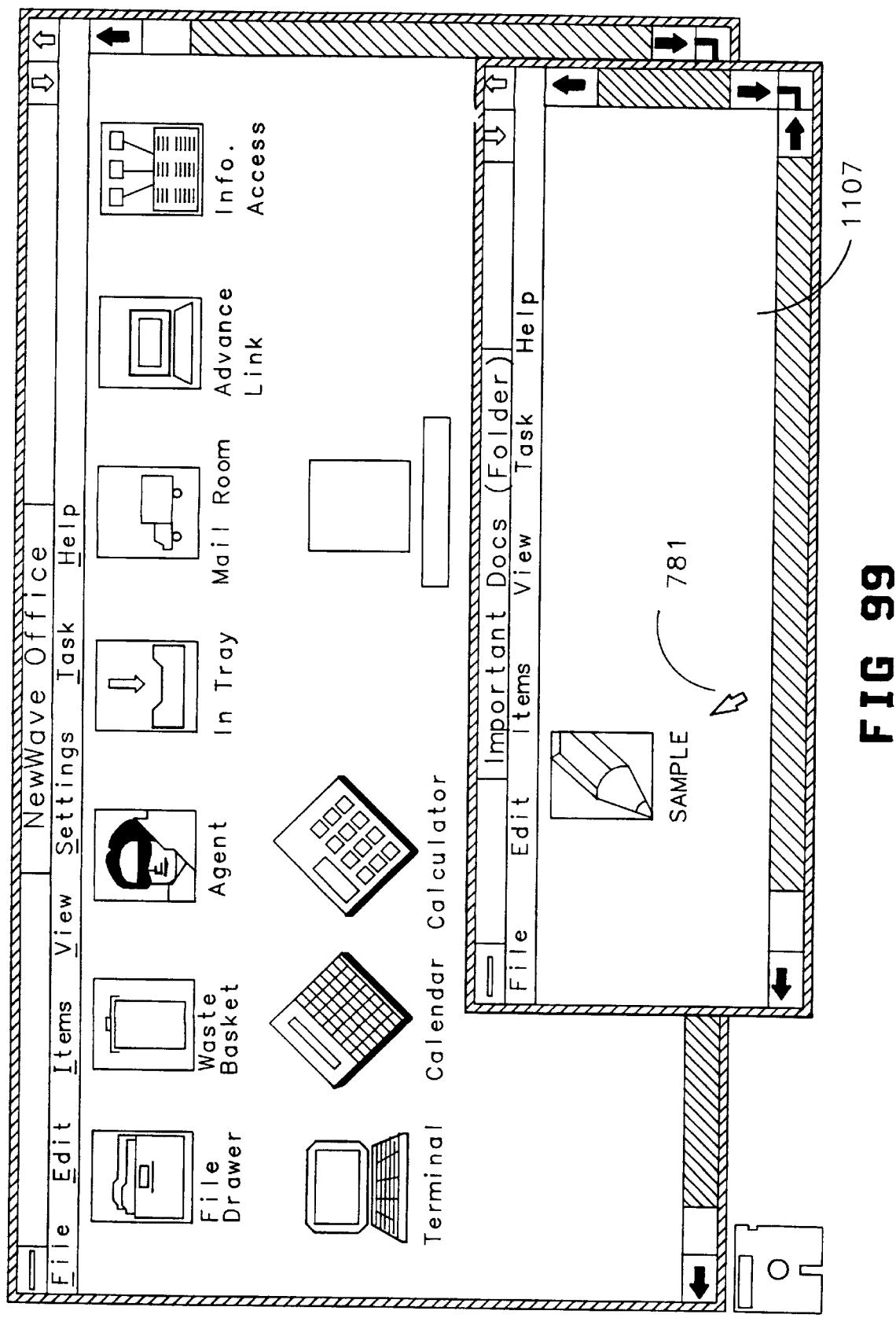
FIG. 99 shows the object "SAMPLE" within a window.

Objects which include encapsulated applications may be manipulated by a user in the same way as the user manipulates normal objects. For example, in FIG. 97 a new folder entitled "Important Docs" has been created and opened. In FIGS. 97 and 98 Cursor 781 is shown moving the object "SAMPLE" to an opened window 1107 for folder "Important Docs". In FIG. 99, object "SAMPLE" is shown within window 1107.

Figure 100:
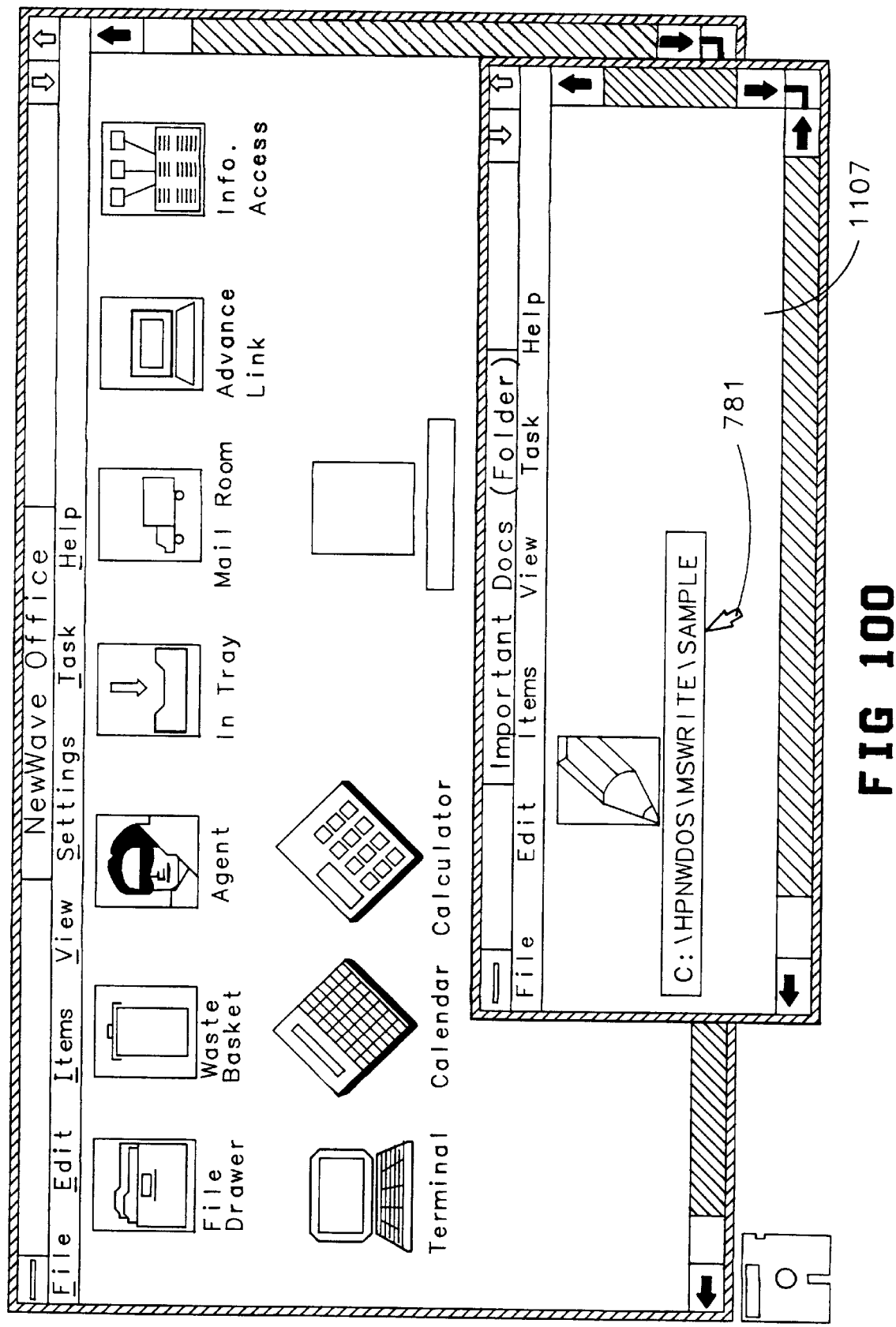
FIG. 100 shows a cursor placed over the name "SAMPLE."

As shown in FIG. 100, placing cursor 781 over the name "SAMPLE" and clicking a button on mouse 20 has resulted in the full name "C:\HPNWDOS\MSWRITE\SAMPLE" appearing. The actual location of the data file "SAMPLE.WRI" in directory "C:\HPNWDOS\MSWRITE" is unchanged, although the object "SAMPLE" has moved from the "NewWave Office" to folder "Important Docs".

Figure 101:
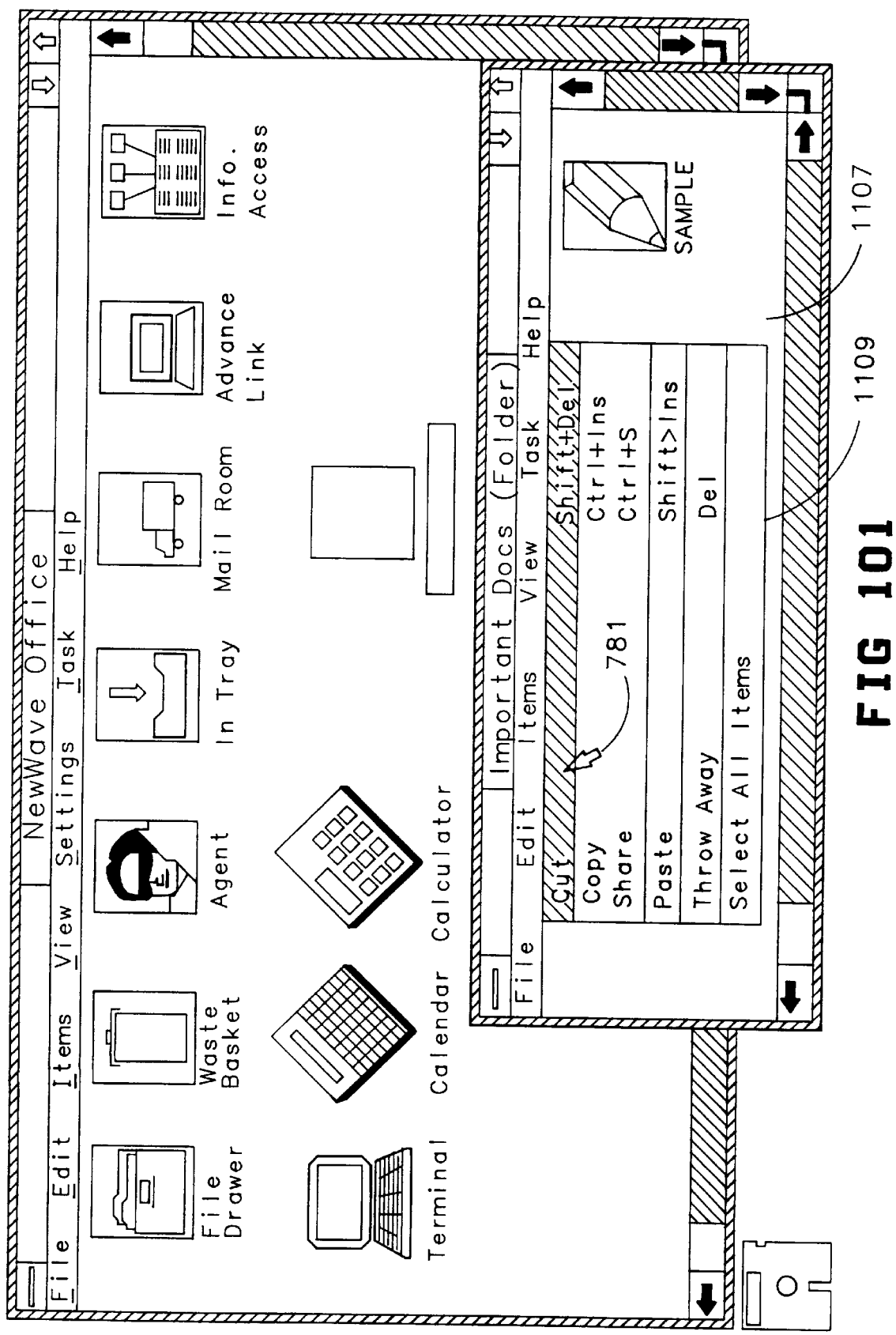
FIG. 101 shows the object "SAMPLE" having been selected.
Figure 102:
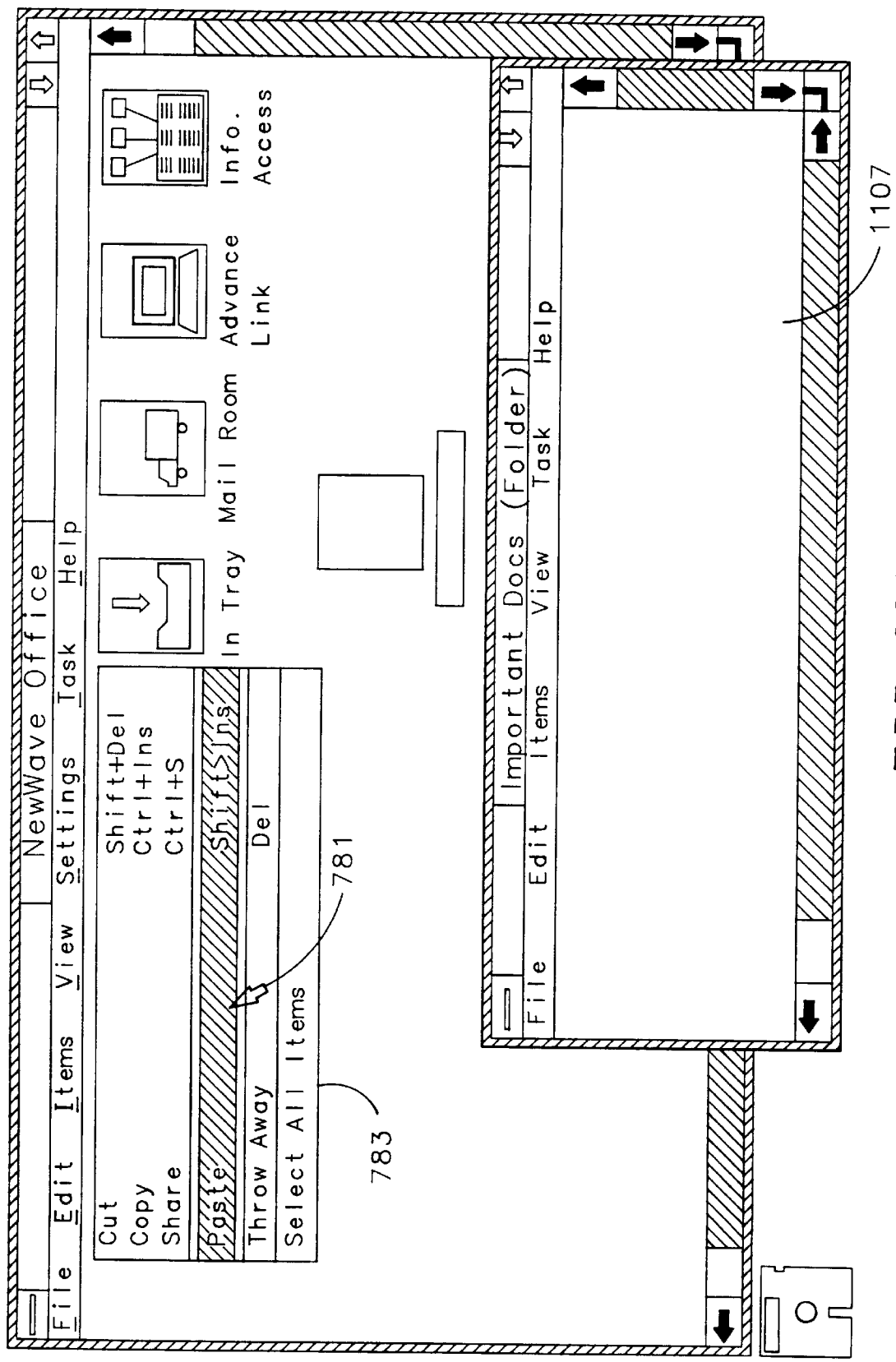
FIG. 102 object "SAMPLE" having been "cut" from folder "Important Docs."
Figure 103:
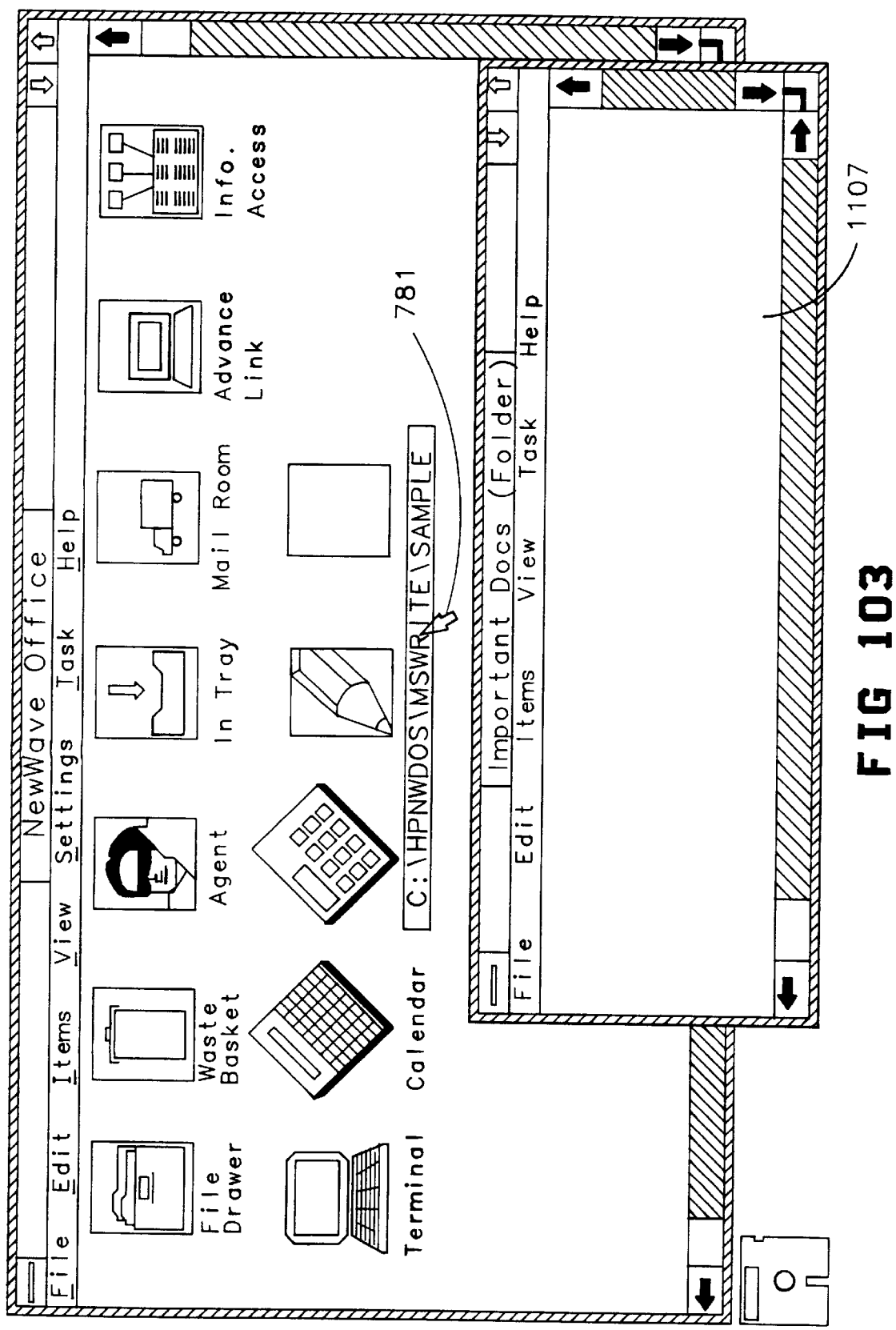
FIG. 103 shows the object "SAMPLE having been moved from folder "Important Docs" to "NewWave Office."

Also, "Cut", "Paste", "Share" and "Copy" commands for encapsulated applications are performed by a user in the same way as the user performs "Cut", "Paste", "Share" and "Copy" commands for ordinary objects. In FIG. 101, the object "SAMPLE" has been selected. Cursor 781 is used to select the command "Cut" from a pull down menu 1109. The result, seen in FIG. 102, is that object "SAMPLE" has been "cut" from folder "Important Docs" and therefore no longer appears in window 1107. Also in FIG. 102 the command "Paste" from pull down menu 783 is selected using cursor 781. The result, seen in FIG. 103 is object "SAMPLE has been moved from folder "Important Docs" to "NewWave Office". Again, placing cursor 781 over the name "SAMPLE" and clicking a button on mouse 20 results in the full name "C:\HPNWDOS\MSWRITE\SAMPLE" appearing. The actual location of the data file "SAMPLE.WRI" in directory "C:\HPNWDOS\MSWRITE" is again unchanged.

Figure 104:
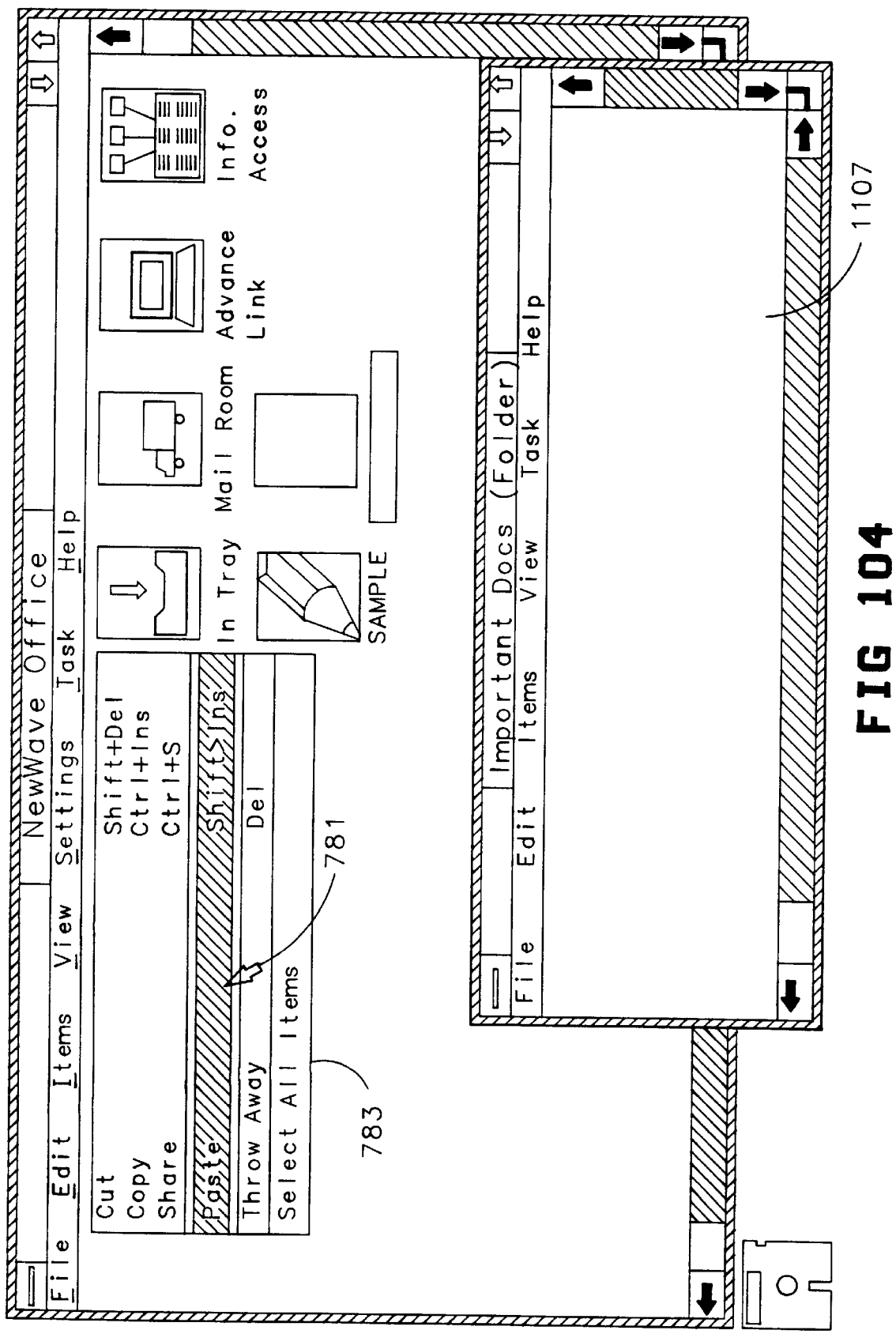
FIG. 104 shows the object "SAMPLE" highlighted and thus selected.
Figure 105:
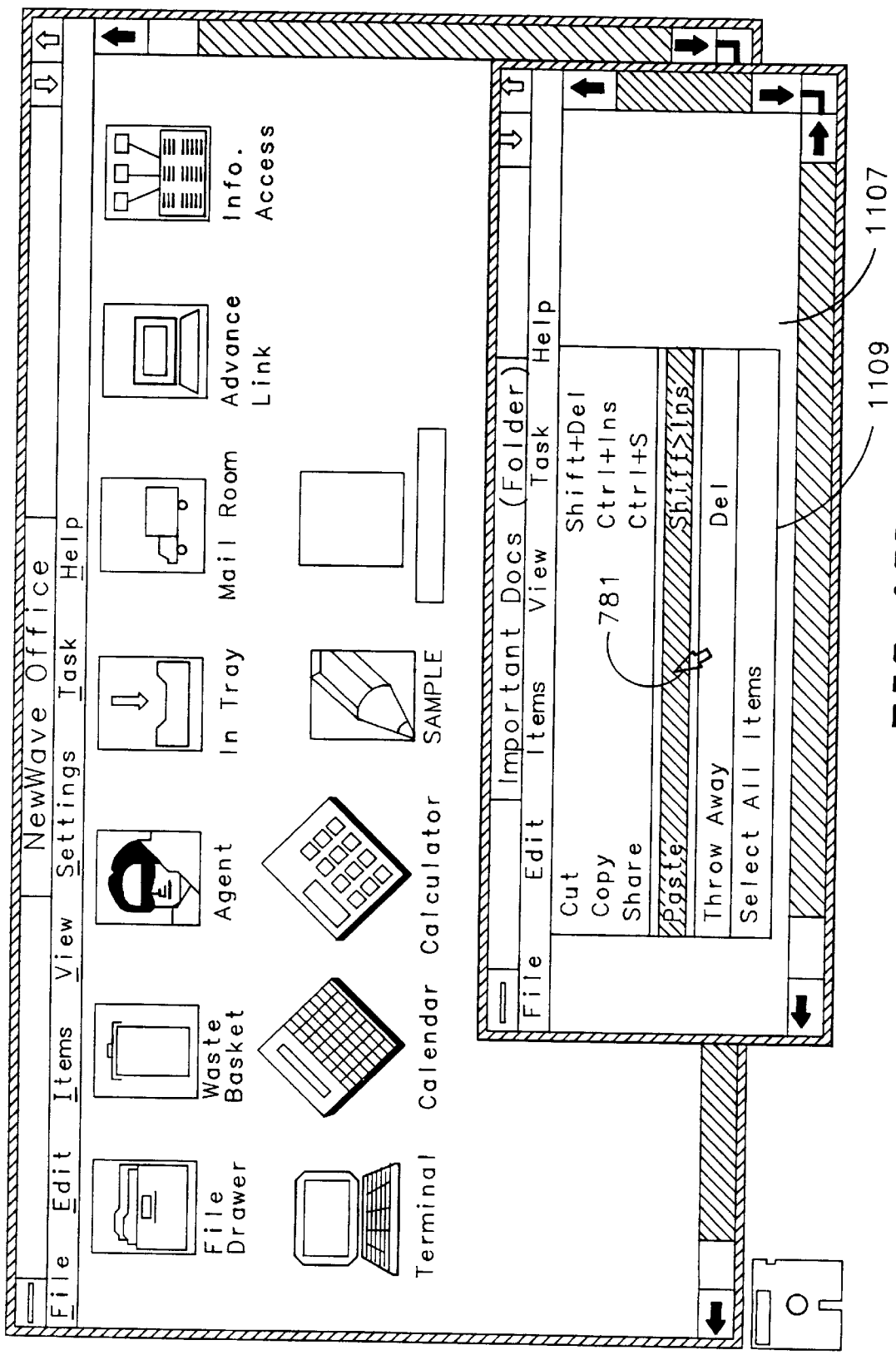
FIG. 105 shows the command "Paste" in a pull down menu being selected.
Figure 106:
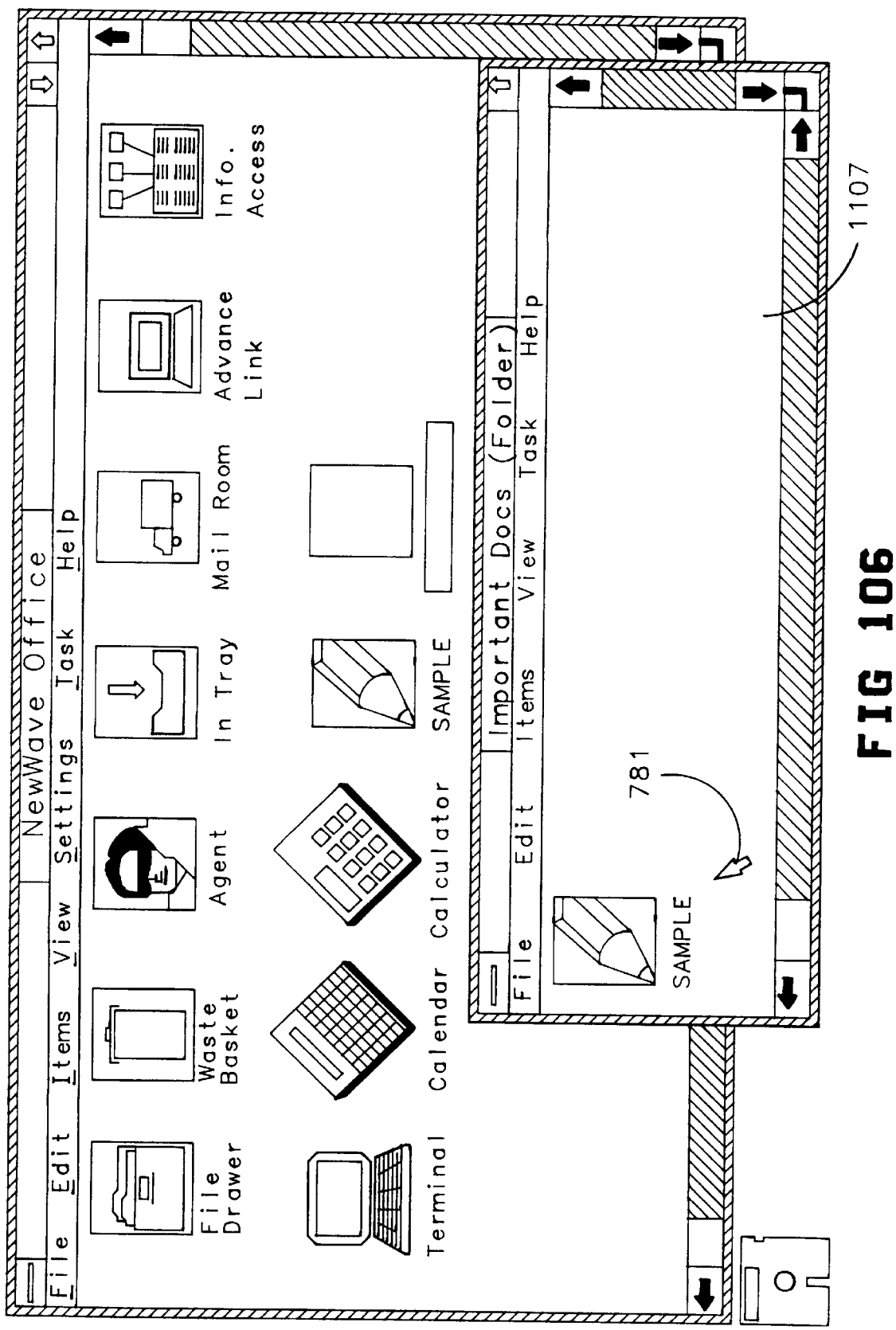
FIG. 106 shows the object "SAMPLE" being shared, and appearing in both the window "NewWave Office" and in another window.

Also, in FIG. 104, Object "SAMPLE" is shown highlighted and thus selected. The command "Share" in pull down menu 783 is selected using cursor 781. In FIG. 105, the command "Paste" in pull down menu 1109 is selected. The result, shown in FIG. 106, is object "SAMPLE" being shared, and appearing in both the window "NewWave Office" and in window 1107.

Figure 107:
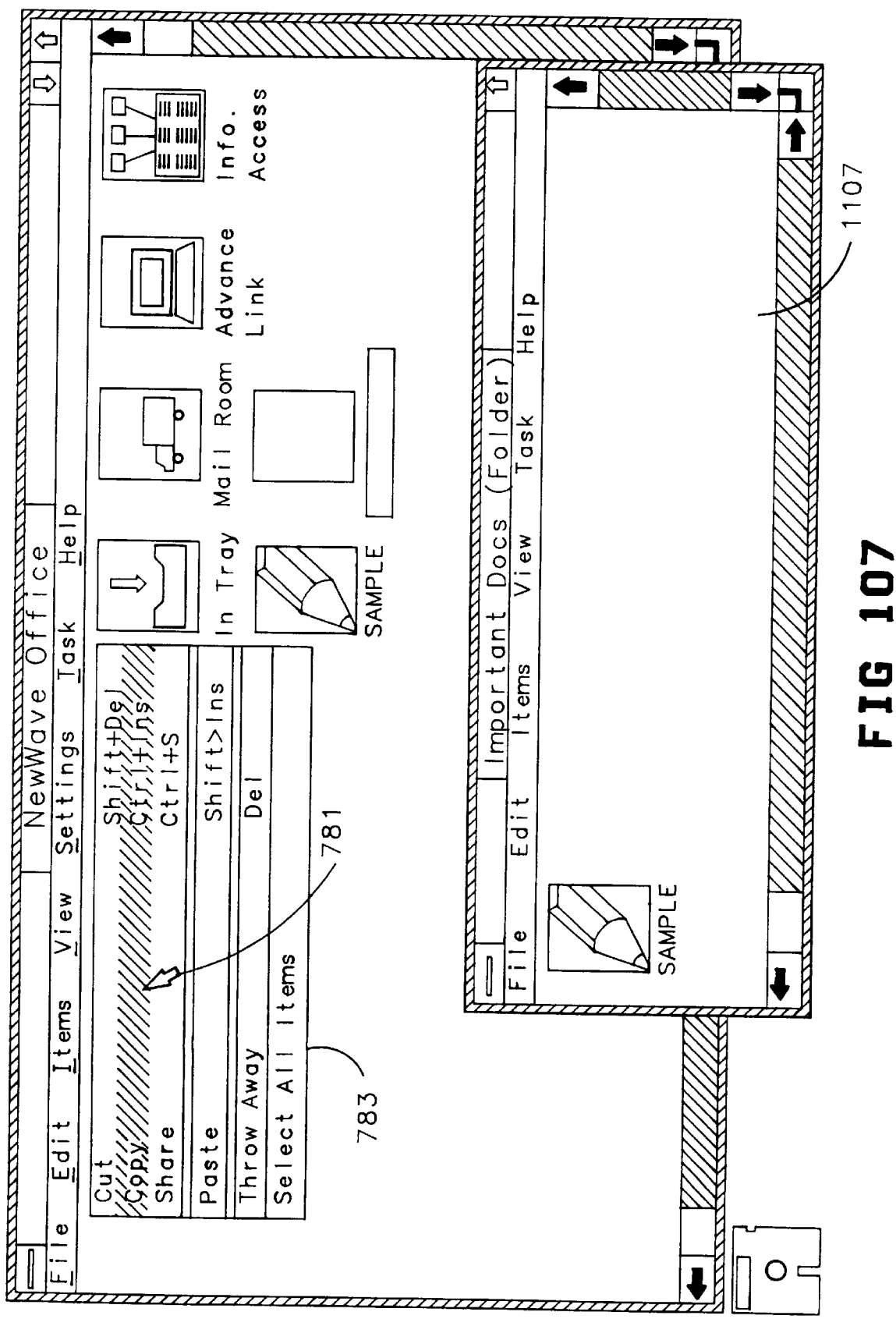
FIG. 107 shows the object "SAMPLE" in "NewWave Office" being highlighted and thus selected.
Figure 108:
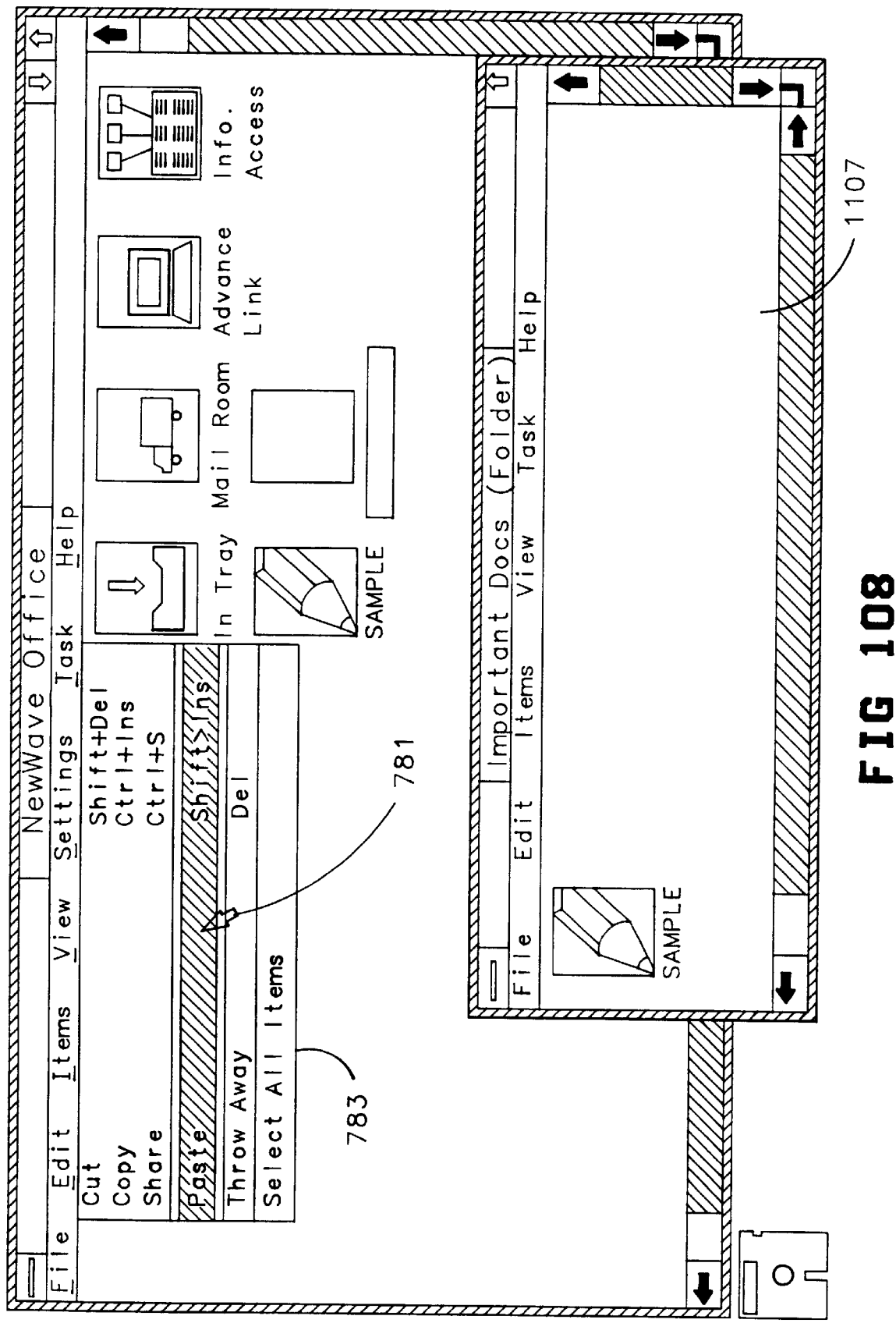
FIG. 108 shows a cursor used to select command "Copy" in a pull down menu.
Figure 109:
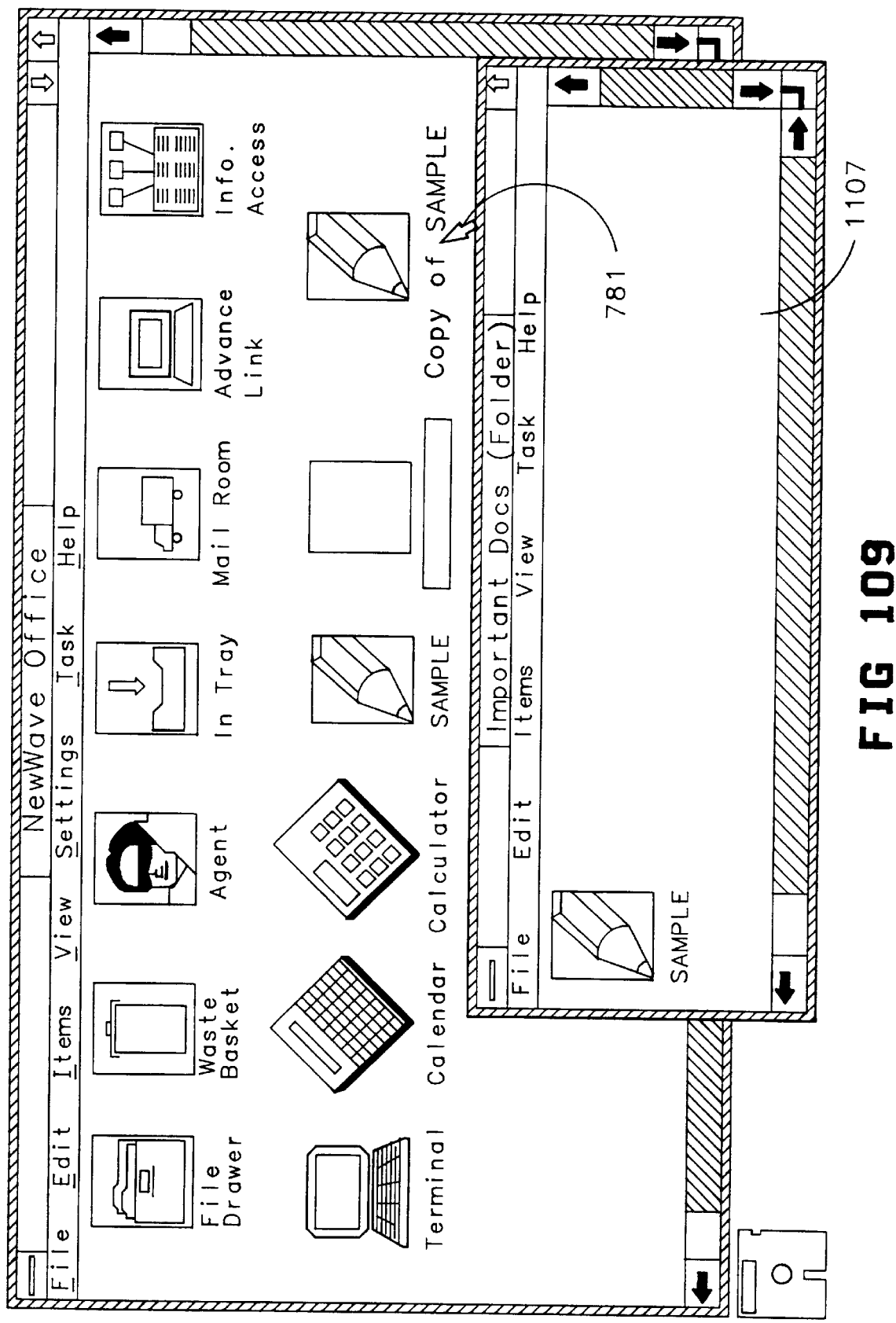
FIG. 109 shows the file "Copy of: SAMPLE" appearing in "NewWave Office".

In FIG. 107, Object "SAMPLE" in "NewWave Office" is shown highlighted and thus selected. Cursor 781 is used to select command "Copy" in pull down menu 783. In FIG. 108, cursor 781 is used to select command "Paste" in pull down menu 783. The result, shown in FIG. 109, is "Copy of: SAMPLE" appearing in "NewWave Office". At this point all files for object "Copy of: SAMPLE" are stored as ordinary objects, in one of the subdirectories of subdirectory 851. There is no new file placed in subdirectory 851, that is, directory "C:\HPNWDOS\MSWRITE".

Figure 110:
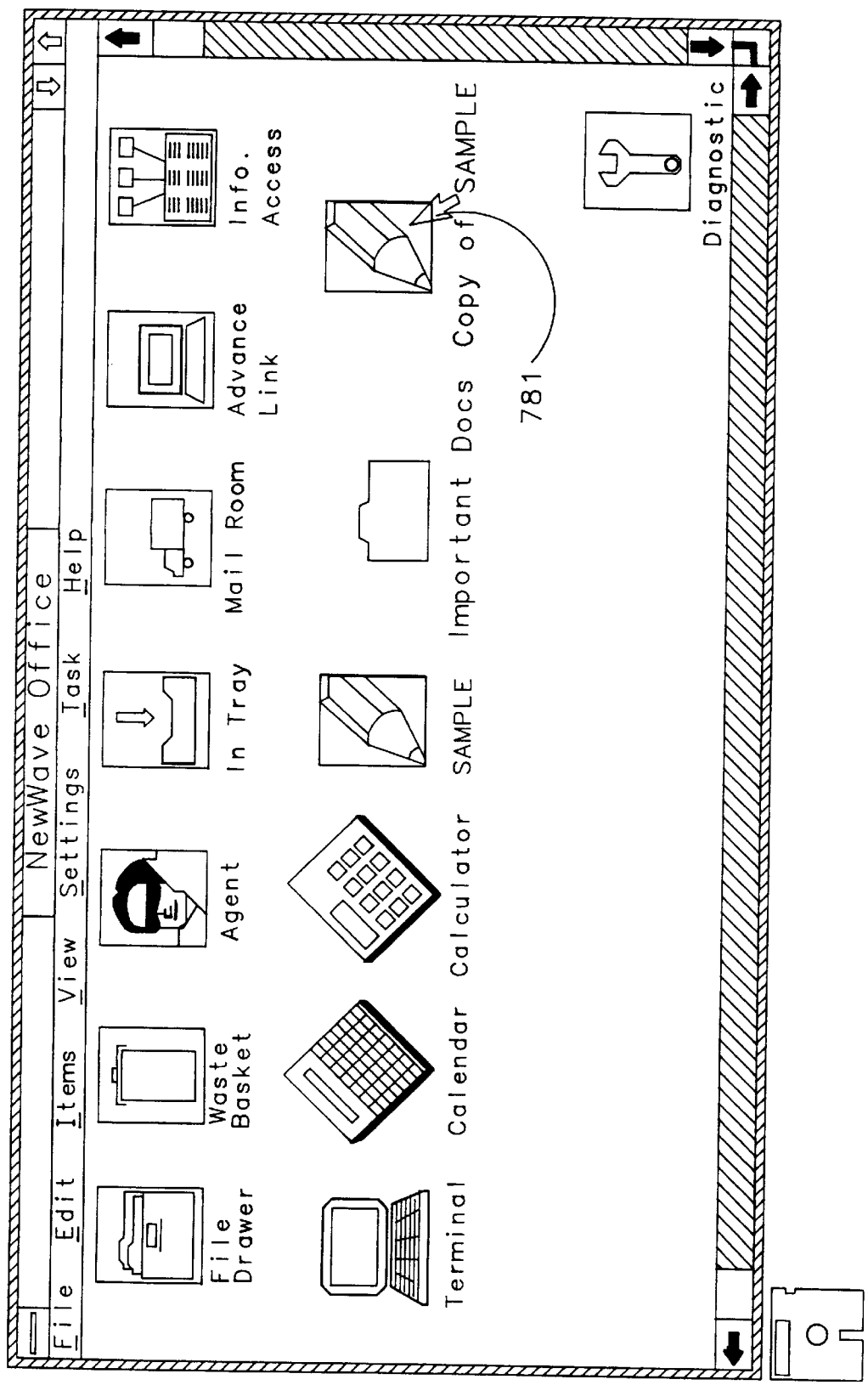
FIG. 110 shows an object "Copy of: Sample" being opened, by placing a cursor over "Copy of:SAMPLE" and twice clicking a button on a mouse.
Figure 111:
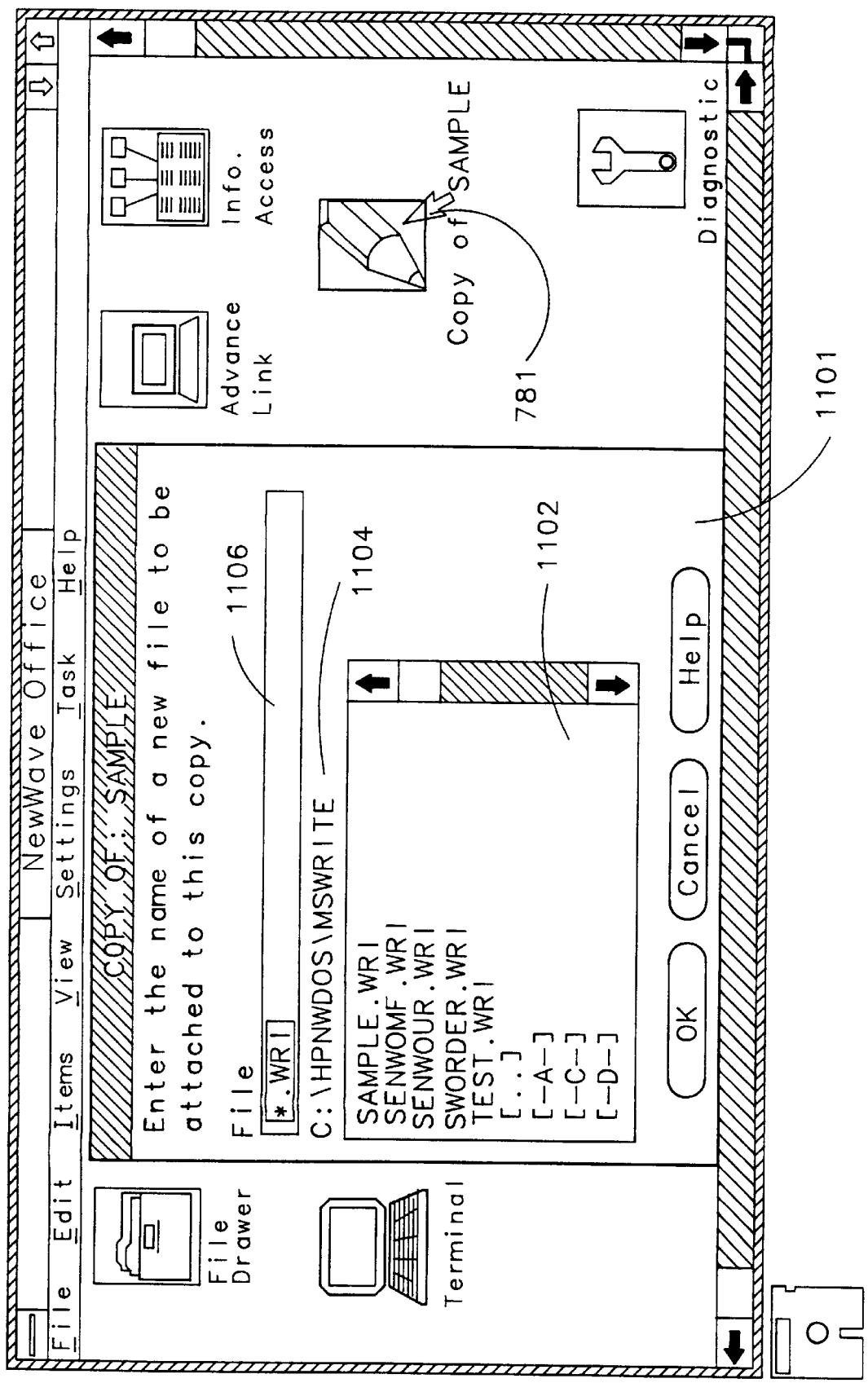
FIG. 111 shows an encapsulation shell prompting a user for a new name by causing a dialog box to appear.
Figure 112:
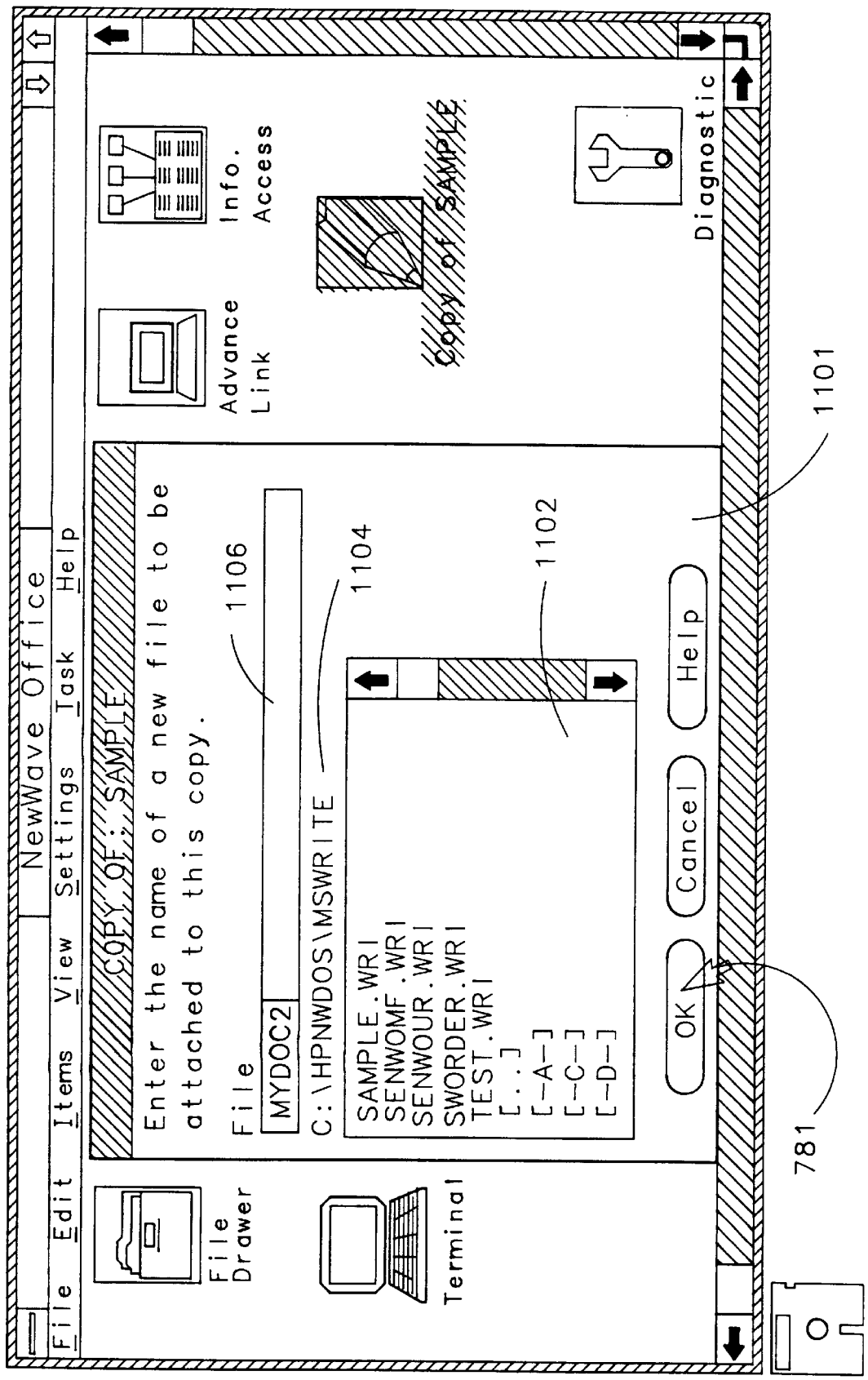
FIG. 112 shows results of a user entering via the keyboard the new name "MYDOC2" for object "Copy of: Sample."
Figure 113:
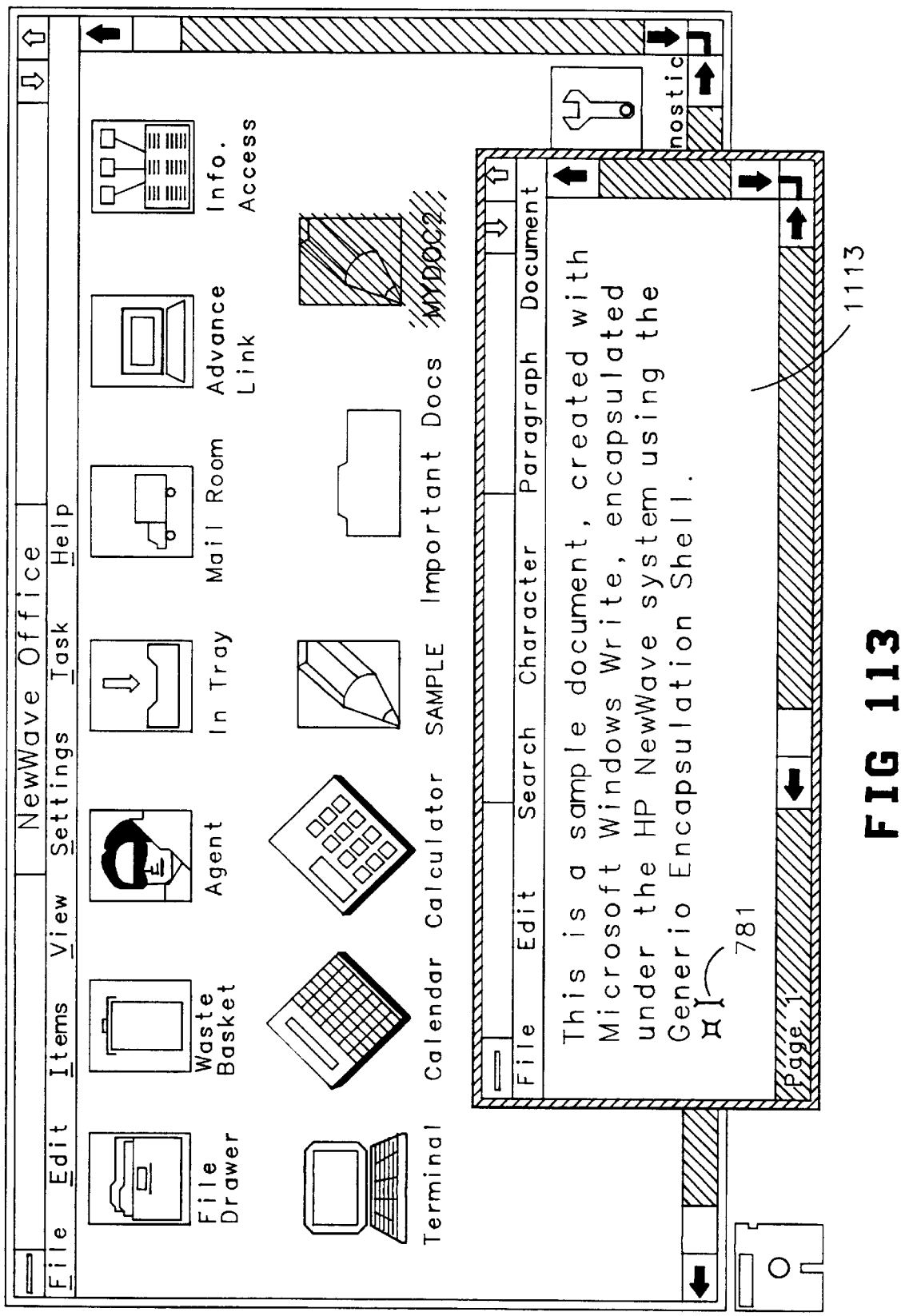
FIG. 113 shows the contents of "MYDOC2" being a copy of data from object "SAMPLE."
Figure 114:
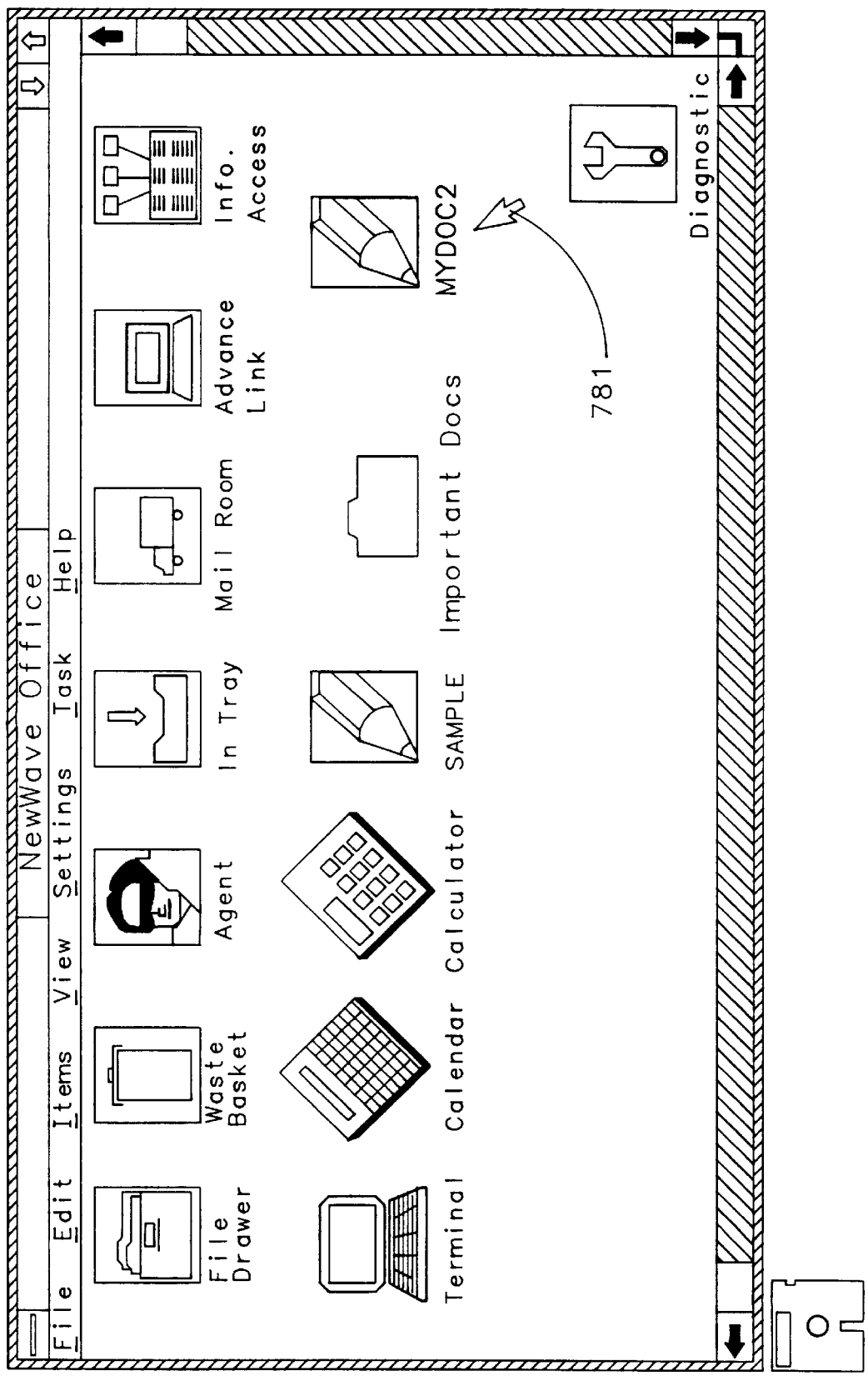
FIG. 114 shows an icon for "MYDOC2" in "NewWave Office."

When object "Copy of: Sample" is opened, by placing cursor 781 over "Copy of:SAMPLE" and twice clicking a button on mouse 20, as shown in FIG. 110, OMF 100 calls encapsulation shell 845. Encapsulation shell 845 checks to see if a "copied object" flag is set. If the copied object flag is set, that indicates to OMF that the user is trying to open a "copied object" that is, an object which references data for an encapsulated application which has been copied and for which the data file has not yet been stored in a subdirectory of subdirectory 851 and has not been moved to a subdirectory of subdirectory 852 where it is to be made available to the encapsulated application. In the present case, since the user is attempting to open a "copied object" encapsulation shell 845 prompts the user for a new name by causing dialog box 1101 to appear, as shown in FIG. 111. As can be seen from comparing FIG. 88 with FIG. 111, the file SAMPLE.WRI has been added to box 1102. This happened when object "SAMPLE" was created. As is seen from FIG. 112, the user has entered via the keyboard the new name "MYDOC2" for object "Copy of: Sample". After selecting the region "OK" in FIG. 112 with cursor 781, encapsulation shell 845 moves the data file from its location in a subdirectory of subdirectory 851 where it formally resided in the OMF data file storage domain, to a location in subdirectory 861. Then encapsulation shell 845 starts the application "Write" and gives "Write" the file name "MYDOC2". "Write" opens "MYDOC2". The contents of "MYDOC2" are a copy of data from object "SAMPLE" and are seen in window 1113 of FIG. 113. When object "MYDOC2" is closed, an icon for "MYDOC2" is seen in "NewWave Office", as shown in FIG. 114 and pointed to by cursor 781.

Figure 115:
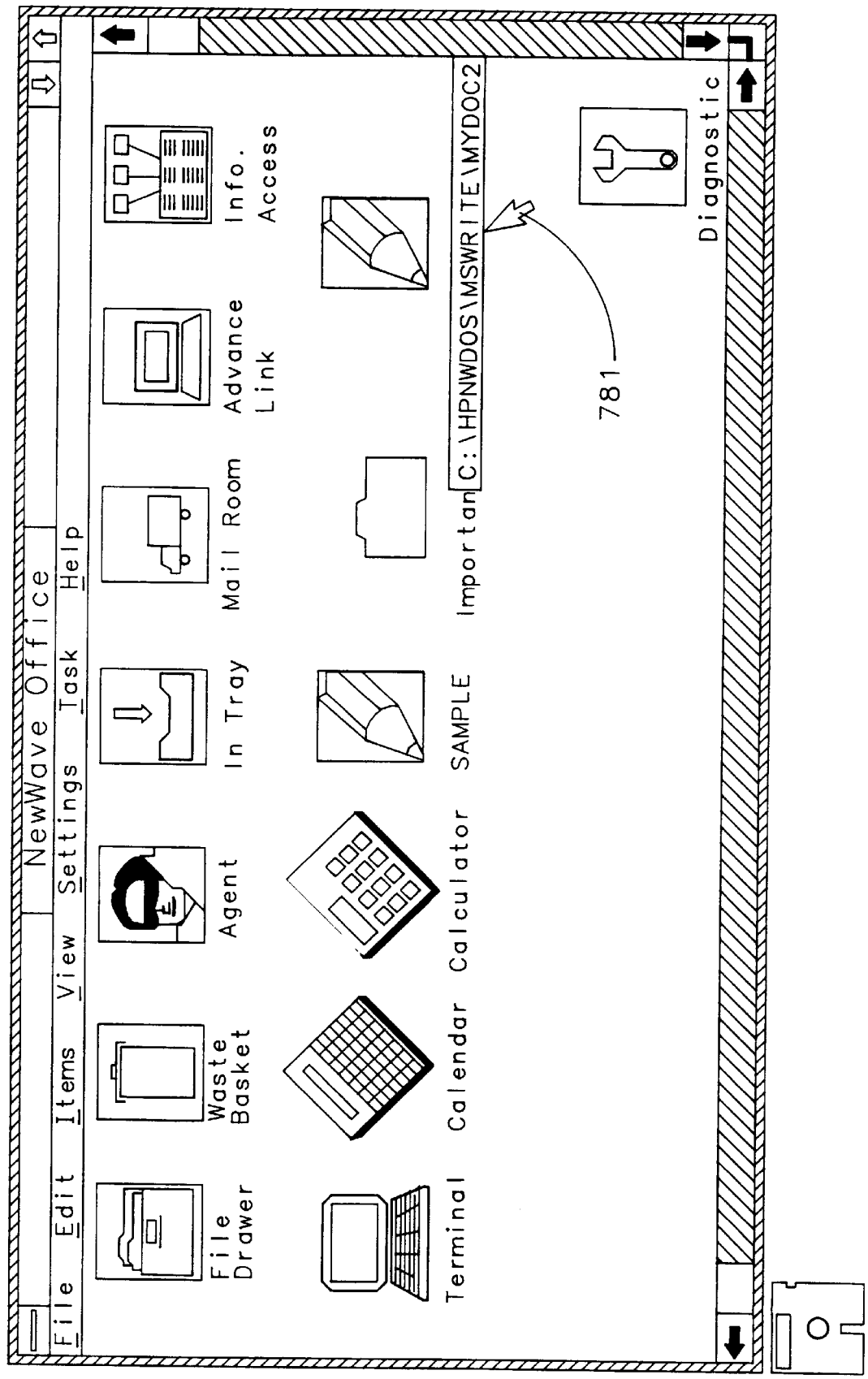
FIG. 115 shows a cursor placed over the name "MYDOC2" and clicking resulting in the full name "C:\HPNWDOS\MSWRITE\MYDOC2" appearing.

As shown in FIG. 115, placing cursor 781 over the name "MYDOC2" and clicking a button on mouse 20 results in the full name "C:\HPNWDOS\MSWRITE\MYDOC2" appearing. The location of the data file "MYDOC2" is in directory "C:\HPNWDOS\MSWRITE".

Figure 116:
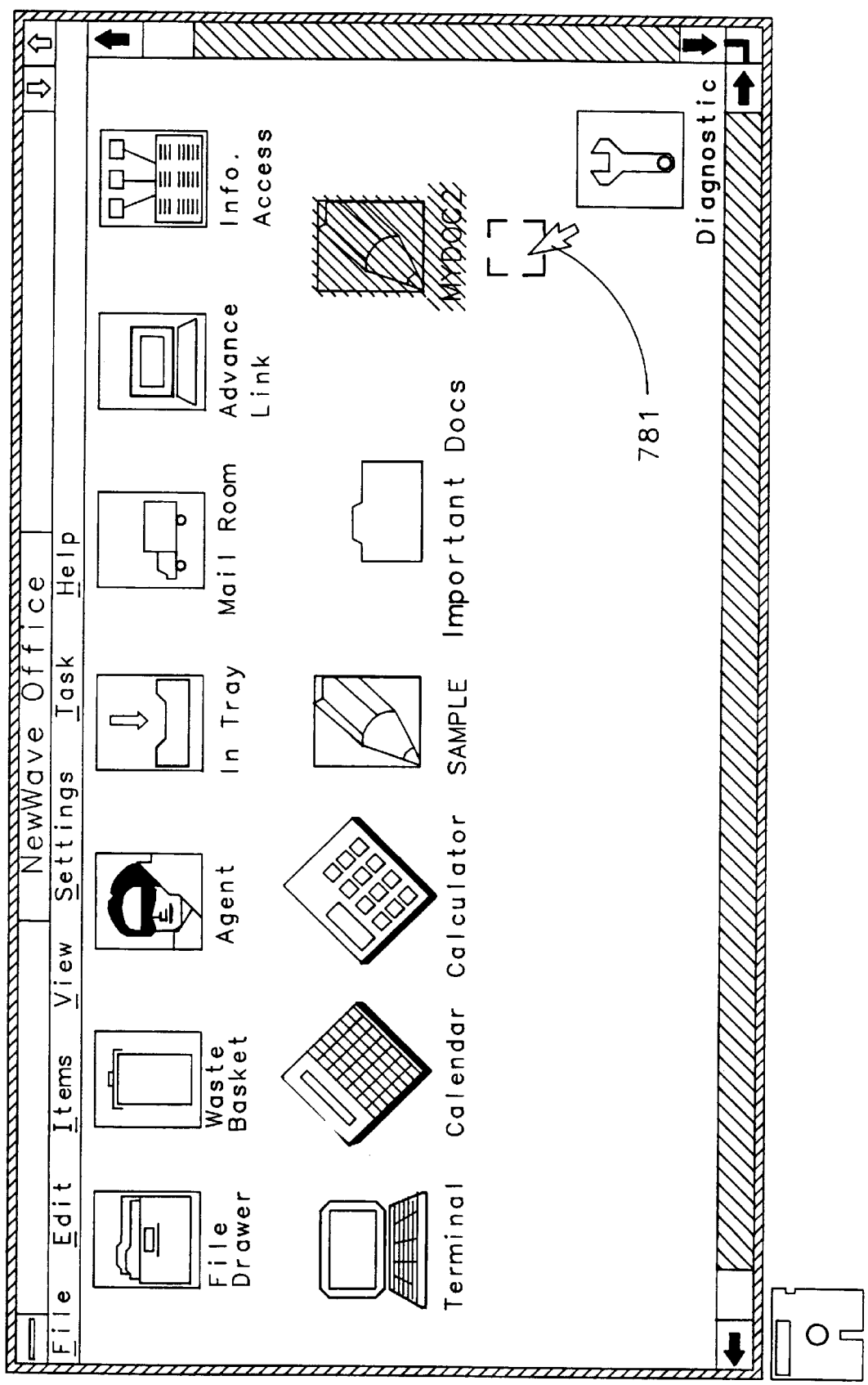
FIG. 116 illustrates a shorthand way of copying "MYDOC2."
Figure 117:
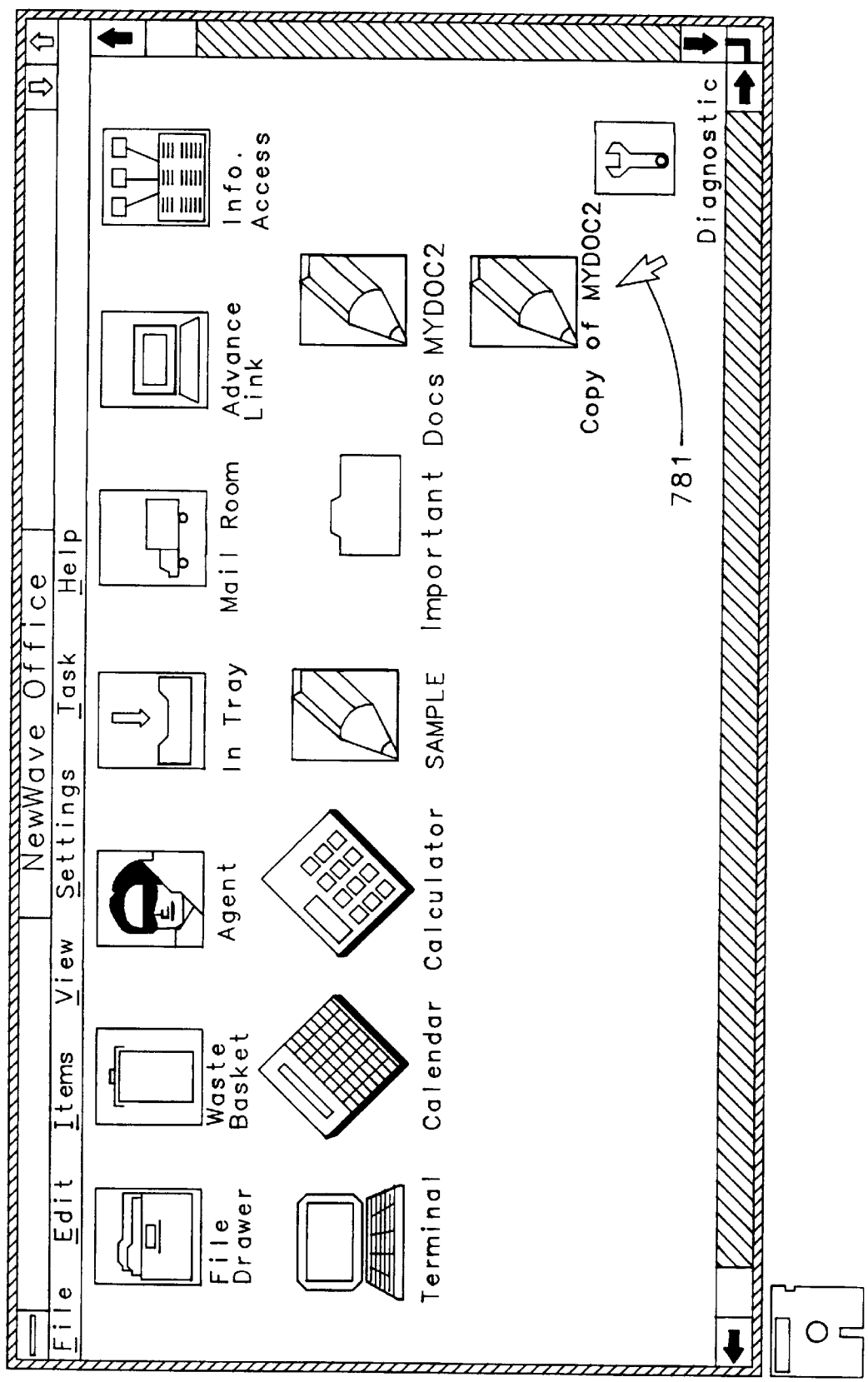
FIG. 117 shows the appearance of "Copy of: MYDOC2" on "NewWave Office."

As shown in FIG. 116, a shorthand way of copying "MYDOC2" is to place cursor 781 over "MYDOC2", depress and hold the "Ctrl" Key on the keyboard while simultaneously depressing a button on mouse 20 and dragging cursor 781 to another location. During this operation the icon for "MYDOC2" remains highlighted in black, rather than becoming gray as when "moved" or "opened". The result, shown in FIG. 117, is the appearance of "Copy of: MYDOC2" on "NewWave Office".

Figure 118:
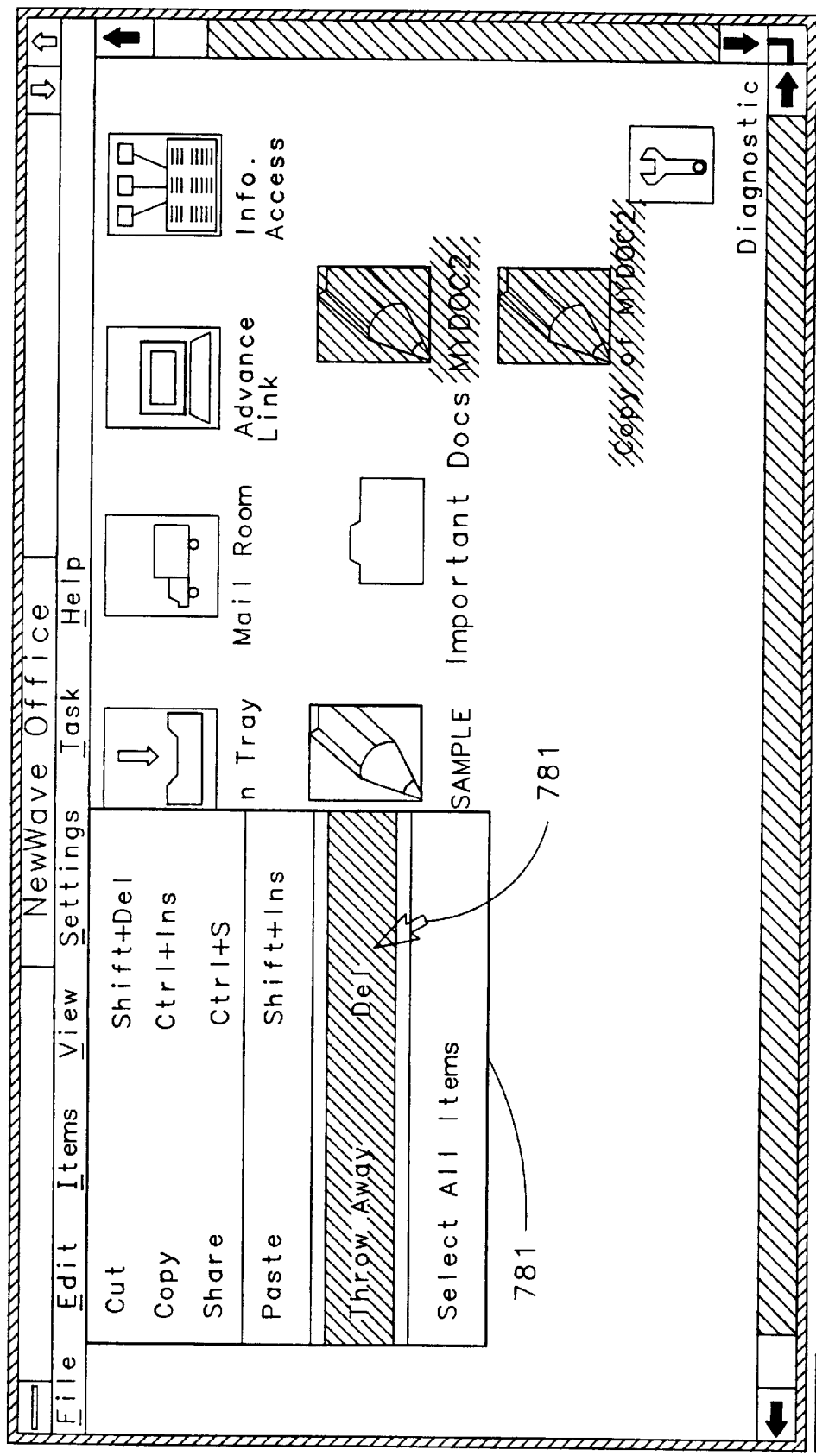
FIG. 118 shows object "MYDOC2" and "Copy of: MYDOC2" having been selected in preparation to be removed from the system by selecting command "Throw Away" in a pull down menu.

In FIG. 118 object "MYDOC2" and "Copy of: MYDOC2" have been selected. These items may be removed from the system by selecting command "Throw Away" in pull down menu 783 as shown.

Figure 119:
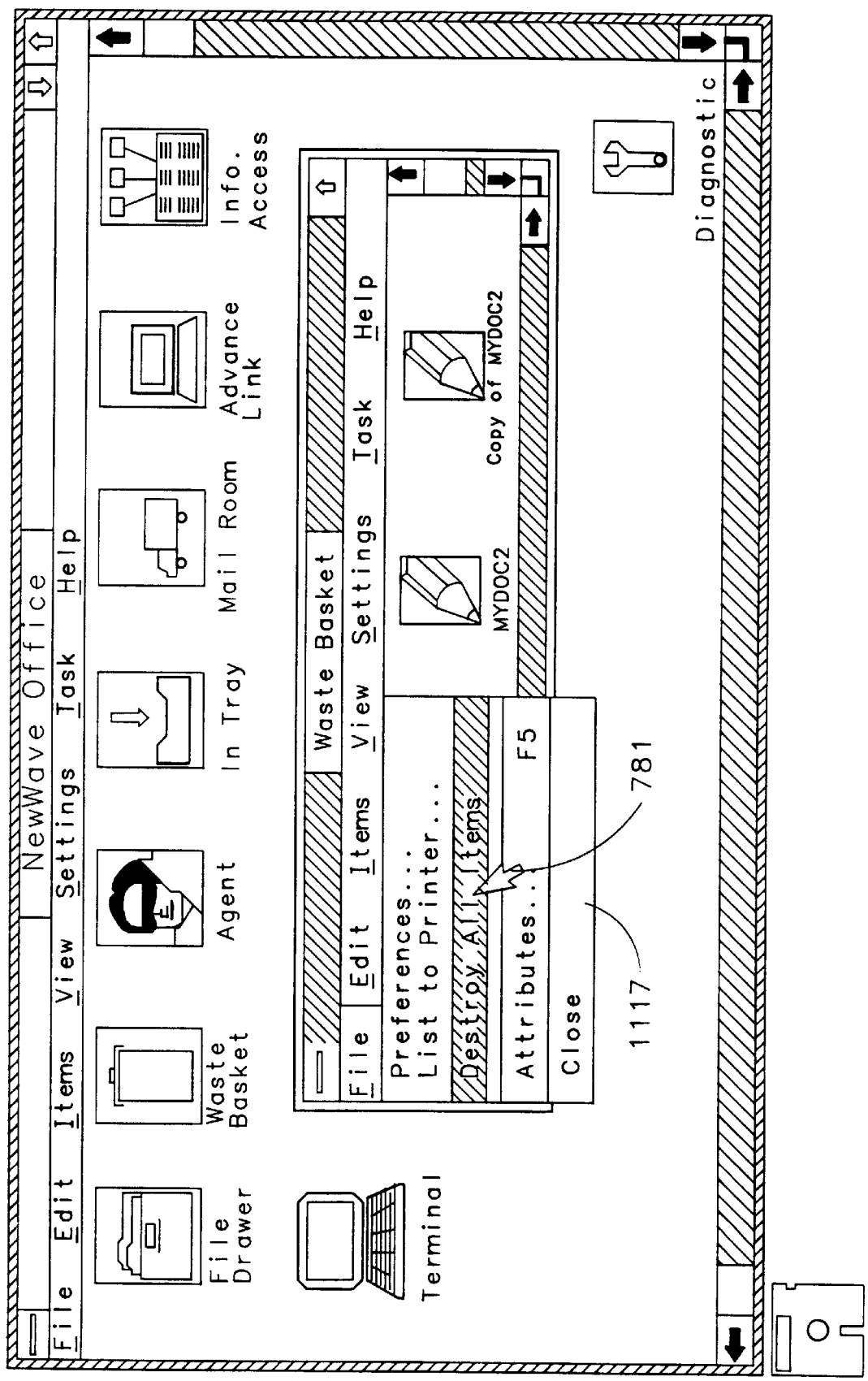
FIG. 119 shows a cursor used to select the command "Destroy All Items" in a pull down menu.
Figure 120:
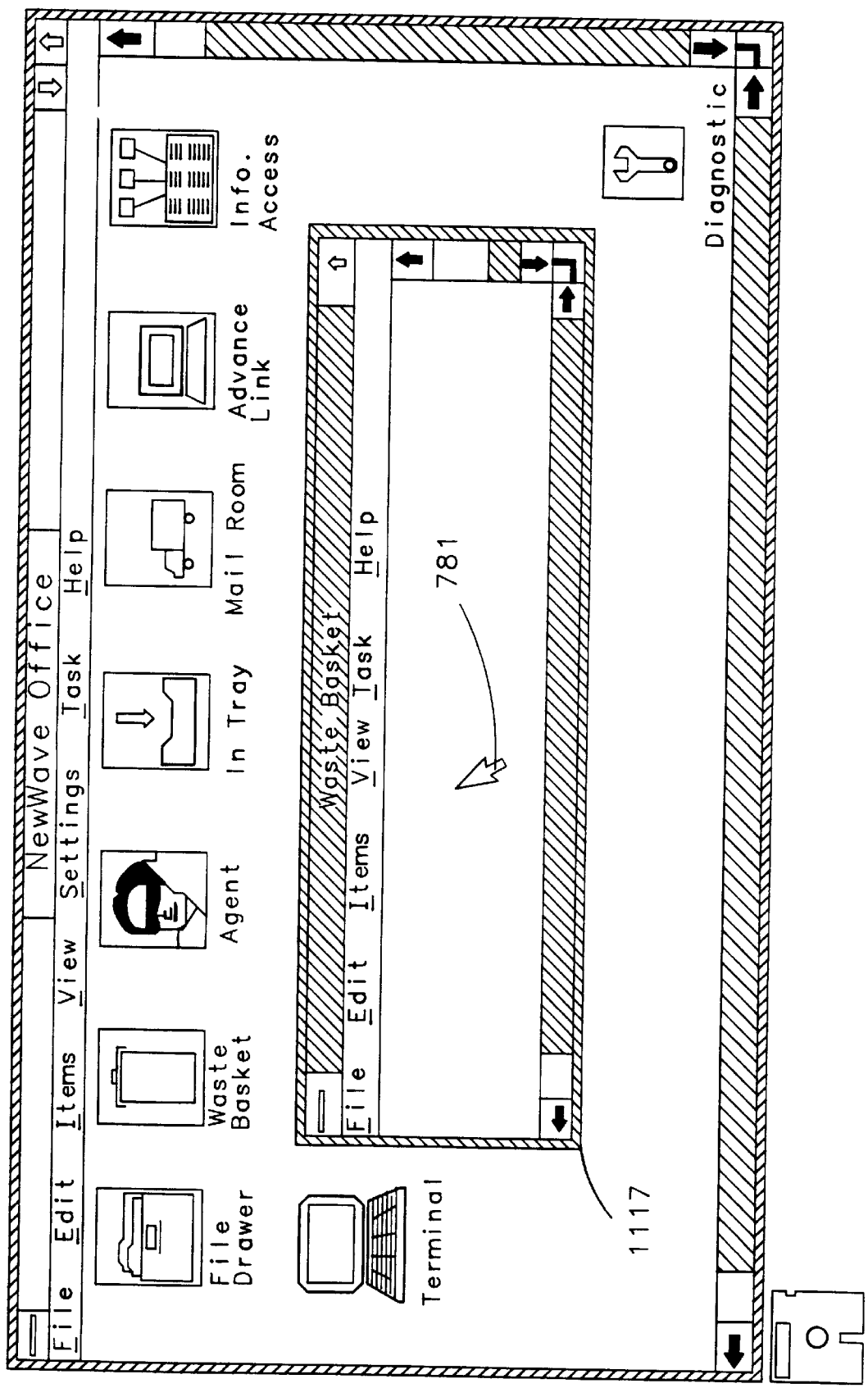
FIG. 120 shows results of the deletion of objects "MYDOC2" and "Copy of: MYDOC2."

In FIG. 119 cursor 781 is used to select the command "Destroy All Items" in pull down menu 1117. The result, shown in FIG. 120, is the deletion of objects "MYDOC2" and "Copy of: MYDOC2". In the case of "MYDOC2, the encapsulation shell deletes the file in the user file area. For "Copy of: MYDOC2", the OMF deletes the file in the OMF file area.

Figure 121A:
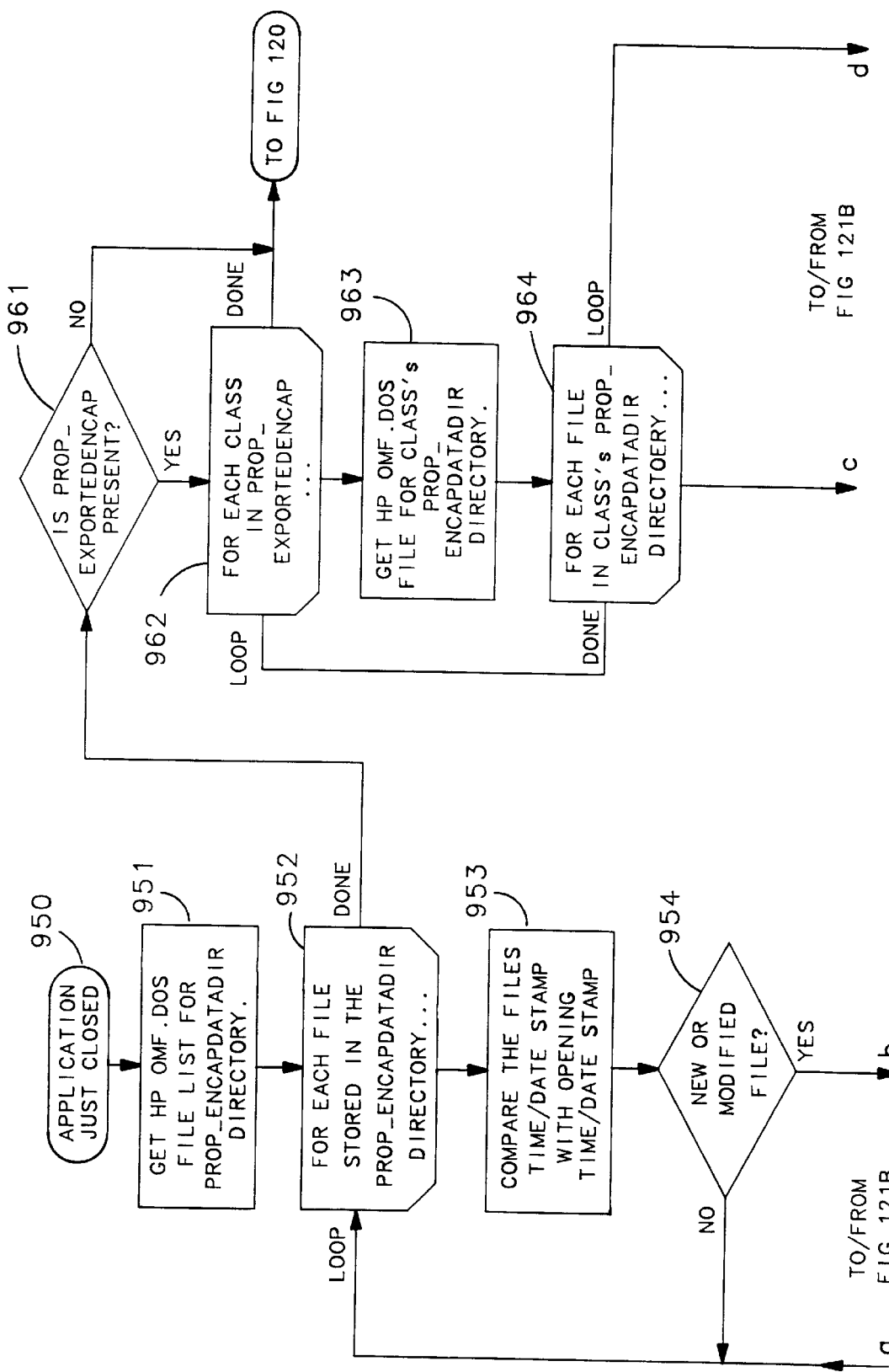
FIG. 121A, FIG. 121B and FIG 122 show a flowchart which describe the steps taken by the encapsulation shell when a program is closed.
Figure 121B:
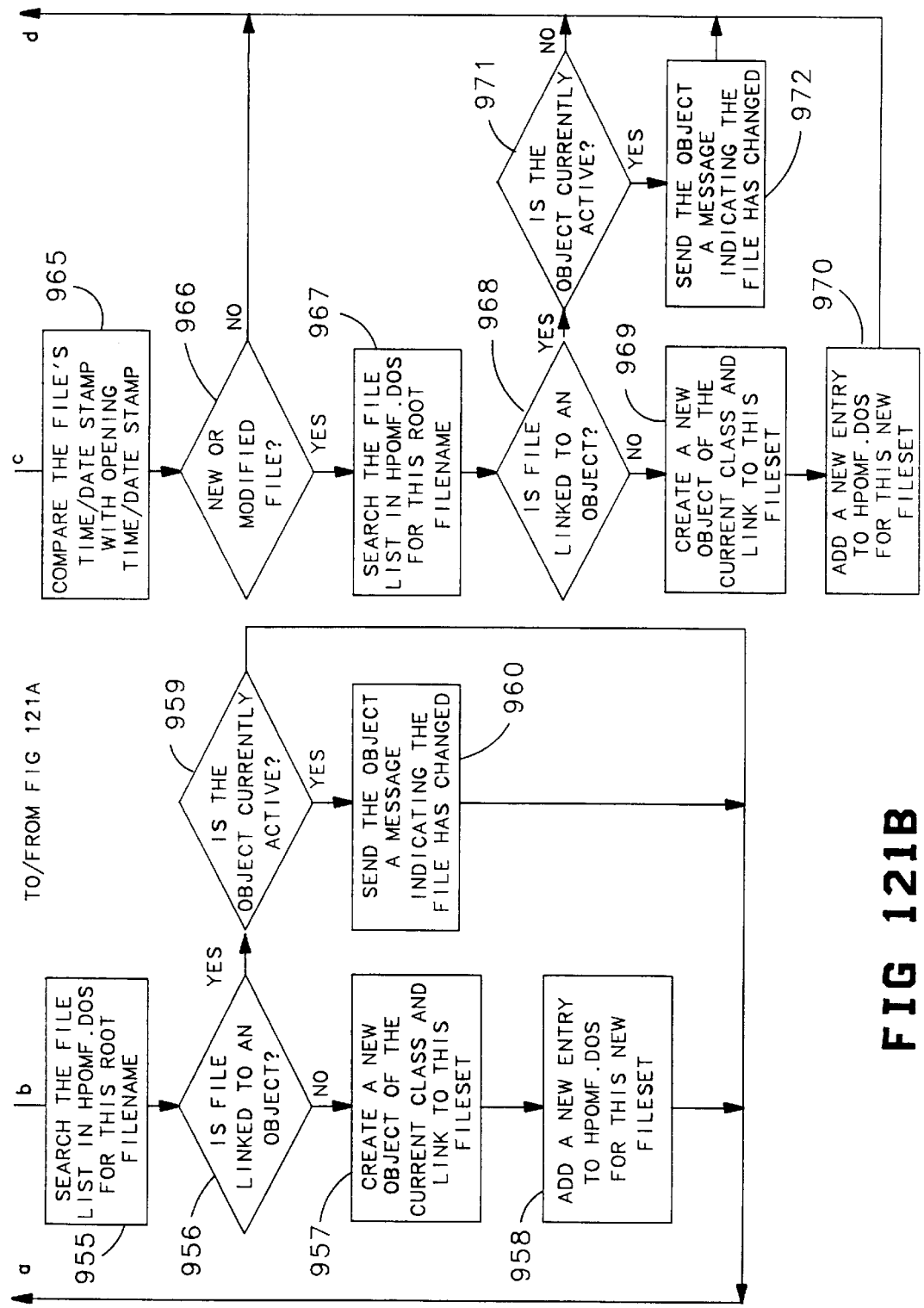
Figure 122:
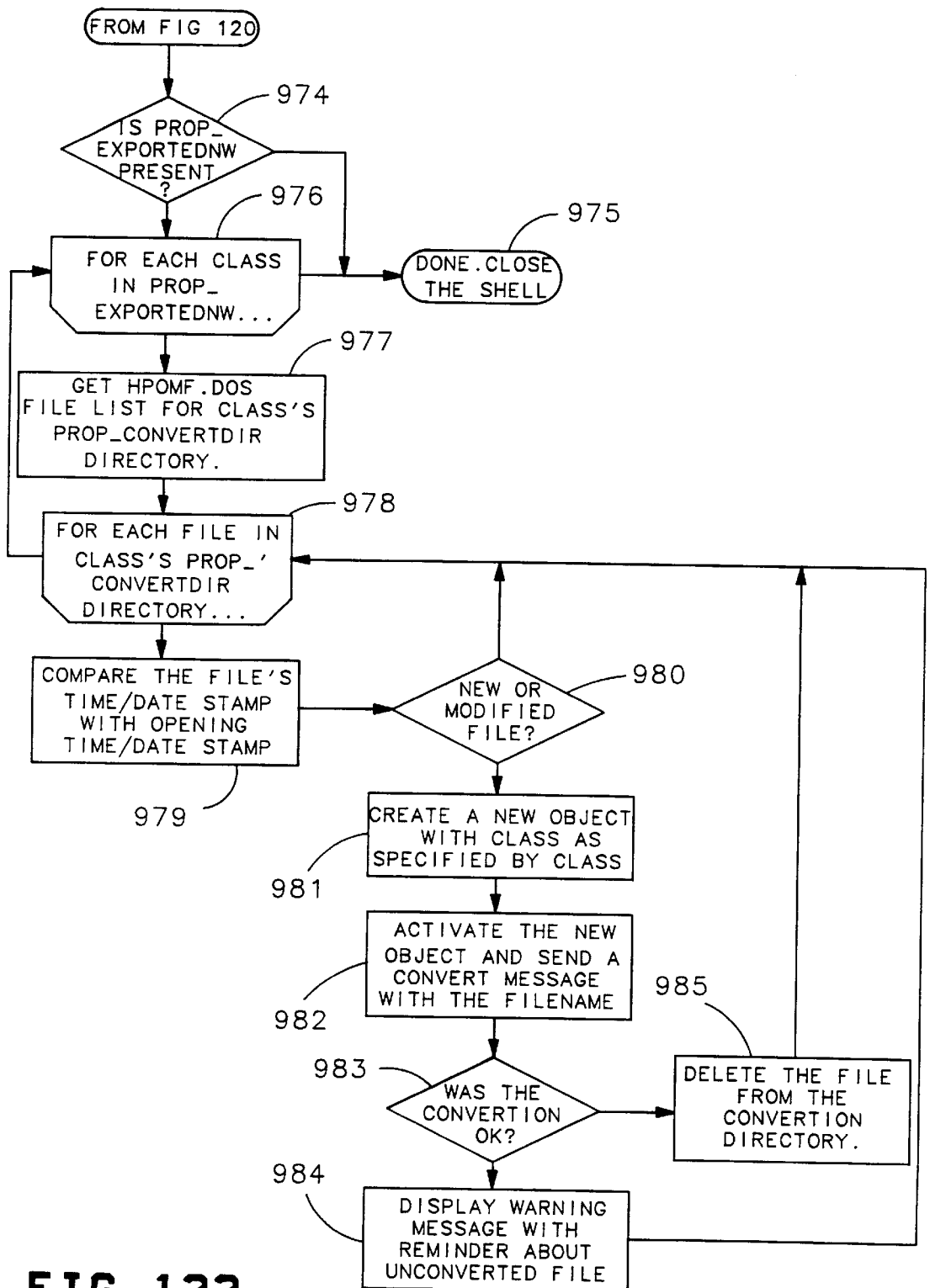

FIGS. 121A, 121B and 122 contain a flowchart which describe the steps taken by encapsulation shell 845 upon the closing of a current application. The program executed by encapsulation shell 845, described by the flowchart, is entered upon the closing of the current application, as indicated by a step 950.

Figure 144:
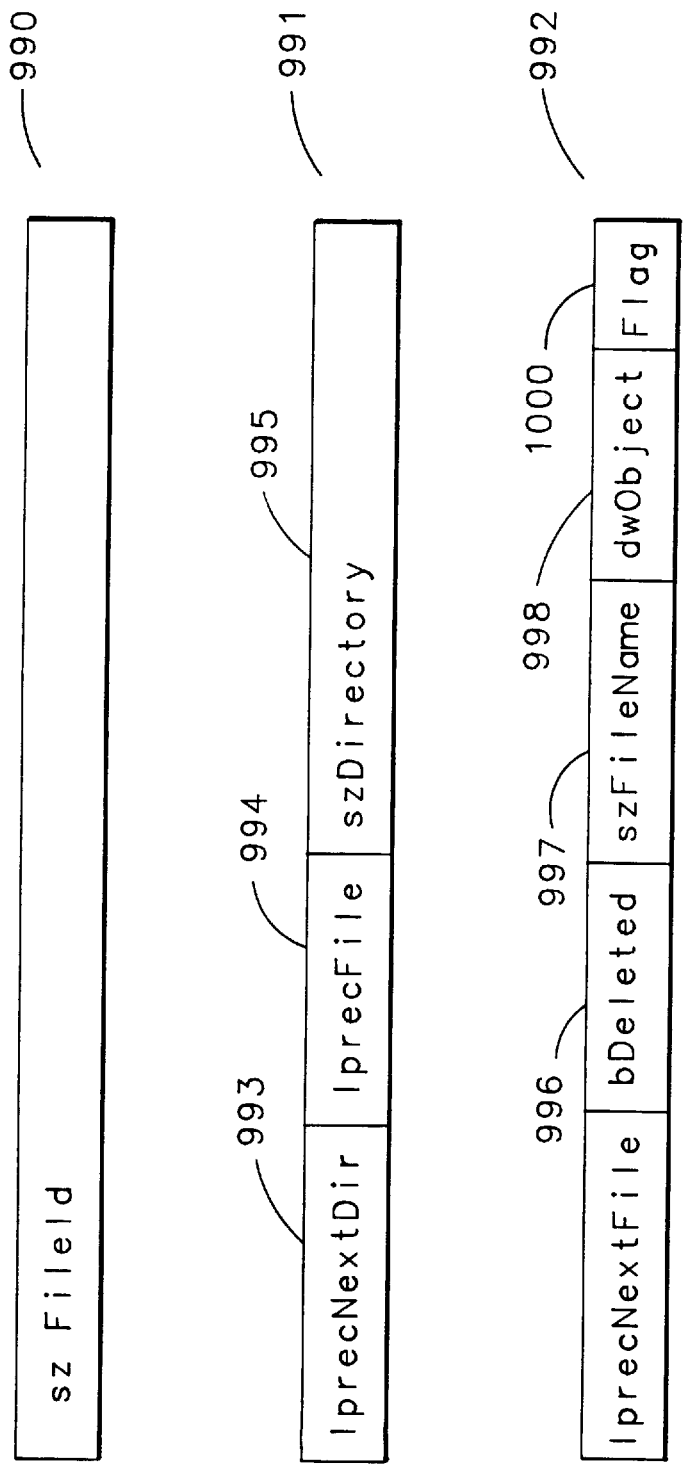
FIG. 144 shows the types of records within the file HPOMF.DOS in accordance with the preferred embodiment of the present invention.

In a step 951, a file HPOMF.DOS is accessed. HPOMF.DOS is a file accessed and maintained by encapsulation shell 845 to keep track of MS-DOS files. It provides the necessary information to map OMF objects to encapsulated files. HPOMF.DOS is further described herein in the discussion of FIGS. 144 and 145. Using HPOMF.DOS encapsulation shell 845 obtains the property "PROP_ENCAPDATADIR". Property "PROP_ENCAPDATADIR" is a class property which indicates the default directory where DOS files are placed for the particular application which belongs to the class. A step 952 begins a loop in which each file in the default directory indicated by "PROP_ENCAPDATADIR" is checked.

In the first operation of the loop, performed in a step 953 and a step 954, the time/date stamp of a file within the default directory is checked. If the time date stamp of the file is later than the time/date stamp at which the application was opened the file is considered to be either new or modified.

If the file is new or modified, in a step 955, the root of the file name is obtained (see FIG. 84B). All the files within the default directory which have the same file name as the file are considered part of the file's file set.

In a step 956 it is determined, using file HPOMF.DOS whether the file is linked to an object. If not, in a step 957, a new object of the class of the current application is created and linked to the file set of the file. Also, in a step 958, a new entry is added to HPOMF.DOS for the file set (see FIG. 145).

If the file is already linked to an object, in a step 959, it is determined whether the object is active. If the file is active, in a step 960, the object is sent a message indicating that the file has changed.

Once the loop beginning at step 952 is complete, the class property "PROP_EXPORTEDENCAP" for the current application is checked in a step 961. The property "PROP_EXPORTEDENCAP", if it exists for the current application, contains a list of classes of encapsulated applications other than the current application. The purpose of listing these applications is so that the default directory where each of these encapsulated applications store DOS files may be checked.

A step 962 begins a loop in which the default directory for each encapsulated application listed in "PROP_EXPORTEDENCAP" is checked. In the first operation of the loop, performed in a step 963, the HPOMF.DOS file is accessed to obtain the identity of the default directory for each encapsulated application. It is included in the class property "PROP_ENCAPDATADIR" for that encapsulated application.

Once the class property "PROP_ENCAPDATADIR" has been obtained for a particular encapsulated application, another loop is entered beginning at a step 964. In this loop each file in the default directory specified by "PROP_ENCAPDATADIR" for the particular encapsulated application is checked.

In the first operation of the loop, performed in a step 965 and a step 966, the time/date stamp of a file within the default directory is checked. If the time date stamp of the file is later than the time/date stamp at which the application was opened the file is considered to be either new or modified.

If the file is new or modified, in a step 967, the root of the file name is obtained (see FIG. 84B). All the files within the default directory which have the same file name as the file are considered part of the file's file set.

In a step 968 it is determined, using file HPOMF.DOS whether the file is linked to an object. If not, in a step 969, a new object of the class of the current application is created and linked to the file set of the file. Also, in a step 970, a new entry is added to HPOMF.DOS for the file set (see FIG. 145).

If the file is already linked to an object, in a step 971, it is determined whether the object is active. If the file is active, in a step 972, the object is sent a message indicating that the file has changed.

Once the loop beginning at step 962 is complete, the class property "PROP_EXPORTEDNW" is checked in a step 974. The property "PROP_EXPORTEDNW", if it exists for the current application, contains a list of classes of true NewWave applications which are able to convert file generated by the current application into file usable by the NewWave application.

A step 977 begins a loop in which a conversion directory of each NewWave application listed in "PROP_EXPORTEDNW" is checked. In the first operation of the loop, performed in a step 977, the HPOMF.DOS file is accessed to obtain the file list within the current conversion directory.

Once the file list for a conversion directory has been obtained for a particular NewWave application, another loop is entered beginning at a step 978. In this loop each file in the conversion directory is checked.

In the first operation of the loop, performed in a step 979 and a step 9980, the time/date stamp of a file within the conversion directory is checked. If the time date stamp of the file is later than the time/date stamp at which the application was opened the file is considered to be either new or modified.

If the file is new or modified, in a step 981, a new object is created—of the class of the NewWave application—which references the file. In a step 982, encapsulation shell 845 activates the newly created object and sends the object a "Convert" message with the name of the file.

In a step 983, encapsulation shell 845 checks to see whether the conversion was successful. If the conversion was not successful, in a step 984, encapsulation shell displays a warning message to the user with a reminder that the unconverted file still exists in the conversion directory. If the conversion was successful, in a step 985, encapsulation shell 845 deletes the file from the conversion directory.

Once all the conversions are complete, encapsulation shell 845 is closed in a step 975. The following discussion indicate how the above-described closing of an application appears to a user.

Figure 123:
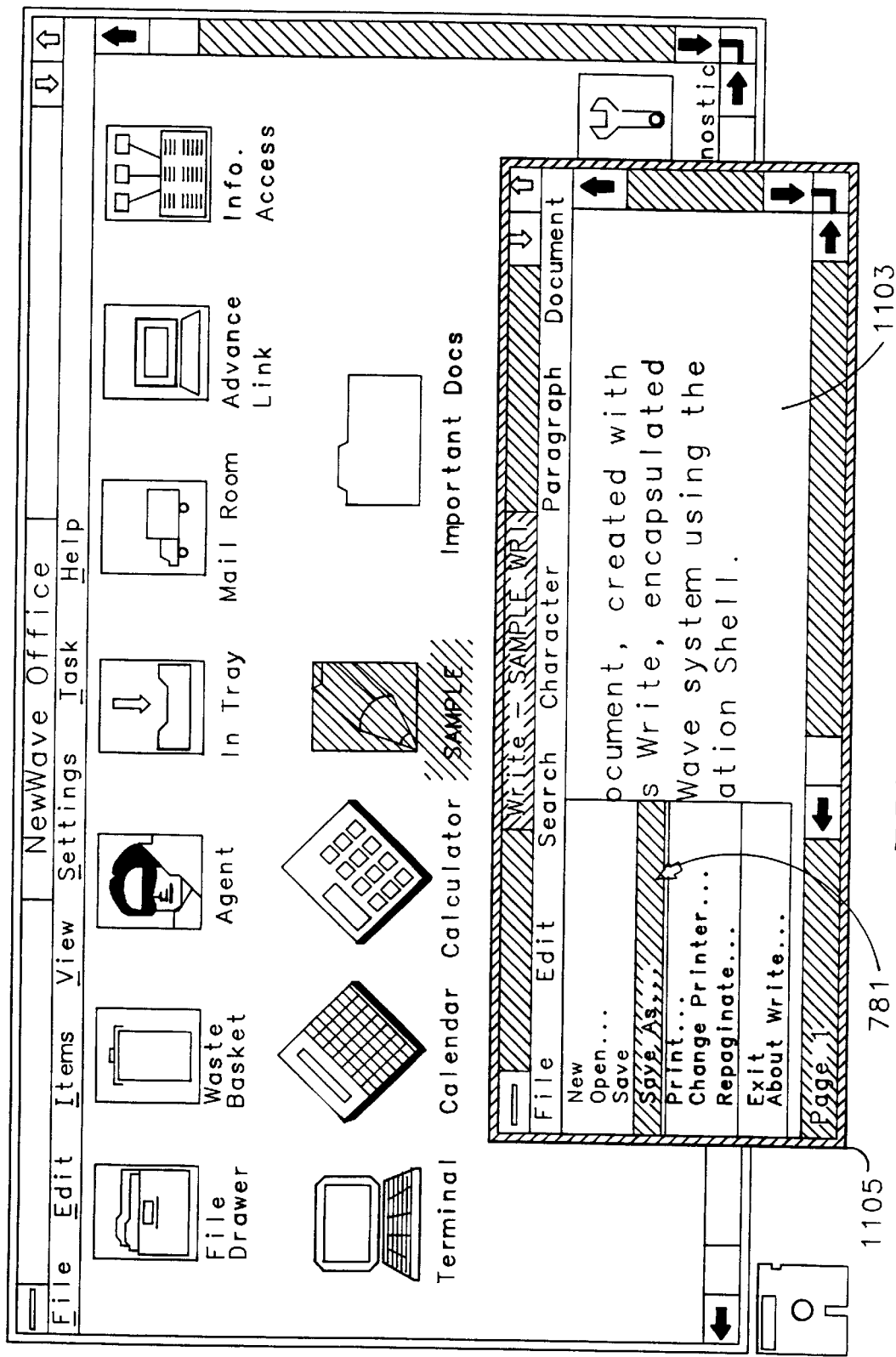
FIG. 123 shows an object "SAMPLE" having been opened and the application "Write" running, displaying data from file "C:\HPNWDOS\MSWRITE\SAMPLE.WRI" in a window.
Figure 124:
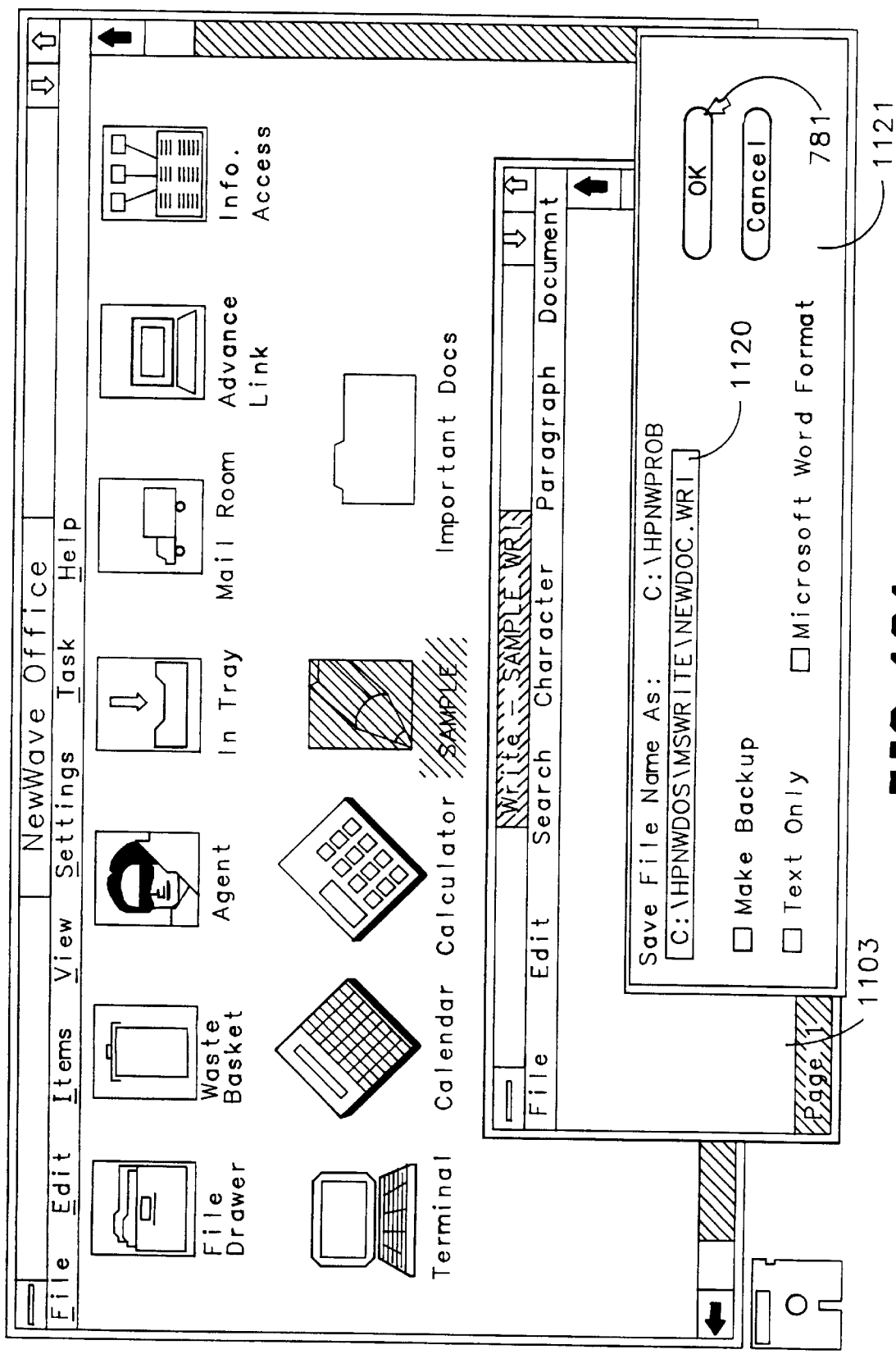
FIG. 124 shows a file name within the default directory having typed into a region of a dialog box.
Figure 125:
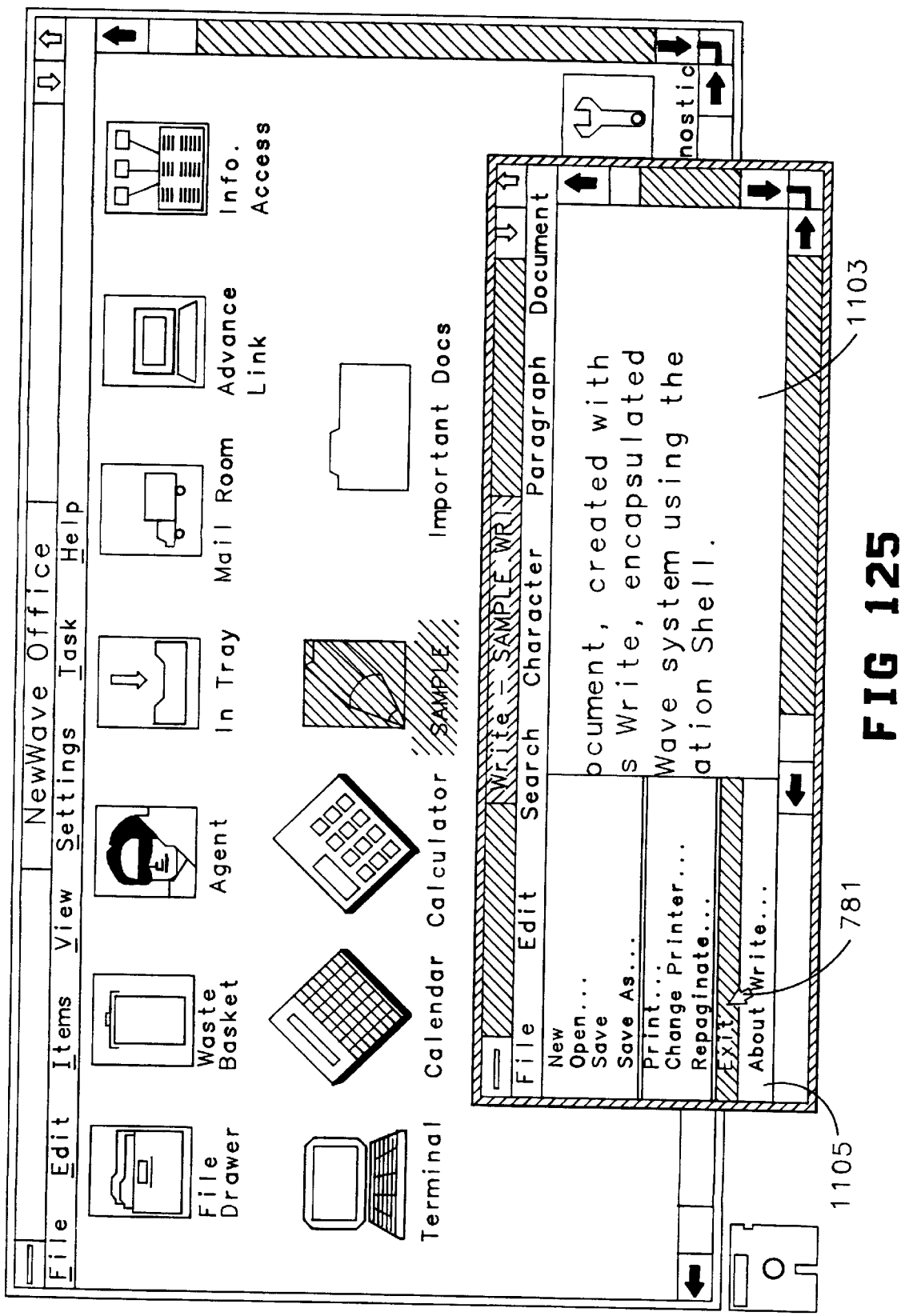
FIG. 125 shows a new file having been made but no new object appearing.
Figure 126:
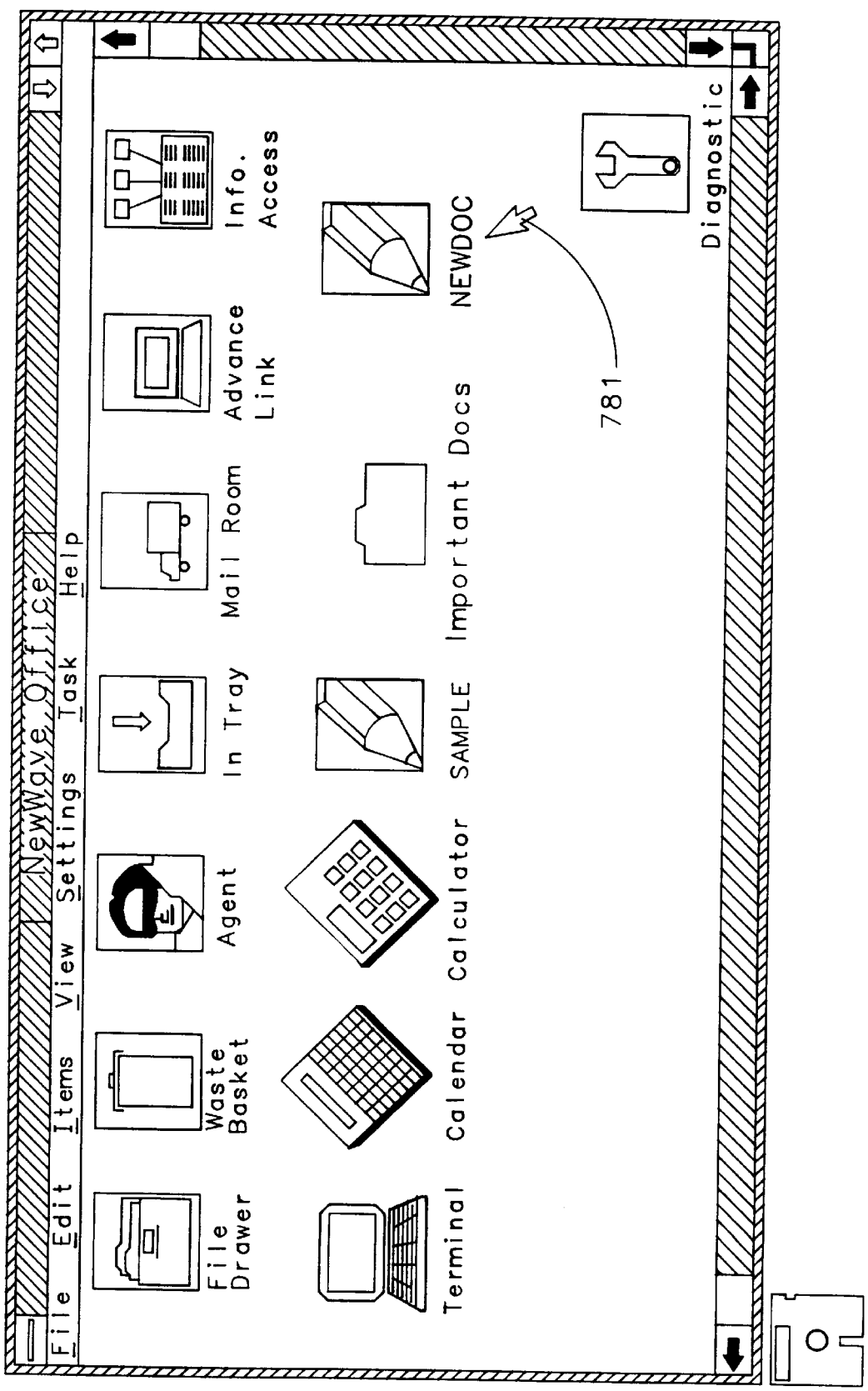
FIG. 126 shows an icon bearing the name "NEWDOC" appearing on "NewWave Office."

A copy of a file may be created within an application. In FIG. 123 object "SAMPLE" has been opened and the application "Write" is running, displaying data from file "C:\HPNWDOS\MSWRITE\SAMPLE.WRI" in window 1103. Cursor 781 is used to select the command "Save As" from pull down menu 1105. In FIG. 124 a file name within the default directory is typed into region 1120 of dialog box 1121. After selecting the region labelled "OK" using cursor 781 a new file is made. This file however does not have an associated object because OMF 100 has not monitored the creation of the new file. Therefore, in FIG. 125, no new object has appeared. After using cursor 781 to select the command "Exit" from pull down menu 1105, window 1103 is shut. As described above, upon termination, encapsulation shell 845 searches the default referenced file area for the encapsulated application—in this case subdirectory 861— and compares a timestamp of each file with the recorded start time of the encapsulated application. If a new file is located and that file is not already referenced by an object encapsulation shell 845 automatically creates a new object of the same class as encapsulation shell 845. In this case object "NEWDOC" is found, an object is created, and a icon bearing the name "NEWDOC" appears on "NewWave Office" as shown in FIG. 126 and pointed to by cursor 781.

Figure 127:
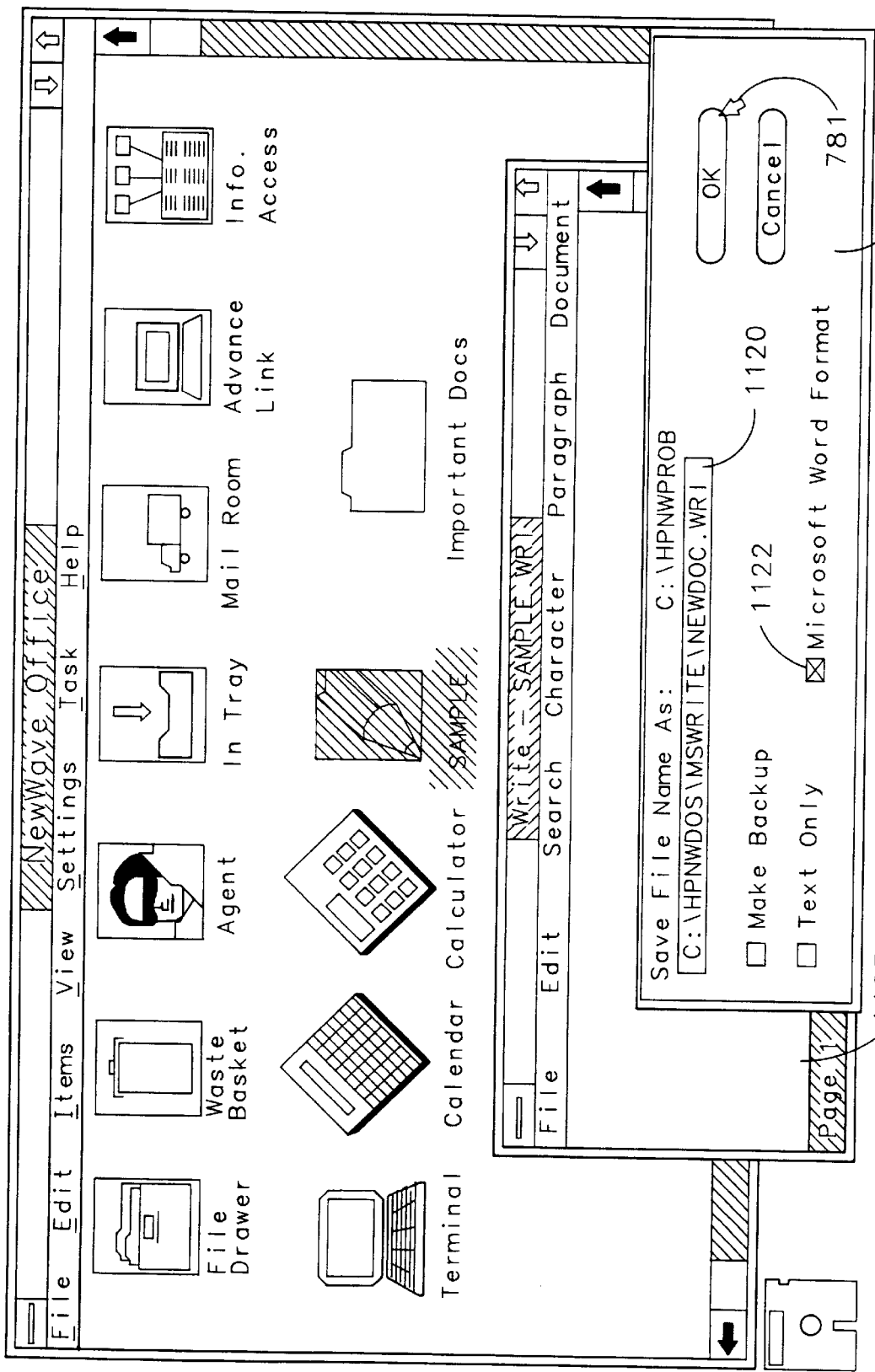
FIG. 127 shows an object "SAMPLE" having been opened in a window.

In FIG. 127, object "SAMPLE" has been opened in window 1103. In saving the file, a box 1122 in window 1121 has been checked. This causes the file to be saved in MS Word format. As seen in region 1120, the file is saved in directory "C:\HPNWDOS\MSWORD" rather than "C:\HPNWDOS\MSWRITE". As discussed above, if specified by configuration properties 847, at termination time other subdirectories within subdirectory 852 which represent other encapsulated classes may be searched for files which have a timestamp later than the recorded start time of the encapsulated application. Encapsulation shell 845 may then create objects of the appropriate class for these files. The objects which represent the new files have associated with them new icons when the application is closed.

Figure 128:
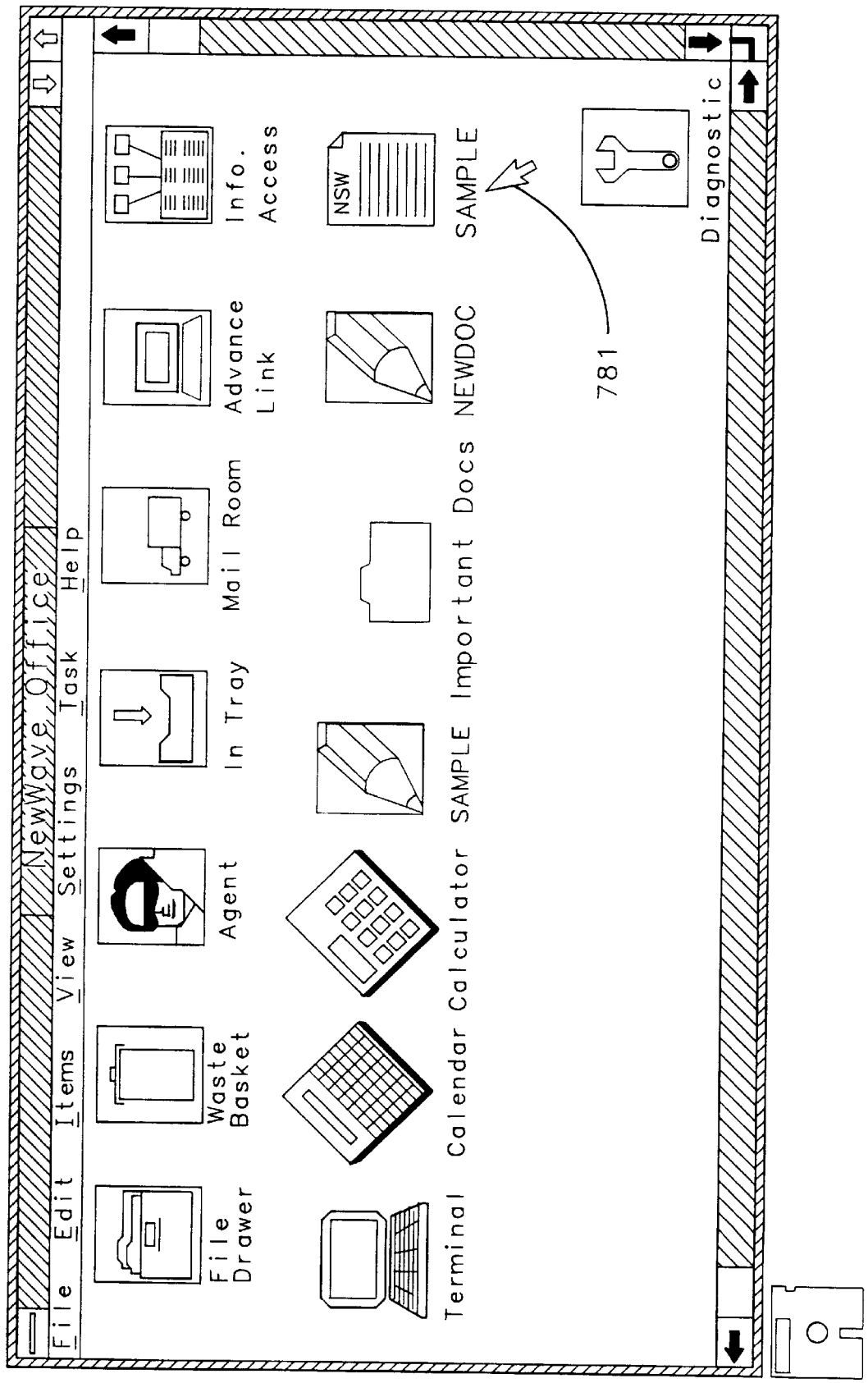
FIG. 128 shows a new object of the class for "MSWORD" having created and an icon named "SAMPLE" being displayed in the window for "NewWave Office."

In the present case directories "C:\HPNWDOS\MSWORD" (subdirectory 860) and "C:\HPNWDOS\MSWRITE" (subdirectory 861) are searched and a new copy of SAMPLE in directory "C:\HPNWDOS\MSWORD" is found. A new object of the class for "MSWORD" is created and an icon named "SAMPLE" is displayed in the window for "NewWave Office" as shown in FIG. 128 and pointed to by cursor 781. The shape of the icon indicates that the new object "SAMPLE" is associated with the object class for "MS Word" rather than for "MS Write".

Figure 129:
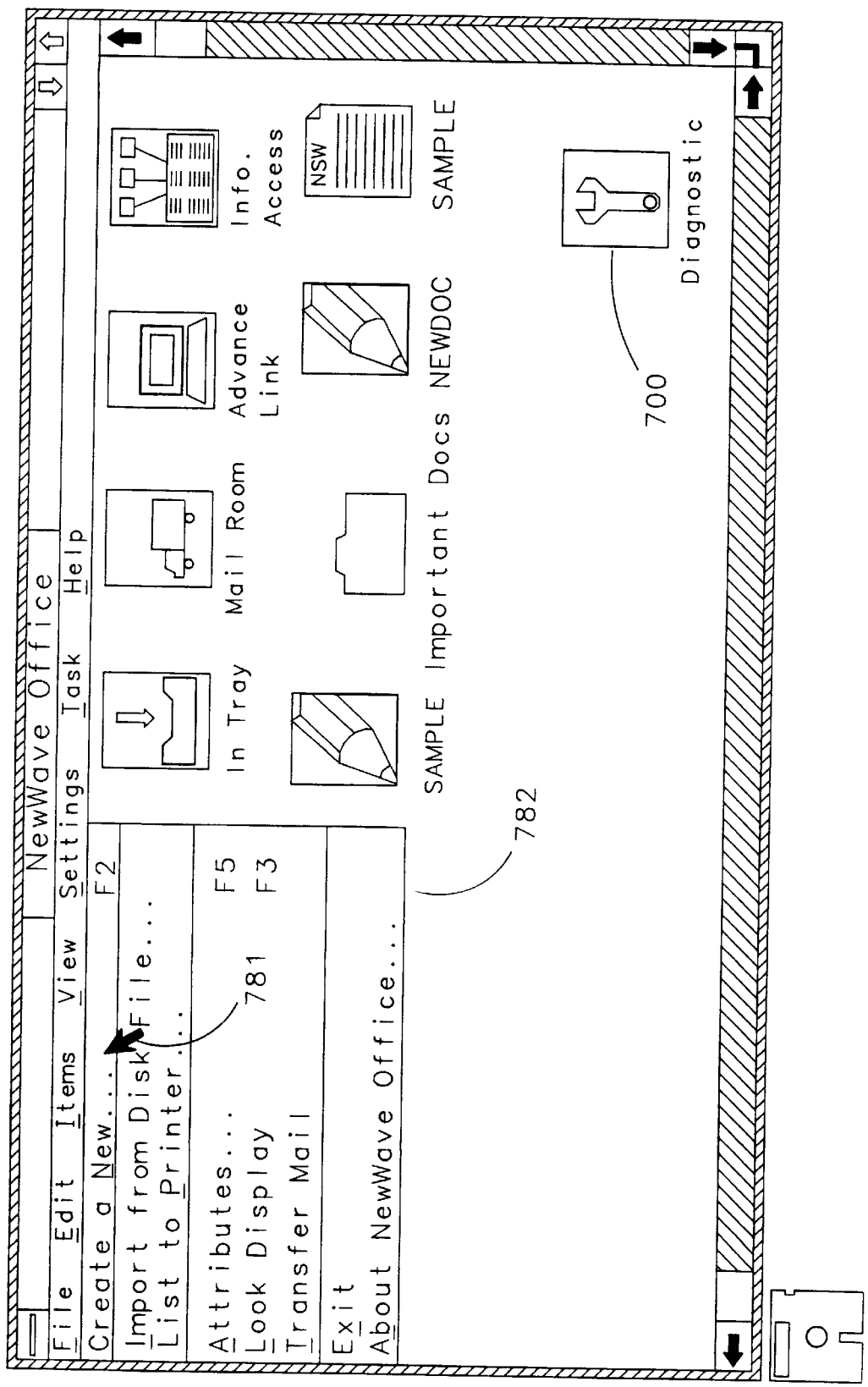
FIG. 129 shows the command "Create a New" in a pull down menu being selected using a cursor.
Figure 130:
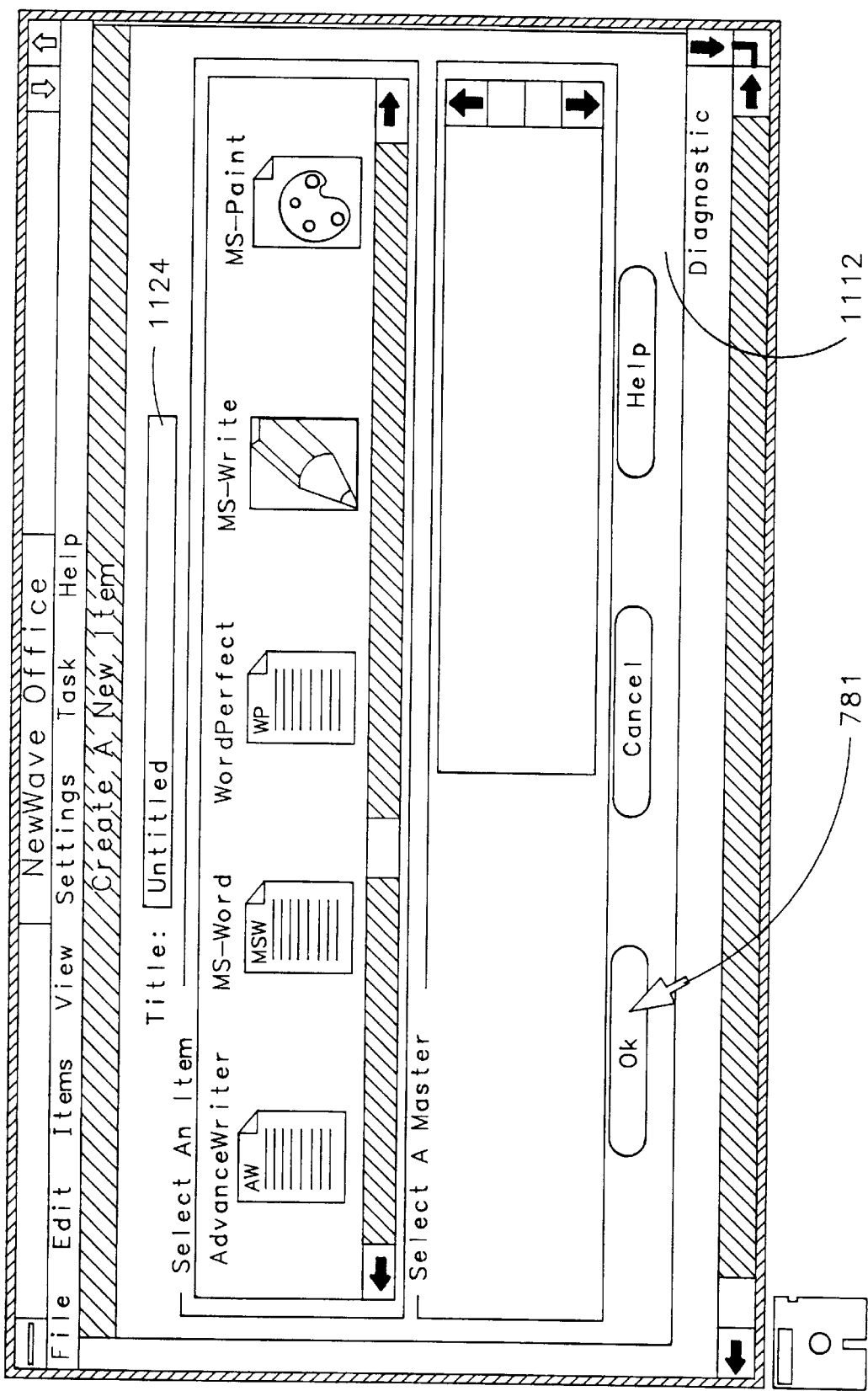
FIG. 130 shows the name "DEMODOC1" typed into a region in a window, and the icon "AdvanceWrite" having been highlighted.
Figure 131:
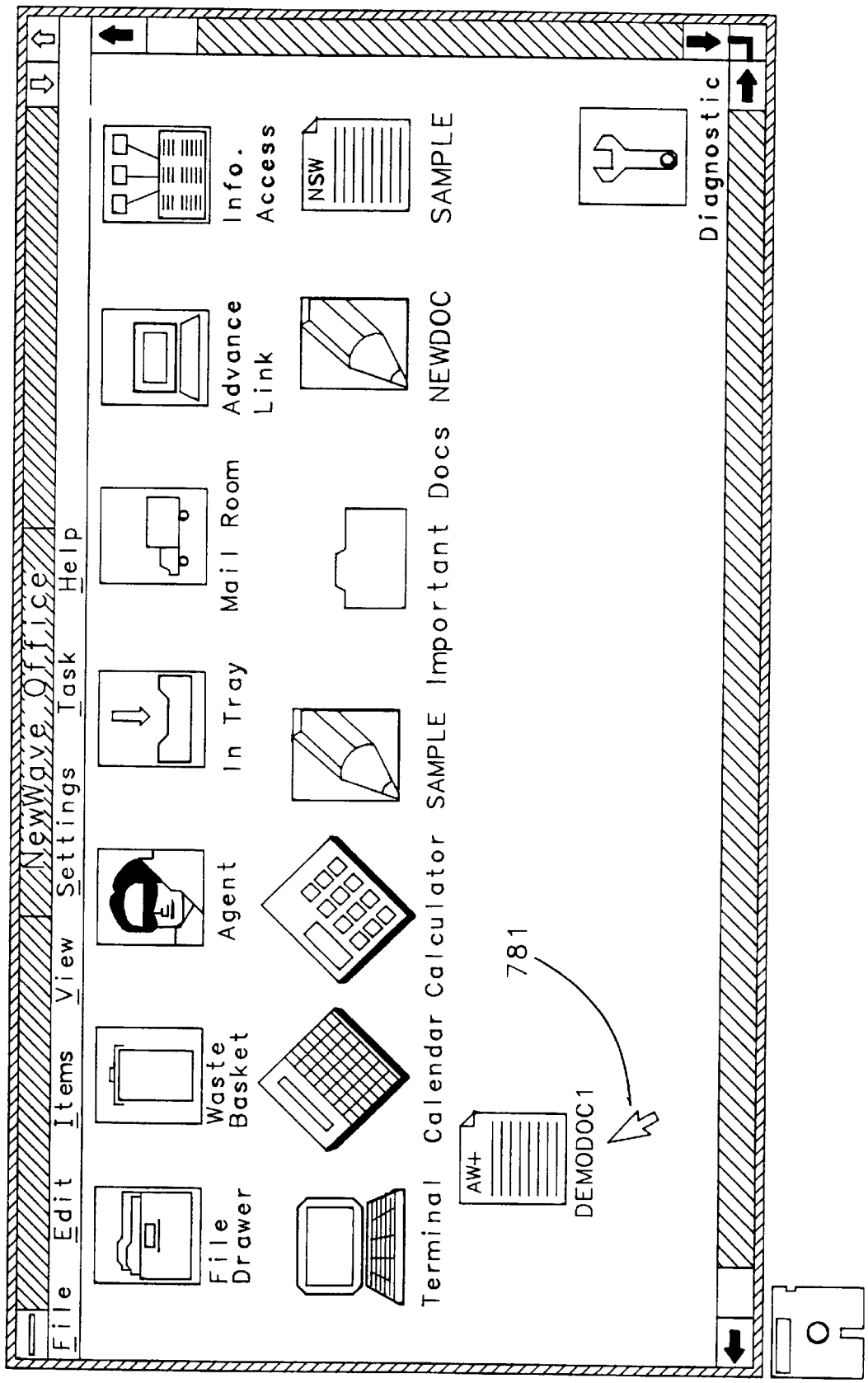
FIG. 131 shows the creation of an object "DEMODOC1."
Figure 132:
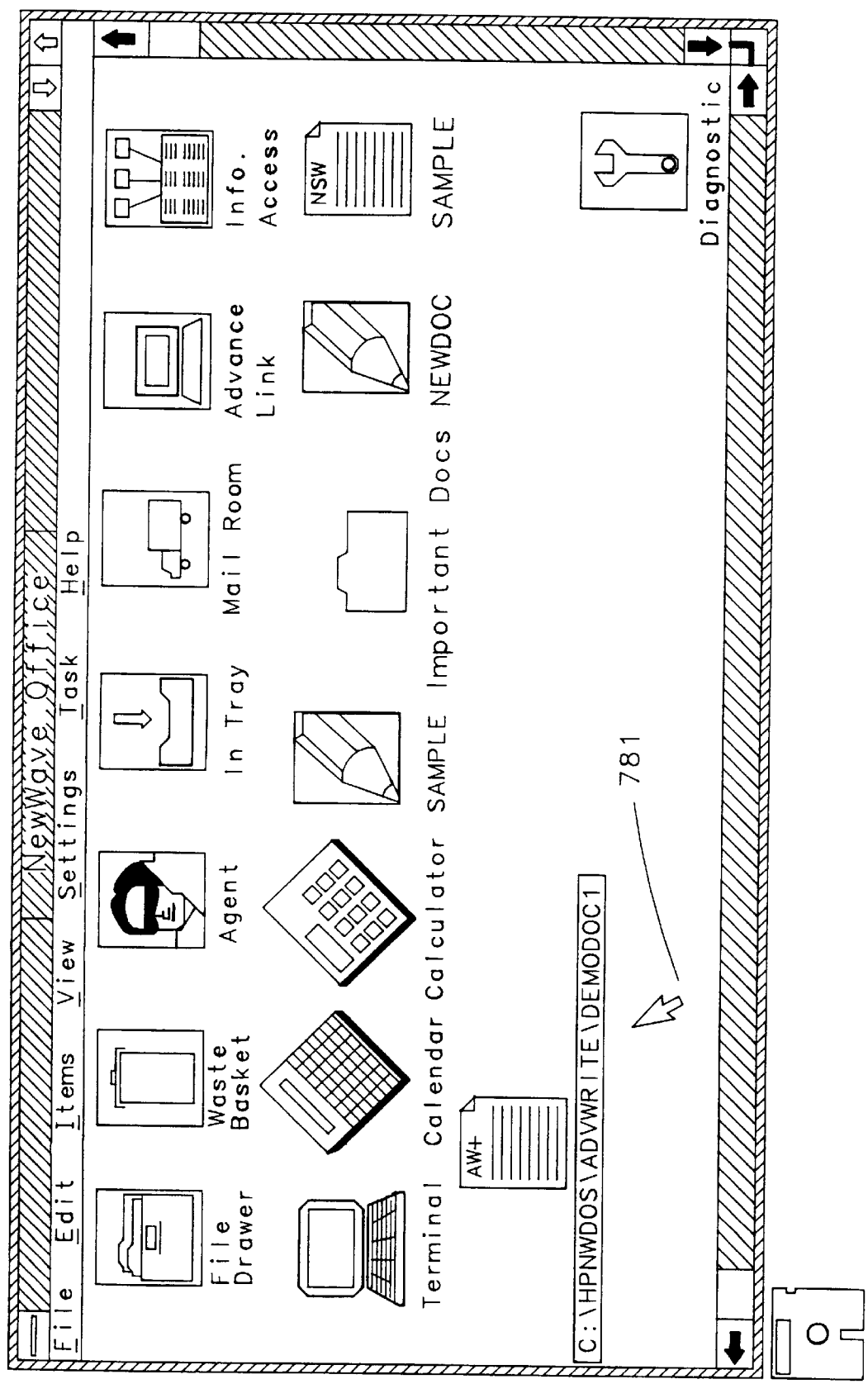
FIG. 132 shows that "DEMODOC1" appears in directory "C:\HPNWDOS\ADVWRITE."
Figure 133:
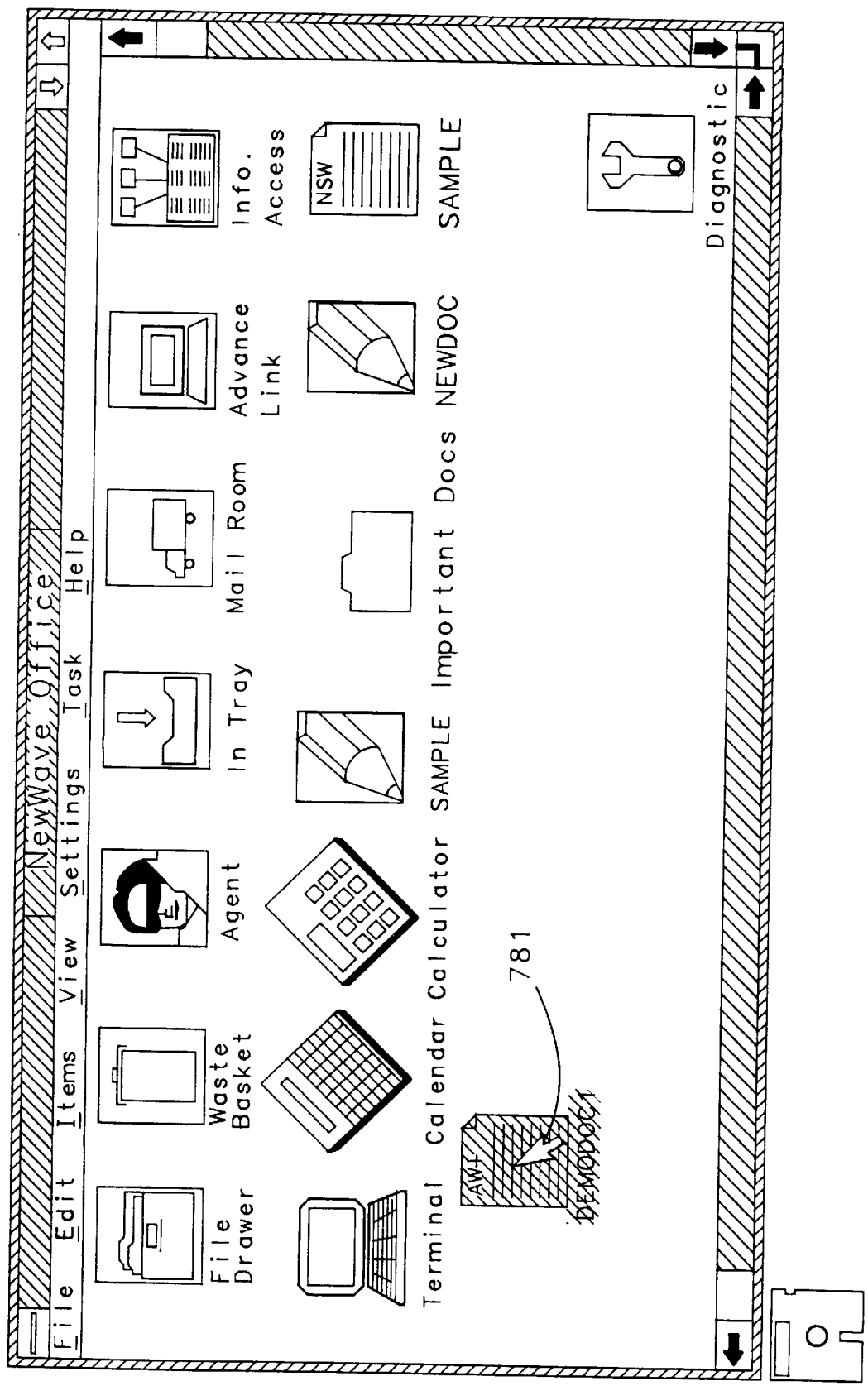
FIG. 133 shows selection of "DEMODOC1" for opening.

In FIG. 129 the command "Create a New" in pull down menu 782 is selected using cursor 781. In FIG. 130 the name "DEMODOC1" is typed into region 1124 in window 1112, and the icon "AdvanceWrite" has been highlighted. The result, shown in FIG. 131, is the creation of an object "DEMODOC1" as pointed to by cursor 781. In FIG. 132, it is shown that "DEMODOC1" appears in directory "C:\HPNWDOS\ADVWRITE". Pointing to icon "DEMODOC1" with cursor 781 and clicking twice on a button of mouse 20, as shown in FIG. 133, results in the opening of "AdvanceWrite" in FIG. 133.

Figure 134:
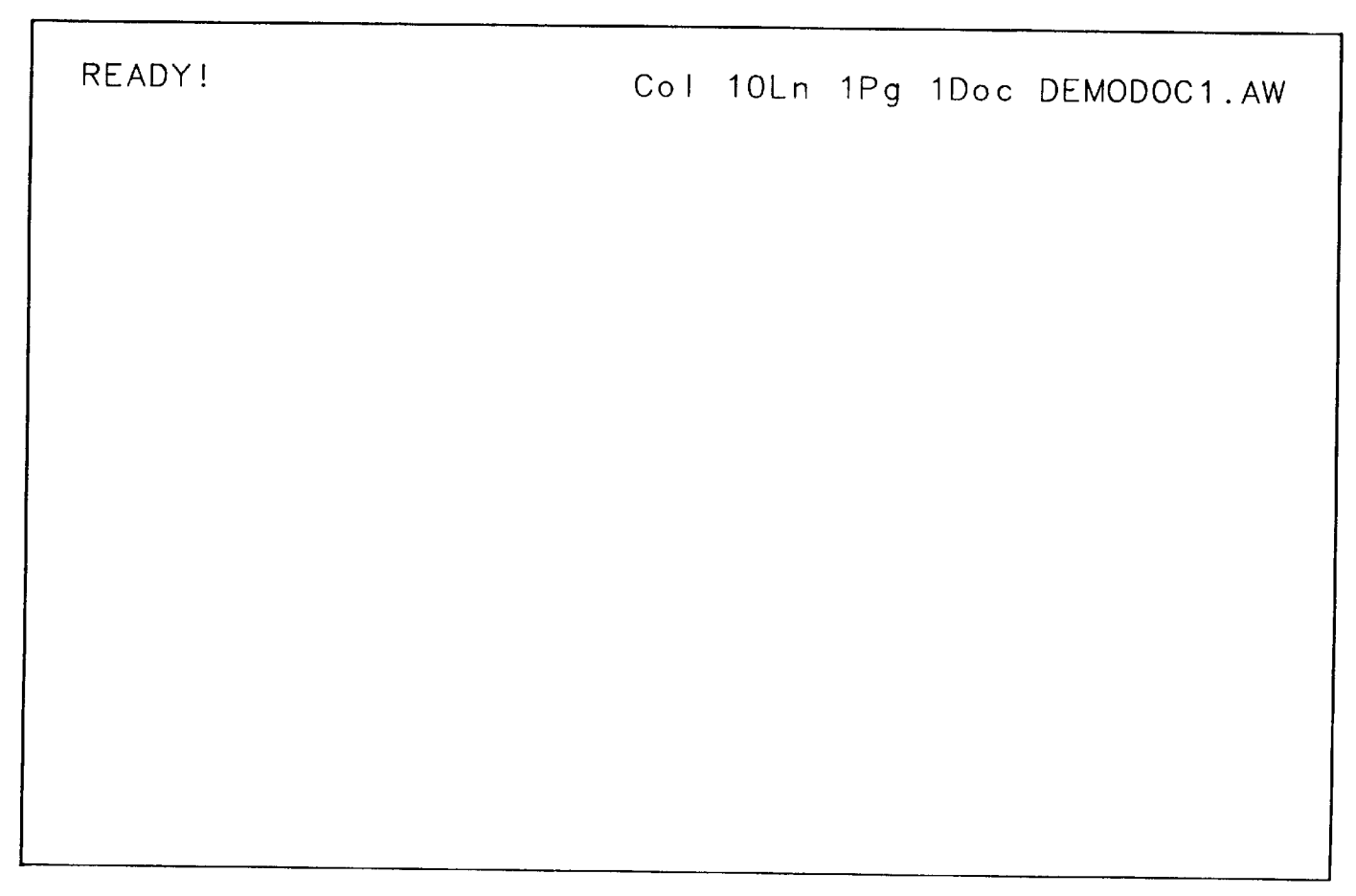

In FIG. 134 the application "AdvanceWrite" is shown. Since "AdvanceWrite" is not a program which was written to function under the "Windows" environment, "AdvanceWrite" takes over the entire screen. In FIG. 135, using the keyboard, text has been added to the screen as shown in FIG. 134.

Figure 136:
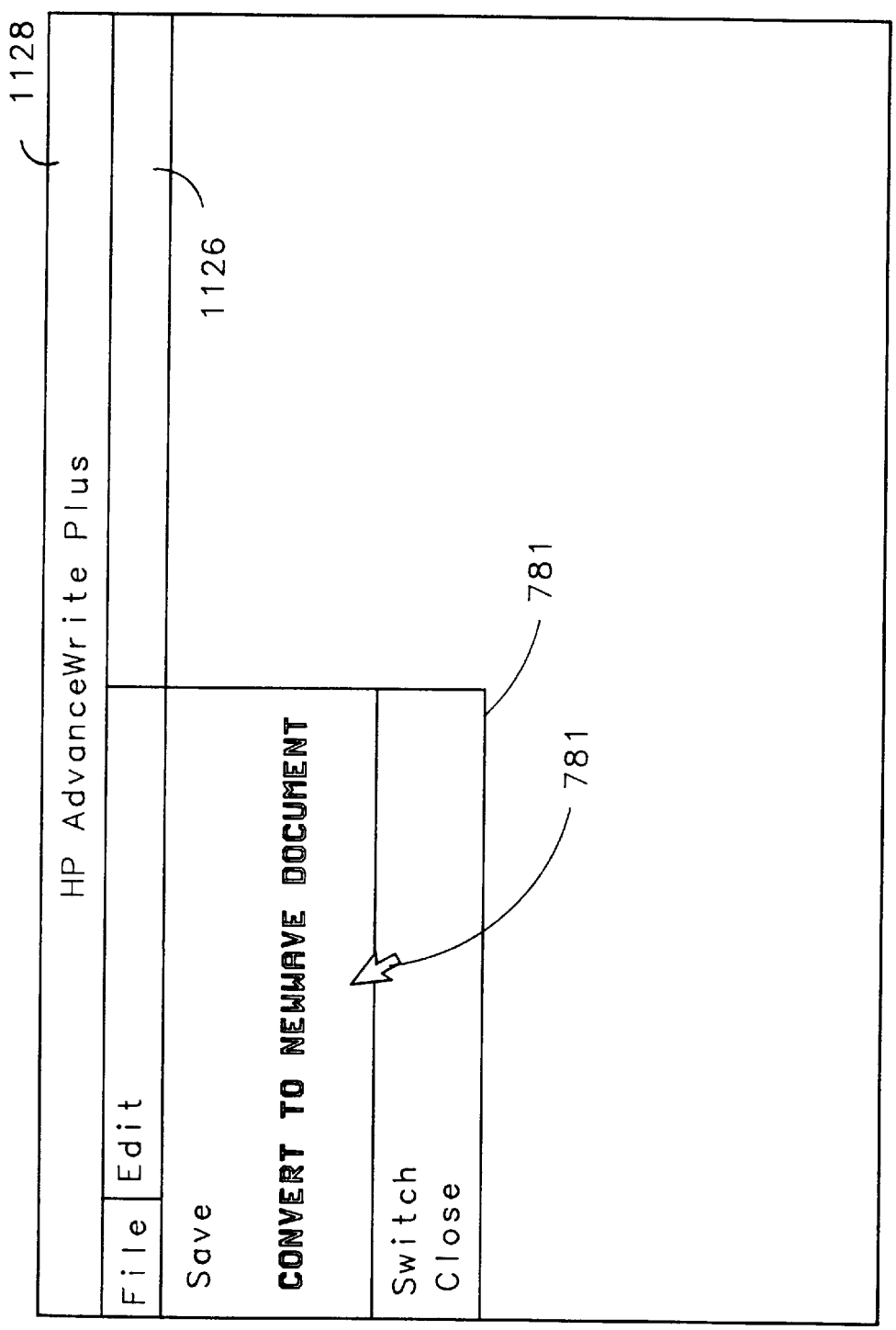
FIG. 136 shows a selection using a pull down menu.

In FIG. 136, pressing an "ALT" key on keyboard 19 activates the menu/macro facility. Shell filter 844 upon recognizing this keystroke displays a Title bar 1128 and menu bar 126 appearing. Cursor 781 is used to select the command "Convert to NewWave Document" in a pull-down menu 1124. Upon receipt of the selection, shell filter 844 transmits to the application "AdvanceWrite" the associated keystroke macro. This keystroke macro commands "AdvanceWrite" to save the current file in the format required for conversion within a special conversion subdirectory, and then commands "AdvanceWrite" to exit. Shell filter 8444 informs encapsulation shell 845 that the application "AdvanceWrite" is terminating. Dependent upon the configuration properties, encapsulation shell 845 searches the conversion subdirectory for any new files. Encapsulation shell 845 creates a conversion object which references a conversion application able to perform the conversion. The conversion application is identified in configuration properties 847. Once the conversion object is created, encapsulation shell 845 sends to the conversion object the identity of the file to be converted and a command to perform the conversion. The converted data file is then stored as part of a NewWave object and the intermediate conversion file in the conversion subdirectory is deleted.

Figure 137:
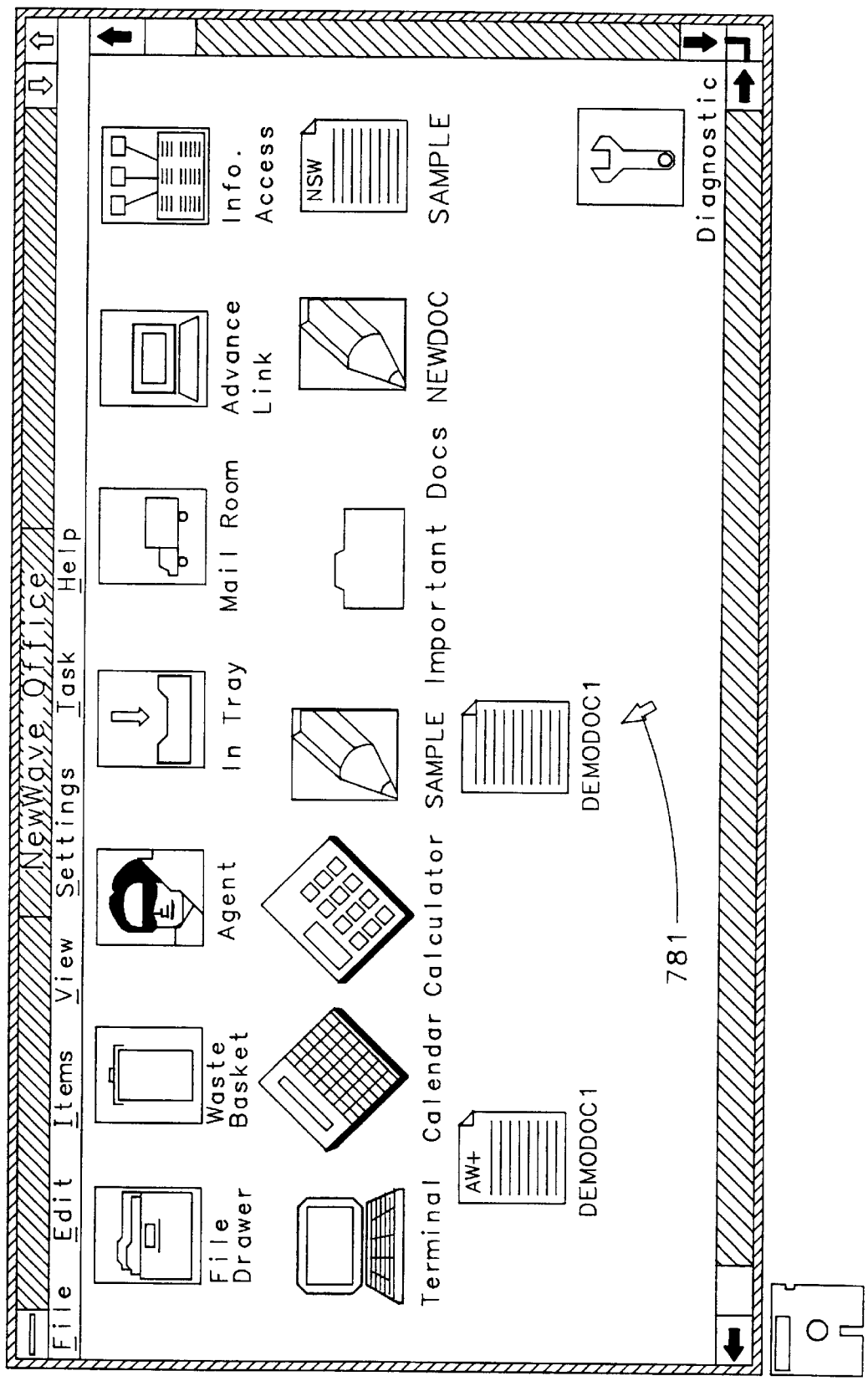
FIG. 137 illustrates copy of "DEMODOC1".
Figure 138:
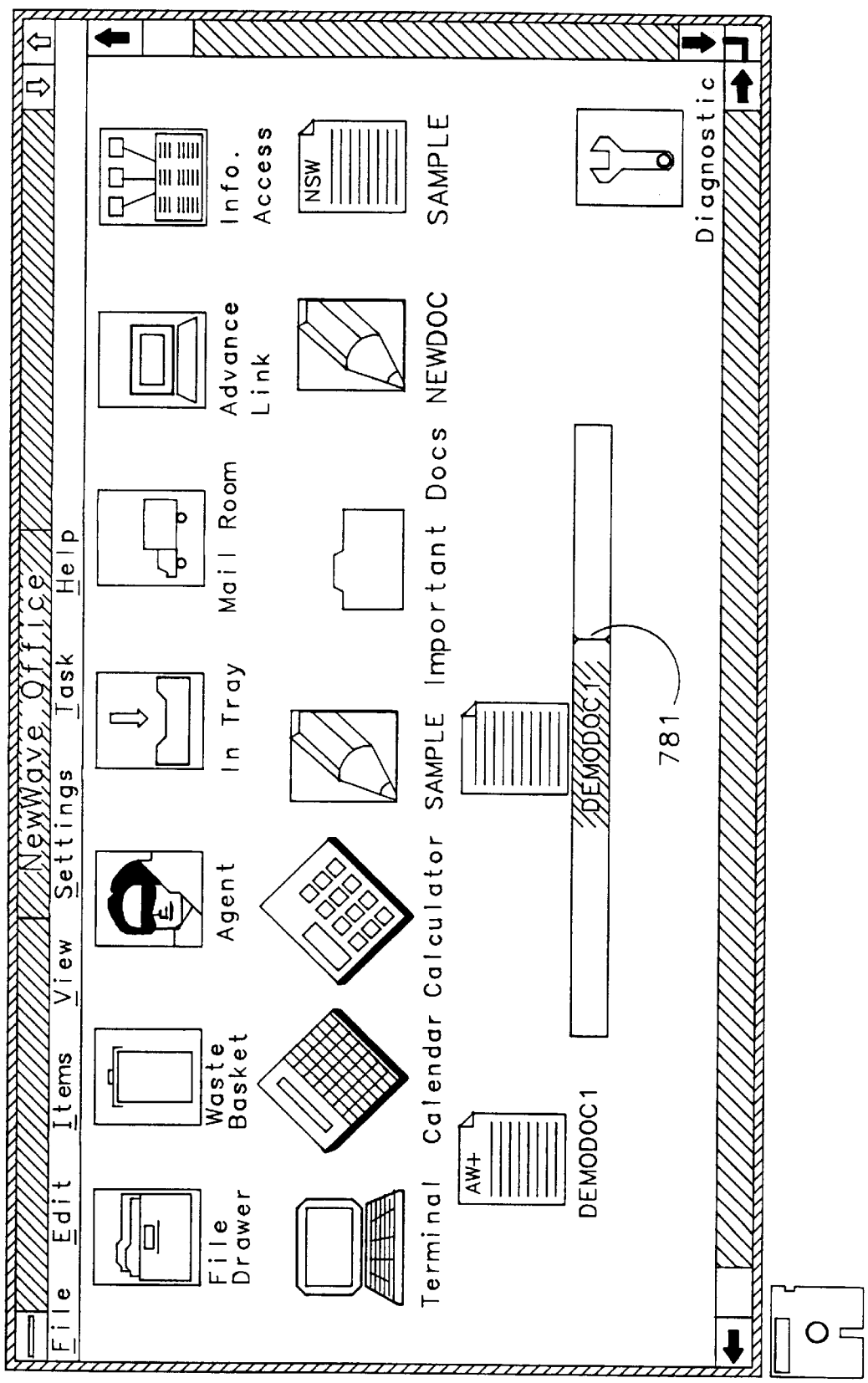
FIG. 138 illustrates that clicking on the title of the copy of "DEMODOC1" reveals that there is no directory listed.
Figure 139:
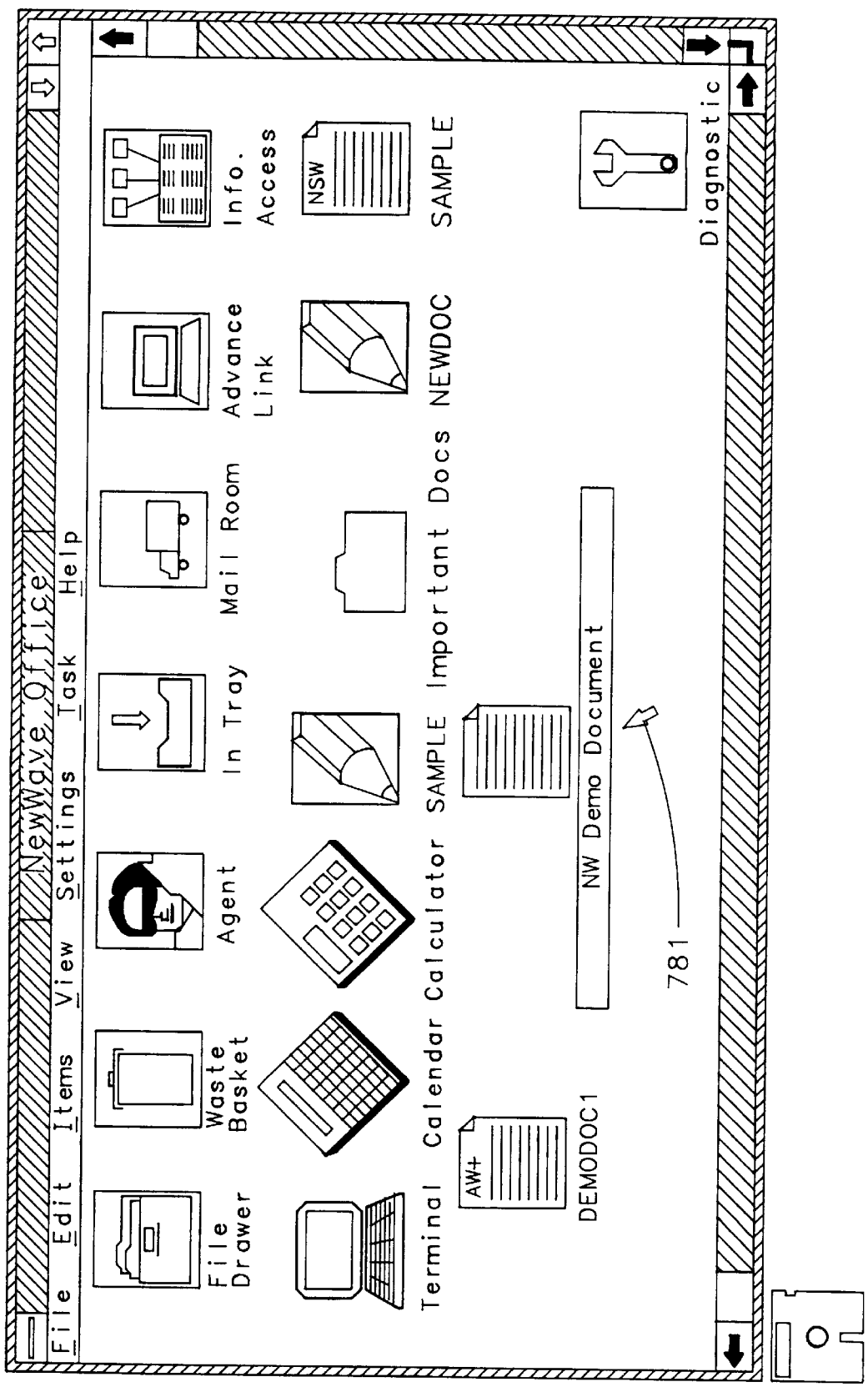
FIG. 139 shows the name of an object having been changed to "NW Demo Document.
Figure 140:
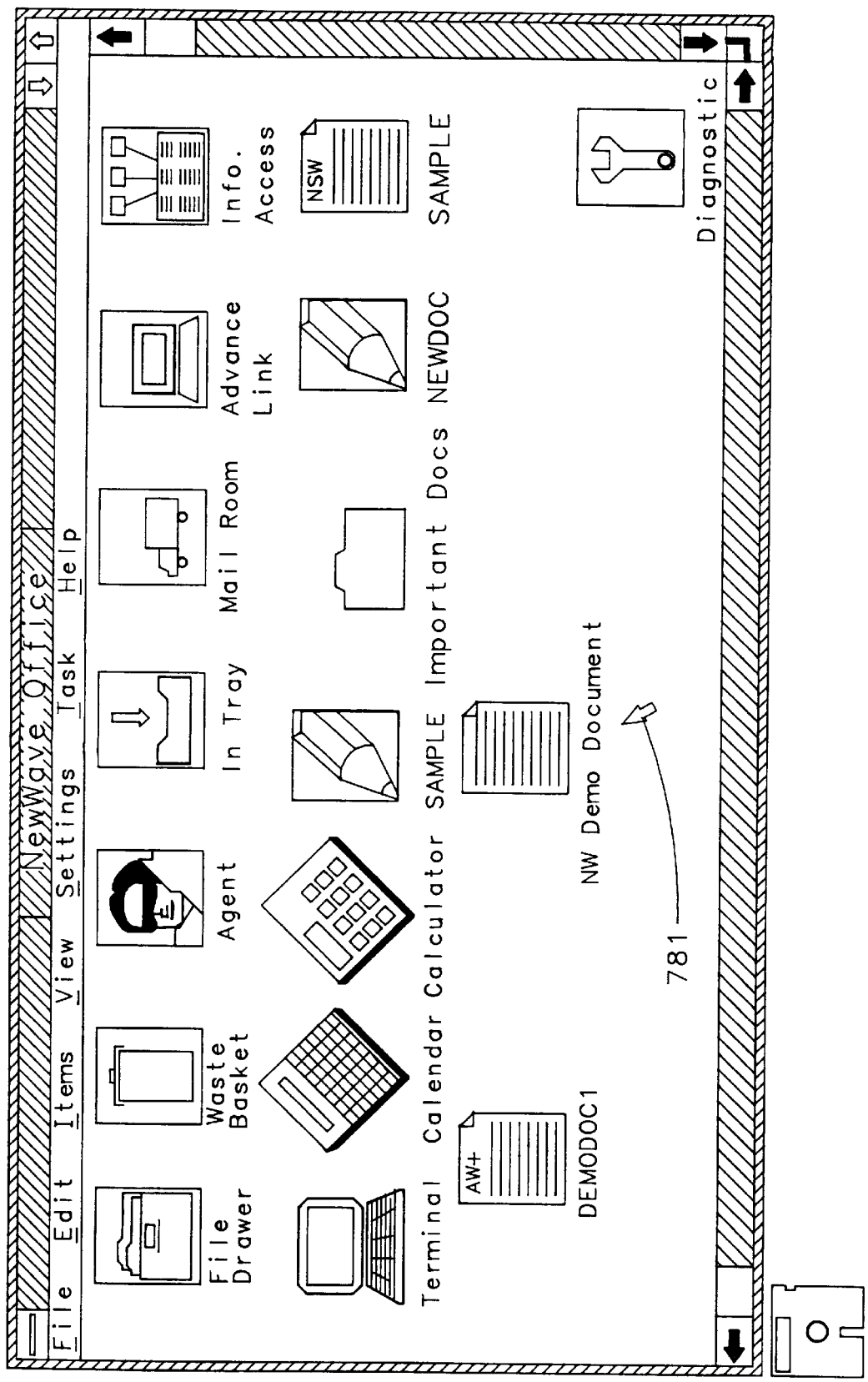
FIG. 140 shows the name bar of object "NW Demo Document" having been closed.

The result is a copy of "DEMODOC1" as shown in FIG. 137 and pointed to by cursor 781. The "DEMODOC1" is a NewWave Document, and thus may be treated as any other object on the system. Clicking on the title of the copy of "DEMODOC1" reveals that there is no directory listed. As shown in FIG. 139 the name of the object has been changed to "NW Demo Document" as pointed to by cursor 781. This name change may be done because the object is a NewWave Document. In FIG. 140 the name bar of object "NW Demo Document" has been closed.

Examples of code which implements "Windowlike" commands which are added to programs which normally do not function in a "Windows" environment are given in Appendix G, which can be found in the application file.

Figure 141:
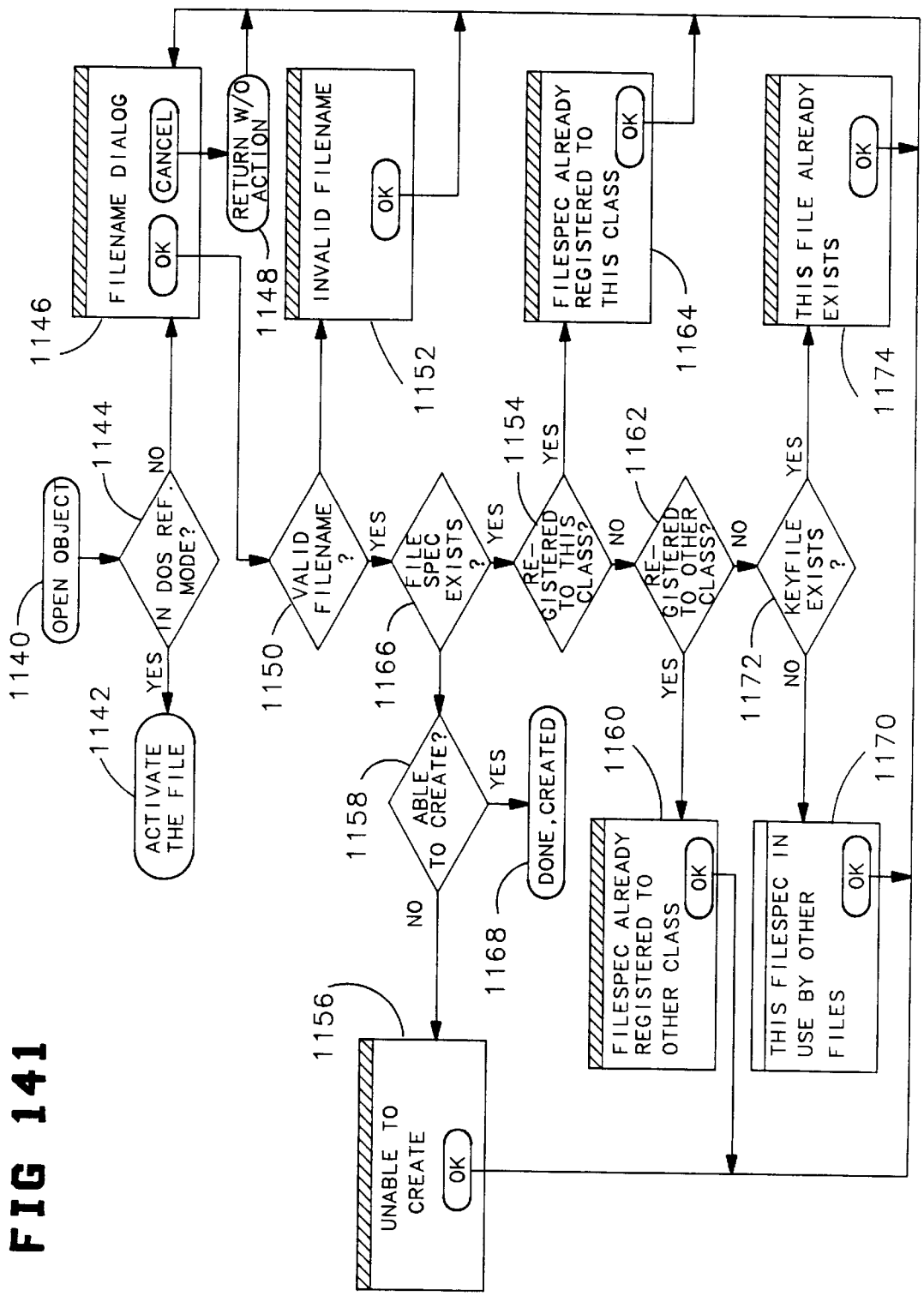
FIG. 141 contains a flowchart which discloses the process performed by the encapsulation shell shown in FIG. 84 when an object for an encapsulated application is opened in accordance with the preferred embodiment of the present invention.

FIG. 141 is a flowchart which shows the process OMF 100 and encapsulation shell 845 go through when an object is opened in accordance with the preferred embodiment of the present invention.

In a step 1140 a user attempts to open an object. In a step 1144, encapsulation shell 845 checks if the object is in DOS reference mode. If so the file is activated in a step 1142. If not in a dialog box 1146 appears to the user, who is asked to name a file. The user may, using cursor 781, cancel the transaction, and in a step 1148, encapsulation shell 845 returns without taking action. When the user selects a name, encapsulation shell 845, in step 1150 checks to see if the chosen name is a valid file name. If it is an invalid file name the user is informed using a dialog box 1152 and the user is asked to pick another file name by dialog box 1146.

If the file name is valid, encapsulation shell 845 checks to see if a file specification exists for the file. If the file specification does not exist in a step 1158 encapsulation shell 845 determines whether the file specification can be created. If so, the file specification is created and encapsulation shell 845, in a step 1168, returns. If the file specification cannot be created, the user is so informed by a dialog box 1156 and the user is asked to pick another file name by dialog box 1146.

If the file specification does exists, encapsulation shell 845, in a step 1154, determines whether the file name is registered to the same class. If so, the user is so informed by a dialog box 1164, and the user is asked to pick another file name by dialog box 1146.

If there is no file of the same name registered to the same class, encapsulation shell 845, in a step 1162, determines whether the file name is registered to another class. If so, the user is so informed by a dialog box 1160 and the user is asked to pick another file name by dialog box 1146.

If the file name is not registered to another class, encapsulation shell 845, in a step 1172, determines whether a keyfile exists for the file. If not the user is informed by a dialog box 1170 that the file specification is in use by other files and the user is asked to pick another file name by dialog box 1146. If the keyfile exists the user is informed by a dialog box 1174 that the file already exists and is asked to pick another file name by dialog box 1146.

Figure 142:
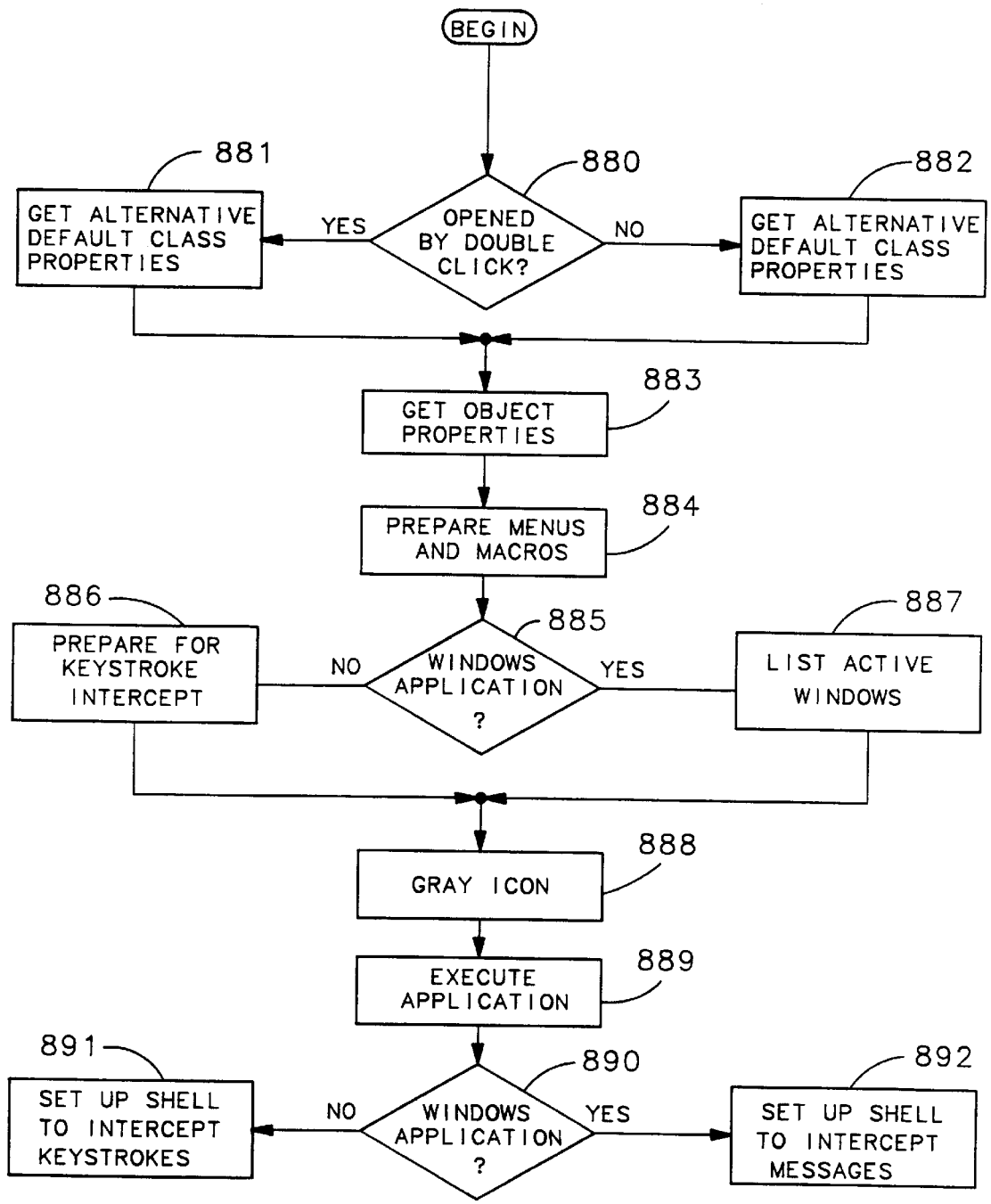
FIG. 142 contains a flowchart which discloses the process performed by the encapsulation shell shown in FIG. 84 when a file is activated.

FIG. 142 shows the steps taken by encapsulation shell 845 when the file is activated in step 1142. In a step 880 the method by which the object for the file was opened is determined. If the normal method of opening the file is used—e.g., by placing cursor 781 over the icon for the file and double clicking a button on mouse 20—then a default set of class properties is obtained in a step 881. If an alternate method of opening the file is employed—e.g., by placing cursor 781 over the icon for the file, holding down the "SHIFT" key on keyboard 19 and pressing a button on mouse 20—then an alternate set of class properties is obtained in a step 882.

In a step 883 encapsulation shell 845 obtains object properties for the file. In a step 884 encapsulation shell 845 prepares menus and macros which are are to be added to the application and which are to be monitored by shell filter 844. Shell filter has a different means of monitoring an application depending upon whether the application was written to operate in the "Windows" environment. Therefore, in a step 885, encapsulation shell 845 determines whether the opened application is a "Windows" application. If so, a list of active windows is obtained in a step 887. This is useful information to shell filter 844, which, when created, wants to intercept messages directed to a newly opened window for the present file. If the opened application is not a "Windows" application, preparation is made in a step 886 for shell filter 844 to intercept keystrokes.

In a step 888, encapsulation shell 888 grays the icon for the file, indicating to a user that the file has been opened. In a step 889 the application for the file is started. In a step 890, encapsulation shell again branches depending upon whether the application for the file is a "Windows" application. If the application is a "Windows" application, shell filter 844 is set up, in a step 892, to intercept messages sent to the window containing the "Windows application. If the application is not a "Windows" application, shell filter 844 is set up, in a step 891, to intercept keystrokes a user makes on keyboard 19 and user actions on mouse 20.

Figure 143:
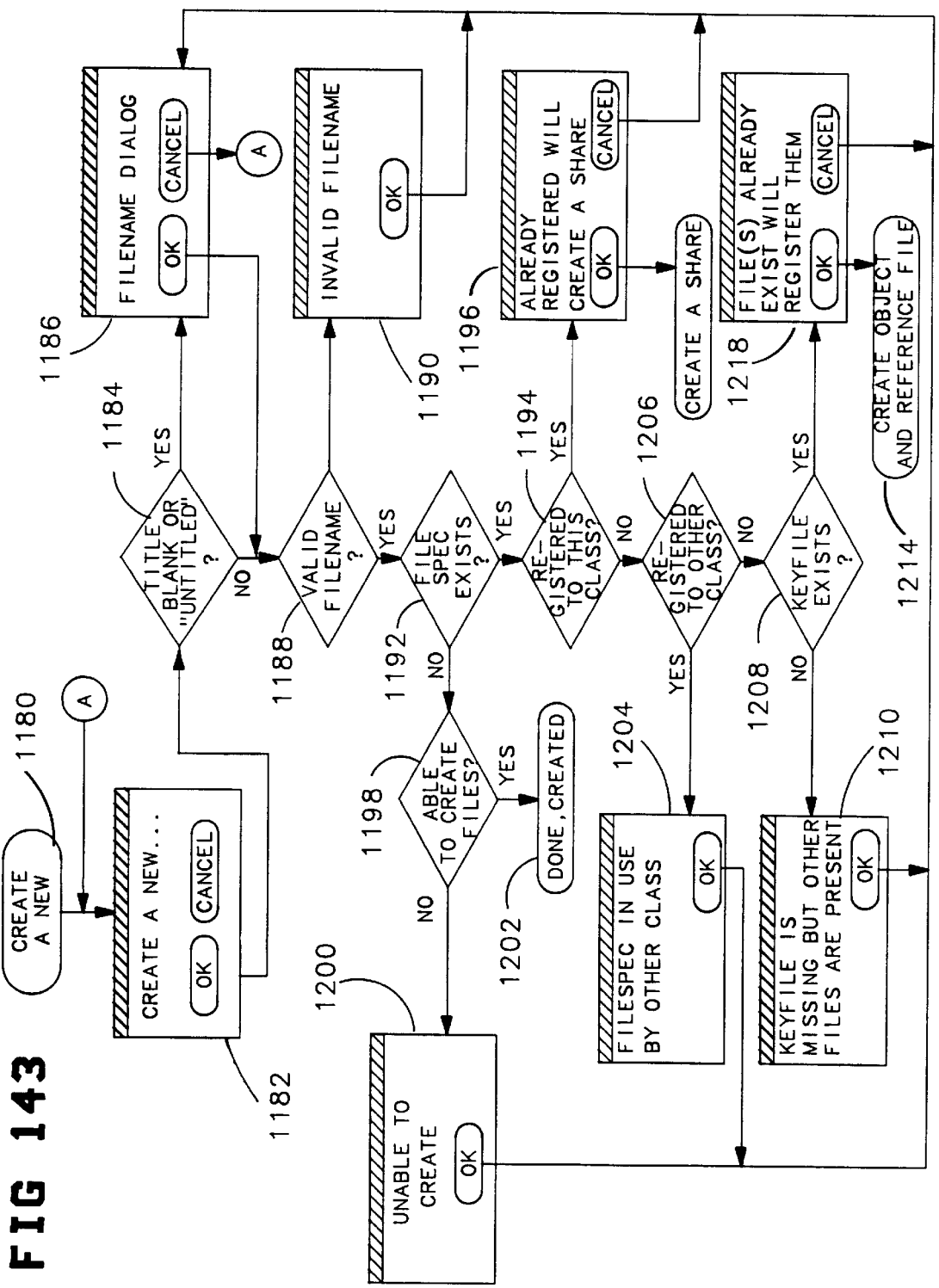
FIG. 143 contains a flowchart which discloses the process performed by the encapsulation shell shown in FIG. 84 when an object for an encapsulated application is created in accordance with the preferred embodiment of the present invention.

FIG. 143 is a flowchart which shows the process OMF 100 and encapsulation shell 845 goes through when an object is created in accordance with the preferred embodiment of the present invention.

In a step 1180 a user attempts to create a new object. A user is asked by a dialog box to confirm if he wants to create a new file. If the user makes the conformation encapsulation shell 845 determines in a step 1184 whether the user has indicated a file name. If not the user is asked to pick a file name by a dialog box 1186. At dialog box 1186 a user may ask to cancel which will bring up dialog box 1182.

Once a name has been selected encapsulation shell 845, in step 1188 checks to see if the chosen name is a valid file name. If it is an invalid file name the user is informed using a dialog box 1190 and the user is asked to pick another file name by dialog box 1186.

If the file name is valid, encapsulation shell 845 checks to see if a file specification exists for the file. If the file specification does not exist in a step 1198 encapsulation shell 845 determines whether the file specification can be created. If so, the file specification is created and encapsulation shell 845, in a step 1202, returns. If the file specification cannot be created, the user is so informed by a dialog box 1200 and the user is asked to pick another file name by dialog box 1186.

If the file specification does exists, encapsulation shell 845, in a step 1194, determines whether the file name is registered to the same class. If so, the user is so informed by a dialog box 1196 and the user is asked by a dialog box 1196 whether he wants to create a share of the existing file. If so a share is created in a step 1216. If not, the user is asked to pick another file name by dialog box 1186.

If there is no file of the same name registered to the same class, encapsulation shell 845, in a step 1206, determines whether the file name is registered to another class. If so, the user is so informed by a dialog box 1204 and the user is asked to pick another file name by dialog box 1204.

If the file name is not registered to another class, encapsulation shell 845, in a step 1208, determines whether a keyfile exists for the existing file. If not the user is informed by a dialog box 1210 that the keyfile is missing but other files are present and the user is asked to pick another file name by dialog box 1186. If the keyfile exists the user is informed by a dialog box 1218 that the file already exists and the user is asked to confirm that these existing files are to be registers. If the user confirms, the object and reference files are created in a step 1214. Otherwise, the user is asked to pick another file name by dialog box 1186.

When OMF 100 sends an open message to an object, the open message includes a alternate class parameter specifying whether or not the Shift key was depressed by the user when the user generated an open command to OMF 100, that is, a special parameter is sent when a user places cursor 781 over an object to be opened holds down the key marked "shift" on keyboard 19 while twice clicking a button on mouse 20. Encapsulation shell 845 may be configured, through parameters stored in configuration properties 847, to open an alternate application other than encapsulated application 846—in this case encapsulated application 846 is the default application—when encapsulation shell 845 receives from OMF 100 an alternate class parameter.

The above described use of a default class and an alternate class upon opening an object may be used to allow a user to specify the opening of two completely different application programs that both can process the same data file type. Alternatively, the use of a default class and an alternate class may be used to request encapsulation shell to open the same encapsulated application, but to open it with different parameters which direct how the data file is to be used. For example, a user may thus be able to specify whether he wants to edit or browse a file. Similarly, a user may thus be able to specify whether he wants to edit or compile a computer program stored in a data file.

In FIG. 14 is shown the different record types within the file HPOMF.DOS. A header record 990 contains a version number and other identification information. There is only one header record in HPOMF.DOS. It is 256 bytes long.

A directory record 991 identifies a directory that contains encapsulated data files. There is one directory record for each MS-DOS directory that contains encapsulated data files. The first directory record follows immediately after header record 990.

Directory record 991 contains three fields. A field 993 (IprecNextDIr) contains a 32-bit pointer (the offset from the beginning of the file, in bytes) of the next directory record in HPOMF.DOS. This field is set to zero in the last Directory Record. A field 994 (IprecFile) is a 32 bit pointer (the offset from the beginning of the file, in bytes) of the first File Record for the directory. A field 995 (szDirectory) contains a null-terminated string which is the directory name, including the drive specification.

A file record 992 identifies an encapsulated data file. There is one File Record for each encapsulated data file. Each Directory Record points to the first File Record within that directory.

File Record 992 contains 5 fields. A field 996 (IprecNextFile) is a 32-bit pointer (the offset from the beginning of the file, in bytes) of the next File Record for this directory. If this is the last file in the directory, field 996 is zero.

A field 997 (bDeleted) is a 16-bit Boolean value that indicates whether the file has subsequently been deleted. Field 997 is initially set to false when the File Record is created. When the file is deleted, the File Record is left in place (for performance reasons) and field 997 is set to "True" to indicate the entry is no longer valid. A File Record with field 997 set to "True" can be reused for another file.

A field 998 (szFileName) contains a null-terminated string which is the root file name (see FIG. 84B) of the encapsulated data file set.

A field 999 (dwObject) is a 32-bit value specifying the NewWave object identifier (parameter-scope name) of the object associated with this encapsulated file.

A field 1000 (Flag) is an 8-bit field containing other status information associated with this encapsulated data file.

FIG. 145 shows the logical structure of file HPOMF.DOS. Header record 991 is followed by directory record 991. Directory record 991, in field "IprecNextDir", contains a pointer to a directory record 1006. Directory record, in field "IprecNextDir", contains a pointer to directory record 1009. And so on.

Directory record 991 also contains, in field "IprecFile", a pointer to file record 992. File record 992 contains, in field "IprecNextFile" a pointer to file record 1004. File record 1004 contains, in field "IprecNextFile" a pointer to file record 1005. Similarly, directory record 1006 also contains, in field "IprecFile", a pointer to file record 1007. File record 1007 contains, in field "IprecNextFile" a pointer to file record 1008.

The following Appendices can be found in the application file.

Appendix A is a list of major data structures within OMF 100.

Appendix B is a description of functions which OMF interface 599 recognizes in the preferred embodiment of the present invention.

Appendix C (HP NewWave Environment: Program Design Examples) Gives examples of how the preferred embodiment of the present invention may be implemented including detail as to how OMF 100 allows data to be viewed between windows displayed on monitor 14.

Appendix D (Programmer's Guide) gives a further overview of the preferred embodiment of the present invention.

Appendix E is a listing of a program which provides for generic encapsulation of programs.

Appendix F, gives examples of files which need to be created for encapsulation of a program into the NewWave Environment.

Appendix G gives examples of code which implement "Windowlike" commands which are added to programs which normally do not function in a "Windows" environment.

We claim:

1. In a computing system, a computer implemented method comprising the steps of:

(a) providing, by a file management facility, a user interface environment on a computing screen, wherein a plurality of application processes are adapted to run in conjunction with the user interface environment, each application process in the plurality of application processes presenting a common set of menus to a user of the computing system, every application process in the plurality of application processes executing user originated instructions generated by a user interacting with the common set of menus;

(b) superimposing menus over a display generated by a first application process which is running on the computing system and which does not have the capability of presenting the common set of menus to the user of the computing system;

(c) forwarding the user originated instructions directly to the first application process when the user originated instructions are not generated using the menus superimposed over the display generated by the first application process;

(d) intercepting the user originated instructions forwarded to the first application process when the user originated instructions are generated using the menus superimposed over the display generated by the first application process;

(e) modifying the user originated instructions intercepted in step (d) to produce modified instructions executable by the first application process; and (f) forwarding the modified instructions produced in step (e) to the first application process.

2. A computer implemented method as in claim 1 additionally comprising the following step:

(g) monitoring input devices in order to recognize the user originated instructions from a user to be forwarded to the first application process in step (c) and to be intercepted in step (d).

3. In a computing system, a computer implemented method comprising the steps of:

(a) providing, by a file management facility, a user interface environment on a computing screen, wherein a plurality of application processes are adapted to run in conjunction with the user interface environment, each application process in the plurality of application processes executing user originated instructions from its own user originated instruction set and in addition, every application process in the plurality of application processes executing user originated instructions from a common user originated instruction set, the common user originated instruction set containing user originated instructions which are executable by every application process from the plurality of application processes; and, (b) filtering user originated instructions forwarded to a first application process which is not adapted to executing the user originated instructions from the common user originated instruction set, including the following substeps:

(b.1) forwarding the user originated instructions directly to the first application process when the user originated instructions are within an user originated instruction set for the first application process, (b.2) intercepting the user originated instructions forwarded to the first application process when the user originated instructions are within the common user originated instruction set, (b.3) modifying the user originated instructions intercepted in substep (b.2) to produce modified instructions within the user originated instruction set for the first application process, and (b.4) forwarding the modified instructions produced in substep (b.3) to the first application process.

4. A computer implemented method as in claim 3 additionally comprising the following step:

(c) monitoring input devices in order to recognize the user originated instructions from a user to be forwarded to the first application process.

5. A computer implemented method as in claim 4 wherein step (b) includes monitoring messages sent to the first application process in order to recognize when the user originated instructions are sent to the first application process.

6. A computer implemented method as in claim 4 wherein in step (c) the user originated instructions from the user are generated by user interactions with menus superimposed over a display generated by the first application process, the menus appearing to a user to be integrated into the first application process.

7. A computer implemented method as in claim 3 additionally comprising the step of:

(c) superimposing menus over a display generated by the first application process, the menus appearing to a user to be integrated into the first application process;

wherein in substep (b.2) the user originated instructions in the common user originated instruction set are generated by the user interactions with the menus superimposed over the display generated by the first application process.

8. A computing system comprising:

a plurality of application processes which operate within the computing system, each application process in the plurality of application processes for receiving user originated instructions including user originated instructions from a first user originated instruction set, and for processing the received user originated instructions;

a first application process, which operates within the computing system, for receiving and processing user originated instructions from a second user originated instruction set, the first application process not being adapted to processing the user originated instructions from the first user originated instruction set;

a user interface means for interpreting data from a user of the computing system and for generating the user originated instructions, the user originated instructions generated by the user interface being sent to at least one of a first group of application processes, the first group of application processes including the first application process and the plurality of application processes;

encapsulation shell means, which operates within the computing system, for receiving and processing the user originated instructions from the first user originated instruction set to generate modified instructions from the second user originated instruction set; and, a shell filter means, coupled to the user interface means, the first application process and the encapsulation shell, for forwarding to the first application process the user originated instructions from the second user originated instruction set sent by the user interface means to the first application process, for intercepting the user originated instructions from the first user originated instruction set sent by the user interface means to the first application process, and for sending the intercepted user originated instructions to the encapsulation shell means;

wherein the modified instructions from the second user originated instruction set generated by the encapsulation shell means are forwarded to the first application process.

9. A computing system as in claim 8 additionally comprising:

information about the first application process, stored within the computing system, wherein the encapsulation shell means accesses the information about the first application process in order to generate the second modified instruction set.

10. A computing system as in claim 9 additionally comprising a menu/macro definitions file, read by the encapsulation shell means, which includes definitions for additional user originated instructions generated by the user interface means, and which are received and processed by the encapsulation shell means.

\* \* \* \* \*